Sept. 9, 1969      J. G. BAKER      3,465,704

HYDROFOIL SYSTEM FOR BOATS

Original Filed Nov. 5, 1964      30 Sheets-Sheet 1

INVENTOR
JOHN GORDON BAKER
BY
ATTORNEY

Sept. 9, 1969 J. G. BAKER 3,465,704
HYDROFOIL SYSTEM FOR BOATS
Original Filed Nov. 5, 1964 30 Sheets-Sheet 2

INVENTOR.
JOHN GORDON BAKER
BY
ATTORNEY

Sept. 9, 1969 J. G. BAKER 3,465,704
HYDROFOIL SYSTEM FOR BOATS
Original Filed Nov. 5, 1964 30 Sheets-Sheet 3

INVENTOR.
JOHN GORDON BAKER
BY
ATTORNEY

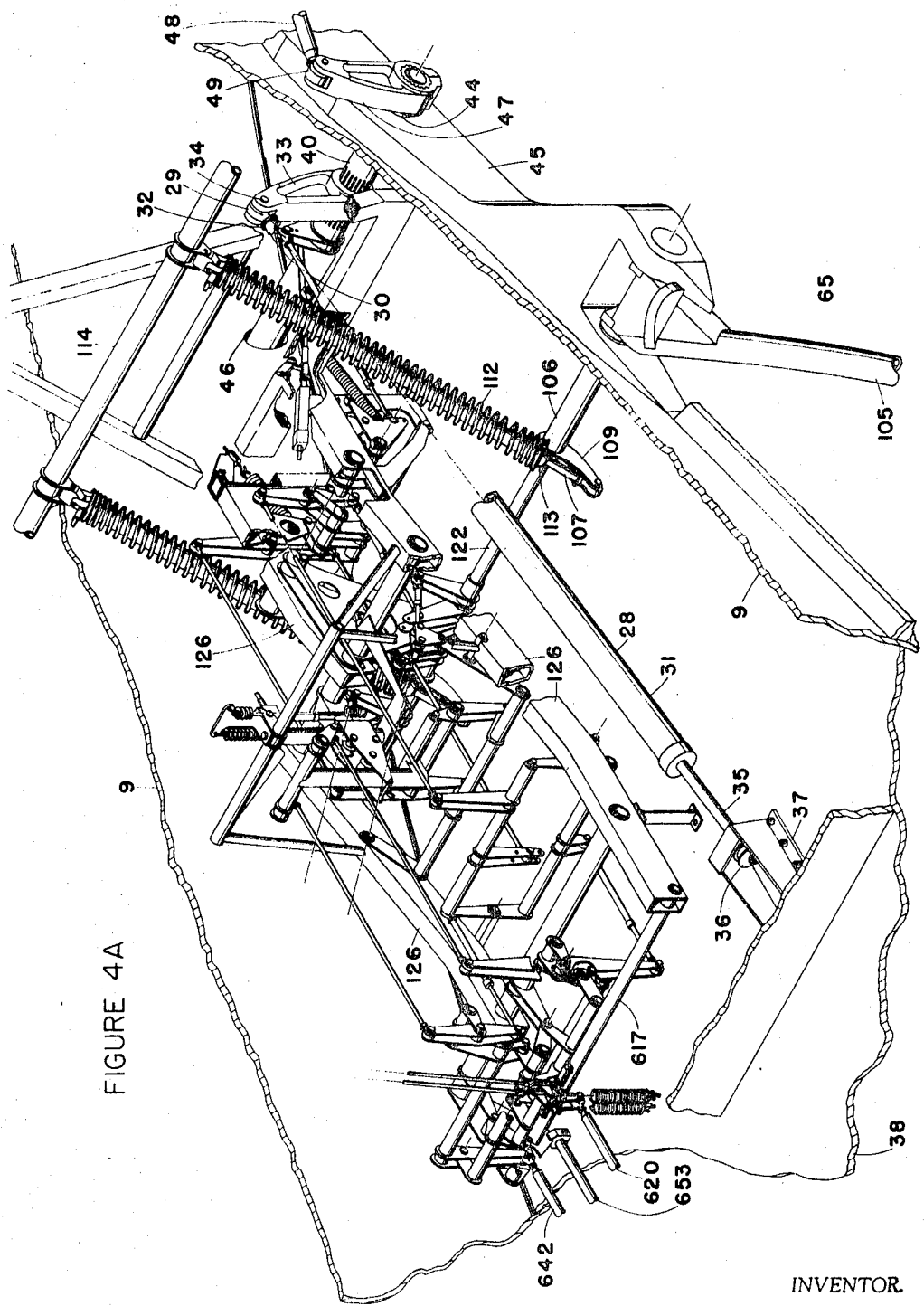

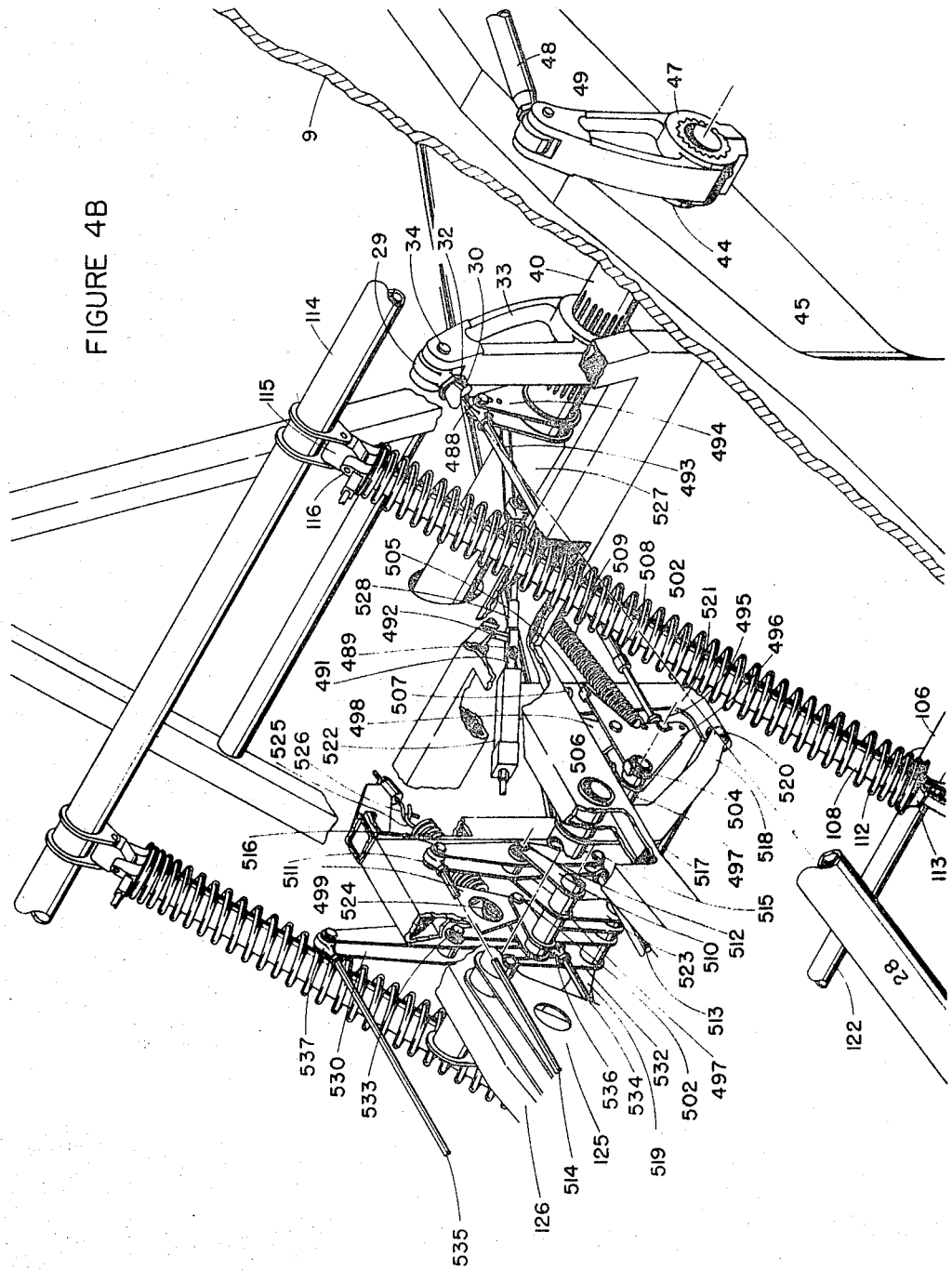

Sept. 9, 1969   J. G. BAKER   3,465,704
HYDROFOIL SYSTEM FOR BOATS
Original Filed Nov. 5, 1964   30 Sheets-Sheet 6

INVENTOR.
JOHN GORDON BAKER
BY
ATTORNEY

Sept. 9, 1969  J. G. BAKER  3,465,704
HYDROFOIL SYSTEM FOR BOATS
Original Filed Nov. 5, 1964  30 Sheets-Sheet 9

INVENTOR
JOHN GORDON BAKER
BY
ATTORNEY

Sept. 9, 1969            J. G. BAKER            3,465,704

HYDROFOIL SYSTEM FOR BOATS

Original Filed Nov. 5, 1964            30 Sheets-Sheet 12

INVENTOR.
JOHN GORDON BAKER
BY
ATTORNEY

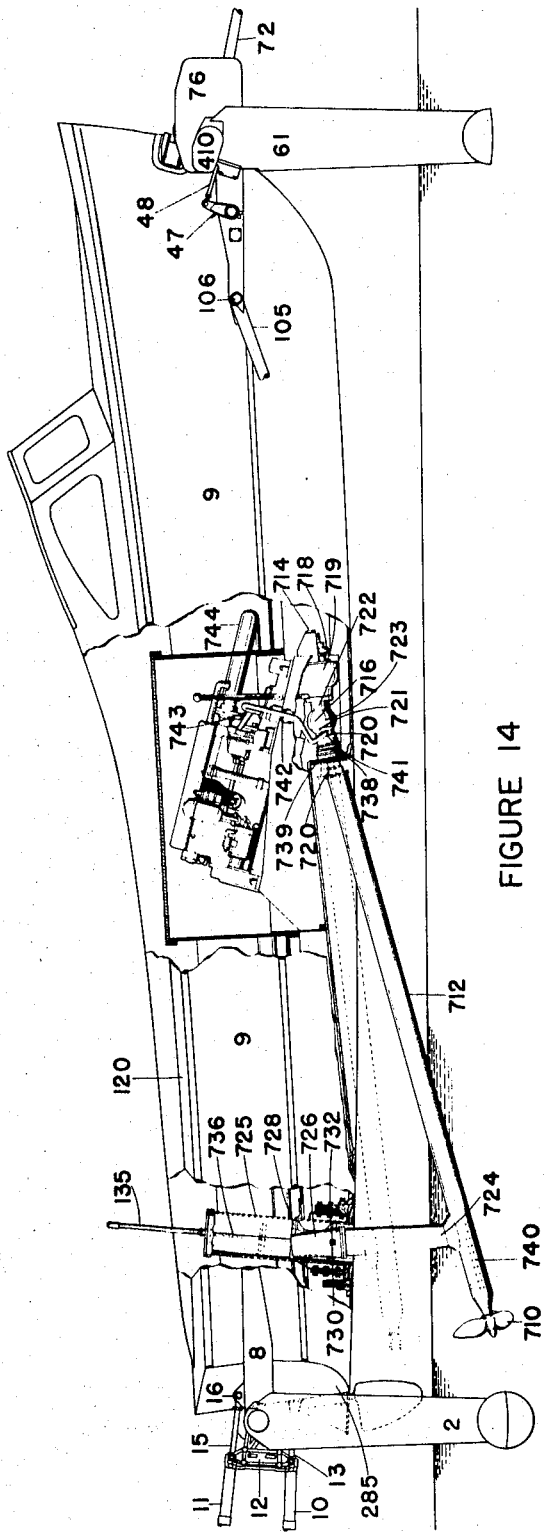

Sept. 9, 1969         J. G. BAKER         3,465,704
HYDROFOIL SYSTEM FOR BOATS
Original Filed Nov. 5, 1964                    30 Sheets-Sheet 14

INVENTOR.
JOHN GORDON BAKER
BY
ATTORNEY

Sept. 9, 1969            J. G. BAKER            3,465,704

HYDROFOIL SYSTEM FOR BOATS

Original Filed Nov. 5, 1964            30 Sheets-Sheet 15

INVENTOR.
JOHN GORDON BAKER
BY
ATTORNEY

Sept. 9, 1969 J. G. BAKER 3,465,704
HYDROFOIL SYSTEM FOR BOATS
Original Filed Nov. 5, 1964 30 Sheets-Sheet 16

INVENTOR.
JOHN GORDON BAKER
BY
ATTORNEY

Sept. 9, 1969   J. G. BAKER   3,465,704
HYDROFOIL SYSTEM FOR BOATS
Original Filed Nov. 5, 1964   30 Sheets-Sheet 17

INVENTOR
JOHN GORDON BAKER
BY John L. Diehl
ATTORNEY

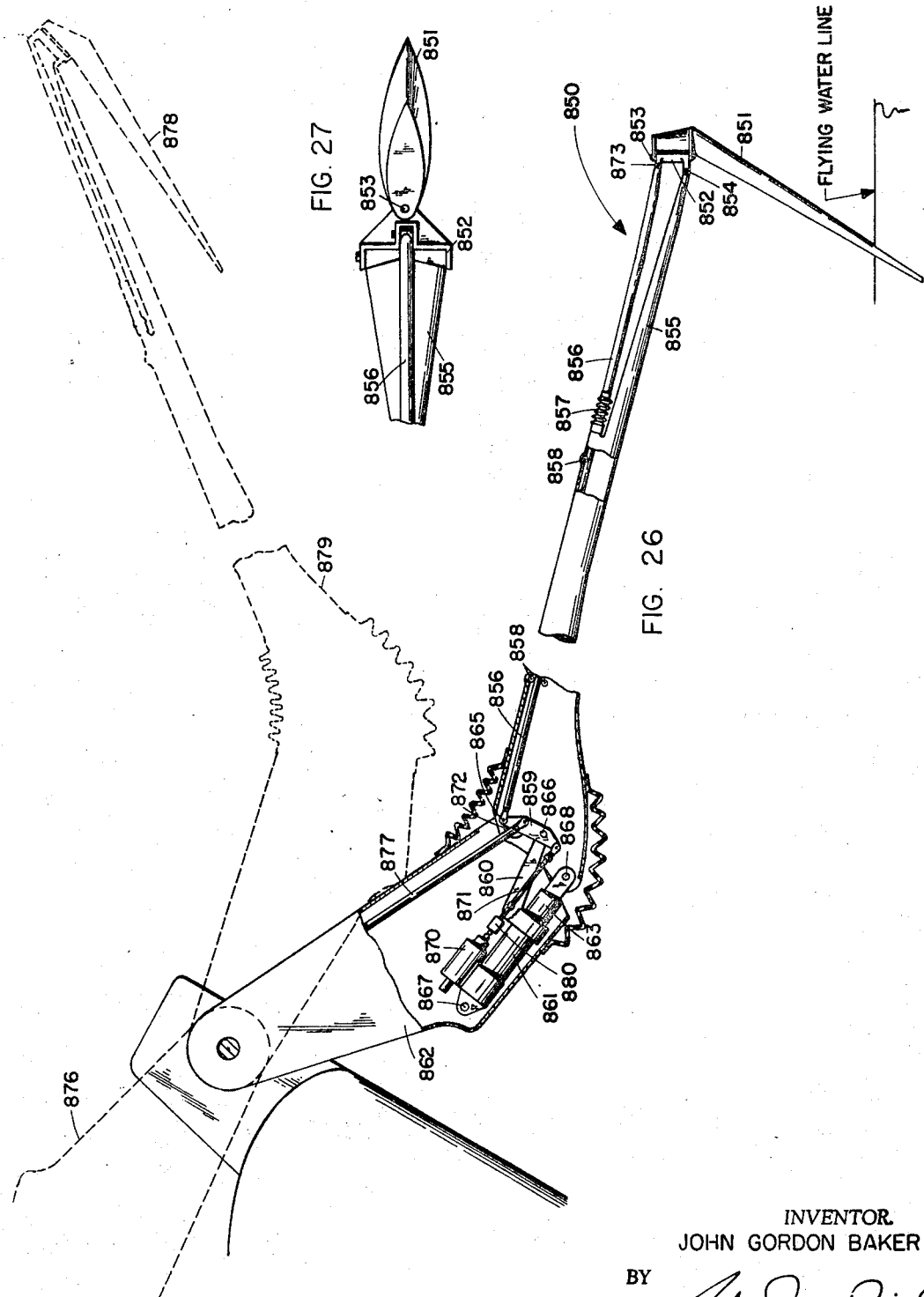

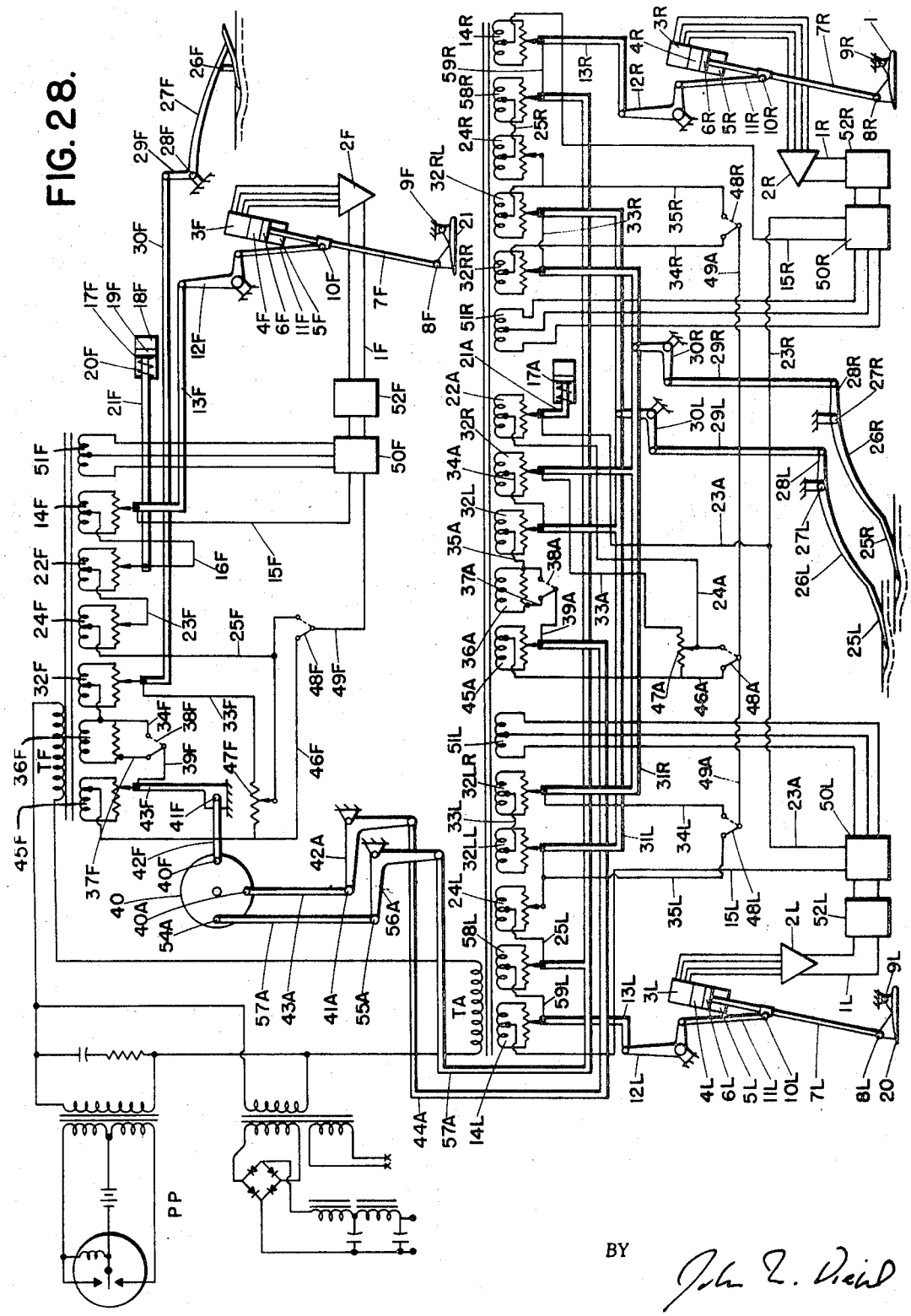

Sept. 9, 1969   J. G. BAKER   3,465,704
HYDROFOIL SYSTEM FOR BOATS
Original Filed Nov. 5, 1964   30 Sheets-Sheet 24

INVENTOR.
JOHN GORDON BAKER
BY
ATTORNEY

Sept. 9, 1969　　　　J. G. BAKER　　　　3,465,704
HYDROFOIL SYSTEM FOR BOATS

Original Filed Nov. 5, 1964　　　　30 Sheets-Sheet 26

INVENTOR.
JOHN GORDON BAKER
BY
ATTORNEY

Sept. 9, 1969  J. G. BAKER  3,465,704
HYDROFOIL SYSTEM FOR BOATS
Original Filed Nov. 5, 1964  30 Sheets-Sheet 27

INVENTOR.
JOHN GORDON BAKER
BY
ATTORNEY

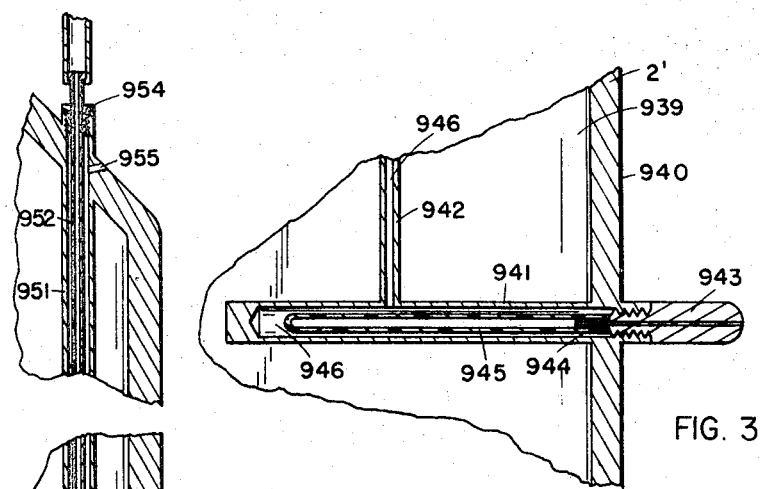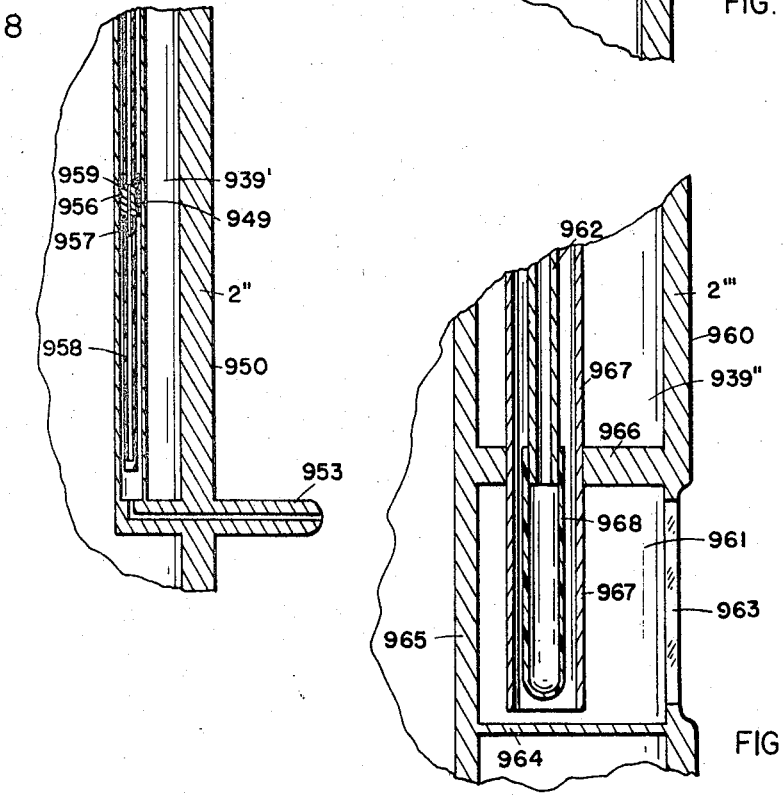

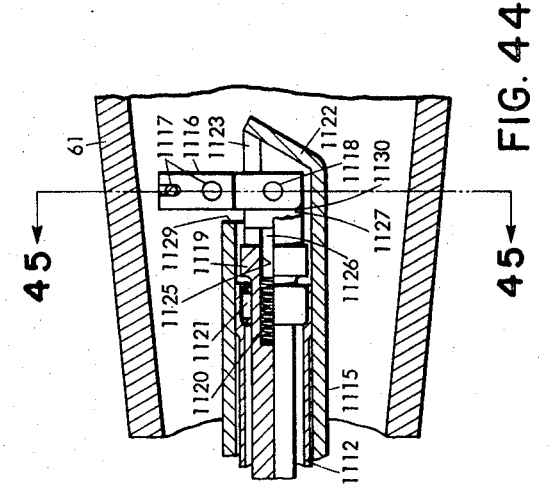
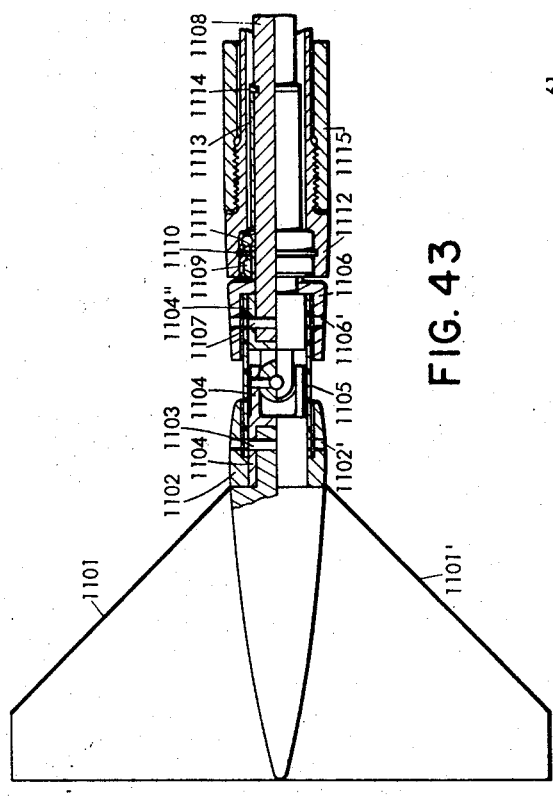
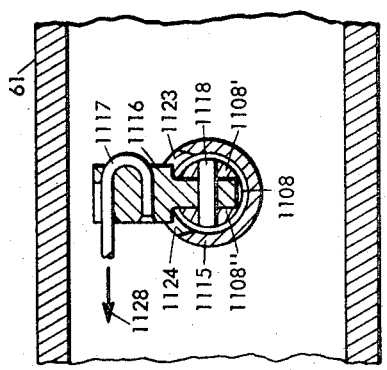
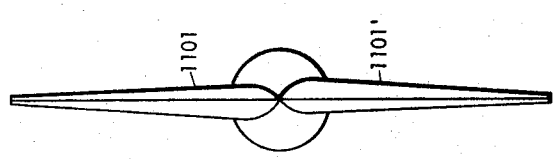

United States Patent Office 3,465,704
Patented Sept. 9, 1969

3,465,704
HYDROFOIL SYSTEM FOR BOATS
John Gordon Baker, Evansville, Wis. 53536
Continuation of application Ser. No. 409,103, Nov. 5, 1964. This application Apr. 8, 1968, Ser. No. 719,764
Int. Cl. B63b 1/30
U.S. Cl. 114—66.5                                76 Claims

ABSTRACT OF THE DISCLOSURE

The first principal embodiment is represented by a boat named "High Tail" which has:

(1) Three fully submerged hydrofoils, two aft and one forward, the latter being rotated about an upright axis for steering, (2) Three planing ski sensors, one forward of each hydrofoil, which with other factors determine the pitch, elevation and roll of the boat, (3) Loading on each sensor that increases with increase in water speed to reduce the change in sensor penetration of the water surface with a given change in water speed, (4) Pitch and elevation control parameters that are near optimum or are readily adjustable to near optimum for a given wave length and heading, to minimize vertical accelerations of the boat in waves for a given hydrofoil strut length, (5) Automatic elevation regulation during changes in course and speed, (6) Automatic inward banking during changes in course, (7) Automatic control sequencing during changes in speed, (8) Hydrofoils with hinge axes located such that the hydrodynamic hinge moment on any hydrofoil is determined by the water speed and independent of the load on or angle of attack of the hydrofoil to permit use of the hydrodynamic moment as a water speed signal in connection with (2) through (7) above.

The use of alternative elevation sensing, alternative roll sensing, and alternative water speed sensing permitting alternate hinging of the hydrofoils and alternate control surface rotation and actuation, are described herein.

The second principal embodiment has or may have features 1, 3, 5, 6, 7 and 8 listed above for the High Tail system. Referring to feature (2) the second principal embodiment has three sensing hydrofoils instead of planning ski sensors as on High Tail. Thus, the second principal embodiment is a hydrofoil boat with hydrofoil sensing. The control parameters of the second principal embodiment are not optimum. On this account, the performance of the second principal embodiment is critical waves, that is, waves of wave length two to four times the fore and aft spacing of the hydrofoils, is inherently inferior to the performance of the first principal embodiment. On the other hand, the second principal embodiment is simpler than the High Tail system yet comparable in performance for wave lengths substantially shorter or longer than critical waves.

CONTENTS
                                                                Column
Objects------------------------------------------------------------ 3
Figures------------------------------------------------------------ 4
Definitions-------------------------------------------------------- 6
Symbols------------------------------------------------------------ 9
High Tail Introduction-------------------------------------------- 15
Description of High Tail------------------------------------------ 16
  A. Hydrofoil Mounting, Retraction, Impact Absorption and
     Steering-------------------------------------------------- 16
  B. Sensor Design, Actuation and Signal Source---------------- 17
  C. The Sequence Function Unit-------------------------------- 19
  D. The Reciprocal Function Units----------------------------- 20
  E. Overload Releases---------------------------------------- 21
  F. Locations of the Computer Sections in the Boat----------- 22
  G. The Forward Computer Section------------------------------ 22
  H. Caging---------------------------------------------------- 26
  I. Servos for Hydrofoil Control------------------------------ 26
  J. Bow Computer Section------------------------------------- 28
  K. Stern Computer Section----------------------------------- 33
  L. Propulsion and Propeller Retraction---------------------- 35
  M. Hydraulic System----------------------------------------- 36
Submerged Hydrofoil Control Theory and Application Assumptions-- 38
  A. Pitch and Heave Control Requirements for Minimum
     Draft and Limited Acceleration--------------------------- 39
  B. Pitch and Heave Control Signals and Coupling Parameters
     for Zero Flying Draft Variance in Long Waves------------ 39
  C. The Selection of Pitch and Heave Control Parameters for
     Minimum Draft and Limited Acceleration------------------ 40
  D. Roll Stabilization--------------------------------------- 46
  E. Roll and Elevation Control in Turns---------------------- 47
  F. Automatic Climb and Descent during Acceleration and
     Deceleration-------------------------------------------- 47
  H. Specific Coupling Equations and High Tail's Control------ 48
  I. Function Units------------------------------------------- 50
Appendix A—Approximation for Wave Train Velocity---------------- 51
Appendix B—Pitch and Heave Control Requirements for Minimum Draft and Limited Acceleration----------------------- 51
Appendix C—Pitch and Heave Control Signals and Coupling Parameters for Zero Flying Draft Variance in Long Waves------ 52
Appendix D—Analysis of Pitch and Heave Motions in Waves-------- 53
Flying Performance in Waves------------------------------------- 57
Some Conclusions------------------------------------------------ 57
Hydrofoil Boat With Hydrofoil Sensing--------------------------- 57
  General Description---------------------------------------- 57
  Invariant Hinged Hydrofoil--------------------------------- 59
  Hydraulic Elevation Adjustment----------------------------- 60
  Functionally Hinged Hydrofoils----------------------------- 61
  Elevation-Speed Relationships for Sensing Hydrofoil Systems
     and for High Tail's System Compared--------------------- 62
Analysis of Sensing Hydrofoil System with Invariant Hinged
  Hydrofoils------------------------------------------------- 62
  Draft of Sensing Hydrofoils-------------------------------- 62
  Equation of Vertical Motion for Sensing Hydrofoil---------- 63
  Elevation of Hull as a Function Speed---------------------- 63
  Equation of Hull Motion------------------------------------ 64
  Stability-------------------------------------------------- 65
Analysis of Sensing Hydrofoil System with Functionally Hinged
  Hydrofoils------------------------------------------------- 65
  Definition of System--------------------------------------- 65
  Forward Unit Typical--------------------------------------- 65
  Elevation of the Hull as a Function of Speed--------------- 65
  Determination of $a_n$, $l_n$ and $K_1\alpha_1$------------ 66
  Equation of Vertical Motion for Sensing Hydrofoil---------- 67
  Equation of Hull Motion and Stability---------------------- 67
Coupling Equations of High Tail Control and of Sensing Hydrofoil
  Controls Compared and Discussed---------------------------- 68
Drag Probe Sensor---------------------------------------------- 69
Electrical Analogue of High Tail's Computer-------------------- 70
Alternative Forward Sensor------------------------------------- 75
Alternate Roll Control----------------------------------------- 76
Clean Hydrofoil Hinge------------------------------------------ 76
Pitot Sensors for Dynamic Pressure----------------------------- 77
Vane Type Dynamic Pressure Sensor------------------------------ 79
Propeller Boat Speed Sensors----------------------------------- 80
Claims
  1–10------------------------------------------------------ 81–83
  20, 21------------------------------------------------------- 85
  30–42----------------------------------------------------- 86–87
  50–52-------------------------------------------------------- 88
  64–76----------------------------------------------------- 90–94
Table I—Following Sea----------------------------------------- 42
Table II—Head Sea--------------------------------------------- 43
Table III—Following Sea--------------------------------------- 46
  Predicted Flying Draft Variances and Vertical Accelerations in
Waves--------------------------------------------------------- 46
Table IV—Head Sea--------------------------------------------- 46
  Predicted Flying Draft Variances and Vertical Accelerations in
Waves--------------------------------------------------------- 46

This application is a continuation of Ser. No. 409,103 filed Nov. 5, 1964, now abandoned.

This invention relates to hydrofoil systems for boats and more particularly to such systems which automatically control the pitch, elevation, and roll of the boat with rotations of the hydrofoils or hydrofoil control surfaces that are dependent on the relative water elevation as determined by one or more water surface sensors.

An object of this invention is to provide a hydrofoil system of the class described which automatically maintains a constant mean elevation-speed relationship for the boat while foilborne.

A second object is to provide a hydrofoil system of the class described which automatically banks the boat inward in a turn.

A third object is to provide a hydrofoil sensor, sensor mounting and coupling combination for a hydrofoil system of the class described for use in smooth water and moderate waves, said combination being capable of directly controlling the rotation of a fully submerged hydrofoil so that the boat flies at a substantially constant mean elevation for a useful range of flying speeds.

A fourth object of this invention is to provide a hydrofoil system of the class described, for use in smooth water and in all typical seaways, in which a novel form of control and specific control parameters are used to minimize the flying draft variation for a given tolerable maximum vertical acceleration in waves, in order to also minimize the length of hydrofoil support struts, and depth setting of the propulsion apparatus, and the weight and drag of the hydrofoil system.

A fifth and related object is to provide a hydrofoil system of the class described with a simple, yet effective, means to adjust the system for various sea conditions.

A sixth object is to provide a sensor of the class described that utilizes hydrodynamic force for sensing, that automatically extends during acceleration and retracts during deceleration at predetermined boat speeds, and that penetrates the water surface an amount that is independent of the boat speed.

A seventh object is to provide a hydrofoil system of the class described, which, during acceleration from rest, automatically extends and loads one or more sensors, starts the control rotations of the hydrofoils, initiates the climb to flying elevation, and performs the reverse operations during deceleration from speed, all at predetermined boat speeds.

An eighth object is to provide simplification and reliability in the automatic control of a hydrofoil system of the class described by the novel use of a specific hydrofoil hinge axis location, one such location being that for which the hydrodynamic moment on the hydrofoil is substantially independent of the angle of attack and therefore an approximate measure of the dynamic pressure of the water flow past the hydrofoil.

A specific related object is the novel use of the hydrodynamic moment on a hydrofoil, having the specific hinge axis location mentioned above, to produce a load on a water surface sensor which will result in water surface penetration of the sensor substantially independent of the boat speed, in order to make such a sensor suitable for use with the automatic control of a hydrofoil system of the class described.

Another specific related object is the novel use of the hydrodynamic moment on a hydrofoil, having the specific hinge axis location mentioned above, to initiate automatic control operations during acceleration and deceleration of the boat.

Still another specific related object is the novel use of the hydrodynamic moment on a hydrofoil, having the specific hinge axis location mentioned above, to produce a constant mean elevation-speed relationship.

A twelfth object is to provide for the hinging of a hydrofoil without adding appreciably to the drag or tendency of the hydrofoil to cavitate or ventilate.

A thirteenth object is to provide a simple novel means of eliminating errors in the automatic control of a system of the class described due to loss of motion and temperature change.

A fourteenth object is to provide a novel mechanical signal transmission for the automatic control of a hydrofoil system of the class described which is compatible with retraction, extension, and impact absorption motions of the hydrofoils, and provided with protection against overload and loss of power supply.

A fifteenth object is to provide a forward and an aft hydrofoil station, with one or two fully submerged angle controlled hydrofoils at each station, with a least one water surface sensor forward of each station, and with control and angular actuation apparatus for each fully submerged hydrofoil at each station, to minimize flying draft variance for a given permissible vertical acceleration and thus to minimize the length of struts needed.

A sixteenth object is to provide a means for automatic lowering of the boat while turning to prevent broaching of one or more of the hydrofoils.

Other objects and advantages of the invention will become apparent from the following detailed description taken in connection with the accompanying drawings which show principally two embodiments of the invented system, together with alternate embodiments of several components, devices and sub-systems.

The first principal embodiment is represented by a boat named "High Tail" which has:

(1) Three fully submerged hydrofoils, two aft and one forward, the latter being rotated about an upright axis for steering, (2) Three planing ski sensors, one forward of each hydrofoil, which with other factors determine the pitch, elevation and roll of the boat, (3) Loading on each sensor that increases with increase in water speed to reduce the change in sensor penetration of the water surface with a given change in water speed, (4) Pitch and elevation control parameters that are near optimum or are readily adjustable to near optimum for a given wave length and heading, to minimize vertical accelerations of the boat in waves for a given hydrofoil strut length, (5) Automatic elevation regulation during changes in course and speed, (6) Automatic inward banking during changes in course, (7) Automatic control sequencing during changes in speed, (8) Hydrofoils with hinge axes located such that the hydrodynamic hinge moment on any hydrofoil is determined by the water speed and independent of the load on or angle of attack of the hydrofoil to permit use of the hydrodynamic moment as a water speed signal in connection with (2) through (7) above.

The use of alternative elevation sensing, alternative roll sensing, and alternative water speed sensing permitting alternate hinging of the hydrofoils and alternate control surface rotation and actuation, are described herein.

The second principal embodiment has or may have features 1, 3, 5, 6, 7, and 8 listed above for the High Tail system. Referring to feature (2) the second principal embodiment has three sensing hydrofoils instead of planing ski sensors as on High Tail. Thus, the second principal embodiment is a hydrofoil boat with hydrofoil sensing. The control parameters of the second principal embodiment are not optimum. On this account, the performance of the second principal embodiment in critical waves, that is, waves of wave length two to four times the fore and aft spacing of the hydrofoils, is inherently inferior to the performance of the first principal embodiment. On the other hand, the second principal embodiment is simpler than the High Tail system yet comparable in performance for wave lengths substantially shorter or longer than critical waves.

FIGURES 1 to 16 are views of the first embodiment of the invention.

FIG. 1 is a perspective rear quarter view of a hydrofoil boat named High Tail, with hydrofoils, sensors and propeller extended;

FIG. 2 is an isometric fragmentary partially cutaway view from the stern of the embodiment of FIG. 1, High Tail;

FIG. 3 is a fragmentary isometric cutaway view from the rear quarter of the bow of the embodiment of FIG. 1;

FIG. 4A is a fragmentary isometric schematic cutaway view of the interior of the bow compartment of High Tail;

FIG. 4B is an enlargement of a forward fragment of the view in FIG. 4A;

FIG. 6 is a fragmentary perspective view of the forward sensor of High Tail;

FIG. 7 is a fragmentary isometric schematic view of the stern compartment;

FIG. 8 is a fragmentary view of the sequence function unit;

FIG. 9 is a partially cross-sectional view of the sequence function unit taken along the line AA of FIG. 8;

FIG. 10 is a partially cross-sectional view of the sequence function unit taken along the Line BB;

FIG. 11 is a partially cross-sectional view of the reciprocal function unit taken along the axis of its spring and cylinder;

FIG. 12 is a partially cross-sectional view of an overload release taken along its longitudinal center line;

FIG. 13 is a partially cross-sectional view of the signal input of the forward hydrofoil servo taken along its longitudinal axis;

FIG. 14 is a partially cutaway elevation of High Tail;

FIG. 15 is a schematic drawing of the hydraulic circuit of High Tail;

FIG. 16 is a fragmentary perspective view of the control station of High Tail;

Limiting acceleration = $(\ddot{h})_t = 32.2$ ft./sec.$^2$

Ratio of wave length of amplitude = $R = 30$
Boat velocity = $v = 36.6$ ft./sec.

Figure 19:
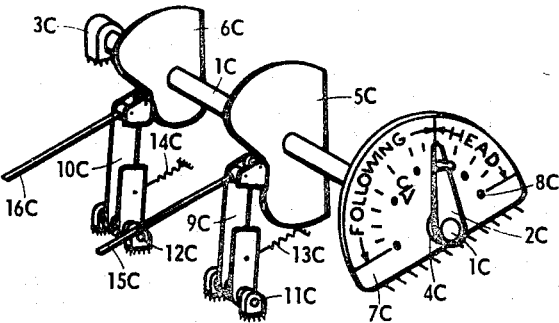
Figure 24:
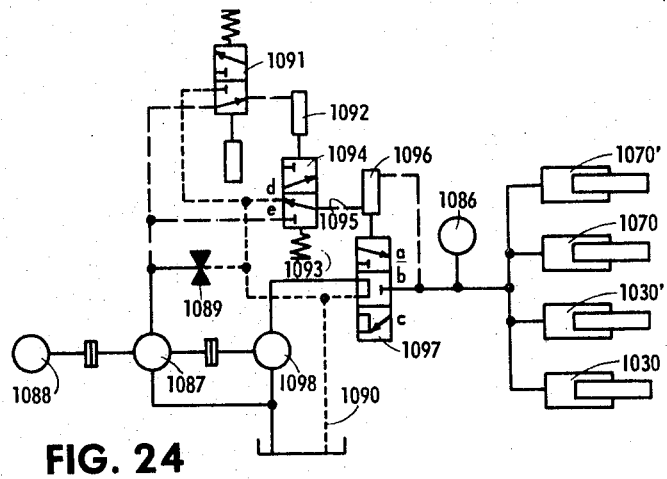
Figure 25:
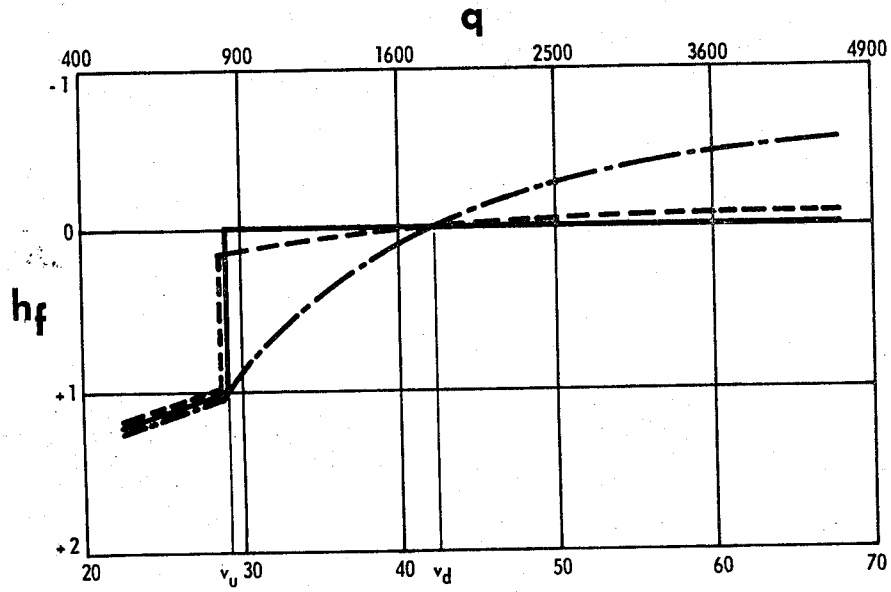
Figure 20:
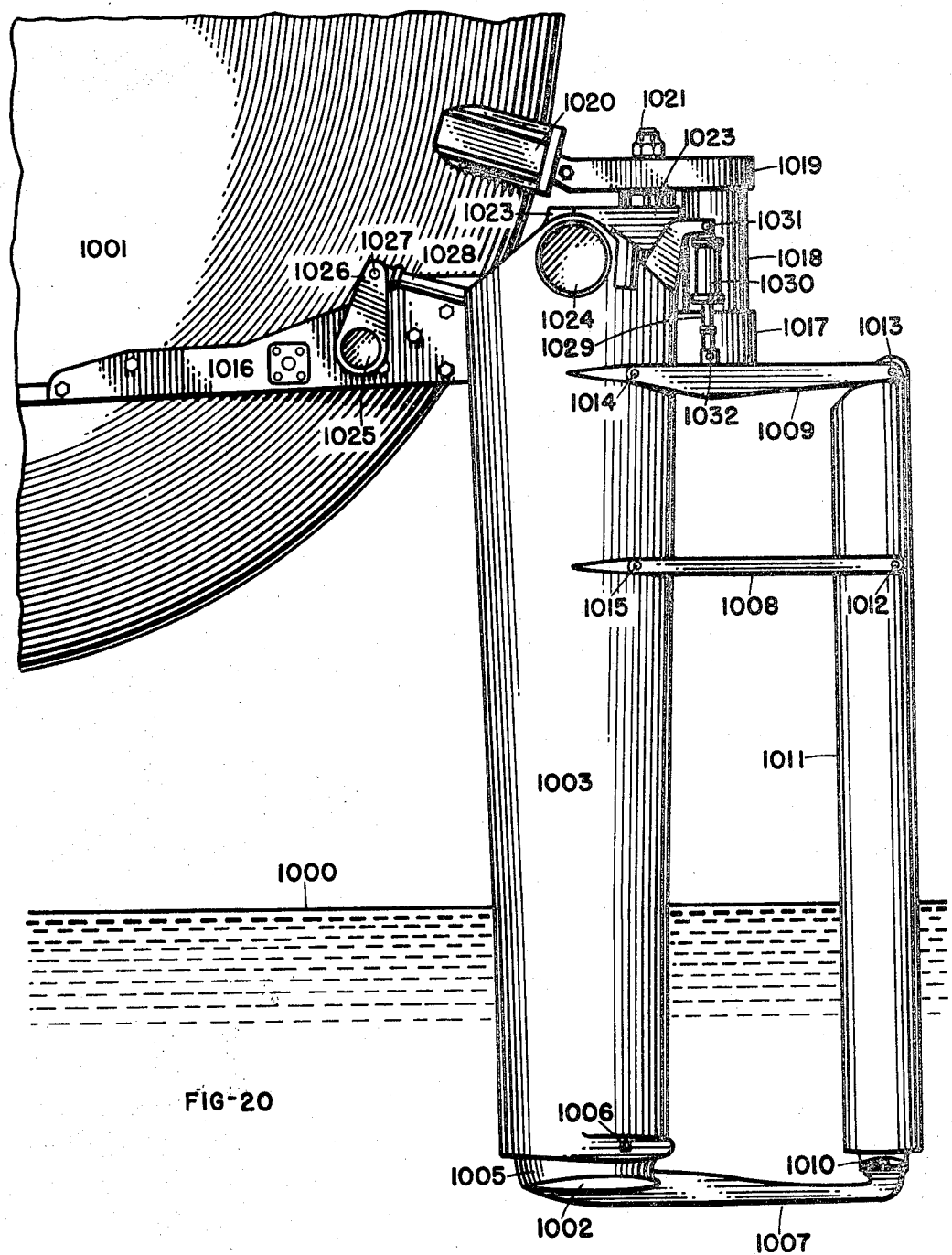
Figure 21:
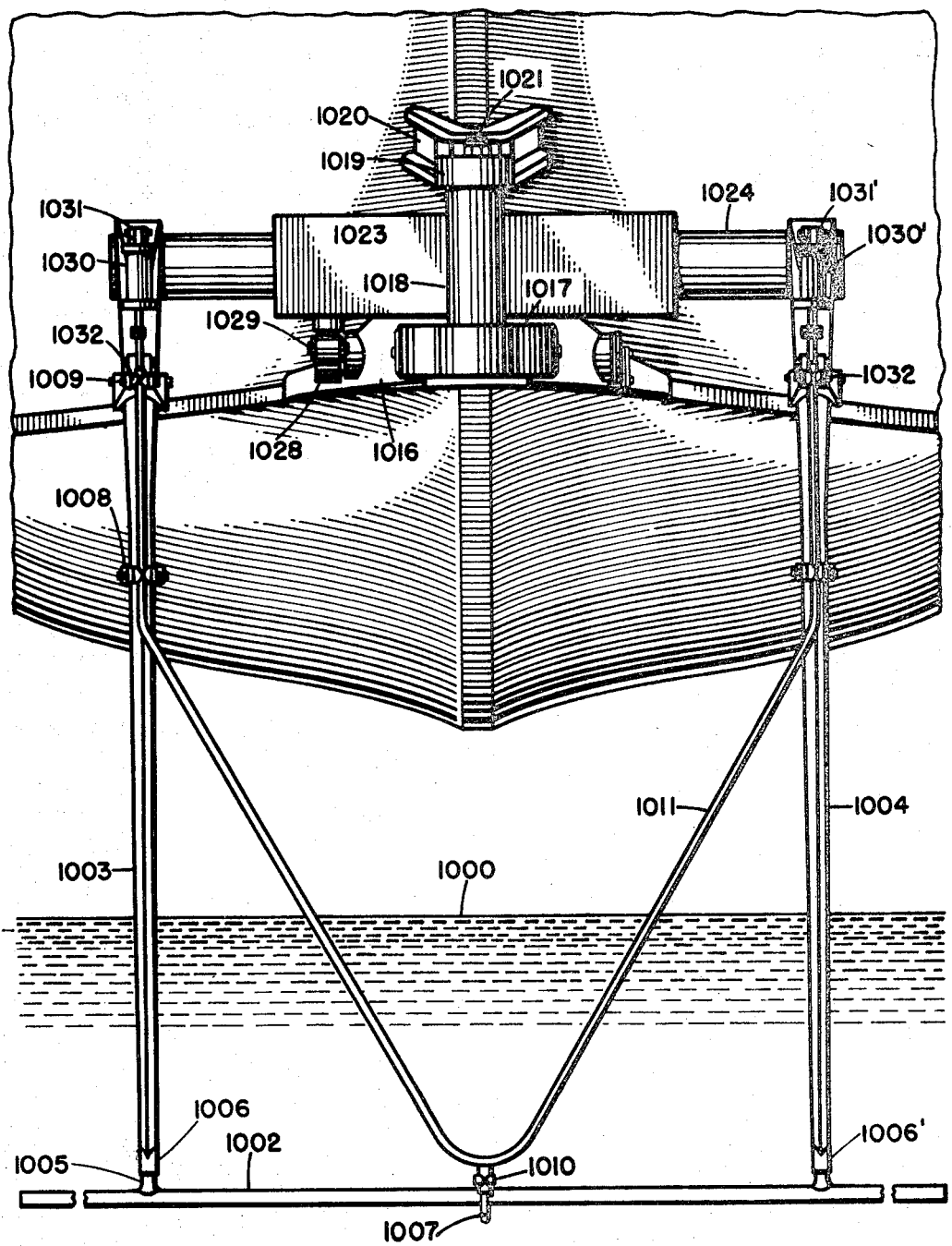
Figure 22:
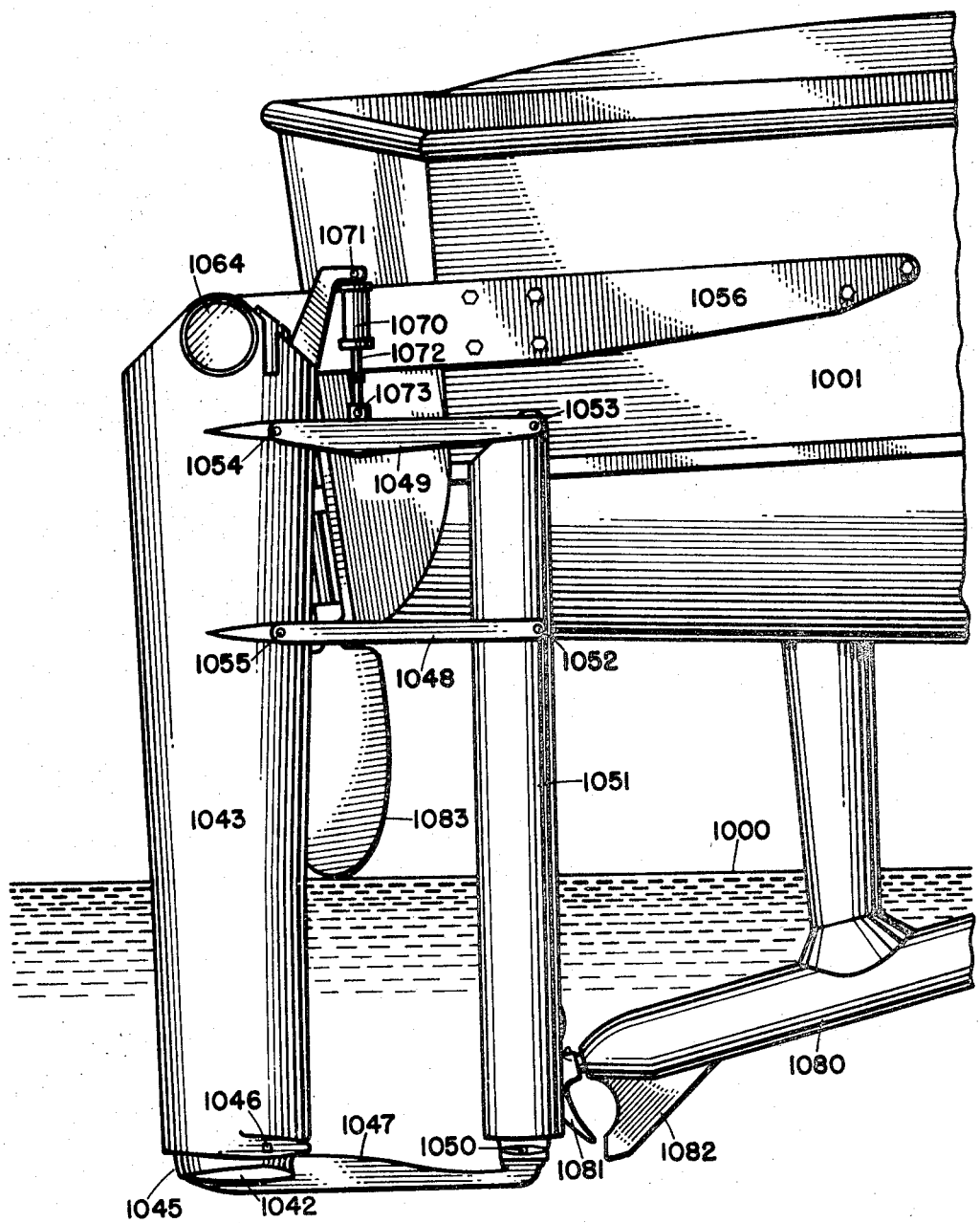
Figure 23:
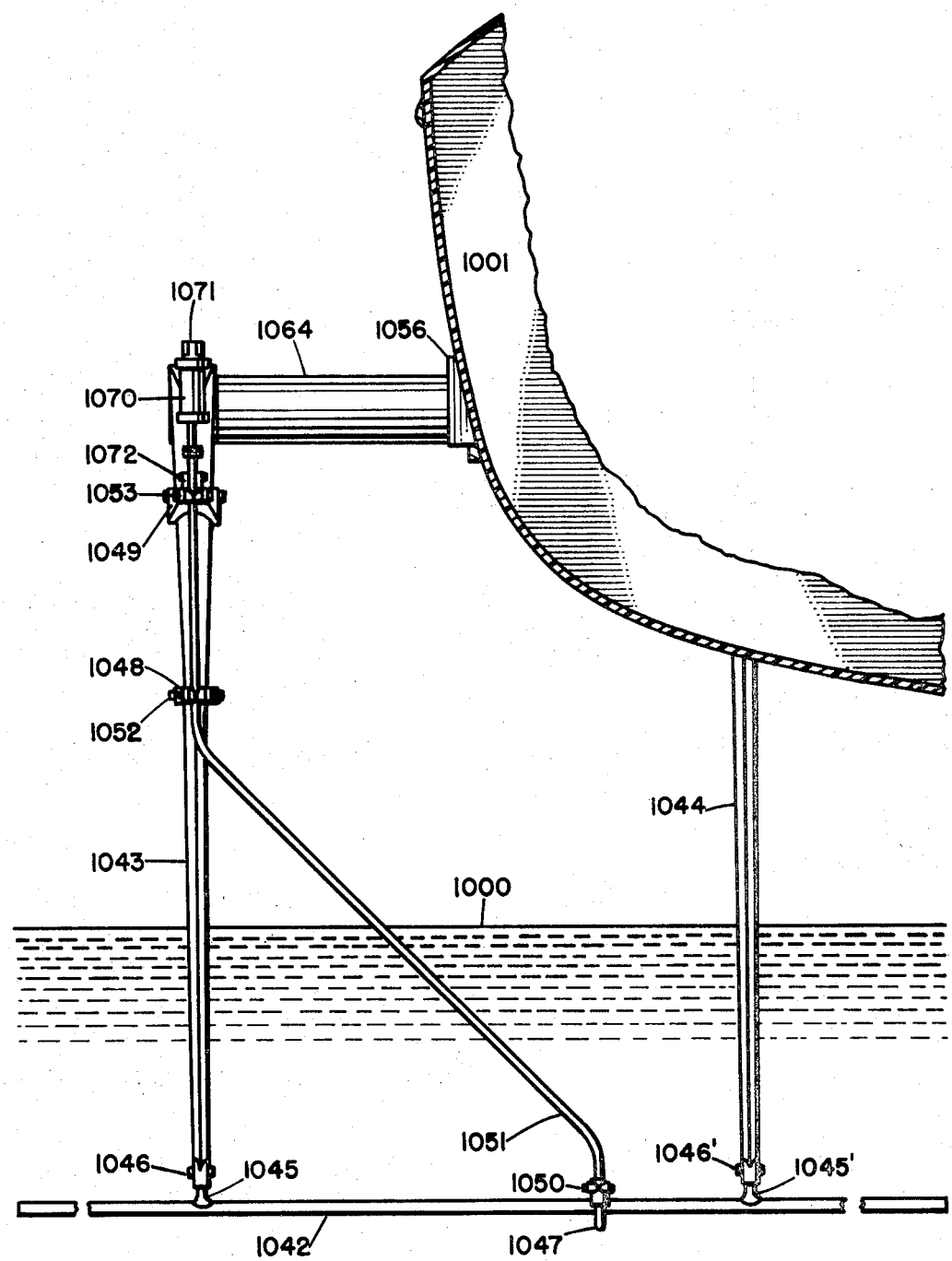
Figure 29:
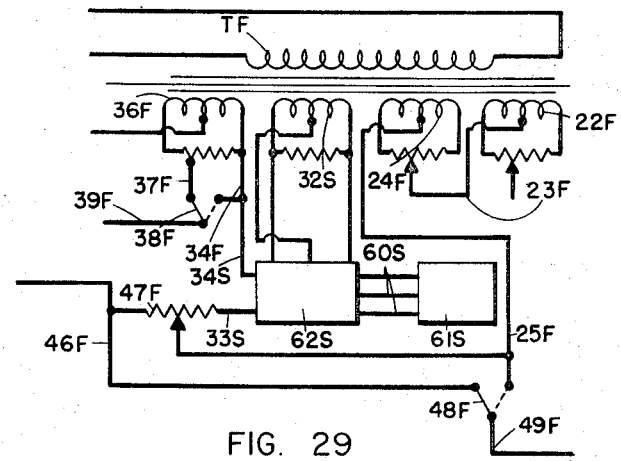
Figure 40:
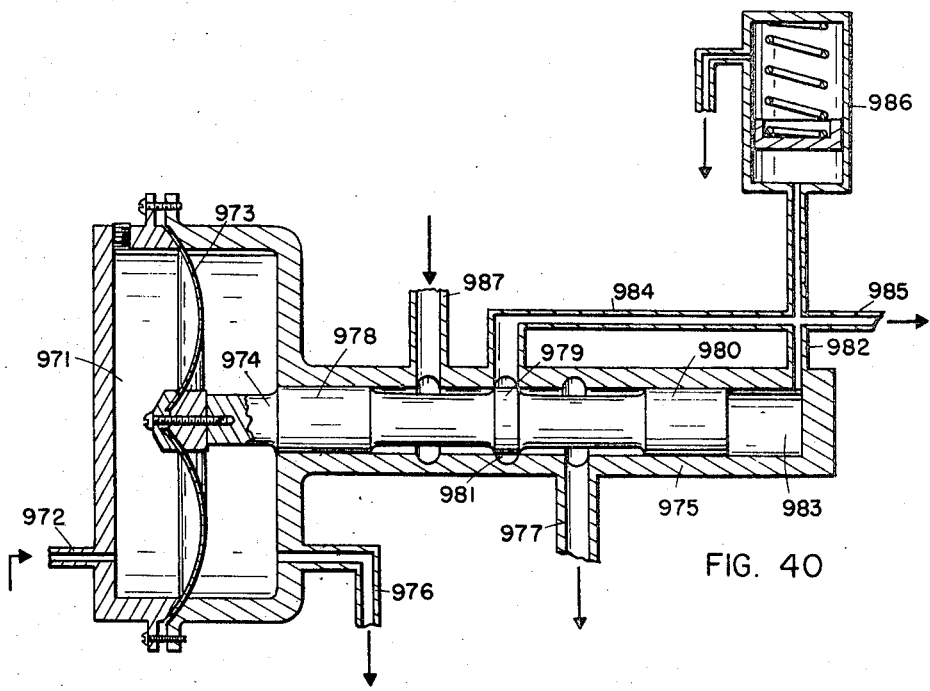
Figure 30:
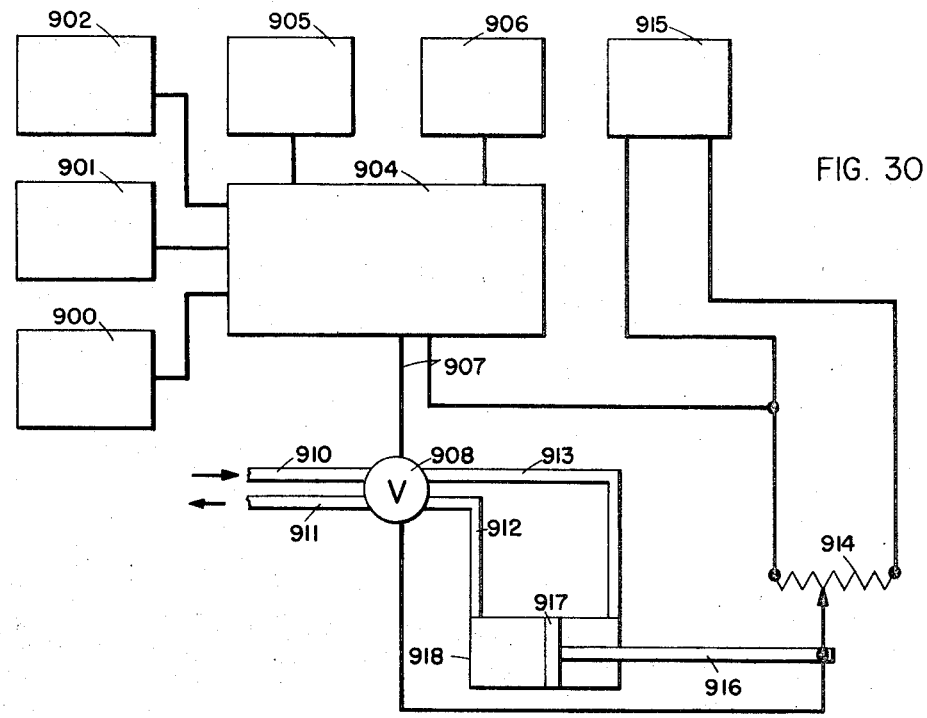
Figure 46:
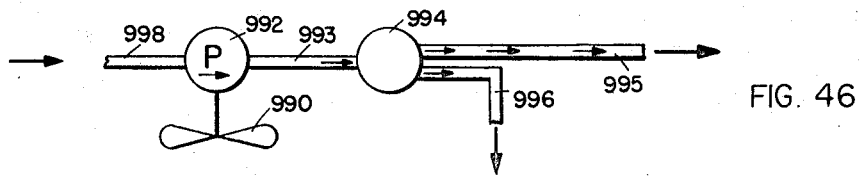
Figure 47:
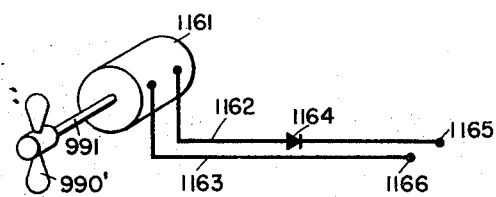
Figure 41:
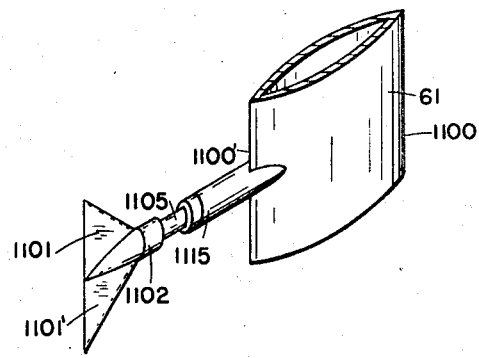
Figure 31:
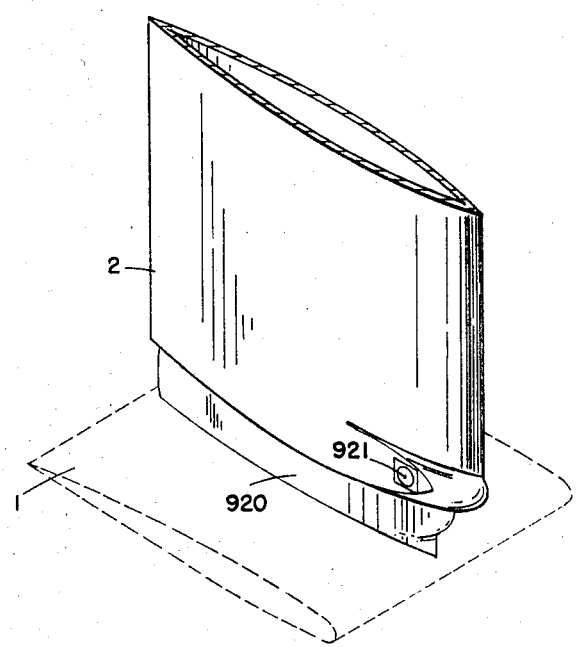
Figure 34:
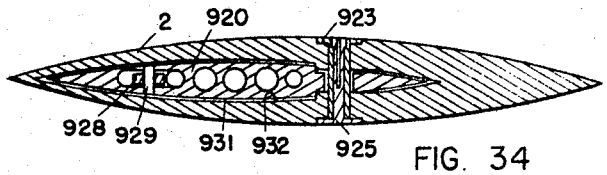
Figure 35:
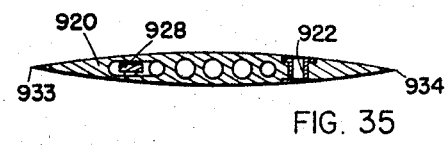
Figure 33:
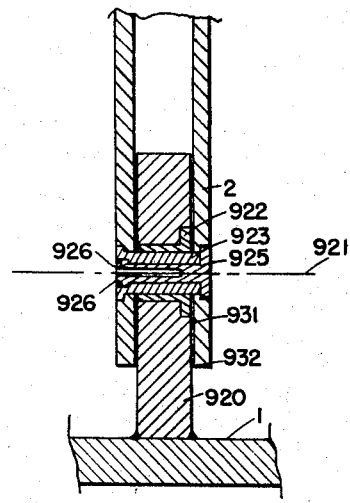
Figure 36:
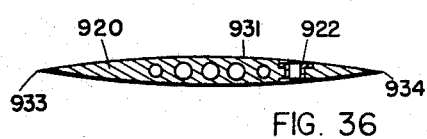
Figure 32:
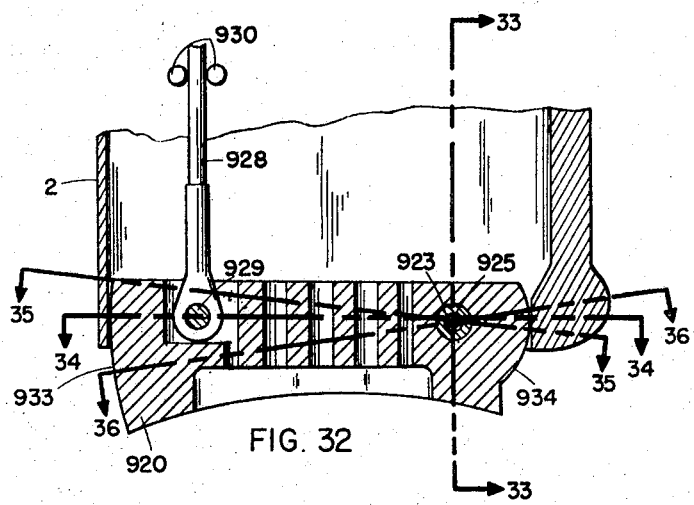
Figure 48:
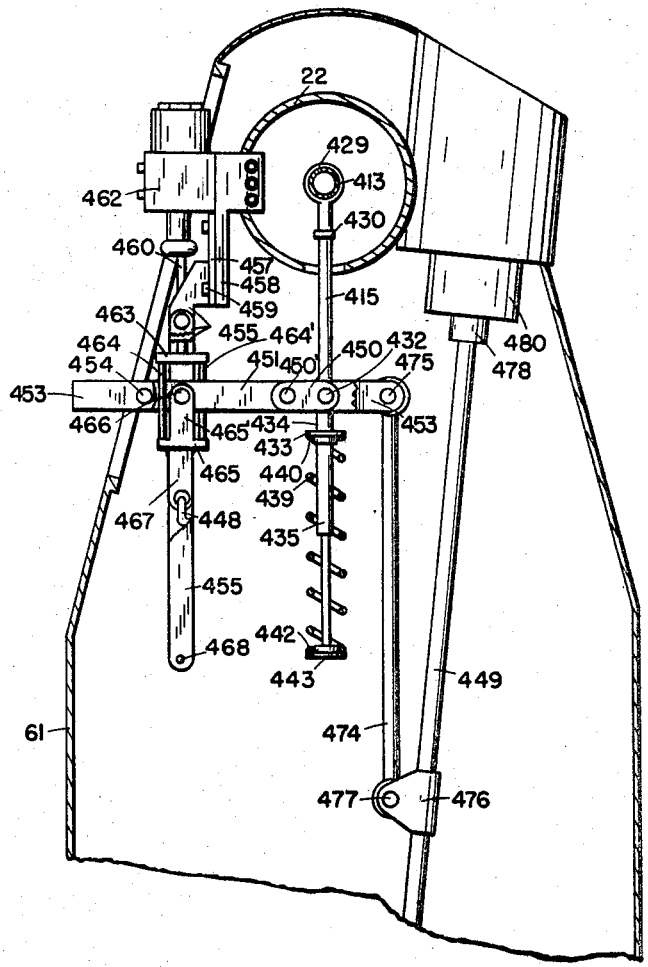

FIG. 19 is an isometric schematic view of an alternative sea condition selector for use with High Tail or comparable hydrofoil angle control;

FIG. 20 is a somewhat simplified fragmentary partial cutaway elevation from the starboard side of the bow of the second principal embodiment;

FIG. 21 is a partially cutaway elevation from the bow looking aft of the embodiment of FIG. 20;

FIG. 22 is a somewhat simplified fragmentary elevation from the starboard side of the stern of the embodiment of FIG. 20;

FIG. 23 is a partially cross-sectional, partially cutaway view, looking aft, of the aft starboard portion of the embodiment of FIGS. 20 and 22;

FIG. 24 is a schematic drawing of the hydraulic circuit for the system shown in FIGS. 20, 21, 22 and 23;

FIG. 25 is a graph of curves showing the prescribed functional relationships between $q$ pressure or boat speed and boat elevation for High Tail and two variations of the embodiment of FIGS. 20 through 24;

FIG. 26 is a partially cutaway elevation from the starboard side of forward drag probe water level sensor means;

FIG. 27 is a fragmentary view from above of a portion of the embodiment of FIG. 26;

FIG. 28 is a schematic view of predominantly electrical system for controlling angles of incidence of hydrofoils in accordance with specific coupling equations;

FIG. 29 is a schematic view of means for utilizing a sonic water level sensor in conjunction with the system of FIG. 28;

FIG. 30 is a schematic view of an alternative embodiment of roll control means;

FIG. 31 is a fragmentary perspective view of a portion of a strut and a portion of a hydrofoil showing a preferred means for attaching these members;

FIG. 32 is a fragmentary cross-sectional view taken on a longitudinal vertical plane, of the embodiment of FIG. 31;

FIG. 33 is a fragmentary cross-sectional view of the embodiment of FIGS. 31 and 32 taken on a transverse vertical plane in the manner indicated by lines 33—33 in FIG. 32;

FIG. 34 is a horizontal cross-sectional view of the embodiment of FIGS. 31 to 33 taken on a plane as indicated by lines 34—34 in FIG. 32;

FIG. 35 is a cross-sectional view of member 920 of FIGS. 31 to 34 taken as indicated by lines 35—35 in FIG. 33;

FIG. 36 is a cross-sectional view of member 920 of FIGS. 31 to 34 taken as indicated by lines 36—36 in FIG. 32;

FIG. 37 is a fragmentary cross-sectional view of a portion of means for sensing dynamic pressure;

FIG. 38 is a fragmentary cross-sectional view of a modification of the embodiment of FIG. 37;

FIG. 39 is a fragmentary cross-sectional view of means which may be used as an alternative to utilizing the embodiment of either FIGS. 37 or 38;

FIG. 40 is a schematic view of a hydraulic amplifier which may receive the signal produced by any of the embodiments of FIGS. 37 to 39;

FIG. 41 is a fragmentary perspective view of a device for sensing dynamic pressure;

FIG. 42 is an elevation from the rear or stern of the embodiment of FIG. 41;

FIG. 43 is a fragmentary partially cross-sectional view of the aft portion of the embodiment of FIG. 41;

FIG. 44 is a fragmentary partially cross-sectional view, taken transversely and horizontally, of the forward portion of the embodiment of FIG. 41 which is contained within the hollow interior of strut 61;

FIG. 45 is a fragmentary cross-sectional view taken on a vertical transverse plane as indicated by lines 45—45 in FIG. 44 of the embodiment of FIG. 41;

FIG. 46 is a schematic view of another embodiment of means for sensing boat speed and providing a signal corresponding to a function of boat speed;

FIG. 47 is a schematic view of another embodiment for sensing boat speed and providing a signal corresponding to a function of boat speed;

FIG. 48 is a fragmentary cross-sectional elevation on a longitudinal vertical plane, taken from the starboard side, of mechanism associated with the hydrofoil servo of High Tail.

Definitions

Certain terms used in this specification and in the claims have the following meanings:

"Boat elevation" is the distance a given point or line in the flying water plane is above the means water level.

"Bottom clearance" is the amount by which the hull bottom clears the water surface during flight.

"Bow computer section" is the portion of High Tail's computer located in the bow compartment forward of the control station.

"Cage speed" is the boat speed during deceleration at which the control mechanism is automatically caged and the hydrofoil angle control stops leaving the hydrofoils at predetermined angle settings.

"Contour allowance" is the average bottom clearance at the hydrofoils allowed in the design to provide adequate bottom clearance between the foils when flying over wave crests.

"Coupling" as applied to hydrofoil control is apparatus that receives one or more control signals and in response to said signals either actuates one or more control surfaces or generates a servo command signal or signals for such actuation.

"Coupling factor" is a dimensionless factor or coefficient relating the relative elevation sensed to the corresponding hydrofoil angle setting with respect to the flying water plane.

"Control surface" is part or all of a hydrofoil, strut, rudder or propeller which participates in the control of the boat.

"Coupling means" as applied to control of the boat is means that receives one or more sensor signals and actuates one or more control surfaces in response to said one or more signals.

"Critical waves" are waves having wave lengths two to four times the fore and aft spacing of the hydrofoils.

"Down sensor load" is the load applied to a sensing hydrofoil to increase the submergence of the sensing hydrofoil in order to lower the hull on to the water surface.

"Down speed" is the predetermined boat speed during deceleration at which the boat automatically descends from flying elevation to the water surface.

"Dynamic pressure" is the dynamic pressure of the related water speed.

"Flying draft" is the maximum difference in elevation between the lowest point on a hydrofoil structure and the water surface above this point.

"Flying draft variance" is the range of variation of the flying draft under given operating conditions.

"Flying water plane" is an imaginary plane attached to the struts of a hydrofoil boat at the design flying water line.

"Forward computer section" is the portion of High Tail's computer mounted with the forward hydrofoil.

"Full banking" is a roll angle inward on a turn such that the vector sum of the centrifugal force and boat weight is perpendicular to the boat beam.

"Function unit" is a control component that produces a signal that is a prescribed ordinarily nonlinear function of the signal it receives.

"Functionally hinged hydrofoil" is a hydrofoil which is hinged such that the hinge moment coefficient is a prescribed function of the dynamic pressure and lift on the hydrofoil.

"Functionally loaded sensor" is a hydrodynamic sensor on which a load is automatically applied that is a prescribed function of the boat speed.

"Hydrodynamic combination" is the combination of an invariant hinged or functionally hinged hydrofoil and a functionally loaded sensor in which the moment reaction of the former determines the loading on the latter at least during flight.

"Hydrodynamic sensor" is a water elevation sensor having a sensing element such as a planing ski, hydrofoil, or drag probe which when moving through the water is subject to a readily detectable hydrodynamic force or moment which for a given forward speed increases with the depth of submergence of the element.

"Hydrofoil angle setting" or "hydrofoil control surface angle setting" is the angle between the line of zero lift of the hydrofoil and the flying water plane in the sense of increased lift.

"Hydrofoil control surface" is a flap, aileron, or an entire hydrofoil that is rotated for control of the hydrofoil lift.

"Hydrofoil Froude Number" is the acceleration of gravity multiplied by the fore and aft spacing of the hydrofoils and divided by the square of the forward speed of the boat.

"Invariant hinged hydrofoil" is a cambered hydrofoil, which in order to make its hydrodynamic hinge moment approximately independent of the angle of attack and therefore a meansure of $q$-pressure, is hinged about an axis that is approximately: (a) perpendicular to the flow; (b) parallel to a plane approximately defined by the leading and trailing edges of said hydrofoils; (c) intersected by a line through the hydrodynamic center of the hydrofoil and parallel to the resultant force on the hydrofoil at design speed and load; and (d) as close as practical to the hydrodynamic center, i.e., from ⅛ to 1 chord from the hydrodynamic center.

"Lead" as applied to a relative water elevation sensor is the distance by which the point of sensing leads the rotational axis of a hydrofoil control surface that is coupled in the control to said sensor.

"Lift draft" is the minimum flying draft required to produce the hydrofoil lift necessary to fly.

"Line of zero lift" is an imaginary line for a hydrofoil or sensing hydrofoil unit that is parallel to the remote flow direction for which the hydrofoil or hydrofoil sensing unit has zero lift. For a hinged hydrofoil the line of zero lift is fixed to the hydrofoil.

"Lower range sea condition" is a sea condition and wave velocity direction that would result in a flying draft variance for High Tail of two feet or less.

"Opposing wave velocity component" is the wave train velocity component opposite in direction to the boat velocity. In a following sea the opposing wave velocity compared is negative.

"Optimum" as applied to lead, coupling factor or smoothing parameter designates the size of such a parameter for a given boat, boat speed, course and tolerable vertical acceleration for which the largest flying draft variance is a minimum while flying in waves of a given length, amplitude and opposing wave velocity component.

"Planing point" is a point on a sensor ski at the intersection of the planing surface of the ski and the water surface while the boat is flying in smooth water.

"Point of sensing" is the center of water surface effectiveness in producing an elevation signal, taken at the axis of the pin connection in the case of a sensing hydrofoil.

"Pump pressure" is the discharge pressure of the pump that delivers fluid to High Tail's hydraulic system.

"Reciprocal function unit" is apparatus that produces a signal that is the reciprocal of the signal it receives.

"Relative water elevation" is the downward displacement of the water surface with respect to the flying water plane.

"Relative water speed" is the water speed relative to the boat or to a specific component attached to the boat.

"Sensor down speed" is the speed during acceleration at which the sensors are automatically lowered to the water surface.

"Sensor loading pressure" is the pressure in any cylinder that applies torque or load to a hydrodynamic sensor.

"Sensor radius" is the radial distance from a sensor mounting shaft axis to the planing point of a sensor ski.

"Sensor up speed" is the speed during deceleration at which the sensors are automatically retracted.

"Sequence function unit" is apparatus that receives a dynamic pressure signal and produces a signal for automatic control changes during acceleration and deceleration of the boat.

"Servo pressure" is the pressure in the servo cylinders actuating the rotation for control purposes of High Tail's forward hydrofoil unless otherwise specified or implied.

"Sine function unit" is a function unit that produces a signal that is the sine of the signal received.

"Smooth water" is either wave free water or the water surface of waves longer than critical waves with no shorter waves present.

"Smoothed servo pressure" is the output signal of a smoothing function unit that receives the servo pressure as an input signal.

"Smoothing function unit" is a function unit that produces a signal that is the same as the signal received except for slight delay and reduced perturbations.

"Specific coupling equations" are Equations 71, 72 and 73 expressing the coupling relations among the signals on which High Tail's hydrofoil angle control depends and the angle settings of the hydrofoils.

"Speed sensor" is a device for sensing boat speed, a function of boat speed, or a useful combination of a function of boat speed and another variable such as hydrofoil lift for example. Examples of speed sensors are a pitot tube, invariant hinged hydrofoil, functionally hinged hydrofoil, propulsion propeller shaft tachometer, and propeller speed sensor.

"Steering function unit" is a function unit that receives a signal proportional to the steering angle and produces a signal for automatically lowering the boat or a function unit that produces signals for automatically lowering and banking the boat.

"Stern computer section" is the portion of High Tail's computer located in the stern compartment just forward of the transom.

"Uncage speed" is the boat speed during acceleration at which the control mechanism is automatically uncaged and the hydrofoil angle control commences operation.

"Up speed" is the forward boat speed during acceleration at which the boat abruptly climbs to the flying elevation.

"Upper range sea condition" is a sea condition and wave velocity direction that would result in a flying draft variance for High Tail of more than two feet.

"Wave velocity function unit" is a function unit which receives at least a manually set in signal representing the opposing wave velocity component $c$ and produces signals representing approximately optimum coupling factors $A_f$ and $A_a$ for a given boat speed.

SYMBOLS

Figure 17:
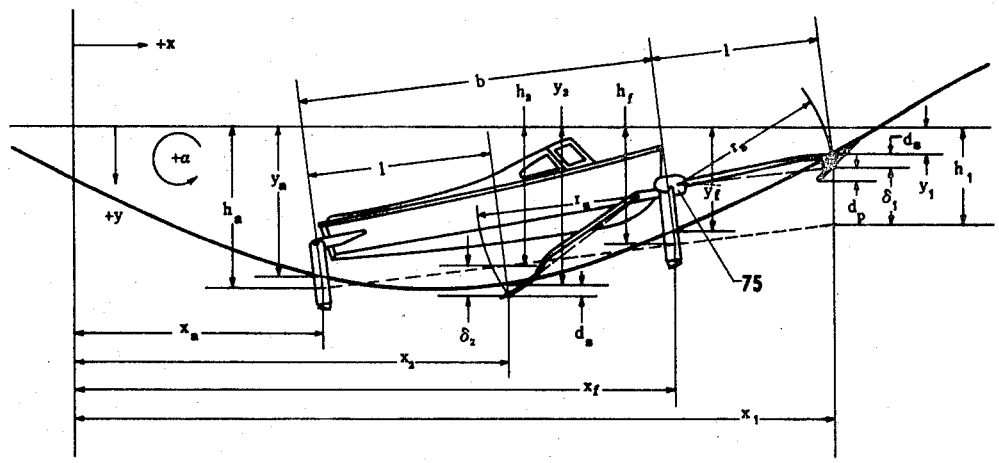
FIG. 17 is a schematic elevation of High Tail showing the application of symbols.

The following symbols are used, some of which are shown in FIG. 17:

$A$=control coupling factor relating $\delta$ perpendicular to a (dimensionless) hydrofoil angle setting $\alpha$ $A_a$=$A$ for an aft hydrofoil or hydrofoils which if adjustable is selected on the basis of boat speed and the opposing wave velocity component.

$$A_{an} = \frac{b}{(b+1)} - \frac{4w_f(v+c)^2}{v^2 pKg(b-1)} = A$$

for an aft hydrofoil for zero flying draft variance in long waves (dimensionless)

$A_f$=$A$ for a forward hydrofoil or hydrofoils which if adjustable is selected on the basis of boat speed and the opposing wave velocity component.

$$A_{fn} = \frac{b}{(b+1)} + \frac{4w_f(v+c)^2}{v^2 pKg(b+1)} = A$$

for a forward hydrofoil for zero flying draft variance in long waves (dimensionless)

$A_e$=control coupling term or signal which is a prescribed function of boat speed, which function for High Tail during acceleration is one below and zero above up speed and during deceleration is zero above down speed and one below down speed. See FIGURE 25.

$A_{ef}$, $A_{ea}$=forward and aft manual elevation adjustment (ft.)

$A_r$=a constant relating the moment or motion restoring a displacement in roll to the angle of roll $\gamma$ (dimensionless)

$a$=width of sensor ski (ft.)

$a_n$=distance the hinge axis of a functionally hinged hydrofoil is forward of a location for invariant hinging $B_a$, $B_{al}$, $B_{ar}$, $B_f$, $B_{fl}$, or $B_{fr}$=dimensionless control parameters representing manual adjustment at the control station for trim of the boat as applied to an aft hydrofoil or hydrofoils, aft hydrofoil on the left, aft hydrofoil on the right, forward hydrofoil or hydrofoils, forward hydrofoil on the left and forward hydrofoil on the right respectively.

$B_r$=dimensionless control parameter representing manual adjustment at the control station for trimming the boat in roll $b$=longitudinal spacing of hydrofoils (ft.)
$b_w$=lateral spacing of sensors (ft.)
$C$=wave train velocity $=2.265 \sqrt{\lambda}$ (ft./sec.)
$C_d$=dimensionless damping parameter=

$$\frac{C_s}{K_s} \frac{v}{b}$$

or in the case of a sensor=$d_p/\alpha_p b$ $C_f$ and $C_a$=positive constants of proportionality in Equations 74 and 75 determined by the dimensions of the control mechanism and the ratio $Q/q$ (ft.)

$C_L$=coefficient of lift
$C_m$=coefficient of hydrodynamic moment for a hydrofoil
$C_s$=sensor signal filter damping parameter or damping constant for sensor motion at the planing point (FIG. 17) with respect to water surface, in which case $C_s$ also equals $K_p a_v d_p$ $C_1$, $C_2$, $C_3$ ... =dimensionless positive constants of proportionality defined in text $c$=wave train velocity component opposite boat velocity as determined along the boat course (ft./sec.)
$d$=flying draft variance=$2(h-y)_o$ (ft.)
$d_a$=$d$ for aft hydrofoil=$2(h_a-y_a)_o$ (ft.)
$d_f$=$d$ for forward hydrofoil=$2(h_f-y_f)_o$ (ft.)
$d_m$=$d_{rm}+d_n$ (ft.)
$d_n$=lift draft (ft.)
$d_p$=smooth water sensor draft at design speed (ft.)
$d_{p1}$, $d_{p2}$=$d_p$ for forward and aft sensing hydrofoil respectively (ft.)
$d_r$=flying draft variance required to limit the vertical acceleration to a specific tolerable magnitude while flying in a sinusoidal sea of a given wave length with the flight path and wave profile in phase
$d_{rm}$=$d_r$ for the wave length $\lambda_m$, at which $d_r$ is maximum
$d_s$=$\delta+h-y$=instantaneous dynamic increase in sensor ski draft over $d_p$ (ft.)
$d_1$=draft of forward sensing hydrofoil or the average draft of the forward sensing hydrofoils=$d_{p1}+h_1-y_1+\delta_1$ (ft.)
$d_2$=draft of aft sensing hydrofoil or the average draft of the aft sensing hydrofoils=$d_{p2}+h_2-y_2+\delta_2$ (ft.)
$d_{1d}$, $d_{2d}$=$d_1$ and $d_2$ respectively for design speed
$d_{1r}$, $d_{1l}$=drafts of the forward right and left sensing hydrofoils respectively
$d_{2r}$, $d_{2l}$=drafts of the aft right and left sensing hydrofoils respectively
$d_{1s}$, $d_{2s}$, $d_{1rs}$, etc.=increase in $d_1$, $d_2$ and $d_{1r'}$ etc., due to increase in speed
$E$=smoothing parameter in coupling equations unless the signal $\delta$ is a smoothed signal, as in the sensing hydrofoil systems, in which case $E=0$ (sec.)
$E_f$, $E_a$=$E$ for forward and aft hydrofoil or hydrofoils respectively
$E_d$=$Ev/b$ dimensionless smoothing parameter
$E_r$=roll smoothing parameter (sec.)
$e$=distance from aft hydrofoil or hydrofoils to center of gravity (ft.)
$F_a$=upward hydrodynamic force on aft fully submerged hydrofoil or hydrofoils less force due to weight (lbs.)
$F_f$=upward hydrodynamic force on forward fully submerged hydrofoil or hydrofoils less force due to weight (lbs.)

$g$ = acceleration of gravity (ft./sec.$^2$)
$gb/v^2$ = Hydrofoil Froude Number
$h$ = distance a point in the flying water flane is below the mean water level (ft.)
$h_1, h_2, h_f, h_a = h$ at the forward sensor, aft sensor, forward hydrofoil and aft hydrofoil respectively (ft.)
$h_e$ = a function of $q$ in the sensing hydrofoil control of the elevation of an invariant hinged fully submerged hydrofoil. At flying speeds $h_e$ equals zero, at hull borne speeds $h_e$ equals the decrease in elevation produced by the loads $n_{1d}v^2$ and $n_{2d}v^2$ on the forward and aft sensing hydrofoils respectively (ft.)
$h_{ef}, h_{ea} = h_a$ for the bow and stern respectively
$h_{fu}, h_{fd} = h_f$ at the lowest flying speed and at design speed respectively
$\overline{h}_f, \overline{h}_a$ = variation in $h_f$ and $h_a$ at a given speed
$K$ = ratio of an increment in coefficient of lift divided by the corresponding increment in angle of attack of a hydrofoil
$K_a$ = constant of proportionality between the square of the steering angle $\theta$ and a signal in the specific coupling equations for the aft hydrofoil or hydrofoils which lower the boat for either direction of turn (ft.)
$K_f$ = constant proportionality between the square of the steering angle $\theta$ and a signal in the specific coupling equation for the forward hydrofoil or hydrofoils which lowers the boat for either direction of turn (ft.)
$K_p$ = constant of proportionality defined by Equation 102 for ski sensor (lbs. sec.$^2$/ft.$^4$)
$K_1 K_2$ = constants of proportionality defined by Equations 128, 129 and 130 for sensing hydrofoil (lbs. sec.$^2$/ft.$^3$)
$K_s$ = sensor signal filter parameter or stiffness constant for sensor motion at the planing point (FIG. 17) with respect to the water surface in which case $K_s$ also equals $K_q a v^2 \alpha_p$ (lbs./ft.)
$K_t$ = dimensionless constant of proportionality for angle of attack change in a turn defined by Equations 134 and 135
$K_\theta$ = constant of proportionality between the steering angle $\theta$ and a roll signal (ft.)
$K_\gamma$ = constant of proportionality betwen steering angle $\theta$ and roll $\gamma$ (dimensionless)
$L$ = resultant hydrodynamic force on a fully submerged hydrofoil
$L_f = L$ for forward hydrofoil (lbs.)
$l$ = sensor lead, i.e., the horizontal distance by which the sensing point leads the hinge axis of a fully submerged hydrofoil (ft.)
$l_i = l$, $l_1$ and $l_2$ for invariant hinged-sensing hydrofoil connection (ft.)
$l_n = l$ for functionally hinged-sensing hydrofoil connection
$l_1, l_2 = l$ for forward and aft sensors respectively
$1$ = One
$M$ = mass of loaded boat (lbs. sec.$^2$/ft.)

$$M_a = \frac{2M(b-e)}{S_a \rho K b^2} = \frac{2w_a}{g \rho K b^2} =$$

dimensionless hydrofoil loading parameter for the aft hydrofoil or hydrofoils $$M_f = \frac{2Me}{S_f \rho K g^2} = \frac{2w_v}{g \rho K b^2} =$$

dimensionless hydrofoil loading parameter for the forward hydrofoil or hydrofoils
$M_i$ = hydrodynamic moment about the hinge axis of an invariant hinged hydrofoil
$M_n$ = hydrodynamic moment of a funtionally hinged hydrofoil about the hinge axes (ft. lbs.)
$m$ = effective mass of boat at a given hydrofoil (lbs. sec.$^2$/ft.)
$m_f, m_a = m$ at the forward and aft hydrofoils respectively $$m_d = \frac{m_s}{K_s} \frac{v^2}{b^2} =$$

dimensionless mass parameter depending on the inertia element in a sensor signal filter or on the effective mass $m_s$ of the sensor in which case $m_d$ also equals $$\frac{m_s}{K_p a \alpha_p b^2}$$

$m_s$ = effective mass of sensor at the planing point (FIG. 17) assuming that the vertical acceleration of the hull is negligible in comparison to the vertical acceleration of the planing point, or sensor signal filter inertia parameter (lbs. sec.$^2$/ft.)
$N$ = upward hydrodynamic moment on ski sensor about the sensor shaft (FIG. 17) divided by $r_s$
$N_1, N_{2r}$ and $N_{2l}$ = upward hydrodynamic forces on the forward, aft right and aft left hydrofoils respectively (lbs.)
$n$ = planing sensor loading coefficient equal to downward sensor loading moment divided by $v^2 r_s$ (lbs./$v^2$)
$n_d$ = hydraulic cylinder elevation control loading coefficient equal to load on the sensing hydrofoil of an invariant hinged hydrofoil unit, divided by $v^2$. $n_d$ is zero during flight and a constant when hull borne (lbs. sec.$^2$/ft.$^2$)
$n_{d1}, n_{d2} = n_d$ for forward and aft sensing hydrofoils respectively
$n_i$ = invariant hinged hydrofoil loading coefficient equal to downward load on a sensing hydrofoil due to the hydrodynamic moment reaction from connected invariant hinged hydrofoil divided by $v^2$. $n_i$ is approximately constant. (lbs. sec.$^2$/ft.$^2$)
$n_{i1}, n_{i2} = n_i$ for forward and aft sensing hydrofoils respectively
$n_t$ = the components of $n_{2r}$ and $n_{2l}$ due to turning
$n_n$ = functionally hinged hydrofoil loading coefficient equal to downward load on a sensing hydrofoil due to hydrodynamic moment reaction from connected fully submerged functionally hinged hydrofoil divided by $v^2$ (lbs. sec.$^2$/ft.$^2$)
$P$ = propeller thrust (lbs.)
$p$ = differential operator $d/dt$ (1/sec.)
$p_d$ = differential operator $$\frac{d}{d\tau} = \frac{d}{v} p$$

(sec.)
$Q$ = smoothed servo pressure or other pressure portional to $q$ (lbs./ft.$^2$)
$Q_u = Q$ for lowest foil borne speed
$q$ = the dynamic pressure of water flow with respect to the boat equal approximately to $\rho v^2/2$ (lbs./ft.$^2$)
$q_d = q$ at design speed
$q_u = q$ for lowest foil-borne speed
$R$ = the wave length-amplitude ratio, $\lambda/y_o$
$r$ = radius of gyration of loaded boat (ft.)
$r_f, r_a$ = push rod pivot radius from hydrofoil pivot axis for forward aft hydrofoils respectively (ft.)
$r_i$ = ratio, $n_n/n_i$, required in a sensing hydrofoil invariant hinged hydrofoil system to put the hull onto the water at $v_u$
$r_s$ = planing sensor radius (see FIG. 17) (ft.)
$r_u$ = ratio of lowest foil-borne speed to design speed
$S$ = surface area of a hydrofoil (ft.$^2$)
$S_f, S_a$ = surface area of forward hydrofoil or hydrofoils and surface area of the aft hydrofoil or hydrofoils respectively (ft.$^2$)

$$T = \frac{2\pi\lambda}{\cos\beta(v+c)} =$$

time required for boat to travel one wave length (sec.)
$t$ = time (sec.)
$v$ = the horizontal velocity of the boat or hydrofoils (ft./sec.)
$v_d$ = design speed
$v_u$ = lowest foil-borne $v$ $W$ = upward force required to sustain the portion of the boat weight carried by a given fully submerged hydrofoil or hydrofoils (lbs.)

$W_d$, $W_u$ = $W$ for design speed and the lowest foil-borne speed respectively (lbs.)

$W_f$, $W_a$ = $W$ for forward hydrofoil or hydrofoils and aft hydrofoil or hydrofoils respectively $W_t$ = total weight carried by a given hydrofoil and connected sensing hydrofoil (lbs.)

$W_{tf}$, $W_{ta}$ = $W_t$ for forward and aft hydrofoil units respectively $w$ = weight carried per unit area of fully submerged hydrofoil. ($w$ for a boat with sensing hydrofoils is a function of $q$.) (lbs./ft.$^2$)

$w_d$, $w_u$ = $w$ for design speed and lowest flying speed respectively $w_f$, $w_a$ = $w$ for forward and aft hydrofoils respectively $w_{fh}$, $w_{ah}$ = $w_f$, $w_a$ for a pay load one-half full pay load (lbs./ft.$^2$)

$\alpha$ = the angle between the line of zero lift hydrofoil or sensing hydrofoil unit and the flying water plane measured about a beamwise axis in the sense of increase $x$ = distance measured in the direction of the boat velocity from a vertical line moving with the wave train (ft.)

$x_1$, $x_2$, $x_f$, $x_a$ = $x$ for the forward and aft sensor and forward and aft hydrofoils respectively (ft.)

$$Y_1 = \left[\frac{\lambda(1+C_d p_d)A_f}{l(1+C_d p_d + m_d p_d^2)(1+E_d p_d)}\right]\frac{y_1}{\lambda} + \left[\frac{\lambda c}{b(v+c)}p_d\right]\frac{y_f}{\lambda}$$

$$Y_2 = \left[\frac{\lambda(1+C_d p_d)A_a}{l(1+C_d p_d + m_d p_d^2)(1+E_d p_d)}\right]\frac{y_2}{\lambda} + \left[\frac{\lambda c}{b(v+c)}p_d\right]\frac{y_t}{\lambda}$$

$y$ = instantaneous distance to the water surface measured downward from the mean water level (ft.)

$y_0$ = wave amplitude (ft.)

$y_1$, $y_2$, $y_f$, $y_a$ = the $y$ for the forward and aft sensors and forward and aft hydrofoils respectively (ft.)

$$Z_3 = \left[\frac{(l+b)(1+C_d p_d)A}{l(1+C_d p_d + m_d p_d^2)(1+E_d p_d)}\right.$$
$$\left. -1 + p_d + M_f\left(\frac{e}{b} + \frac{r^2}{be}\right)p_d^2\right]$$

$$Z_4 = -\left[\frac{(1+C_d p_d)A_f}{(1+C_d p_d + m_d p_d^2)(1+E_d p_d)}\right.$$
$$\left. -1 - M_f\left(\frac{b-e}{b} - \frac{r^2}{be}\right)p_d^2\right]$$

$$Z_5 = \left[\frac{(1+C_d p_d)A_a}{(1+C_d p_d + m_d p_d^2)(1+E_d p_d)}\right.$$
$$\left. -1 + M_a\left(\frac{e}{b} - \frac{r^2}{b(b-e)}\right)p_d^2\right]$$

$$Z_6 = -\left[\frac{(l-b)(1+C_d p_d)A_a}{l(1+C_d p_d + m_d p_d^2)(1+E_d p_d)}\right.$$
$$\left. -1 - p_d - M_a\left(\frac{b-e}{b} + \frac{r^2}{b(b-e)}\right)p_d^2\right]$$

$\alpha$ = the angle between the line of zero lift hydrofoil or sensing hydrofoil unit and the flying water plane measured about a beamwise axis in the sense of increase lift (dimensionless)

$\alpha$ = angle of attack, i.e., the angle between the line of zero lift for a hydrofoil or sensing hydrofoil unit and the instantaneous water flow direction relative to the hydrofoil or sensing hydrofoil unit measured about a beamwise axis in the sense of increased lift (dimensionless)

$\alpha_f$, $\underline{\alpha_f}$ = $\alpha$ and $\underline{\alpha}$ respectively for the forward fully submerged hydrofoil or the average $\alpha$ and $\underline{\alpha}$ respectively for forward fully submerged hydrofoils $\underline{\alpha_a}$ = $\alpha$ and $\underline{\alpha}$ respectively for the aft fully submerged ydrofoil or the average $\alpha$ and $\underline{\alpha}$ respectively for the ft fully submerged hydrofoils $\alpha_{fd}$, $\alpha_{ad}$ = $\alpha_f$ and $\alpha_a$ at design speed in smooth water $\alpha_r$, $\alpha_l$ = mean $\alpha$ for the right and left sides of the boat respectively $\alpha_{fr}$, $\alpha_{fl}$, $\alpha_{ar}$, $\alpha_{al}$, $\underline{\alpha_{fr}}$, $\underline{\alpha_{fl}}$, $\underline{\alpha_{ar}}$ and $\underline{\alpha_{al}}$ = $\alpha$ and $\underline{\alpha}$ for forward right and left, and aft right and left fully submerged hydrofoils respectively $\bar{\alpha}$, $\bar{\alpha}_a$, $\bar{\alpha}_f$, etc. = variation at a given relative water speed of $\alpha$, $\alpha_f$, $\alpha_a$, etc., respectively from a mean value, i.e.,
$$\bar{\alpha} = \alpha - \frac{w}{Kq}$$

$\alpha_1$ = the fixed $\alpha$ of the forward sensing hydrofoil or hydrofoils $\alpha_2$ = the fixed $\alpha$ of the aft sensing hydrofoil or hydrofoils $\underline{\alpha_1}$ = $\underline{\alpha}$ for the forward sensing hydrofoil or the average $\underline{\alpha}$ for the forward sensing hydrofoils $\underline{\alpha_2}$ = $\underline{\alpha}$ for the aft sensing hydrofoil or the average $\underline{\alpha}$ for the aft sensing hydrofoils $\underline{\alpha_{1r}}$, $\underline{\alpha_{11}}$ = $\underline{\alpha}$ for the forward right and left sensing hydrofoils respectively $\underline{\alpha_{2r}}$, $\underline{\alpha_{21}}$ = $\underline{\alpha}$ for the aft right and left sensing hydrofoils respectively $\beta$ = 180° angle between wave velocity and boat velocity $\gamma$ = the sensed angle of roll measured counter-clockwise looking forward, i.e., if a total of two surface sensors forward are used, $$\gamma = \frac{\delta_{1r} - \delta_{11}}{b_w}$$

if a total of two surface sensors aft are used, $$\gamma = \frac{\delta_{2r} - \delta_{21}}{b_w}$$

or, if a gyro vertical is used $\gamma$ = the angle of roll signal from the gyro vertical $\Delta$ = total displacement of loaded boat (lbs.)

$\delta$ = relative water elevation or the signal from a relative water elevation sensor, the relative water elevation being the downward displacemement of the water surface with respect to the flying water plane $\delta_1$ = $\delta$ for forward sensor or if there are two forward sensors the average of the two (ft.)

$\delta_{11}$ = $\delta$ for forward sensor on left (ft.)

$\delta_{1r}$ = $\delta$ for forward sensor on right (ft.)

$\delta_2$ = $\delta$ for aft sensor or if there are two aft sensors the average of the two (ft.)

$\delta_{21}$ = $\delta$ for aft sensor on left (ft.)

$\delta_{2r}$ = $\delta$ for aft sensor on right (ft.)

$\delta_{1s}$, $\delta_{2s}$ = component of $\delta_1$ and $\delta_2$ due to change in speed from the design speed $\bar{\delta}$, $\bar{\delta}_1$, $\bar{\delta}_2$, etc. = variation in $\delta$, $\delta_1$, $\delta_2$, etc., at design speed $\theta$ = manual steering angle measured to the right from center looking forward $\theta_b = \theta$ when $\theta_m > \theta > -\theta_m$ $\theta_b = \theta_m$ when $\theta > \theta_m$ $\theta_b = -\theta_m$ when $\theta < -\theta_m$ $\theta_c = \theta$ when $\theta_n > \theta > -\theta_n$ $\theta_c = \theta_n$ when $\theta > \theta_n$ $\theta_c = $ when $\theta < -\theta_n$ $\pm\theta_m$ = specified steering angles beyond which there is no change in any $\alpha$ due to change in $\theta^2$ $\pm\theta_n$ = specified steering angles beyond which there is no change in any $\alpha$ due to change in $\theta$ $\lambda$ = wave length as determined in the direction of the wave train velocity (ft.)

$\lambda_f$ = the $\lambda$ in a following seat at which the maximum vertical acceleration with $y=h$ is at the tolerable limit (ft.)

$\lambda_h$ = the $\lambda$ in a head sea at which the maximum vertical acceleration with $y=h$ is at the tolerable limit (ft.)

$\lambda_m = \lambda$ at which $d_r$ is a maximum $= d_{rm}$ (ft.)

$\rho$ = mass density of water $\sigma_{302}, \sigma_{303} \ldots \sigma_{642}$=signal displacements in the forward direction of the members designated by the numbers 302, 303 ... 642, respectively (ft.)

$\sigma_f, \sigma_{ar}$ and $\sigma_{al}$=downward displacement command signals to the forward, right aft and left aft servos respectively $\sigma_h$=output signal signal of either forward or aft reciprocal function unit which is an increase in length of the unit (ft.)

$\tau = tv$ = dimensionless measure of time $$\omega = \frac{2\pi}{T} = \frac{2\pi \cos \beta (v+c)}{\lambda}$$

frequency of wave encounter (radians per second)

$\omega_d = \omega b/v$ (dimensionless)

A dot over a quantity indicates the derivative of the quantity with respect to time.

A subscript zero following a variable or a quantity or added to another subscript indicates the maximum magnitude of the quantity for the wave length and course considered unless otherwise defined.

High Tail introduction

The functional form of the hydrofoil angle control was synthesized mathematically and expressed by specific coupling equations. Important control parameters were selected to minimize the hydrofoil draft increment for a given forward speed and a given limiting vertical acceleration on the basis of a mathematical analysis of High Tail's vertical motions controlled in accordance with the specific coupling equations while flying in waves. Minimum hydrofoil draft increment is important not only to enlarge the areas of practical operation, but also to save weight and drag.

In the design of High Tail's actual control, the coupling relationships expressed by the specific coupling equations, except for the smoothing terms, are produced by a mechanical computer. Three output signals from the computer command three hydraulic servos which introduce smoothing effects and actuate the angular control movements of the hydrofoils. Other output signals control unfolding and folding of the sensors, start and stop the control and indicate the flying elevation at the control station.

The input signals to the computer are:
(1) The displacements of the three water surface sensors;
(2) The steering angle of the forward hydrofoil;
(3) The smoothed hydraulic pressure in the hydrofoil actuating cylinders; and
(4) The four manual control station adjustments of which three are for pay load, elevation, and roll trimming, and the fourth is for sea condition.

High Tail automatically flies at a constant mean altitude on a straight course and banks and lowers in turns. As High Tail accelerates from rest (decelerates from speed) the sensors unfold (fold), the angle control starts (stops), and the hull abruptly climbs to (descends from) the flying elevation all automatically, at predetermined boat speeds.

The fact that the moment coefficient for the one-quarter chord point of a hydrofoil is substantially independent of the angle of attack and therefore a measure of dynamic pressure is taken advantage of in the design of High Tail. A pivot point on the chord line is considered structurally and hydrodynamically impractical, but the pivot point can be located sufficiently above the chord line to be structurally practical (⅛ to 1 chord) while retaining the small variation in moment coefficient with change in angle of attack.

The reaction of the hydrodynamic moment on each of High Tail's hydrofoils is sustained by the two hydraulic servo cylinders that actuate the hydrofoil rotation for control. By smoothing, the servo pressure alternating component due to friction is largely removed and the smoothed servo pressure becomes approximately proportional to the dynamic pressure. In other words, the ratio $Q/q$ is approximately constant.

Smoothed servo pressures are used on High Tail to control the loading on the sensors, to substantially eliminate change in bottom clearance with change in flying speed and to automatically introduce control operations during acceleration and deceleration of the boat.

Figure 1:
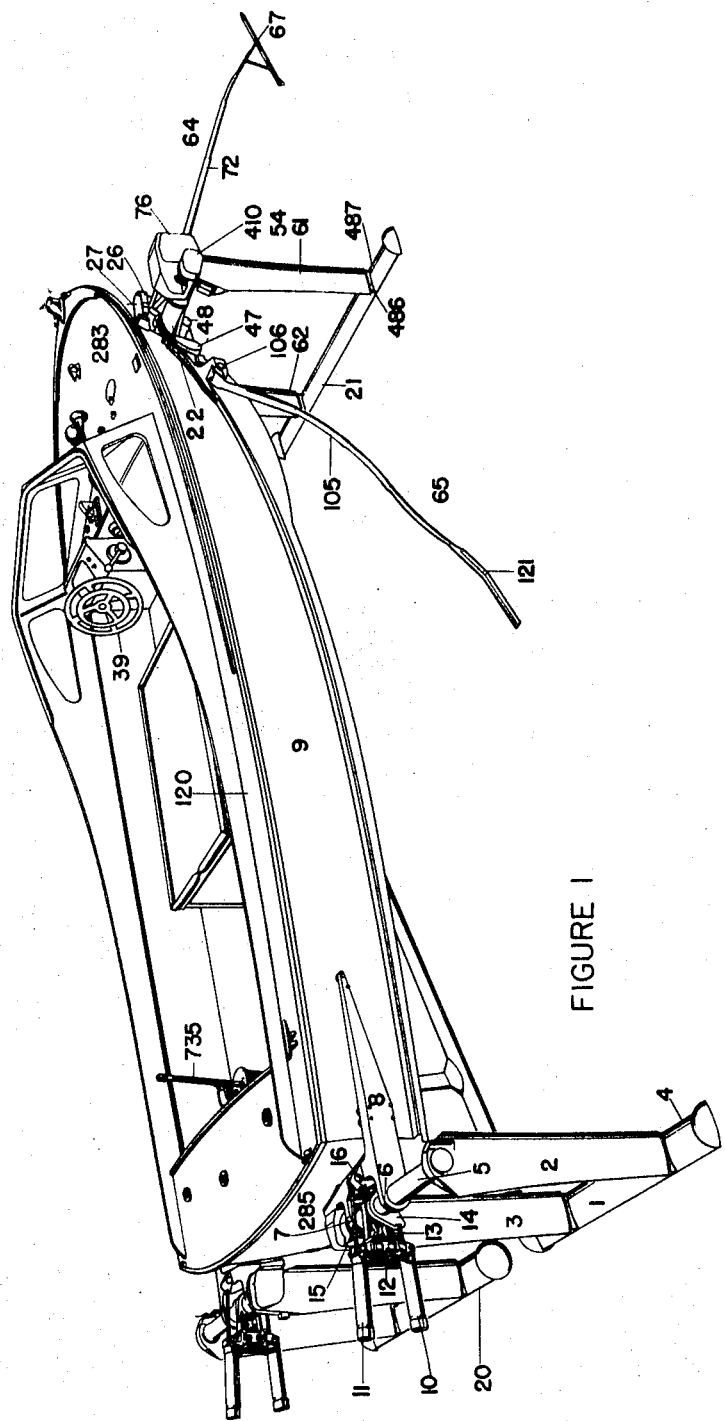
Figure 2:
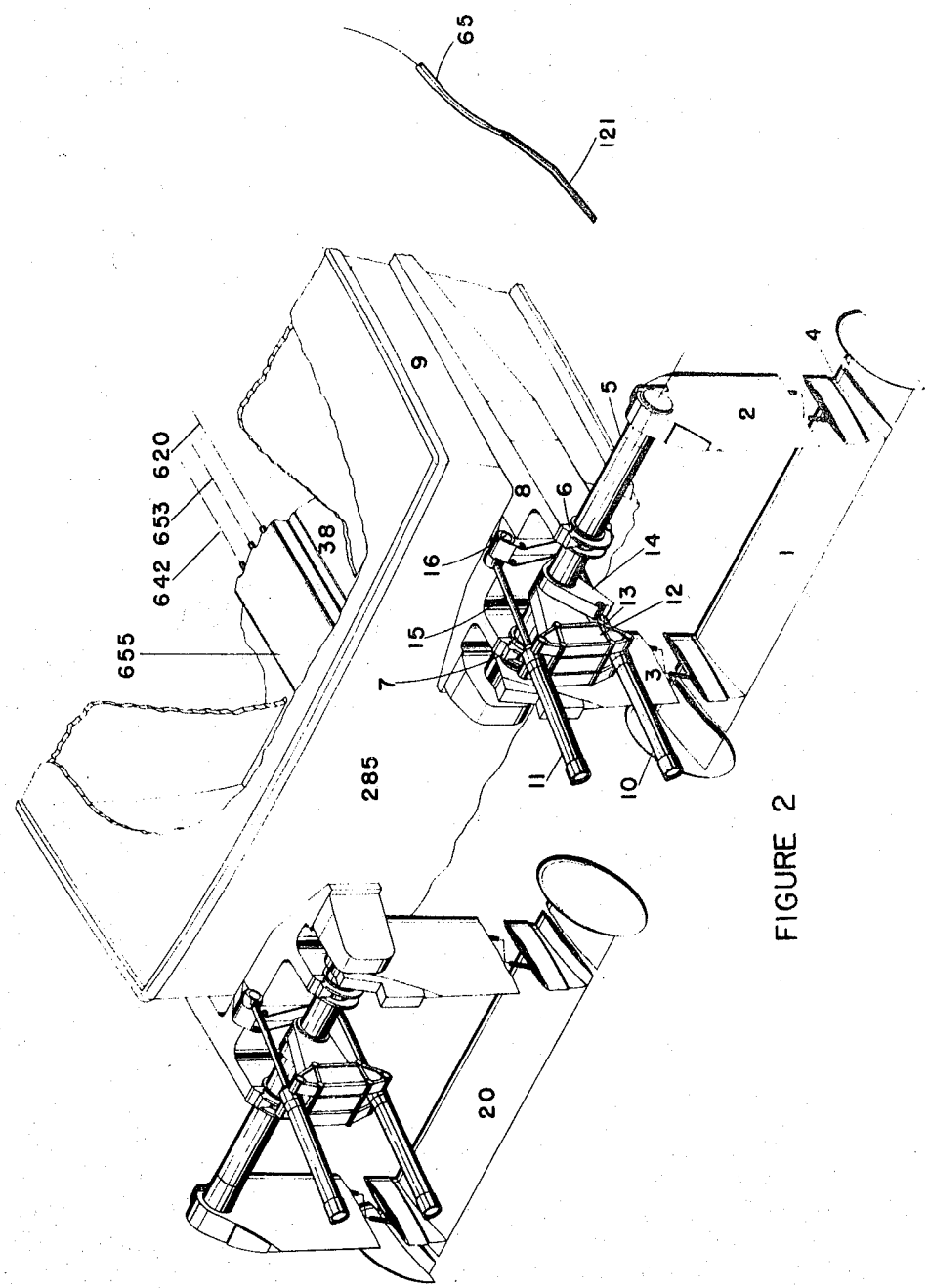
Figure 15:
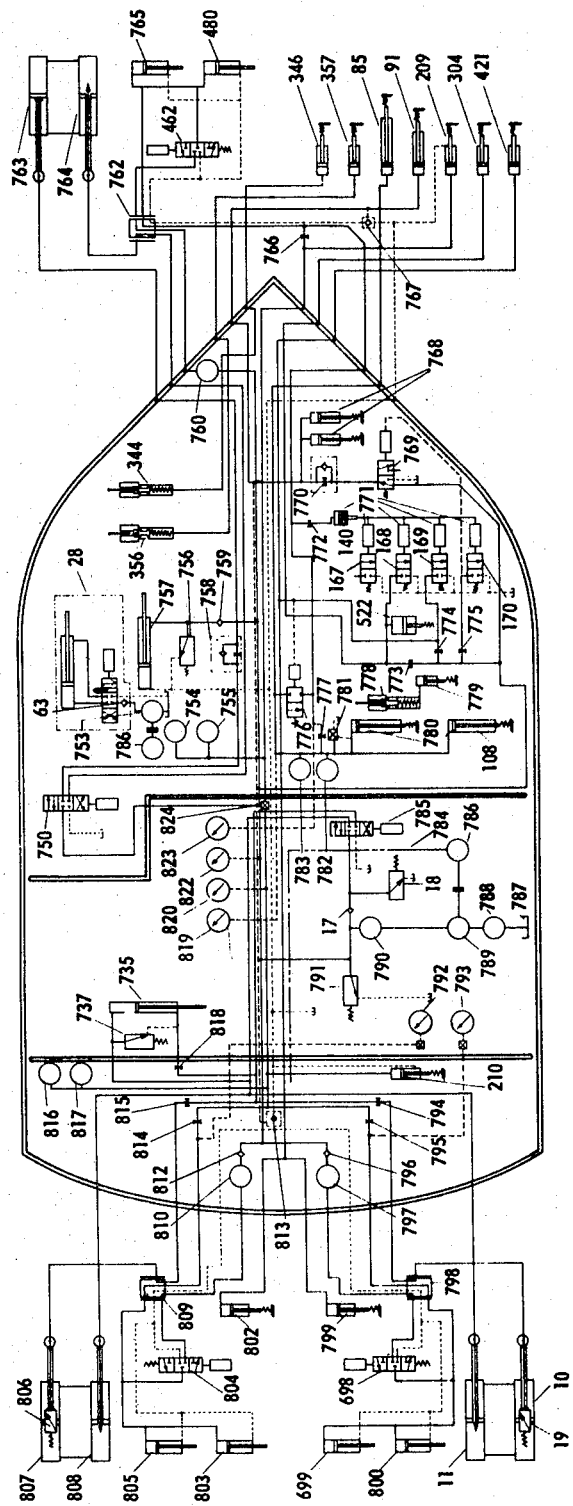

DESCRIPTION OF HIGH TAIL (A) Hydrofoil mounting, retraction, impact absorption, and steering Referring to FIGS. 1, 2 and 15, the aft hydrofoil 1 is pivoted on the struts 2 and 3 about the axis 4. The struts 2 and 3 supporting the right rear hydrofoil 1 are welded to the hollow shaft 5 which is journalled in the bearings 6 and 7. These bearings are carried on the bracket 8 attached to the hull of the boat 9. The cylinders 10 and 11 are trunnion mounted on the bracket 12 which is journalled on the shaft 5. The ram 13 of the cylinder 10 is pivoted on the forward leg (not visible) of the crank 14 attached to the shaft 5. The ram 15 of the cylinder 11 is pivoted on the pin 16 projecting from the bracket 8.

When pump pressure is applied to the ram end of the cylinders 10 and 11, the rams 13 and 15 are drawn in causing clockwise rotation of the shaft 5 and the attached struts and hydrofoil through an angle of 180° for retraction. When pump pressure is applied to the aft end of the cylinders 10 and 11, the rams 13 and 15 extend causing the counterclockwise rotation of the shaft 5 until the hydrofoil 1 reaches its operating position, where it is held not only by the pump pressure but also by a check valve 17 which forces any oil leaving the cylinders through a high pressure relief valve 18. There is also a high pressure, high flow velocity relief valve 19 resisting the flow of oil through a hole through the plunger of the cylinder 10. With this arrangement, should the hydrofoil 1 strike an obstacle while the boat is underway, the hydrofoil 1 can swing rearward under heavy resistance to avoid impact damage. The arrangements are similar for the left aft hydrofoil 20.

The mechanism for the forward hydrofoil 21 differs in three respects from that for each aft hydrofoil. First, the retraction rotation is opposite to the impact rotation, second, the energy absorbing cylinder is separate from the retraction cylinders and third, steering is provided by rotation of struts and hydrofoil about an upright axis.

Figure 3:
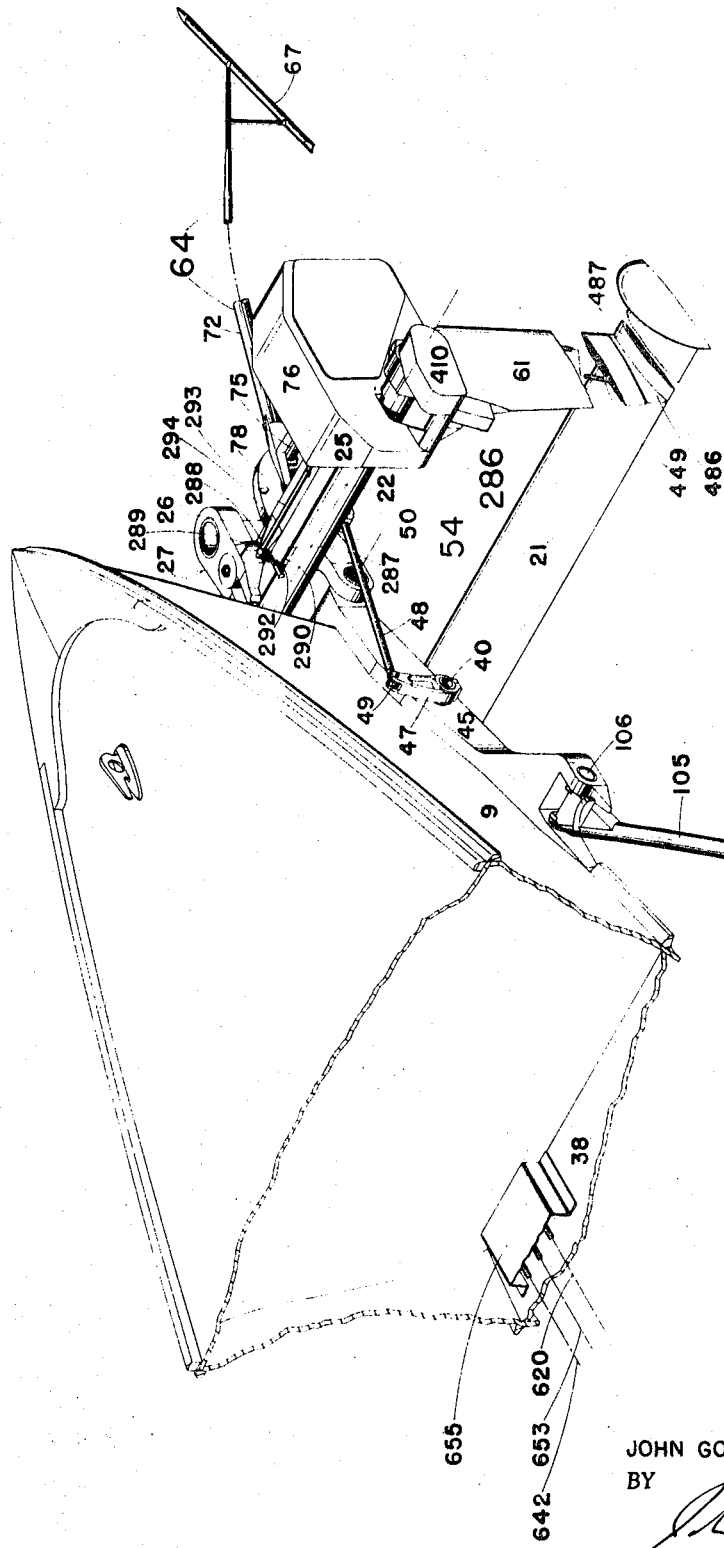

Referring to FIG. 3, the hollow shaft 22 is journalled near its ends in the bearings 23 and 24 (not visible). These bearings are carried by the steering support member 25 which is pivoted for steering, on knuckle 26, about the axis 27.

Figure 4C:
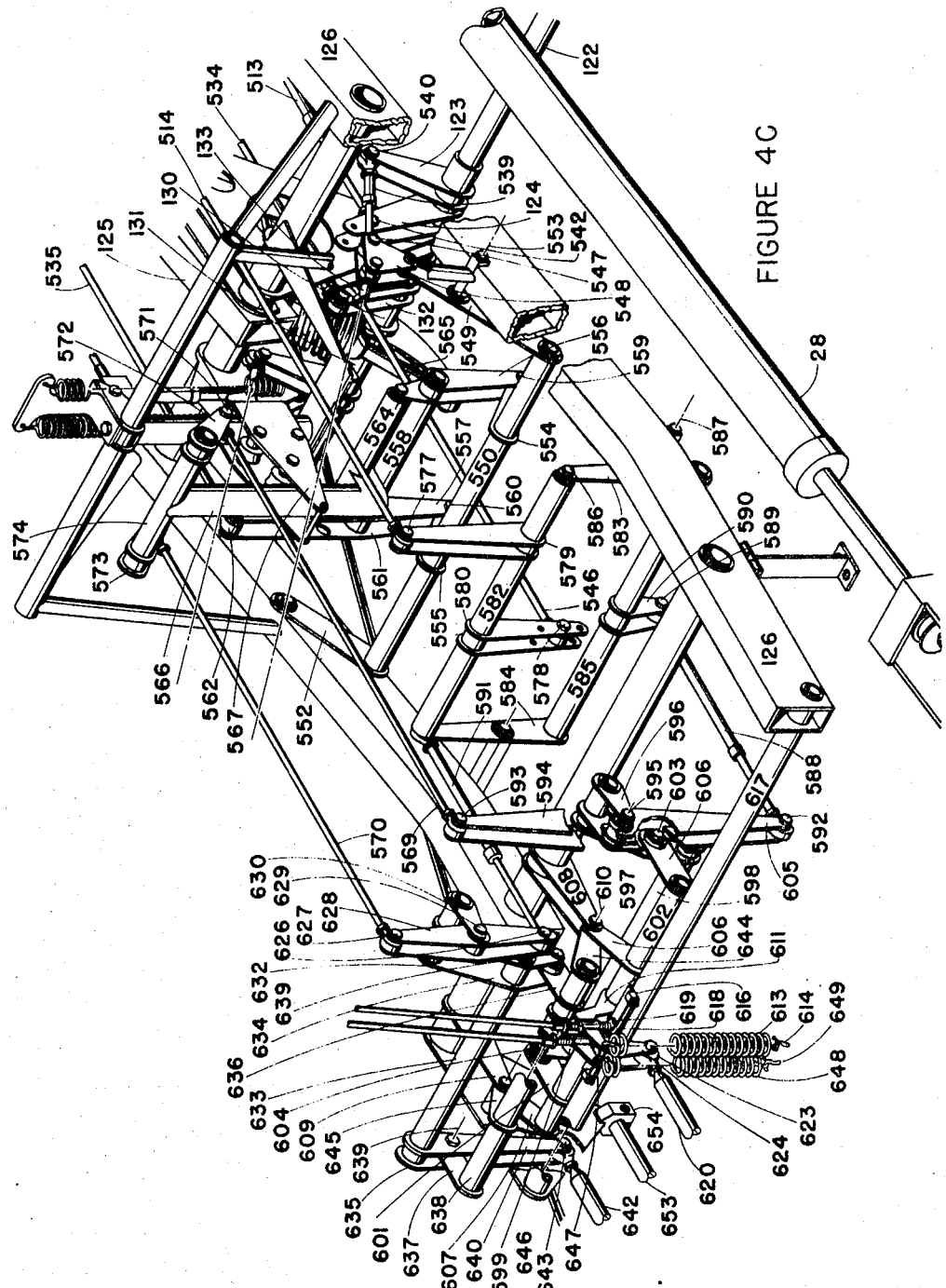
FIG. 4C is an enlargement of an aft fragment of the view in FIG. 4A.

Referring to FIG. 4A, the hydraulic steering unit shown partially at 28 is a power steering aid commonly used on automotive trucks.

The rod end 29 is screwed into the forward extension 30 of the hydraulic cylinder body 31, of the hydraulic steering unit 28, and locked with the nut 32. The rod end 29 is pinned to the crank 33 with the pin 34. The ram 35 of the cylinder 31 is attached with the rubber coupling 36 to the bracket 37 which is securely bolted to the deck 38. The extension and withdrawal of the ram 35, which rotates the crank 33 for steering, is controlled by the steering wheel 39 at the control station shown in FIG. 16 in a manner similar to that well known in the automotive industry.

The crank 33 is splined on the shaft 40. The shaft 40 passes first through an aperture 42 (not visible) in the right side of the hull 9 and then through an aperture 44 in the mounting bracket 45 within which the shaft 40 is journalled and sealed to prevent water entering the hull. The shaft 40 also passes through an aperture 46 in the left side of the hull and is journalled in the left side of the bracket 45.

Figure 5A:
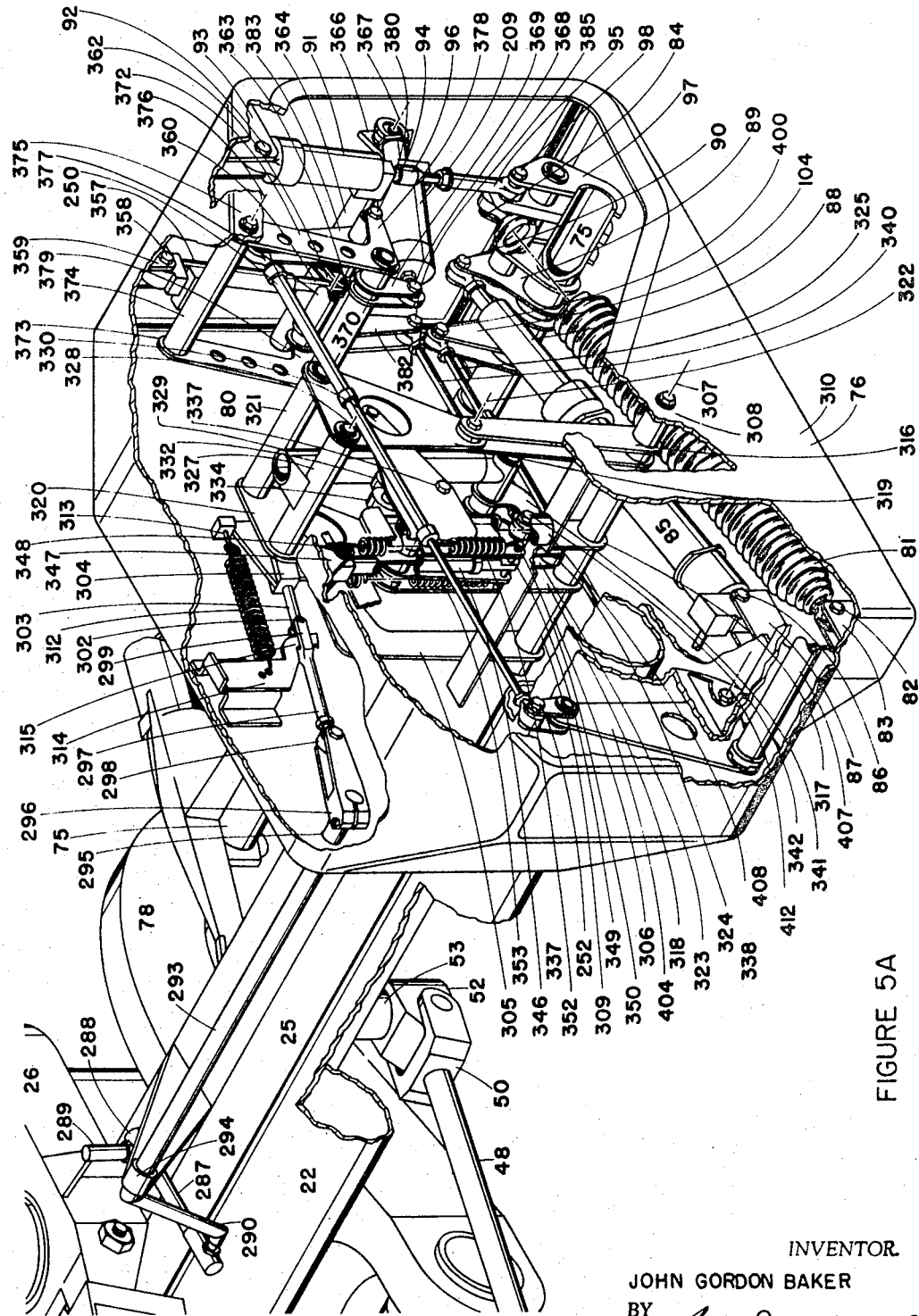
FIG. 5A is an isometric cutaway partially fragmentary view of the steering, forward sensor control and forward computer section of High Tail.

Referring to FIGS. 3 and 5A, the crank 47 is splined and clamped to the shaft 40 and coupled to the connecting rod 48 with the ball joint 49. The connecting rod 48 ends at its forward end in a crotch 50 which is journalled to the block 52. The latter is journalled on a pin 53 projecting downward from the steering support member 25. With this arrangement, fore and aft movements of the cylinder 31, as commanded by the corresponding rotations of the steering wheel 39, rotate the forward hydrofoil assembly 54 about the upright axis 27 for steering. Referring to FIG. 1, the forward hydrofoil assembly 54 includes the struts 61 and 62, the hydrofoil 21 and the hollow shaft 22 to which the upper ends of the struts 61 and 62 are attached.

A check valve 63 in the line supplying hydraulic fluid to the cylinder 28 eliminates back flow from the cylinder and thus prevents rotation of the forward hydrofoil assembly 54 about the steering axis 27, as a result of impact on one end of the hydrofoil 21, even if the hydraulic pressure in the cylinder 28 far exceeds the pump pressure.

(B) Sensor design, actuation and signal source

Figure 6:
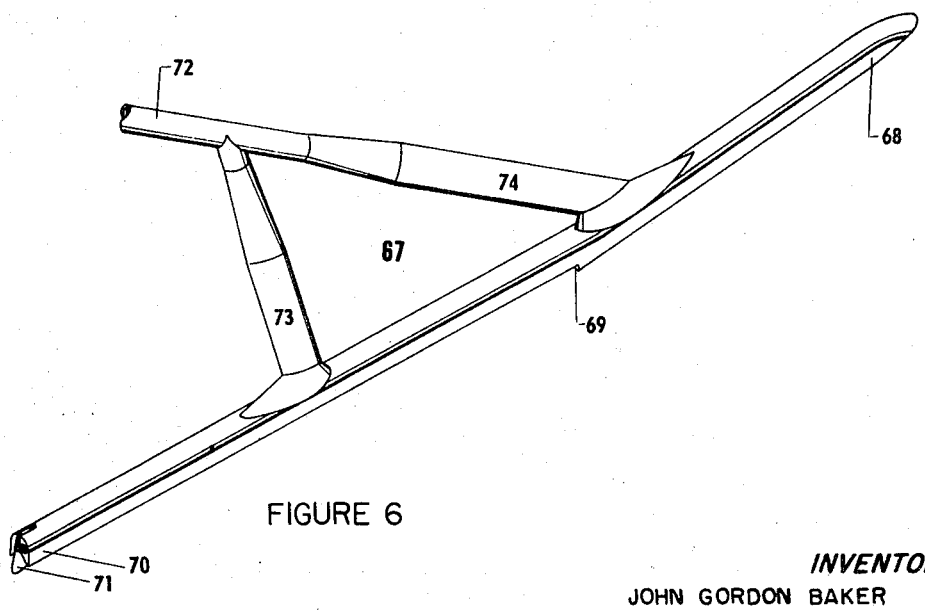

Referring to FIGS. 1 and 6, each of the three sensors, 64, 65 and 66 (the latter not visible) consists of a sensor arm and a ski rigidly connected together. On the basis of tests thus far, the form preferred for the forward ski 67 of High Tail has three planing surfaces in tandem all of which are $3\frac{1}{32}$ inch wide. The forward planing surface is 2½ inches long and extends from the forward tip of the ski to the step 68. The forward planing surface is flat with a smooth water trim angle of 26°. The intermediate planing surface is 13 inches long and extends from the step 68 to the step 69. The intermediate planing surface has a negative dead rise angle of 45° and a smooth water trim angle of 21°. The chine of the intermediate planing surface is a continuation of the chine of the forward planing surface. The aft planing surface is 22 inches long and extends from the step 69 to the aft end 70 of the ski. The aft planing surface has a 45° negative dead rise and a smooth water trim angle of 15°. A small vertical center fin 71 is attached at the aft end of the ski 67 to damp lateral vibrations of the ski.

The ski 67 is mounted on the forward end of the sensor arm 72 by means of the struts 73 and 74. The upper portions of the struts are circular tubes and the lower portions are streamlined tubes with fairings at the intersections with the ski. In the form preferred, the ski and struts are constructed as thin walled tubes of high strength corrosion resistant material.

For either of the aft sensors 65 and 66, the sensor arm is attached to the forward end of the ski so that no struts are required. Tubular construction with two planing surfaces and dead rise angles of 45° as described for the forward sensor ski 67 are preferred, but T-cross sections and flat planing surfaces as shown in FIGS. 1 and 2 are adequate.

In FIGS. 1, 3, 5A and 6, the forward sensor 64 is shown in its operating position. The sensor arm 72 is clamped and keyed to the shaft 75 which extends into the computer case 76. The computer case 76 is rigidly attached to the steering support member 25. The shaft 75 is journalled in two bearings one of which, 77 (not shown), is supported on the bracket 78 rigidly attached to the steering support member 25. The other bearing 79 (not shown) is supported in the left wall 80 of the computer case 76.

The aft end of the tension spring 81 is pivoted at the pin 82 to the bracket 83 fixed to the computer case 76. The tension spring 81 exerts a counter-clockwise moment on the crank 84 greater than the clockwise moment of the weight of the sensor 64 for all angular positions of the sensor 64.

With the boat floating at rest or underway at a speed below the sensor down speed there is no other comparable moment on the sensor 64 or the shaft 75 so that the sensor 64 retracts to an upright position if it is not already in this position.

The aft end of the hydraulic cylinder 85 is pivoted at the pin 86 to the bracket 87 fixed to the computer case 76. The ram 88 of the hydraulic cylinder 85 is pivoted on the crank 89 at the pin 90. The crank 89 is rigidly attached to the shaft 75. The hydraulic cylinder 91 is pivoted at the pin 92 on the bracket 93 fixed to the case 76. The ram 94 of the cylinder 91 is connected to the rod end 95 through the coupling 96. The coupling 96 puts a limit on the length of the connection between the ram 94 and the rod end 95 but telescopes to permit reduction of this length without restraint. The rod end 95 is pivoted on the crank 97 at the pin 98.

With the floating boat starting forward from rest, the sensor 64 remains retracted in an upright position (not shown) until the boat reaches sensor down speed when the sequence function unit automatically places the sensor loading pressure on the hydraulic cylinder 85 producing compression in the cylinder 85 and a counter-clockwise moment on the shaft 75. At the same time the sequence function unit automatically places pump pressure on the cylinder 91 producing tension in the cylinder 91 and a clockwise moment on the shaft 75. The latter moment, being dominant when the sensor 64 is upright, starts the rotation of the sensor 64 clockwise. When the crank 89 moves over center, the moment produced by the cylinder 85 also becomes clockwise and the sensor 64 accelerates under the torque of both cylinders. Well before the crank 97 reaches dead center, the ram 94 reaches the end of its travel upward. But the telescoping of the coupling 96 permits the continuation of the rotation of the sensor 64 through its full operating range without restraint from the cylinder 91. Beyond the angle at which the ram 94 reaches the end of its travel, the moment of the cylinder 85 continues the rotation of the sensor 64 until the sensor ski 67 strikes the water surface and arm 72 reaches the position shown in the figures. Then the moment of the cylinder 85, in combination with the weight and spring moments also present, maintains the proper planing load on the ski 67 for all operating speed above sensor down speed during acceleration or above sensor up speed during deceleration.

At sensor up speed during deceleration of the boat, the cylinders 85 and 91 are automatically drained causing the sensor 64 to retract to an upright position under the action of the tension spring 81.

The crank 104 attached to the shaft 75 introduces the signal motion of the sensor 64 into the forward computer section.

Referring to FIG. 1, the right aft sensor 65 is shown in its operating position. Referring also to FIGS. 3 and 4A, the sensor arm 105 for the right aft sensor 65 is clamped and keyed to the hollow shaft 106 which extends into the bow compartment of the boat where the bow computer section is located. The ram 107 of the hydraulic cylinder 108 is pivoted on the crank 109 at the pin 110. The crank 109 is rigidly attached to the shaft 106. The tension spring 112 is also attached at its lower end to the ram 107 by means of the threaded adapter 113. The upper end of the cylinder 108 is attached to the cross member 114 by means of universal joint 115. The upper end of the tension spring 112 is attached to the upper end of the cylinder 108 by the threaded cap 116 of the cylinder 108. The cross member 114 is attached to the skin of the hull 9 at its left end by the flange mounting 117. A similar attachment is used for the right end of the cross member 114 (not shown).

The tension spring 112 exerts a greater clockwise moment on the shaft 106, through the crank 109, than the counter-clockwise moment of the weight of the sensor 65 for all angular positions of the sensor 65. With the boat floating at rest or underway at a speed below a predetermined speed there is no other comparable moment on the sensor 65 or the shaft 106, so that the sensor 65 retracts to a position in which the ski is just under the level of the deck 120 if it is not already in this position.

With the floating boat starting forward from rest, the sensor 65 remains retracted until the boat reaches down speed when the sensor loading pressure is automatically conducted to the cylinder 108 producing a compression in the cylinder 108 and a dominant counter-clockwise moment on the shaft 106 causing the sensor 65 to rotate counter-clockwise downward until the sensor ski 121 strikes the water surface. Then the moment of the cylinder 108, in combination with the spring and weight moments also present, maintains the proper planing load on the sensor ski 121. The rotation of the sensor 65 is transmitted by the shafts 106 and 122 to the cranks 123 and 124 which introduce the sensor signal motion into two parts of the bow computer section. To minimize distortions of the signal motions caused by deflections of the shaft 106 perpendicular to its axis, the shafts 106 and 122 are coupled together by means of a universal joint (not shown) within the hollow shaft 106, and the shaft 122 is journalled on the extension 125 of the frame 126. At sensor up speed during deceleration of the boat, the cylinder 108 is automatically drained causing the retraction of the sensor 65 under the action of the spring 112.

The mounting and actuation of the left aft sensor 66 is similar to that described for the right aft sensor 65. The rotation of the sensor 66 is transmitted by the shafts 130 and 131 to the cranks 132 and 133 which introduce the sensor signal motions into two parts of the bow computer section. The arrangement to minimize distortion of the signal motions, caused by deflection of the shaft 130 perpendicular to its axis, is similar to that described for the sensor 65.

(C) The sequence function unit

Figure 8:
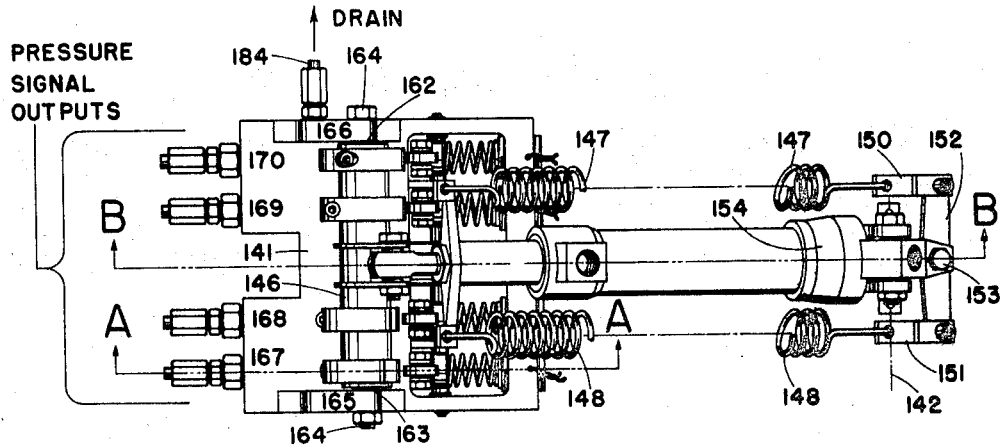
Figure 10:
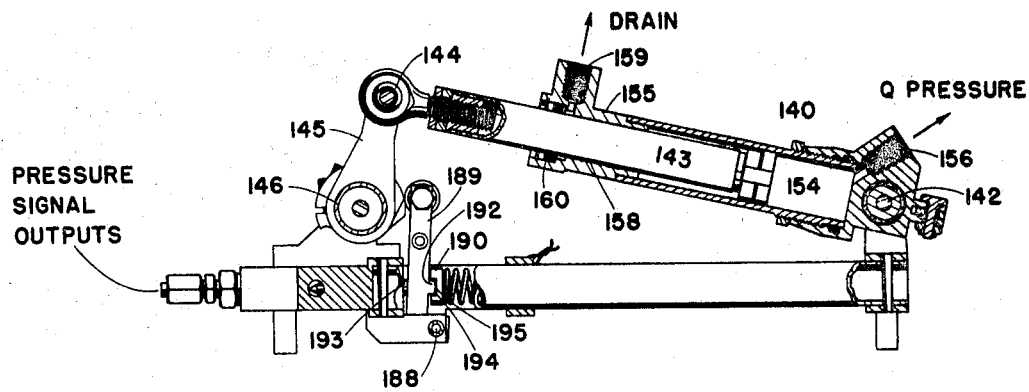
Figure 9:
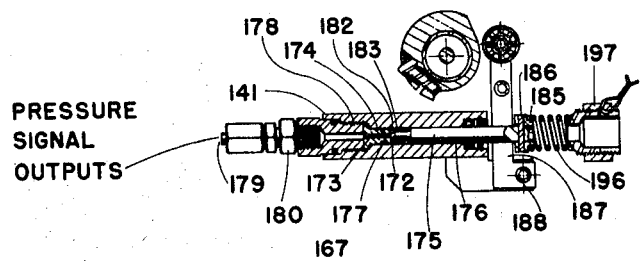

Referring to FIGS. 8, 9 and 10, the single acting hydraulic cylinder 140 is hinged on the frame 141 at the axis 142. The ram 143 of the cylinder 140 is pivoted at the ball joint 144 to the crank 115, attached rigidly to the hollow cam shaft 146. The tension springs 147 and 148 extend from the cross member 149 mounted on the ram 143, to the links 150 and 151 which connect the springs 147 and 148 to the evener bar 152, pivoted at the pin 153 on the hydraulic cylinder head 154. The evener bar 152 equalizes the tensions of the springs 147 and 148 and, thus, eliminates bending moment on the ram 143 in order to minimize sliding friction between the ram 143 and the cylinder body 155.

The smoothed servo cylinder pressure is connected to the hydraulic cylinder 140 through the port 156 in the cylinder head 154. The ram 143 of the hydraulic cylinder 140 is sealed with a labyrinth seal 158 to minimize seal friction. The leakage through the seal 158 is conducted out of the port 159 to drain. The chevron seal 160 prevents loss of the leakage oil, but, not being under appreciable pressure, contributes only slightly to the friction.

The cam shaft 146 is journalled on the ball bearings 162 and 163 which are supported by the bolt 164 extending through the two brackets 165 and 166. The latter brackets are bolted and doweled to the frame 141.

There are four needle valves generally located at 167, 168, 169 and 170 within the frame 141. FIG. 9 shows the needle valve located at 167 which is typical. The needle valve cone 172 is adapted to close the passage 173 of the valve seat member 174. The valve stem 175 integral with the needle valve cone 172 is a close free fit in the cylindrical hole 176 within the frame 141. The valve seat member 174 is also sealed within the hole 176 by means of the ring seal 177. The valve seat member 174 is held in place by the fitting 178. The pilot pressure tube 179 is connected by means of the tube fitting 180.

The tube 179 is connected directly to the hydraulic component being controlled such as a valve or cylinder and also connected through a restrictor to the pump pressure. The needle valve passage 182 is connected by a hole 183 drilled in the frame 141 to the drain connection 184. The other three needle valve passages are also drained by the hole 183 and the connection 184. The gimbal ring 185 is attached to the valve stem 175 by means of the pin 186. The rocker arm 187 is journalled on the frame 141 on the axis 188. The rocker and gimbal construction is further shown for the rocker arm 189 and the gimbal ring 190 in FIG. 10. The two projections 192 on the rocker arm 189 straddle the valve stem 193 and protrude into two notches 194 in the gimbal ring 190 to prevent the valve stem 193 from rotating and to provide contacts 195 between the rocker arm 189 and the gimbal ring 190 along a line parallel to the axis 188 and the intersecting axis of the valve stem 193. Referring back to FIG. 9, the compression spring 196 seats on the gimbal ring 185 and on the spring support screw 197 threaded into the frame 141. The roller 198 is a ball bearing pinned to the rocker arm 187. All rockers, rollers and needle valve assemblies are of identical design. The cam 199 is securely clamped to the hollow cam shaft 146 by means of the cap screw 200. The cam 199 has a large constant radius portion 202, a transition portion 203 and a clearance portion 204. All four cams are identical except for the angular position of the transition portion of the cam with respect to the crank 145.

In operation, the smoothed servo cylinder pressure within the cylinder 140 pushes the ram 143 out extending the springs 147 and 148 to a length corresponding to the smoothed servo cylinder pressure and therefore corresponding to the forward speed of the boat. Each length of the springs 147 and 148 corresponds to an angular position of the cam shaft 146. Starting with the boat at rest the cam shaft 146, as viewed in FIG. 10, is rotated to its extreme clockwise position. In this position, all cam rollers are lifted by being in contact with the large constant radius portion of the respective cams, all needle valves are open, and all pilot pressures are at drain pressure. As the speed of the boat increases, the cam shaft 146 rotates counter-clockwise as viewed in FIG. 10. As the transition portion of each cam rolls under the cam roller, the latter is lowered and the spring 196, as viewed in FIG. 9, closes the needle valve 175 blocking the drain 183 on the pilot line 172 and thus raising the pilot pressure which initiates the corresponding control operation.

(D) The reciprocal function units

The two reciprocal function units used on High Tail are identical except for different length adaptations. Each reciprocal function unit produces a signal $\sigma_h$ from the smoothed servo pressure Q as the signal for the dynamic pressure $q$ in accordance with (74) and (75) and corresponding to the terms $w_{fh}/Kq$ and $w_{ah}/Kq$ in (71), (72) and (73). Such use of reciprocal function units substantially eliminates change in bottom clearance with change in forward speed at speeds above up speed.

Figure 11:
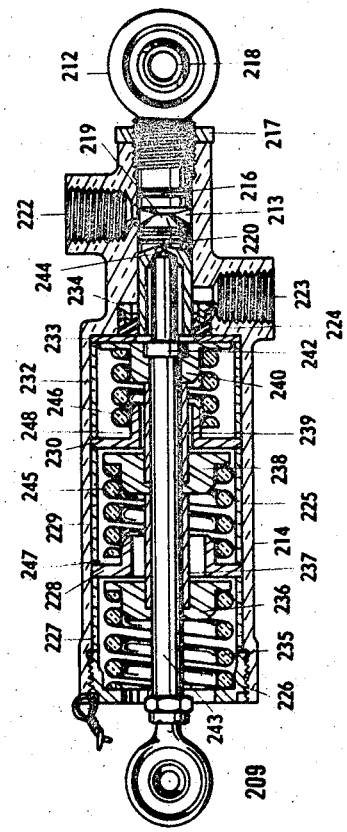

FIG. 11 is a cross sectional view of the reciprocal function unit 209 used in the control of the forward hydrofoil 21. The reciprocal function unit 210 for the two aft hydrofoils differs only in that its plug and length adapter 211 is much longer than the plug and length adapter 212 for the reciprocal function unit 209.

Referring to FIG. 11, the bore 213 of the cylinder 214 is closed with the plug and length adapter 212 which is screwed into the body 214 of the reciprocal function unit 209, sealed with the ring seal 216, and locked in place with the lock nut 217. The ball joint 218 is formed integral with the plug and length adapter 212. The ram 219 is a close free fit in the bore 213 and has several circumferential sealing grooves 220 to reduce leakage. The smoothed servo pressure is conducted through the port 222. Leakage passing the fit between the ram 219 and the bore 213 is drained by a drain line attached to the drain port 223. The seal 224, not being under pressure, adds very little to the friction but prevents leakage other than through the drain port 223.

225 is a circular cylindrical bore in the body 214 coaxial with the bore 213. The hollow nut 226 is threaded into the body 214, coaxial with the bores 213 and 225, and holds the tube 227, washer 228, the tube 229, the washer 230, the tube 232, the washer 233, the seal 224, and the ring 234 tightly in place. The spring 235 is centered at its left end by the hollow nut 226 and at its right end by the washer 236. Initial compression in the spring 235 holds the washer 236, the tube 237, the washer 238, the tube 239, and the washer 240 either against the washer 233, if there is no smoothed servo pressure, or against the shoulder 242 of the spindle 243 or against both the washer 233 and the shoulder 242 if there is smoothed servo pressure. The spindle 243 fits into the socket 244 of the ram 219 and takes the reaction of the latter.

As the smoothed servo pressure is increased, the ram 219, together with the spindle 243 and the washers and tubes strung thereupon, moves to the left, compressing the spring 235 and moving the springs 245 and 246 to the left until the gap 247 between the spring 245 and the washer 228 is closed, after which the movement to the left of the spindle 243 for a given increase in the smoothed servo pressure is decreased due to the stiffness of the spring 245. With still further increase in the smoothed servo pressure, the gap 248 between the spring 246 and the washer 230 closes further decreasing the movement to the left of the spindle 243 for a given increase in the smoothed servo pressure. The required nonlinear relation between the smoothed servo pressure and the increase in length $\sigma_h$ of the reciprocal function unit 209 is thus approximated.

(E) Overload releases

Figure 13:
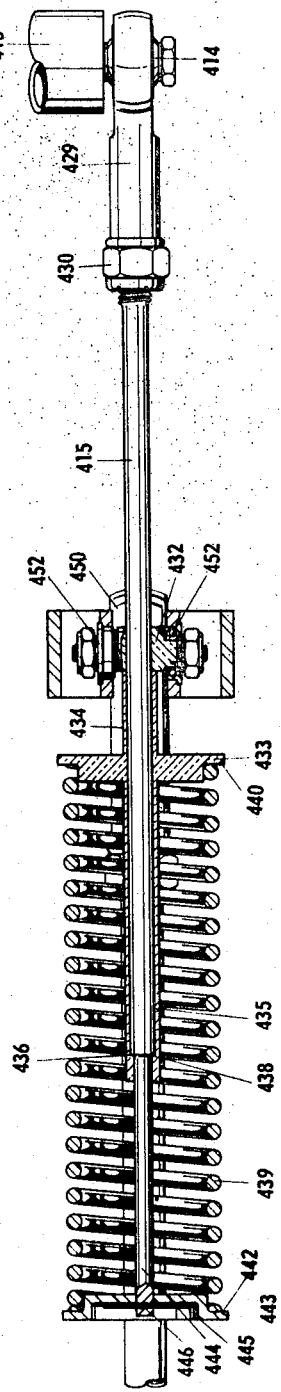

There are twelve overload release devices in High Tail's control. One of these used with the forward servo is shown in FIG. 13 and described in Section 1 of this descriptive appendix. Two others of the same design are used with the aft servos.

Figure 12:
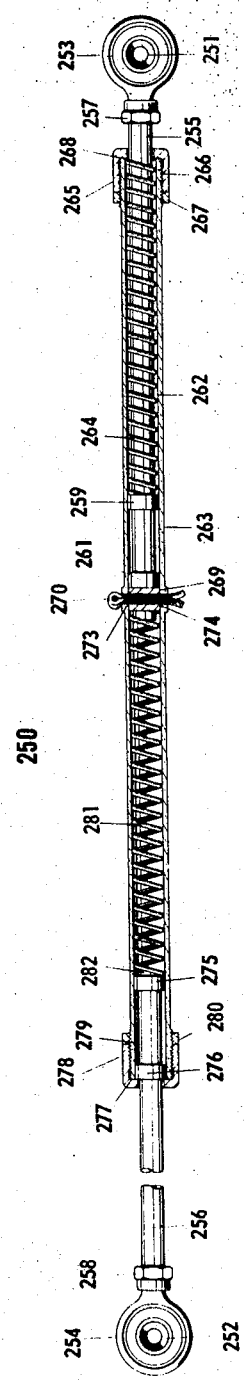

FIG. 12 shows a partial section view of the overload release 250 used in the forward computer section. The overload release 250 is a link in the computer mechanism pivoted at the pins 251 and 252. The rod ends 253 and 254 are screwed into the rods 255 and 256 and locked in place with the nuts 257 and 258 respectively.

The rod 255 has two enlargements 259 and 261 which fit freely and align the rod 255 within the bore 262 of the tube 263. The compression spring 264 slides freely over the rod 255 and within the bore 262. The spring 264 is retained by the threaded cap 265, which is screwed on to the threaded end 266 of the tube 263 and locked with the lock nut 267.

The compression load in the spring 264 is exerted against the inward extending flange 268 of the cap 265 and against the plug 269 fitting the bore 262 of the tube 263 and located by the cotter pin 270. The cotter pin 270 is fitted into the matching holes 273 and 274 in the tube 263 and the plug 269 respectively. The compression load in the spring 264 is equal to the limiting tension in the overload release 250 beyond which the withdrawal of the rod 255 from the tube 263 lengthens the overload release 250.

The rod 256 has two enlargements 275 and 276 which fit freely and align the rod 256 within the bore 262 of the tube 263. The enlargement 276 is retained by the inward extending shoulder 277 of the threaded cap 278 which is screwed on the threaded end 279 of the tube 263 and locked with the lock nut 20. The compression spring 281 slides freely within the bore 262 of the tube 263. The compression load in the spring 281 is exerted on the plug 269 and the inner end 282 of the rod 256. This compression load in the spring 281 is the limiting compression in the overload release 250 beyond which the rod 256 moves into the tube 263 shortening the overload release 250.

The other overload releases in the computer are variations of the overload release 250 and that shown in FIG. 13.

(F) Locations of the computer sections in the boat

The computer is physically divided into four parts, the forward computer section, the bow computer section, the sequence function unit and the stern computer section. The forward computer section is contained within the case 76 and is part of the forward hydrofoil control. The bow computer section is located within the bow enclosure 283 and is part of the control for all three hydrofoils. The sequence function unit is mounted on the forward wall of the bulkhead at the control station shown in FIG. 16. The stern computer section is located within the stern compartment just forward of the transom 285 and is part of the control for the aft hydrofoils.

(G) The forward computer section

Referring to FIG. 5A, the forward computer section located within the case 76 is part of the hydrofoil angle control for the forward hydrofoil. Steering, elevation, smoothed servo pressure and sensor signals, as well as manual adjustments for pay load, trim and multiplier settings are transmitted to the case 76.

All important axes of the forward computer section are parallel to the axis of the tubular shaft 22. Lost motion in the forward computer section is prevented by a load throughout the mechanism introduced by the forward hydrofoil servo shown generally at 286 and described in Section I of this descriptive appendix. The forward hydrofoil 21, the struts 61 and 62, the shaft 22, the sensor 64, the steering support member 25 and the computer case 76 all rotate together about the upright axis 27 when the boat is steered.

The signal for the steering angle $\theta$ is transmitted from the knuckle 26 by means of the connecting rod 287 the forward end of which is pivoted at the ball joint 288 on the extension 289 of the knuckle 26. The aft end of the connecting rod 287 is pivoted on the crank 290 at the ball joint 292. The crank 290 is part of the hollow shaft 293 which is supported by the bearing 294 attached to the steering support member 25 and the bearing 295 in the left skin 80 of the computer case 76 where the shaft 293 enters the computer case 76.

The crank, connecting rod, stop and spring, now to be described, comprise the steering function unit of the forward computer section. The near dead-center crank 296 is keyed and clamped to the shaft 293 just inside the computer case 76. The connecting rod 297 is attached at its aft end to the crank 296 at the ball joint 298. The connecting rod 297 telescopes so that it may be increased in length but not shortened below a fixed minimum length. The forward end of the connecting rod 297 is the crotch 299 which is pivoted at the pin 302 to the ram 303 of the hydraulic cylinder 304 mounted on the crank 305 of the multi-crank member 306, the latter being journalled about the axis 307 in bearings 308 and 309 supported in the right and left skins 310 and 80 of the case 76. The tension spring 312, attached to the crank 305 with the eye bolt 313 and to the case mounted bracket 314, pulls rearward on the crank 305 putting compression in the ram 303 with a reaction either through the pin 302 and the connecting rod 297 to the ball joint 298 or to the stop 315.

From the geometric relations between the crank 296 and the connecting rod 297 the rearward movement of the pin 302, before the aft end of the ram 303 strikes the stop 315, is approximately proportional to the square of the angular displacement of the crank 296 away from the dead center, which is also proportional to the steering angle $\theta$. When $\theta$ reaches either $+\theta_m$ or $-\theta_m$ the aft end of the ram 303 strikes the stop 315 preventing further rearward displacement of the pin 302. The telescopic extension of the connecting rod 297 permits the further unrestrained rotation of the crank 296. With this mechanism the forward displacement $\sigma_{302}$ of the pin 302 may be expressed:

$$C_1\sigma_{302} = -K_f\theta_b^2 \qquad (1)$$

At up speed during acceleration, the sequence function unit subjects the hydraulic cylinder 304 to pump pressure, which causes the ram 303 of the hydraulic cylinder 304 to move rearward against a stop within the hydraulic cylinder 304. This is the position of the ram 303 shown in FIG. 5A. At down speed during deceleration, the sequence function unit drains the hydraulic cylinder 304 causing the tension spring 312 to withdraw the ram 303 forward against another stop within the cylinder 304.

The forward displacement $\sigma_{304}$ of the cylinder 304 equals the forward displacement $\sigma_{302}$ of the pin 302 minus the forward displacement $\sigma_{303}$ of the ram 303 with respect to the cylinder 304 thus:

$$\sigma_{304} = \sigma_{302} - \sigma_{303} \qquad (2)$$

Choosing $\sigma_{303}$ equal to $+\dfrac{A_e}{C_1}$ and combining (1) and (2) gives:

$$C_1\sigma_{304} \equiv -A_e - K_f\theta_b^2 \qquad (3)$$

The two-layer crank 316 and the cranks 317 and 318, all of which are appendages of the multi-crank member 306, form a hinge with the two-axis cranks 319 and 320 of the multi-crank member 321 about the hinge axis 322. The two-layer crank 323, which is the rigid extension of the two-axis crank 320 of the multi-crank member 321, is pivoted to the aft end 324 of the connecting rod 325 at the pin 326 (not shown).

Figure 16:
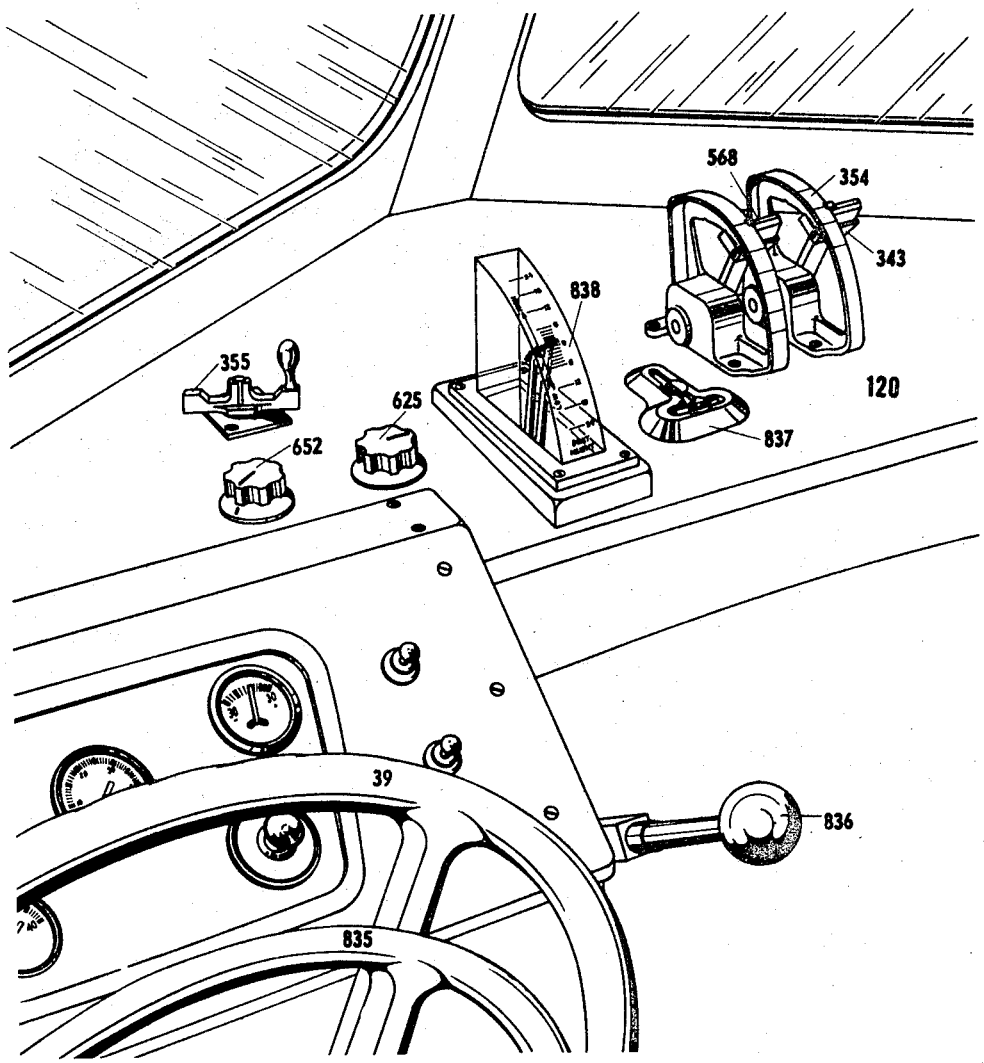

The multiplier-shaft 327 is hinged on the two-axis cranks 319 and 320 of the multi-crank member 321 about the hinge axis 328. The multiplier-beam 329 is rigidly attached to the multiplier-shaft 327. The carriage 330 and the attached parts provide a vertically movable fulcrum for the multiplier-beam 329. The multiplier-beam 329 is maintained in contact with the roller 332 by a load from the forward hydrofoil servo as will be explained below. The roller 332 is pivoted on the carriage 330 with the pin 333 (not visible). Two other rollers, 334 and 335 (the latter not shown), pivoted on the carriage 330 on the pins 336 and 337 (the former not shown), guide the carriage 330 on the vertical cylindrical post 338 fixed to the case 76. The load introduced by the forward servo, as described in Section I of this descriptive appendix, maintains contact between the rollers 334 and 335 and the cylindrical post 338. Under these conditions the multiplier-beam 329 is constrained to rotate about the axis 333, hence the forward displacement $\sigma_{340}$ of the connecting rod 340, which is pivoted to the two-layer extension 341 of the multiplier-beam 329 at the pin 342 is given by:

$$\sigma_{340} = -C_2 A_f \sigma_{328} \qquad (4)$$

where $A_f$ is a coefficient in (71) and $-C_2A_f$ is the multiplication ratio of the multiplier-beam 329 determined by the elevation of the carriage 330 with respect to the hinge axis 328 which is adjusted at the control station with the handle 343 shown in FIG. 16. The handle 343 is connected to a master cylinder 344, shown in FIG. 15, located below the deck 120. A single hydraulic line (not shown) connects the master cylinder 344 to the slave cylinder 346, FIG. 5A. The slave cylinder 346 is connected to the bracket 347 with the pin 348. The bracket 347 is attached to the upper skin of the case 76. The ram 349 of the slave cylinder 346 is connected to the carriage 330 with the pin 350. The two tension springs 352 and 353 are hooked around the pin 350 at their lower ends and around the pin 348 at their upper ends. The springs 352 and 353 act to return the ram 349 when the ram of the master cylinder 344 is withdrawn by the control handle 343 at the control station. Fluid leakage is replaced at the end of the stroke of the master cylinder 344 in a way well known for such hydraulic repeater systems, so that the extension of the ram 349 of the slave cylinder 346 is determined by the position of the handle 343 at the control station. The scale 354 at the control station which indicates the position of the handle 343 is calibrated to read the coefficient $A_f$.

The forward displacement $\sigma_{304}$ of the cylinder 304 is proportional to the forward displacement $\sigma_{322}$ of the hinge axis 322 because both are attached to the multi-crank member 306, thus:

$$C_3\sigma_{304} = \sigma_{322} \qquad (5)$$

The relations among the forward displacements $\sigma_{328}$, $\sigma_{322}$ and $\sigma_{325}$ of the axis 328, the axis 322 and the connecting rod 325 are determined by their relative elevations to be:

$$C_4\sigma_{328} = \sigma_{322} - C_5\sigma_{325} \qquad (6)$$

Combining (3), (4), (5) and (6) gives:

$$\sigma_{340} = \frac{C_2C_3}{C_4C_1}A_f\left[\frac{C_1C_5\sigma_{325}}{C_3} + A_e + K_f\theta_b^2\right] \qquad (7)$$

The manual pay load and trimming adjustment at the control station for the forward hydrofoil, corresponding to the term $B_f$ in (71), is made with and indicated by the crank and screw assembly 355 as shown in FIG. 16. The crank and screw assembly 355 moves the ram of a master cylinder 356, shown in FIG. 15, located under the deck 120. The master cylinder 356 is connected with a single hydraulic line (not shown) to the slave cylinder 357, FIG. 5A. The slave cylinder 357 is hinged with a pin 358 on the bracket 359 attached to the top of the case 76. The ram 360 of the slave cylinder 357 is pivoted on the two-layer crank 362 by means of the pin 363. The two-layer crank 362 is rigidly attached to the shaft 364. The tension spring 365 (not shown) extending from the pin 363 to the pin 358 acts to return the ram 360 when the ram of the master cylinder 356 is withdrawn. Fluid leakage is replaced at the end of the stroke of the master cylinder 356 in a way well known for such hydraulic repeater systems, so that the extension of the ram 360 of the slave cylinder 357 corresponds to the setting of the crank and screw assembly 355 at the control station.

The shaft 364 is journalled in the left side 80 of the case 76 and in the bracket 366, attached to the forward side of the case 76. The shaft 364 has the eccentric 367 integral therewith.

The reciprocal function unit 209 as a link extends from the eccentric 367 to the pin 368 which pivots the reciprocal function unit 209 to the two-layer extension 369 of the member 370. The reciprocal function unit 209 is shown in cross section in FIG. 11 and described in Section D of this descriptive appendix. The reciprocal function unit 209 is subject to the smoothed servo pressure Q. The increase in length, $\sigma_h$, of the reciprocal function unit 209, corresponding to the term $w_{fh}/Kq$ in (71) is expressed by (74).

The member 370, which includes the rigidly attached bars 372 and 373 and the tube 374, is hinged on the bracket 375 mounted on the upper skin of the case 76 and on the left skin 80 of the case 76 about the axis 376. The double crank member 377 is hinged on the extensions 378 and 379 of the member 370 about the axis 380. The two-layer arms 382 and 383 are the cranks of the double crank member 377. The connecting rod 340 is hinged on the two-layer crank 382 at the pin 385. The connecting rod 250 is pivoted on the two-layer crank 383 at the pin 251 (not shown).

With this arrangement, the counter-clockwise angular displacement of the member 370 about the axis 376 and therefore the forward displacement $\sigma_{380}$ of the axis 380 are proportional to the pay load and trimming adjustment term $B_f$, in (71), minus a quantity proportional to the increase in the length $\sigma_h$ of the reciprocal function unit 209 as given by (74), thus:

$$C_6\sigma_{380} \equiv B_f r_f + C_7 C_f \left[\frac{w_{fn}}{Kq}\right] \quad (8)$$

With the components designed to make $C_7 C_f = r_f$, (8) becomes:

$$\frac{C_6\sigma_{380}}{r_f} = \frac{w_{fh}}{Kq} + B_f \quad (9)$$

The relations between the forward displacements $\sigma_{340}$, $\sigma_{250}$ and $\sigma_{380}$ of the connecting rods 340 and 250 and the axis 380 are determined by their relative elevations to be:

$$C_8\sigma_{340} + C_9\sigma_{250} = \sigma_{380} \quad (10)$$

It follows from (9) and (10) that:

$$C_9\sigma_{250} = -C_8\sigma_{340} + \frac{r_f}{C_6}\left[\frac{w_{fh}}{Kq} + B_f\right] \quad (11)$$

The crank 104, attached to the shaft 75 and pivoted to the connecting rod 325 at the pin 400, introduces the sensor displacement signal into the forward computer section. The combination of the crank 104 and the connecting rod 325, with the angle between chosen equal to the corresponding angle between the sensor radius and a perpendicular to the flying bottom plane, is a sine function unit so that the connecting rod 325 transmits a forward displacement signal $\sigma_{325}$ to the pin 326 that is proportional to $\delta_1$ thus:

$$C_{10}\sigma_{325} = \delta_1 \quad (12)$$

The connecting rod 250 extends from the pin 251 to the crank 404 to which it is pivoted at the pin 252. Included in the connecting rod 250 is the overload release shown in FIG. 12 and described in Section E of this descriptive appendix. The crank 404 is rigidly attached to the tubular shaft 407 at the jaw coupling 408. 407 extends to the right through a tubular extension 409 of the case 76 and into another case 410 which is attached to the extension 409 and sealed to the inner diameter of the outer end of the tubular shaft 22, with a rotary ring seal (not shown) coaxial with the tubular shaft 22. Within the case 410, the shaft 407 is rigidly attached to the crank 411. The crank 411 is pivoted on the case 410 and the crank 404 is pivoted on the case 76, both about the axis 412. The tubular extension 413 is rigidly mounted to the crank 411 and carries the pin 414, as shown in FIG. 13, at its left end on which is pivoted the vertical connecting rod 415 which connects to the forward hydrofoil servo below.

The downward displacement $\sigma_f$ of the connecting rod 415 is proportional to the forward displacement $\sigma_{250}$ thus:

$$C_{11}\sigma_{250} = \sigma_f \quad (13)$$

Combining (7), (11), (12) and (13) gives:

$$\frac{C_6 C_9}{r_f C_{11}}\sigma_f = \frac{w_{fh}}{Kq} + B_f - \frac{1 C_8 C_2 C_3 C_6}{r_f C_4 C_1}\frac{A_f}{1}\left[\frac{C_1 C_5}{C_3 C_{10}}\sigma_1 + A_e + K_f\theta_b^2\right] \quad (14)$$

Choosing the mechanism dimensions to satisfy the conditions:

$$\frac{1 C_8 C_2 C_3 C_6}{r_f C_4 C_1} = I \quad (15)$$

and $$\frac{C_1 C_5}{C_3 C_{10}} = I \quad (16)$$

$$\frac{C_6 C_9}{r_f C_{11}}\sigma_f = \frac{w_{fh}}{Kq} + B_f - \frac{A_f}{1}[\delta_1 + A_e + K_f\theta_b^2] \quad (17)$$

The downward displacement $\delta_f$ of the connecting rod 415 is the output signal of the forward computer section and the command signal to the forward servo, shown generally at 286, which must produce the $\alpha_f$ that satisfies (71). Since this equation must be satisfied for all conditions, any condition may be used to determine the constant of proportionality relating $\sigma_f$ to $\alpha_f$. Take the condition $\alpha_f = 0$. The right hand member of (17) is identical to the right hand member of (71). Equating the left hand members and using the condition $\alpha_f = 0$ gives:

$$\frac{C_6 C_9}{r_f C_{11}}\sigma_f\alpha_f \quad (18)$$

The mechanism dimensions are selected such that the ratio $$\frac{C_6 C_9}{r_f C_{11}}$$

is suitable for the servo.

(H) Caging

Figure 5B:
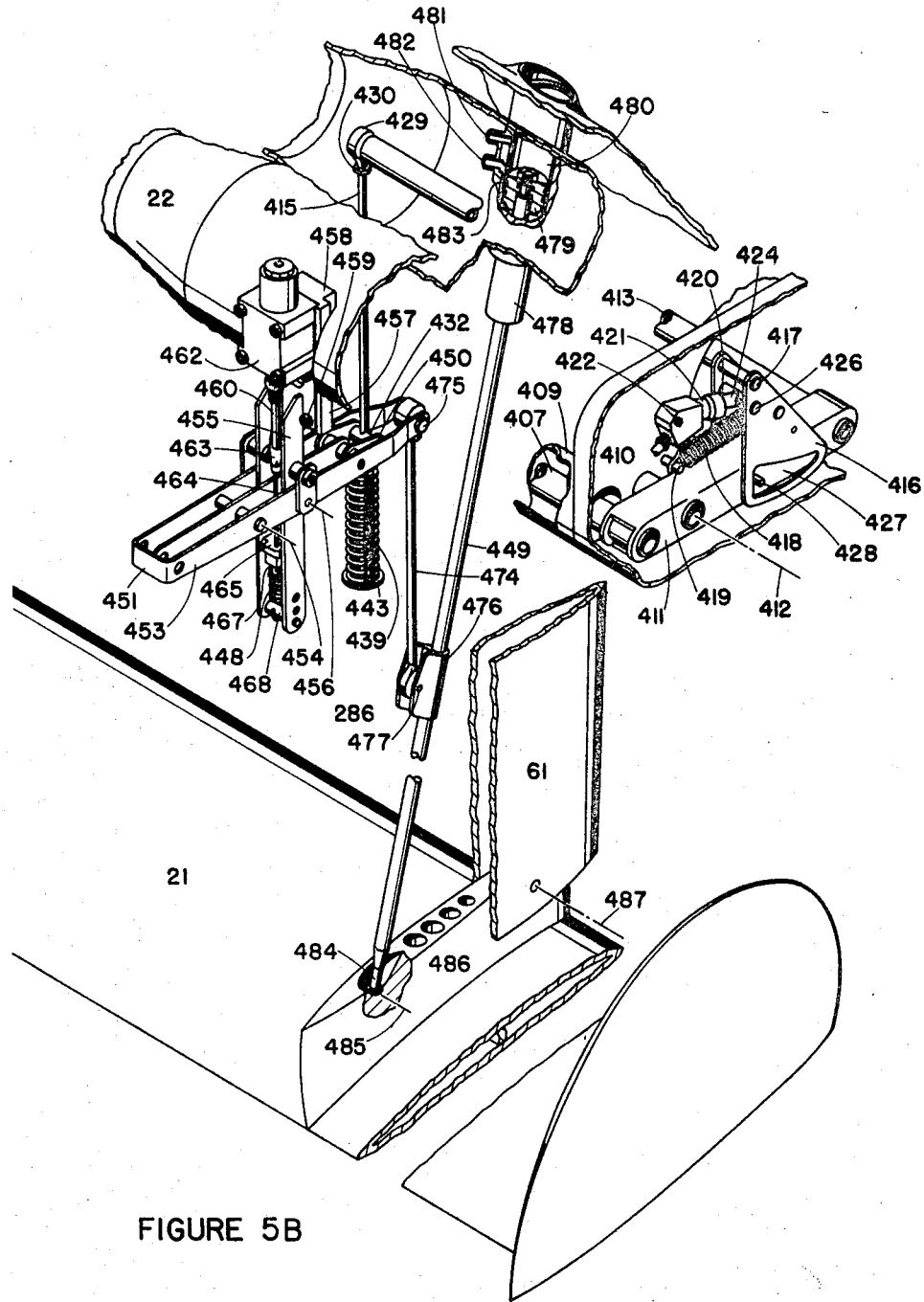
FIG. 5B is an isometric cutaway partially fragmentary view of the forward caging and servomechanism of High Tail.

Caging to force the output signal of the forward computer section to a predetermined displacement, suitable for operation of the boat at speeds below uncage speed, is accomplished by the caging unit located within the case 410 shown in FIG. 5B. The cam rocker 416 is pivoted on the case 410 about the axis 417. The tension spring 418 extends from the pin 419, projecting from the wall of the case 410, to the pin 420 attached to the cam rocker 416. The tension spring 418 tends to rotate the cam rocker 416 clockwise. The single acting hydraulic cylinder 421 is pivoted on the case 410 at the pin 422. The ram 424 of the cylinder 421 is hinged on the cam rocker 416 about the axis 426.

Hydraulic pressure to the cylinder 421 is controlled by the sequence function unit. With the boat at rest or under way at speeds below the uncaged speed during acceleration or below the caged speed during deceleration, the cylinder 421 is drained so that the cam rocker 416 rotates clockwise under the pull of the spring 418. With this rotation, the sides of the cam opening 427 of the cam rocker 416 cage the crank 411 by forcing the roller 428 pivoted to the crank 411 into the forward narrow end of the opening 427.

The caged position of the crank 411 is chosen to produce the most favorable trim of the boat at forward speeds below the caged speed during acceleration. Caging of the crank 411 is possible despite input signals to the forward computer section corresponding to $\sigma_f$ other than the caged position because of the overload releases in the forward computer section which tolerate the displacement incompatibilities involved.

When the boat accelerates to uncaged speed, the sequence function unit admits pump pressure to the cylinder 421 rotating the cam rocker 416 counter-clockwise under the dominant torque of the cylinder 421, and the roller 428 is released from the sides of the cam opening 427, uncaging the crank 411 and allowing the signal $\sigma_f$ to go through to the forward hydrofoil servo.

Separate caging of the computer output signals $\sigma_{ar}$ and $\sigma_{al}$ is accomplished in the same way for the right aft and left aft hydrofoils.

(I) Servos for hydrofoil control

Each of the three hydrofoils is rotated for control purposes by a hydraulic servo. The design of all three servos is the same except some of the dimensions are larger for the forward servo. Only the forward servo shown generally at 286 in FIG. 5 will be described in detail.

Referring to FIGS. 5A, 48 and 13, the rod end 429 is screwed onto the upper end of the rod 415 and locked in place with the lock unit 430. The rod end 429 is pivoted on the arm 413 at the pin 414. The rod 415 extends downward through the trunnion guide 432 and the spring support 433 with freely slidable fits in both. The spring support 433 has upper and lower tubular extensions 434 and 435 respectively. The rod 415 has a shoulder 436 below which the rod diameter is reduced. The lower tubular extension 435 also has a shoulder 438 below which its inside diameter is reduced. The compression spring 439 extends between an upper seat 440 on the spring support 433 to a lower seat 442 on the support washer 443. The latter surrounds the lower end 444 of the rod 415 and is held in place by the pin 445 inserted in the hole 446 in the lower end of the rod 415.

During ordinary operating conditions where there is no need for relative motion between the rod 415 and the trunnion guide 432, the compression load in the spring 439 holds the shoulder 438 of the spring support 433 against the shoulder 436 of the rod 415, and the tension in the spring 448 holds the lower side of the trunnion guide 432 against the upper end of the upper tubular extension 434. On the other hand, if the absence of pump pressure or some other condition prevents movement of the rod 449, and thereby limits movement of the trunnion guide 432, the rod 415 can move through the trunnion guide 432 without damaging the mechanism. When this movement is downward the assembly below the trunnion guide 432 moves downward with the rod 415 as the latter slides unrestrained through the trunnion guide 432. When this movement is upward the spring support 433 is prevented from moving upward by the contact between the bottom of the trunnion guide 432 and the upper tubular extension 434 so that reduction in the length of the compression spring 439 is necessary. The compression load reached in the spring 439 by this reduction in length is not large enough to damage the mechanism and yet the initial load in the spring is adequate to prevent the ordinary control forces from moving the rod 415 through the trunnion guide 432.

The trunnion guide 432 is journalled in the two-layer beam 450 which is hingedly connected to beam 451 by pin 450'.

The beam 451 is pivoted on the two-layer beam 453 about the axis 454. The two-layer beam 453 is journalled on the four-layer bracket 455 about the axis 456. The four-layer bracket 455 includes the flange 457, which is fastened to the valve plate 458 by means of four screws, one of which is 459.

The valve stem 460 which controls the valve 462 is rigidly attached to the cross bar 463. Two rods 464 and 464', symmetrically disposed with respect to the valve stem 460, rigidly join the crossbar 463 to the cross member 465. The latter has two strips 465' extending upwardly, one on each side of the beam 451, to which the beam 451 is pivoted about the axis 466 coincident with or slightly above or below and parallel to the axis 456.

The upper end of the tension spring 448 is hooked into the downward extending eye 467 which is part of the cross member 465. The lower end of the tension spring 448 is hooked around the pin 468 which extends through holes in the lower end of two layers of the four-layer bracket 455. When the control is operating, tension in the spring 448 puts a downward load on the beam 451 which, through the trunnion guide 432 and the ball bearings 452, puts a tension in the rod 415 and corresponding loads throughout the entire mechanism. These loads eliminate lost motion. One such load holds the multiplier beam 329 against its roller fulcrum as explained in Section G of this descriptive appendix.

When the control is not operating and the motion of the push rod 449 is blocked, only a small downward displacement of the trunnion guide 432 is possible before the valve stem 460 reaches a stop (not shown) which sustains the tension in the spring 448 and thereby removes the corresponding loads throughout the mechanism.

The two-layer beam 453 is pivoted on the connecting rod 474 at the pin 475. The connecting rod 474 is also pivoted on the U-clamp 476 at the pin 477. The U-clamp 476 is rigidly clamped to the push rod 449, which extends upward through the seal 478 and through the piston 479 to which it is rigidly attached and sealed. The piston 479 is sealed within the bore of the closed top cylinder 480.

The hydraulic valve 462 is mounted and sealed to the valve plate 458. The hydraulic tubes (not shown), within the hollow shaft 22, conducting oil to and from the valve 462 are joined and sealed to the valve plate 458. Hydraulic fluid controlled by the valve 462 is conducted to and drained from the hydraulic cylinder 480 through the tube connection 481. The space within the cylinder 480 below the piston is connected to the tube 482 by the annular passage 483.

The push rod 449 is fitted with a rod end 484 which is spherically journalled about the axis 485 on the hinge block 486 of the hydrofoil 21. The hinge block 486 is spherically journalled on the strut 61 about the axis 487.

With the arrangement described, for any downward displacement of the push rod 449 and therefore any angular position of the hydrofoil 21, there is a downward displacement $\sigma_f$ of the axis of the ball bearing 452 which places the axis 466 in coincidence with the axis 456. This $\sigma_f$ will be referred to as the coincident $\sigma_f$. For the coincident $\sigma_f$, the stem 460 of the valve 462 is in its center position blocking the oil flow through the tube 481 to or from the top of the cylinder 480. On the other hand, if the downward displacement $\sigma_f$ is greater than the coincident $\sigma_f$ the valve stem 460 is displaced downward conducting hydraulic fluid to the cylinder 480 through the tube 481. If $\sigma_f$ is less than the coincident $\sigma_f$, the valve stem 460 is raised and the valve 462 drains the cylinder 480 through the tube 481. The amount of valve opening being in either case determined by the difference between the actual $\sigma_f$ and the coincident $\sigma_f$.

(J) Bow computer section

Referring to FIGS. 3 and 4A, the bow computer section is part of the control for the aft hydrofoils. The bow computer section receives aft sensor signals, as described in Section B of this descriptive appendix, steering signals, signals from the sequence function unit, and manual sea condition, pay load and trimming adjustments.

All important axes of the bow computer section are beamwise. Lost motion in most of the bow computer mechanism is prevented by loads introduced by the aft hydrofoil servos in the same manner as explained in the previous Section I.

The steering function unit for the bow computer section will now be described. Referring to FIG. 4A, the tubular splined shaft 40 is rotated for steering. Two steering signals are obtained from this rotation. The first is the forward displacement $\sigma_{488}$ of the pin 488 given by:

$$C_{14}\sigma_{488} = -\theta \tag{19}$$

and the second is the forward displacement $\sigma_{489}$ of the pin 489 when the ram 491 is not in contact with the stop 492, given by:

$$C_{15}\sigma_{489} = \theta^2 \tag{20}$$

The connecting rod 493 is pivoted on the two-layer crank 494 attached to the shaft 40 at the pin 488 and transmits $\sigma_{488}$ from the pin 488 to the pin 495 which pivots the connecting rod 493 on the two-layer crank 496 of the multi-crank member 497. The latter is hinged on the brackets 498 and 499 of the frame 126 about the hinge axis 502. The frame 126 is rigidly fastened to the hull framing and to the deck 38. The contact points 504 and 505 attached to the crank 496 and the mating contact points 506 and 507 forming part of the frame 126 impose limits on the angular rotation of the crank 496 and therefore on the multi-crank member 497 at the steering angles $\theta_n$ and $-\theta_n$. Thus the forward displacement $\sigma_{495}$ is given by:

$$C_{14}\sigma_{495} = -\theta_c \tag{21}$$

Forward travel of the pin 488 is excess of that corresponding to the stop limits is permitted by the overload release 508 forming part of the connecting rod 493, working in conjunction with the tension spring 509 extending between the crank 496 and an eyebolt (not shown) attached to the frame 126.

The two-layer arm 510 is also part of the multi-crank member 497. The two-layer lever 511 is pivoted on the two-layer arm 510 at the pin 512. The horizontal connecting rods 513 and 514 are pivoted on the two-layer lever 511 at the pins 515 and 516 respectively, equidistant from the pin 512. The forward displacement $\sigma_{512}$ of the pin 512 is proportional to the rearward displacement of the pin 495. Hence, from (21) the forward displacement $\sigma_{514}$ of the connecting rod 514 is given by:

$$\sigma_{514} = -\sigma_{513} + C_{15}\theta_c \qquad (22)$$

The multi-crank member 517 is pivoted on the brackets 518 and 519, which are part of the frame 126, about the axis 520. The arm 521 of the multi-crank member 517 carries the hydraulic cylinder 522. The two-layer crank 523, of the multi-crank member 517, carries the pin 524 around which the aft end of the tension spring 525 is pivoted. The forward end of the spring 525 is hooked into the eyebolt 526 attached to the frame 126.

The combination of the two-layer crank 527, the connecting rod 528, the stop 492, the hydraulic cylinder 522, the ram 491 of the latter, the spring 525, and the arm 521 of the multi-crank member 517 for producing a $\theta_b^2$ signal is the same scheme as the combination of the crank 296, the connecting rod 297, the stop 315, the hydraulic cylinder 404, the ram 303 of the latter, the spring 312 and the arm 305 of the multi-crank member 306 described in Section G of this descriptive appendix for the forward computer section. The forward displacement $\sigma_{522}$ of the hydraulic cylinder 522 is therefore given by:

$$C_{16}\sigma_{522} \equiv +2A_e + 2K_a\theta_b^2 \qquad (23)$$

The signs of the right hand member of (23) are opposite to those in the right hand member of (3) because the arrangement of the mechanism is opposite to that in the forward computer section.

The two-layer lever 530 is pivoted on the two-layer crank 532, which is part of the multi-crank member 517, at the pin 533. The horizontal connecting rods 534 and 535 are pivoted on the two-layer lever 530, at the pins 536 and 537, equidistant from the pin 533. The forward displacement of $\sigma_{533}$ of the pin 533 is proportional to $\sigma_{522}$ expressed in (23). Hence, the forward displacement $\sigma_{535}$ of the connecting rod 535 is given by:

$$\sigma_{535} = -\sigma_{534} + C_{17}[+2A_e + 2K_a\theta_b^2 \qquad (24)$$

The signal from each aft sensor 65 and 66 is introduced twice in the bow computer section by means of two crank-connecting rod combinations. Each of such combinations is a sine function unit as explained in Section I of the submerged hydrofoil control theory and application herein.

The signal from right aft sensor 65 is introduced into the bow computer section by the crank 123 and the connecting 539, pivoted to the crank 123 at the pin 540, and by the crank 124 and the connecting rod 513 pivoted to the crank 124 at the pin 542. The connecting rods 539 and 513 include overload releases. The rearward displacement of connecting rods 539 and 513 are proportional to $\delta_{2r}$ thus:

$$-\sigma_{539} = C_{18}\delta_{2r} \qquad (25)$$

$$-\sigma_{513} = C_{19}\delta_{2r} \qquad (26)$$

Similarly the signal from the left aft sensor 66 is introduced into the bow computer section by the crank 132 in combination with the connecting rod 534 and the crank 133 in combination with the connecting rod 546. The rearward displacements of the connecting rods 534 and 546 are given by:

$$-\sigma_{534} = C_{18}\delta_{21} \qquad (27)$$

$$-\sigma_{546} = C_{19}\delta_{21} \qquad (28)$$

Next, the paths of the variables will be traced through the bow computer section. The connecting rod 539 is pivoted at the pin 547 on the extension 548 of the arm 549 which is part of the multi-arm member 550. The arms 549 and 552 of the multi-arm member 50 form a hinge with the frame 126 about the axis 553. The arms 554 and 555, of the multi-arm member 550, form a hinge with the two-layer arms 556 and 557 of the multi-arm member 558 about the hinge axis determined by the pins 559 and 560. The geometry of the multi-arm member 550 and the connecting rod 539 is such that the forward displacement $\sigma_{559}$ of the hinge axis determined by the pins 559 and 560 is equal to the aft displacement $-\sigma_{539}$ of the connecting rod 539 as given by (25). Thus:

$$\sigma_{559} = C_{18}\delta_{2r} \qquad (29)$$

The multi-arm member 558 has the two-layer arm 561 to which is pivoted the connecting rod 535 at its aft end 562. The right hand layer of the two-layer arm 561 and the single-layer arm 563 of the multi-arm member 558 form a hinge with the multiplier shaft 564 about the hinge axis 565. The axis determined by the pins 559 and 560 and the aft end 562 of the connecting rod 535 are equidistant from the axis 565 so that the forward displacement $\sigma_{565}$ of the axis 565 is given by:

$$2\sigma_{565} = \sigma_{595} + \sigma_{535} \qquad (30)$$

From (24), (27), (29) and (30):

$$2\frac{\sigma_{565}}{C_{17}} = \frac{C_{18}}{C_{17}}\delta_{2r} + \frac{C_{18}}{C_{17}}\delta_{21} + 2A_e + 2K_a\theta_b^2 \qquad (31)$$

With the dimensions chosen such that:

$$\frac{C_{18}}{C_{17}} = 1 \qquad (32)$$

(31) becomes:

$$\sigma_{565} = \frac{C_{17}}{2}(\delta_{2r} + \delta_{21} + 2A_e + 2K_a\theta_b^2) \qquad (33)$$

The multiplier beam 566, rigidly attached to the multiplier-shaft 564, the carriage 567 carrying the fulcrum for the beam 566, and the hydraulic repeater for adjusting the elevation of the carriage 567 with the handle 568 at the control station shown in FIG. 16, are similar to the multiplier beam 329, rigidly attached to the multiplier-shaft 327, the carriage 330 carrying the fulcrum for the beam 329 and the hydraulic repeater for adjusting the elevation of the carriage 330 with the handle 343 at the control station shown in FIGS. 5A and 16 described in Section G of this descriptive appendix.

The connecting rods 569 and 570 are pivoted about the axis 571 on the two-layer extensions 572 and 573 of the crossbar 574 rigidly attached to the multiplier beam 566. From (33), the equal forward displacement $\sigma_{569}$ and $\sigma_{570}$ of the connecting rods 569 and 570 are given by:

$$\sigma_{569} = \sigma_{570} \equiv -\frac{C_{17}C_{20}}{2}A_a(\delta_{2r} + \delta_{21} + 2K_a\theta_b^2) \qquad (34)$$

in which $A_a$ is a coefficient in (72) and (73) and $-C_{20}A_a$ is the multiplication ratio of the multiplier beam 566 determined by the elevation of the carriage 567 which is adjusted for sea condition with the handle 568 at the control station, shown in FIG. 16.

The connecting rods 514 and 546 are pivoted at the pins 577 and 578 on the cranks 579 and 580 respectively of the double crank member 582. The latter is hinged on the arms 583 and 584 of the multi-arm member 585 about the axis 586. The pins 577 and 578 are equidistant from the axis 586 so that the forward displacement $\sigma_{586}$ of the axis 586 is given by:

$$2\sigma_{586} = \sigma_{514} + \sigma_{546} \qquad (35)$$

The arms 583 and 584 also form a hinge for the multi-arm member 585 on the frame 126 with a hinge axis 587. Combining (22), (26), (28) and (35) gives:

$$\frac{2}{C_{19}}\sigma_{586} = \delta_{2r} - \delta_{21} + \frac{C_{15}}{C_{19}}\theta_c \quad (36)$$

With the mechanism dimensions chosen such that:

$$\frac{C_{15}}{C_{19}} = 2K_\theta \quad (37)$$

and (36) becomes:

$$\sigma_{586} = \frac{C_{19}}{2}(\delta_{2r} - \delta_{21} + 2K_\theta\theta_c) \quad (38)$$

The connecting rod 588 is pivoted at the pin 589 on the two-layer arm 590 which is part of the multi-arm member 585. The connecting rod 591 is pivoted on the arm 584 about the axis 586. Each of the connecting rods 588 and 591 has an overload release. The pin 589 and the axis 586 are equidistant from the axis 587 so that the forward displacements of the connecting rods 588 and 591 are given by:

$$\sigma_{591} = \sigma_{586} = -\sigma_{588} \quad (39)$$

The connecting rods 588 and 569 are pivoted, at the pins 592 and 593 respectively, on the two-layer level 594. The connecting rod 588 has an overload release. The two-layer lever 594 is pivoted at the pin 595, on the two-layer extension 586, of the two-layer arm 597 of the multi-arm member 598. The pins 592 and 593 are equidistant from the pin 595 so that the forward displacement $\sigma_{595}$ of the pin 595 is given by:

$$2\sigma_{597} = \sigma_{588} + \sigma_{569} \quad (40)$$

The two-layer arms 597 and 599, of the multi-arm member 598, with the arms 600 and 601 of the multi-arm member 602 with the pins 603 and 604 form a hinge with the hinge axis 605.

The arms 606 and 607 of the mutli-arm member 602 with the two-layer extensions 608 and 609 of the frame 126 form a hinge with the hinge axis 610. The arm 611 of the multi-arm member 602 has the hole 612 into which is hooked the upper end of the tension spring 613 which is hooked at its lower end into the hook 614 screwed into the deck 38 below. The arm 611 is threaded to receive the left hand screw 615. The tension in the spring 613 forces the lower end of the left hand screw 615 to bear against the plate 616 mounted on the cross member 617 of the frame 126. The detent 618 together with the star wheel 619, which is part of the left hand screw 615, prevent unintentional rotation of the left hand screw 615. The guided connecting tube 620 is pivoted at the pin 623 to the two-layer arm 624 of the multi-arm member 602.

Rotation clockwise of the left hand screw 615 with the knob 625 at the control station, as shown in FIG. 16, rotates the multi-arm member 602 counter-clockwise about the axis 610 producing a forward displacement $\sigma_{605}$ of the hinge axis 605. This displacement is proportional to the negative of the pay load and trimming adjustment term $B_{ar}$, in (72), for the right aft hydrofoil thus:

$$\sigma_{605} \equiv -C_{21}r_a B_{ar} \quad (41)$$

The forward displacement $\sigma_{620}$ of the guided connecting tube $\sigma_{620}$ of the guided connecting tube 620 is given by:

$$\sigma_{620} = -C_{22}\sigma_{605} + C_{23}\sigma_{595} \quad (42)$$

with the constants $C_{22}$ and $C_{23}$ being determined by the dimensions of the multi-arm member 598.

Combining (34), (38), (39), (40), (41), and (42) gives: tube $\sigma_{620}$ of the guided connecting tube 620 is given by:

$$\frac{-\sigma_{620}}{C_{22}C_{21}r_a} = B_{ar} - \frac{C_{23}C_{17}C_{20}A_a}{4r_a C_{22}C_{21}}(\delta_{2r} + \delta_{21} 2A_e + 2K_a\theta_b^2) +$$

$$\frac{C_{23}C_{19}}{4C_{22}C_{21}r_a}(\delta_{2r} - \delta_{21} + 2K_\theta\theta_c) \quad (43)$$

Choosing the mechanism dimensions such that:

$$\frac{C_{23}C_{17}C_{20}}{2C_{22}C_{21}r_a} = \frac{1}{l} \quad (44)$$

and $$\frac{C_{23}C_{19}}{2C_{22}C_{21}r_a} = \frac{A_r}{b_w} \quad (45)$$

(43) becomes:

$$\frac{-\sigma_{620}}{C_{22}C_{21}r_a} = B_{ar} - \frac{A_a}{2l}(\delta_{2r} + \delta_{21} + 2A_e + 2K_a\theta_b^2) -$$

$$\frac{A_r}{2b_w}(\delta_{2r} - \delta_{21} + K_\theta\theta_c) \quad (46)$$

The connecting rods 591 and 570 are pivoted at the pins 626 and 627 respectively on the two-layer lever 628. The connecting rod 591 has an overload release. The two-layer lever 628 is pivoted at the pin 629 on the two-layer extension 630 of the two-layer arm 632 of the multi-arm member 633. The pins 626 and 627 are equidistant from the pin 629 so that the forward displacement $\sigma_{629}$ of the pin 629 is given by:

$$2\sigma_{629} = \sigma_{591} + \sigma_{570} \quad (47)$$

The two-layer arms 634 and 635 of the multi-arm member 633 with the arms 636 and 637 of the multi-arm member 638 form a hinge with a hinge axis 639. The two-layer arm 640 is a downward extension of the two-layer arm 635. The guided connecting tube 642 is pivoted on the two-layer arm 640 at the pin 643. The arms 644 and 645 of the multi-arm member 638, with the two-layer extensions 608 and 609 of the frame 126, form a hinge with a hinge axis 610. The arm 646 of the multi-arm member 638 has a hole 647 into which is hooked the upper end of the tension spring 648 which is hooked at its lower end into the hook 649 screwed into the deck 38 below. The arm 646 is tapped to receive the right-hand screw 650. The tension in the spring 648 forces the lower end of the right-hand screw 650 to bear against the plate 616 already mentioned. The star wheel and detent arrangement with the screw 650 is similar to that already described for the screw 615.

Rotation clockwise of the right-hand screw 650, with the knob 652 at the control station, as shown in FIG. 16, roates the multi-crank member 638 clockwise about the axis 610 producing a forward displacement $\sigma_{639}$ of the hinge axis 639. This displacement is proportional to the negative of the pay load and trimming adjustment term $B_a$ in the specific coupling Equation (73) for the left aft hydrofoil thus:

$$\sigma_{639} \equiv -C_{21}r_a B_{al} \quad (48)$$

The forward displacement $\sigma_{642}$ of the guided connecting tube 642 is given by:

$$\sigma_{642} \equiv C_{22}\sigma_{639} - C_{23}\sigma_{629} \quad (49)$$

The constants $C_{22}$ and $C_{23}$ appearing in (42) are repeated in (49) because pertinent dimensions of the multi-arm member 633 are chosen similar to the corresponding dimensions of the multi-arm members 598.

Combining (34), (38), (39), (44), (45), and (47), gives:

$$\frac{-\sigma_{742}}{C_{22}C_{21}r_a} = B_{al} - \frac{A_a}{2l}(\delta_{2r} + \delta_{21} + 2K_a\theta_b{}^2)$$

$$+ \frac{A_r}{2b_w}(\delta_{2r} - \delta_{21} + 2K_\theta\theta_c) \quad (50)$$

The guided connecting tubes 620 and 642 transmit the forward displacements $\sigma_{620}$ and $\sigma_{642}$ respectively to the stern computer section. The guided connecting tube 653 attached with the clamp 654 to the frame 126 transmits the position of the frame 126 to the stern computer section and compensates for strain and temperature changes as will be explained below. The three guided connecting tubes 620, 642 and 653 pass through the tunnel 655 attached to the deck 38. Within the tunnel 655 the tubes 620, 642 and 653 are supported by guide bearings, such as 656, 657 and 658 which are carried by the mounting bracket 659, as shown in FIG. 7.

(K) Stern computer section

Figure 7:
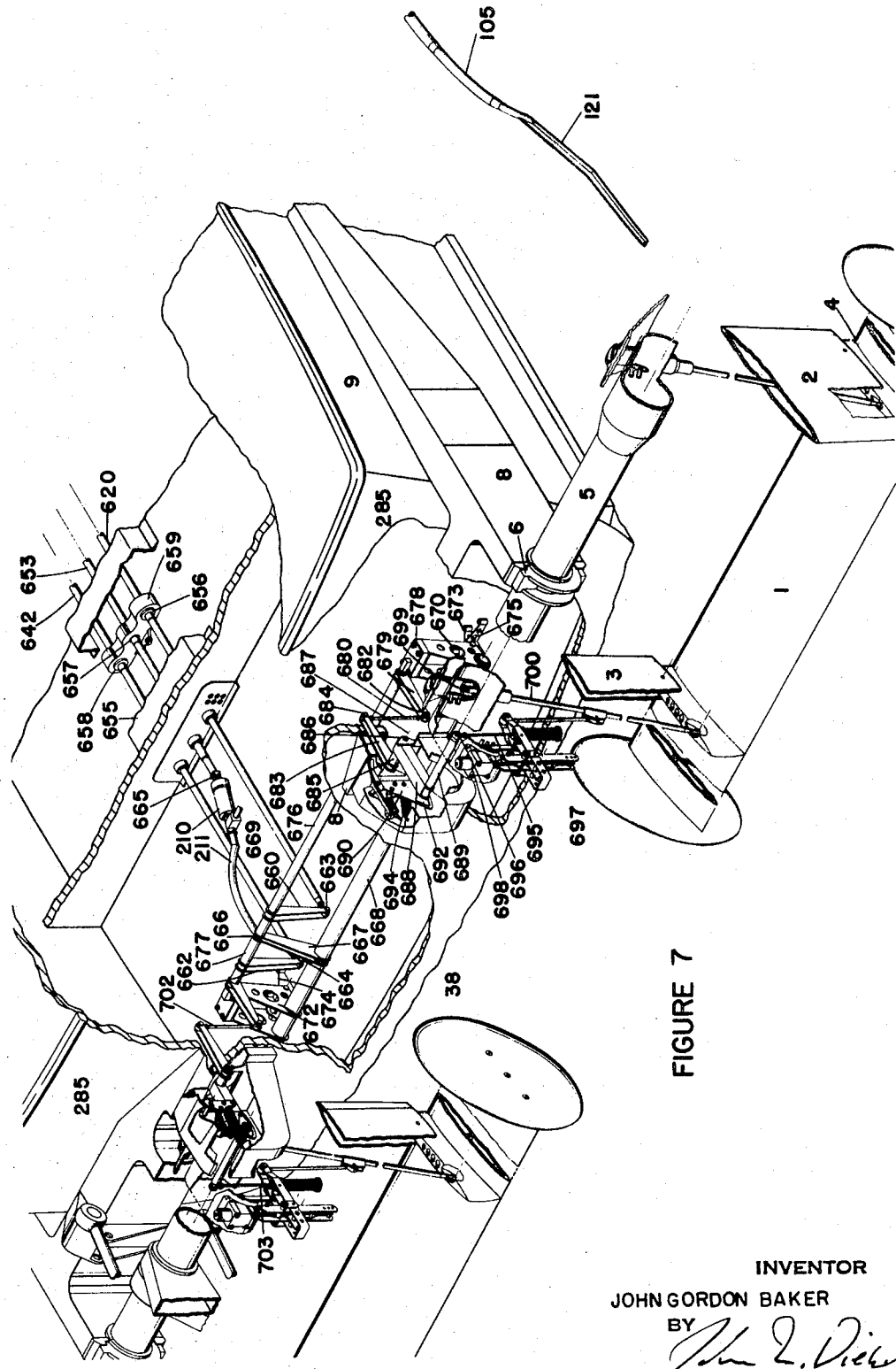

Referring to FIG. 7, the aft ends of the guided connecting tubes 620 and 642 are pivoted on the cranks 660 and 662 at the pins 663 and 664. The aft end of the guided connecting tube 653 is pivoted on the reciprocal function unit 210 at the pin 665. The rearward extension of the plug and length adapter 211, of the reciprocal function unit 210, is pivoted at the pin 666 on the two-layer arm 667 which is part of the multi-arm member 668. The combination of the guided connecting tube 653, the reciprocal function unit 210 and the plug and length adapter 211 will be referred to herein as the connecting combination 669. The two-layer arms 670 and 672 of the multi-arm member 668 form a hinge with the brackets 673 and 674 with a hinge axis 675. The brackets 673 and 674 are rigidly fastened to the deck 38 below.

The arms 670, 672 and 667 of the multi-arm member 668 form hinges with the double crank members 676 and 667 with the common hinge axis 678.

On the right side, the rearward extending crank 679 of the double crank member 676 is pivoted on the lower end of the vertical connecting rod 680 at the pin 682. The connecting rod 680 is pivoted at its upper end on the two-layer crank 683 at the pin 684. The crank 683 is part of the double crank member 685 which is hinged on the bracket 686 about the horizontal hinge axis 687. The bracket 686 is rigidly attached to the bracket 8 which is fastened to the transom of the boat 285. The double crank member 685 extends through both the bracket 8 and the transom of the boat 285.

The tubular crank arm 688 and the extension 689 therefrom are parts of the double crank member 685. The cam rocker 690, the cam opening 692, the cam roller 693 (not shown) and the spring 694 are similar in design and operation to the cam rocker 416, the cam opening 427, the cam roller 428 and the spring 418 described in Section H of this Descriptive Appendix.

The vertical connecting rod 695 is pivoted on the extension 689 at the pin 696. The connecting rod 695 is similar to the connecting rod 415 described for the forward servo in Section I of this Descriptive Appendix. The servo mechanism shown generally at 697, the valve 698, the servo cylinder 699 and the push rod 700 are all similar in design to corresponding components described for the forward servo.

On the left side, the design and operation of the signal transmission, caging and servo are the same as described for the right side except that the double crank member 677 is shorter than the double crank member 676.

Because the connecting rods 680, 702, 695 and 703 are vertical, horizontal deflections of the transom 285, equal changes in length of the connecting combination 669 and the guided connecting tubes 620 and 642, and changes in length of the deck 38 have no significant effect on the signal displacements $\sigma_{ar}$ and $\sigma_{al}$. On this account, errors due to temperature changes of the guided connecting tubes 620 and 642 and the hull are practically eliminated by placing the connecting combination 669 in the same enclosure as the guided connecting tubes 620 and 642 to equalize temperatures and by constructing the connecting combination 669 of the same material as the guided connecting tubes 620 and 642.

The downward displacements $\sigma_{ar}$ and $\sigma_{al}$ of the connecting rods 695 and 703 respectively are proportional to the amount by which the aft displacements $-\sigma_{620}$ and $-\sigma_{642}$ exceed the increase in length $\sigma_h$ of the reciprocal function unit 210, thus:

$$C_{24}\sigma_{ar} = -\sigma_{620} - \sigma_h \quad (51)$$

$$C_{24}\sigma_{al} = -\sigma_{642} - \sigma_h \quad (52)$$

From (75), (43) and (50), Equations (51) and (52) become respectively:

$$C_{24}\sigma_{ar} = C_a\left[\frac{w_{ah}}{Kq}\right] + C_{22}C_{21}r_a\left[B_{ar} - \frac{A_a}{2l}(\delta_{2r} + \delta_{21}\right.$$
$$\left. - 2A_e + 2K_a\theta_b{}^2) - \frac{A_r}{2l}(\delta_{ar} - \delta_{21} + 2K_\theta\theta_c)\right] \quad (53)$$

$$C_{24}\sigma_{al} = C_a\left[\frac{w_{ah}}{Kq}\right] + C_{22}C_{21}r_a\left[B_{al} - \frac{A_a}{2l}(\delta_{2r} + \delta_{21}\right.$$
$$\left. - 2A_e + 2K_a\theta_b{}^2) + \frac{A_r}{2b_w}(\delta_{2r} - \delta_{21} + 2K_\theta\theta_c)\right] \quad (54)$$

Choosing the mechanism dimensions such that:

$$\frac{C_{22}C_{21}r_a}{C_a} = 1 \quad (55)$$

(54) and (55) become:

$$\frac{C_{24}\sigma_{ar}}{C_a} = \frac{w_{ah}}{Kq} + B_{ar} - \frac{A_a}{2l}(\delta_{2r} + \delta_{21} - 2A_e + 2K_a\theta_b{}^2)$$
$$- \frac{A_r}{2l}(\delta_{2r} - \delta_{21} + 2K_\theta\theta_c) \quad (56)$$

$$\frac{C_{24}\sigma_{al}}{C_a} = \frac{w_{ah}}{Kq} + B_{al} - \frac{A_a}{2l}(\delta_{2r} - \delta_{21} - 2A_e + 2K_a\theta_b{}^2)$$
$$+ \frac{A_r}{2l}(\delta_{2r} - \delta_{21} + 2K_\theta\theta_c) \quad (57)$$

The downward displacements $\sigma_{ar}$ and $\sigma_{al}$ of the connecting rods 695 and 703 are the output signals of the stern computer section and the command signals to the aft servos which must produce $\alpha_{ar}$ and the $\alpha_{al}$ that satisfy the specific coupling Equations (72) and (73). Since these equations must be satisfied for all conditions, any condition may be used to determine the constant of proportionality relating $\sigma_{ar}$ to $\alpha_{ar}$ and $\sigma_{al}$ to $\alpha_{al}$. Take the conditions $$\dot{\alpha}_{ar} = \dot{\alpha}_{al} = 0$$

The right-hand members of (56) and (57) are identical to the right-hand members of the specific coupling Equation (72) and using the condition $$\dot{\alpha}_{ar} = \dot{\alpha}_{al} = 0$$

gives:

$$\frac{C_{24}}{C_a}\sigma_{af}=\alpha_{ar} \quad (58)$$

$$\frac{C_{24}}{C_a}\sigma_{al}=\alpha_{al} \quad (59)$$

The mechanism dimensions must be selected such that the ratio $C_{24}/C_a$ is suitable for the servos.

(L) Propulsion and propeller retraction

The propulsion system is shown in FIG. 14. Propulsion is by a standard marine propeller 710 driven by the propeller shaft 711 (not visible) supported within the streamlined housing 712 on rubber water-lubricated bearings 713 (not visible) spaced at intervals along the propeller shaft 711 and fastened within the streamlined housing 712. The forward end of the propeller shaft 711 and the aft end of the stub shaft 714 are connected with a standard universal joint 715 (not visible) within the hollow spherical joint 716. The stub shaft 714 extends through and is coaxial with a quill output shaft 717 (not visible) and the flange coupling 718 of the V-drive 719. The forward ends of the stub shaft 714 and the quill output shaft 717 are coupled with flange coupling 718. The streamlined housing 712 is flange coupled at its forward end to the aft extension 720 of the inner spherical part 721 of the spherical joint 716. The forward extension 722 of the outer spherical part 723 of the spherical joint 716 is flange mounted to the V-drive 719. The centers of the spherical joint 716 and the universal joint 715 substantially coincide.

The streamlined strut 724 is welded to the streamlined housing 712 and extends upward within the upright accurately bored tube 725 where it is flange coupled to the center support 726. The accurately bored tube 725 is sealed watertight and clamped to the bottom of the hull and securely bolted to the hull framing. The center support 726 is sandwiched between and guided by the castings 728 and 729 (the latter not shown). The castings 728 and 729 with flanges machined to fit closely within the bore of the tube 725 support the center support 726 and the strut 724 laterally. Two rectangular blocks 730 and 731 (the latter not visible) one on the right side and one on the left of the center support 726, are pivoted to the center support 726 on the pin 732. These blocks fit into fore and aft rectangular grooves 733 and 734 (not visible) machined into the castings 728 and 729 and support the propeller assembly consisting of center support 726, strut 724, propeller 710, streamlined housing 712 and inner spherical part 721.

The hydraulic cylinder 735 has the ram 736 which is connected at its lower end to the casting 728. The propeller assembly is moved and positioned vertically by the hydraulic cylinder 735. The fore and aft location of the strut 724 is determined by the spherical joint 716. Fore and aft motion of the propeller assembly with respect to the castings 728 and 729 is permitted by sliding of the rectangular blocks 730 and 731 in the grooves 733 and 734. The propeller 710 is positioned by the hydraulic cylinder 735, either *down* as shown when operating on hydrofoils, or *up* as shown dotted, when operating in the displacement condition with the hydrofoils retracted.

When the propeller 710 is operating in the down position and either the propeller 710 or the streamlined housing 712 strikes an object with sufficient force, a relief valve 737 in the hydraulic system allows the propeller 710 and the streamlined housing 712 to move upward under heavy resistance to reduce the impact load.

The bellows 738 is clamped and sealed to the vertical surface 739 of the hull 9 and clamped around the aft extension 720 of the inner spherical part 721. The bellows 738 allows vertical motion of the propeller assembly and seals the hull against water entry.

Sea water is taken in through the openings 740 in the streamlined housing 712, conducted forward in the streamlined housing 712 and through the aft extension 720 into the tube connection 741. The flexible hose 742 clamped to the tube connection 741 conducts the water to the engine cooling system 743. Cooling water from the engine is discharged into the exhaust system 744 in a well-known manner. The rubber propeller shaft bearings 713 within the streamlined housing 712 are lubricated by the sea water passing through the housing 712.

(M) Hydraulic system

The hydraulilc system of High Tail reference is shown schematically in FIG. 15 and various portions, subsystems and elements of it have been referred to and fully described hereinabove so that it is believed that it has been fully described an that a separate and additional description of it is not necessary. However, to facilitate reference to FIG. 15 in connection with description of portions of the hydraulic system and to indicate the nature and identity of parts which are not described elsewhere because they are relatively conventional hydraulic components which facilitate operation of the hydraulic system, the elements of the system are identified as follows:

750 Hydrofoil retraction control valve—forward—manually actuated
753 Power steering pump
63 Check valve—steering impact
754 Accumulator—100 p.s.i. precharge—forward reciprocal function unit
755 Accumulator—300 p.s.i. precharge—forward reciprocal function unit
756 Relief valve—impact energy absorption
757 Forward impact energy absorption cylinder
758 Restrictor—one-way forward foil counter balance
759 Check valve—impact energy absorption
28 Power steering unit
356 Forward pay load and elevation trim master cylinder
344 Front multiplier master cylinder
760 Hydraulic fluid filter
762 Rotary ring seal unit—forward
763 Forward hydrofoil retraction cylinder
764 Forward hydrofoil retraction cylinder
765 Left forward hydrofoil servo cylinder
462 Forward hydrofoil servo valve—mechanically actuated
480 Right forward hydrofoil servo cylinder
766 Restrictor—to smooth servo pressure forward to reciprocal function unit
767 Pilot-operated check valve—proposed to restrain hydrofoil rotation during very low speed in waves and during backing
346 Front multiplier slave cylinder
357 Forward pay load and elevation trim slave cylinder
85 Forward sensor loading cylinder
91 Forward sensor unfolding cylinder
209 Forward reciprocal function unit
304 Forward climb cylinder
421 Forward caging cylinder
768 Rear sensor unfolding cylinder
769 Valve-sensor unfolding—hydraulically actuated
770 Restrictor—one-way—sensor unfolding
771 Sequence function unit—hydraulically actuated
140 Sequence function unit actuation cylinder
772 Restrictor—remove surge pressure to sequence function unit actuation cylinder
167 Cam actuated valve—spare
168 Cam actuated valve—climb
773 Restrictor—pump pressure to climb actuation
169 Cam actuated valve—uncaging
774 Restrictor—pump pressure to uncaging actuation 170 Cam actuated valve—sensor unfolding
775 Restrictor—pump pressure to sensor unfolding actuation
522 Rear climb cylinder
766 Valve—servo cylinder pressure to sensor loading cylinder—hydraulically actuated
777 Restrictor—to prevent servo cylinder surge pressure to sensor loading pressure
778 Rear multiplier master cylinder
779 Rear multiplier slave cylinder
108 Right rear sensor loading cylinder
780 Left rear sensor loading cylinder
781 Valve—shut-off—sensor loading pressure to drain
782 Accumulator—100 p.s.i. precharge—sensor loading pressure
783 Accumulator—300 p.s.i. precharge— sensor loading pressure
784 Engine fuel line
785 Hydrofoil retraction control valve—rear—manually actuated
786 Engine
18 Relief valve—rear hydrofoil retraction to drain
17 Check valve—rear hydrofoil impact retraction
787 Hydraulic fluid reservoir
788 Strainer
789 Pump—variable delivery
790 Hydraulic fluid filter
791 System relief valve
792 Pressure gauge—left rear servo cylinder
793 Pressure gauge—right rear servo cylinder
210 Rear reciprocal function unit
794 Restrictor—right rear hydrofoil retraction
795 Restrictor—to smooth servo pressure right rear to reciprocal function unit
796 Check valve—proposed to inhibit roll in case of accidental loss of hydraulic pressure
797 Hydraulic fluid filter
798 Rotary ring seal unit—right rear
799 Right rear caging cylinder
698 Right rear hydrofoil servo valve—mechanically actuated
699 Right rear left hydrofoil servo cylinder
800 Right rear right hydrofoil servo cylinder
19 Piston relief valve—impact energy absorption
10 Cylinder—right rear hydrofoil retraction—impact energy absorption
11 Cylinder—right rear hydrofoil retraction
802 Left rear caging cylinder
803 Left rear right hydrofoil servo cylinder
804 Left rear hydrofoil servo valve—mechanically actuated
805 Left rear left hydrofoil servo cylinder
806 Piston relief valve—impact energy absorption
807 Cylinder—left rear hydrofoil retraction—impact energy absorption
808 Cylinder—left rear hydrofoil retraction
809 Rotary ring seal unit—left rear
810 Hydraulic fluid filter
812 Check valve—proposed to inhibit roll in case of accidental loss of hydraulic fluid
813 Pilot-operated check valve—proposed to restrain hydrofoil rotation during very low speed in waves and during backing
814 Restrictor—to smooth servo pressure left rear to reciprocal function unit
815 Restrictor—left rear hydrofoil retraction
816 Accumulator—100 p.s.i. precharge—rear reciprocal function unit
817 Accumulator—300 p.s.i. precharge—rear reciprocal function unit
818 Restrictor—propeller counter balance
737 Relief valve—impact energy absorption—propeller retraction
735 Cylinder—propeller retraction
819 Pressure gauge—smoothed servo pressure to sensor loading cylinders
820 Pressure gauge—smoothed servo cylinder pressure to reciprocal function unit
822 Pressure gauge—system pressure
823 Pressure gauge—front servo cylinder pressure
824 Shut-off valve Submerged hydrofoil control theory and application—
Assumptions It is assumed:
(a) That all variations are small;
(b) That the horizontal acceleration of the boat is negligible;
(c) That the horizontal component of the orbital wave velocity is neglectable;
(d) That waves are sinusoidal in shape;
(e) That there are no surface effects on the hydrodynamic characteristics of fully submerged hydrofoils;
(f) That, for purposes of the determination of pitch and heave control signals and coupling parameters for zero flying draft variance in long waves, the planing points of all sensor skis follow the water surface;
(g) That there are no interference effects between hydrofoils;
(h) That there is zero time delay between a change in angle of attack of a hydrofoil and the corresponding change in lift;
(i) That, for the purposes of Appendix C and analyzing the second principal embodiment with variations, a forward hydrofoil is located at the center of percussion of the boat, with the center of oscillation at the aft hydrofoils and vice versa;
(j) That, for the purposes of Appendix C, the rate of change of curvature of the wave surface encountered by a hydrofoil boat flying in long waves may be neglected;
(k) That, for the purposes of Appendix D, the stiffness and damping in the connection of any sensor to the hull are both zero;
(l) That the effective trim angle of the sensor ski with respect to the water surface at the ski and the sensor lead are constant;
(m) That, for the specific purpose of expressing the vertical force on the sensor in Appendix D, the vertical acceleration of the hull is neglectable compared to that of the sensors;
(n) That the center of mass of the boat is at the same level as the hydrofoils;
(o) That the pressure drop, through the valve controlling the hydraulic fluid to the servo cylinders for any hydrofoil, is so large that the rate of flow into or out of the servo cylinders is determined solely by the valve opening; and that the latter is proportional to the difference between the hydrofoil angle command signal and the hydrofoil angle setting;
(p) That, the fore and aft spacing of the fully submerged hydrofoils of the second principal embodiment is sufficiently large to neglect the change in pitch of the flying water plane in comparison with the variations in $\alpha_f$ and $\alpha_a$;
(q) That, in view of the heavy damping resisting the vertical movement of a sensing hydrofoil with respect to the water, the inertia forces on a sensing hydrofoil may be neglected in comparison with the damping forces;
(r) That, for the purposes of analyzing the second principal embodiment in other than critical waves, the orbital velocities of the waves with respect to the boat can be neglected;
(s) That the rates of change $\dot{h}_1$, $\dot{h}_2$, $\dot{\alpha}_f$, $\dot{\alpha}_{ar}$ and $\dot{\alpha}_{al}$ in smooth water with the second principal embodiment are neglectable;

---

A dot over a quantity indicates the derivative of the quantity with respect to time.

(t) That the difference between the dynamic pressure on the outside and inside hydrofoils on a turn is neglectable;

(u) That the spring scale of the soft spring used to counterbalance and center a sensing hydrofoil is neglectable for the purposes of motion analysis.

(A) Pitch and heave control requirements for minimum draft and limited acceleration The hydrofoil draft increment required is of course determined by the maximum flying draft variance to be encountered. As an approach to the approximate determination of the maximum flying draft variance, consider a single hydrofoil flying at a constant horizontal speed $v$ in a sinusoidal wave train of given wave length $\lambda$ and amplitude $y_o$. Assume a sinusoidal hydrofoil flight path of the same phase and wave length as the wave train as determined in the direction of flight. Under these conditions, the flying draft variance $d_r$ required at the center of the foil to limit the vertical acceleration of the hydrofoil to a specific tolerable amount, as determined in Appendix B, is given by:

$$d_r = \frac{2\lambda}{R} - \frac{(\ddot{h})_t \lambda^2}{2\pi^2 (v \cos \beta \pm 2.265 \sqrt{\lambda})^2} \quad (60)$$

Figure 18:
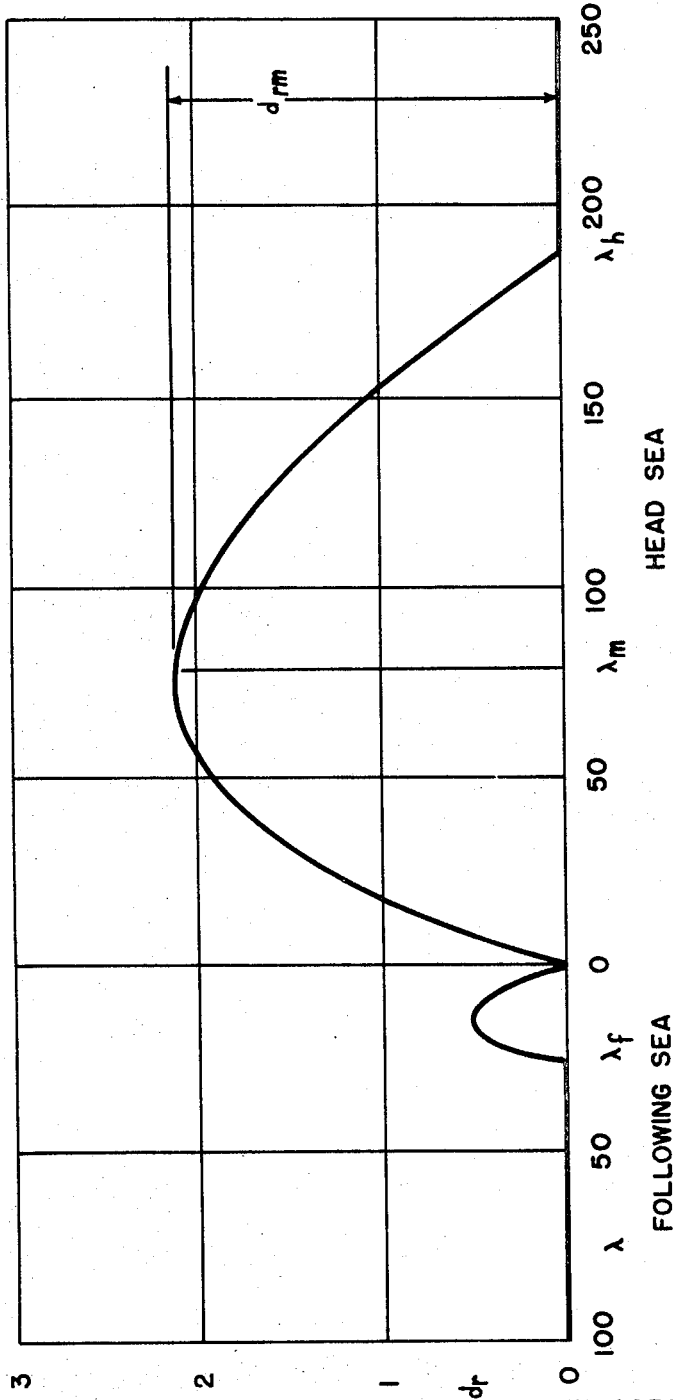
FIG. 18 is a curve of flying draft variance, $d_r$, plotted against wave length, $\lambda$ for the following conditions.

Inspection of (60) indicates that the largest flying draft variance, $d_r$ for given magnitudes of $\lambda$, R, $(\ddot{h})_t$ and $v$, is with a plus sign in the denominator of the last term and with $\beta$ equal to zero which is the head sea condition. In the head sea condition with $(\ddot{h})_t = 32.2$ ft./sec.$^2$; $v = 36.6$ ft./sec.; $R = 30$; the maximum $d_r = d_{rm} = 2.08'$ occurs at $\lambda = \lambda_m = 83'$. The relation between $d_r$ and $\lambda$ is shown in FIG. 18.

If the flight path and wave profile are not in phase, a larger flying draft variance is required.

An actual wave train is of course not sinusoidal so that for accurate treatment it would be necessary to consider an actual wave train and the corresponding flight path in several component wave trains. For the purpose of estimating draft and acceleration limits it appears only necessary to consider the dominant sinusoidal component and one or two other components. On this basis (60) can be applied to each component with a rough allowance for departures from the assumptions on which (60) is based and the results added to determine the total flying draft variance and acceleration amplitude. Or, more simply, (60) may be applied to the dominant sinusoidal component only with the presence of the components of other wave lengths taken into account in the choice of R. The latter procedure with a slightly different equation was used for purposes of predicting the flying draft variance inherently required for High Tail.

The hydrofoil draft increment, needed to provide adequate bottom clearance between the hydrofoils for a tandem hydrofoil system, is the sum of the lift draft, the contour allowance, and the flying draft variance.

(B) Pitch and heave control signals and coupling parameters for zero flying draft variance in long waves In a tandem, fully submerged hydrofoil system, at least one signal dependent on the elevation of the hull relative to the water surface is necessary for control of the incidence angles of the hydrofoils. For control design purposes it is necessary to select the location or locations of sensing the water surface and to determine the additional signals required.

From FIG. 18 it is apparent that no flying draft variance is required to limit the acceleration to that tolerable for either following sea wave lengths longer than $\lambda_f$ or head sea wave lengths longer than $\lambda_h$. Zero flying draft variance for such wave lengths is desirable in order to permit adequate flying draft variance for shorter waves typically present and to avoid the corresponding vertical acceleration components of objectionable magnitude. Considering only pitch and heave motions and assuming that the wave lengths are long enough to neglect the rate of change in water surface curvature encountered, the condition of zero flying draft variance determines the coupling relationships between the hydrofoil angles and the sensor displacements both with respect to the boat hull. These relationships depend on the fore and aft locations of the sensors and foils, the velocity of the boat, the velocity of the wave train, the course of the boat with respect to the direction of the wave train velocity, and the relative water velocity with respect to the boat.

For the case of a water surface sensor forward of each foil, it is shown in Appendix C that the required coupling relationships between the sensors and the hydrofoils for zero flying draft variance in long waves is expressed approximately by:

$$\alpha_f = \frac{w_f}{Kq} - \frac{A_{fn}}{l_1} \delta_1 \quad (61)$$

$$\alpha_a = \frac{w_a}{Kq} - \frac{A_{an}}{l_2} \delta_2 \quad (62)$$

in which $A_{fn}$ and $A_{an}$ are determined by the boat speed and the opposing wave velocity component.

(C) The selection of pitch and heave control parameters for minimum draft and limited acceleration The dynamic analysis of Appendix D indicates: (a) that the flying draft variance in long waves with the coupling relationships expressed by (61) and (62) is very small, as would be expected; (b) that the flying draft variance is excessive for wave lengths about twice the boat length; and (c) that the maximum flying draft variance and maximum vertical acceleration for all wave lengths and wave train velocity directions relative to the boat course, can be brought within practical limits by selecting the optimum sensor lead, by replacing the coefficients $A_{fn}$ and $A_{an}$ in (61) and (62), with the coefficients $A_f$ and $A_a$ selected on the basis of the boat speed and the opposing wave velocity component, and by introducing first order smoothing. (61) and (62) with these modifications become:

$$\alpha_f + E\dot{\alpha}_f = \frac{w_f}{Kq} - \frac{A_f}{l_1} \delta_1 \quad (63)$$

$$\alpha_a + E\dot{\alpha}_a = \frac{w_a}{Kq} - \frac{A_a}{l_2} \delta_2 \quad (64)$$

In wave free water with the boat foil-borne at design elevation $$\delta_1 = 0 = \delta_2 \text{ and } \dot{\alpha}_f = 0 = \dot{\alpha}_a$$

and (63) and (64) become:

$$\alpha_f = \frac{w_f}{Kq} \quad (63u)$$

$$\alpha_a = \frac{w_a}{Kq} \quad (64u)$$

The second terms in the right hand members of (63) and (64) represent the control signals from the relative water elevation sensors modified by the coupling factors $A_f$ and $A_a$ which vary the angle settings $\alpha_f$ and $\alpha_a$ from the smooth water settings shown in $(63u)$ and $(64u)$ for optimum performance in waves. For a given dynamic pressure $q$ such as that for the design boat speed $q_d$, (63) and (64) may be written in terms of the variations of $\alpha_f$ and $\alpha_a$ thus:

$$\bar{\alpha}_f + E\dot{\bar{\alpha}}_f = -\frac{A_f}{l_1}\delta_1 \qquad (63v)$$

$$\bar{\alpha}_a + E\dot{\bar{\alpha}}_a = -\frac{A_a}{l_2}\delta_2 \qquad (64v)$$

The choice of optimum values of $A_f$ and $A_a$ in the invented system being based on the dynamical analysis of Appendix D.

In view of the definitions of $\alpha_a$ and $\delta_2$ (64) may be expanded to:

$$\alpha_{ar} + \alpha_{al} + E\dot{\alpha}_{ar} + E\dot{\alpha}_{al} = \frac{2w_a}{Kq} - \frac{A_a}{l_2}(\delta_{2r} + \delta_{21}) \qquad (65)$$

On the basis of the Appendix D analysis, theoretical flying draft variances and vertical accelerations of High Tail with hydrofoil control coupling in accordance with (63) and (64) were computed. The results are shown in Tables I and II for a boat velocity, $v$, of 22 knots, a distance between foils, $b$, of 22 feet, a sensor lead, $l$, of 11 feet, a wave length/amplitude ratio, $R$, of 30, and a total boat weight, $\Delta$, of 6,000 pounds. Under these conditions, the tolerable limit on flying draft variance for either hydrofoil is considered to be 2.5 feet and the tolerable limit on vertical acceleration at a location where personnel are present is considered to be 38 ft./sec.$^2$. Of the five combinations of $A_f$ and $A_a$, shown in Tables I and II, the first three have both flying draft variances and vertical accelerations beyond the tolerable limits and the last two combinations have vertical accelerations beyond the tolerable limit. Thus, there is no single combination of $A_f$ and $A_a$ shown in Tables I and II that is satisfactory for all wave lengths and both head and following sea headings. On the other hand, the maximum flying draft variance and the maximum vertical acceleration can be substantially reduced by setting $A_a$ according to the wave length, $\lambda$, and the boat heading. For instance, consider Combination I in which:

$A_f = .77$ for all wave lengths in head and following seas,
$A_a = .99$ for wave lengths greater than 25 feet in following seas, and
$A_a = 0$ for wave lengths less than 25 feet in following seas and for all wave lengths in head seas Tables I and II show that with Combination I, the maximum computed flying draft variance is 2.41 feet and the maximum computed acceleration midship, $$\ddot{h}_2$$

is 35.75 ft./sec.$^2$, both of which are within the tolerable limits. These figures may be compared to the maximum flying draft variance of 2.08 feet and a maximum vertical acceleration of 32.2 ft./sec.$^2$ for the idealized hydrofoil case mentioned in connection with (60).

TABLE I.—FOLLOWING SEA

| $\lambda$, Feet | 300 | 200 | 100 | 75 | 50 | 35 | 30 | 25 | 20 | 15 | 10 |
|---|---|---|---|---|---|---|---|---|---|---|---|
| 2 $y_0$, Feet | 20 | 13.33 | 6.67 | 5.0 | 3.33 | 2.33 | 2.0 | 1.67 | 1.33 | 1.0 | .67 |
| $A_f = .77$: | | | | | | | | | | | |
| $d_f$, Feet | .20 | .420 | 1.410 | 2.02 | 2.570 | 2.530 | 2.430 | 2.206 | 1.786 | 1.468 | .784 |
| $d_a$, Feet | 1.972 | 2.092 | 4.854 | 5.464 | 3.568 | 3.668 | 2.884 | 2.114 | 1.730 | 1.412 | .794 |
| $A_a = 0$: | | | | | | | | | | | |
| $\ddot{h}_f$, Ft./sec.$^2$ | .032 | .14 | 2.34 | 3.76 | 3.14 | 3.093 | 8.24 | 15.89 | 22.13 | 34.09 | 21.41 |
| $\ddot{h}_a$, Ft./sec.$^2$ | .029 | .11 | .84 | .96 | 6.29 | 11.93 | 11.79 | 9.02 | 16.57 | 28.15 | 28.36 |
| $\ddot{h}_2$, Ft./sec.$^2$ | 0.29 | .12 | 1.20 | 1.44 | 4.0 | 4.71 | 2.0 | 8.29 | 19.01 | 9.12 | 12.74 |
| $A_f = .55$: | | | | | | | | | | | |
| $d_f$, Feet | 1.228 | 1.880 | 3.88 | 4.74 | 4.10 | 2.806 | 2.484 | 2.166 | 1.736 | 1.394 | .768 |
| $d_a$, Feet | .880 | 1.306 | 2.94 | 4.32 | 4.42 | 3.576 | 2.850 | 2.152 | 1.756 | 1.390 | .786 |
| $A_a = 0$: | | | | | | | | | | | |
| $\ddot{h}_f$, Ft./sec.$^2$ | .034 | .15 | 3.06 | 5.07 | 3.80 | 4.86 | 8.07 | 13.56 | 18.86 | 28.82 | 18.87 |
| $\ddot{h}_a$, Ft./sec.$^2$ | 0.31 | .13 | 1.81 | 2.81 | 6.71 | 11.31 | 11.28 | 9.80 | 16.92 | 26.71 | 27.30 |
| $\ddot{h}_2$, Ft./sec.$^2$ | 0.31 | .13 | 1.99 | 2.47 | 1.52 | 3.32 | 2.39 | 8.34 | 17.58 | 7.38 | 12.98 |
| $A_f = .33$: | | | | | | | | | | | |
| $d_f$, Feet | 3.778 | 5.648 | 11.720 | 12.672 | 6.028 | 3.052 | 2.570 | 2.180 | 1.716 | 1.330 | .754 |
| $d_a$, Feet | 1.680 | 2.508 | 6.492 | 8.674 | 5.774 | 3.552 | 2.808 | 2.174 | 1.782 | 1.368 | .780 |
| $A_a = 0$: | | | | | | | | | | | |
| $\ddot{h}_f$, Ft./sec.$^2$ | .038 | .19 | 5.51 | 10.46 | 8.96 | 7.31 | 8.66 | 12.46 | 16.56 | 24.16 | 16.78 |
| $\ddot{h}_a$, Ft./sec.$^2$ | .035 | .16 | 4.53 | 9.34 | 11.24 | 11.44 | 10.73 | 10.28 | 17.51 | 25.36 | 26.31 |
| $\ddot{h}_2$, Ft./sec.$^2$ | .036 | .17 | 4.53 | 8.25 | 6.45 | 2.53 | 2.64 | 9.04 | 16.63 | 6.02 | 13.3 |
| $A_f = .88$: | | | | | | | | | | | |
| $d_f$, Feet | .378 | .574 | 1.144 | 1.498 | 2.058 | 2.330 | 2.324 | 2.148 | 1.756 | 1.558 | .766 |
| $d_a$, Feet | .650 | .966 | 1.678 | 2.034 | 2.382 | 2.306 | 2.154 | 1.984 | 1.892 | 1.530 | .836 |
| $A_a = .88$: | | | | | | | | | | | |
| $\ddot{h}_f$, Ft./sec.$^2$ | .031 | .13 | 2.12 | 3.56 | 4.24 | 3.99 | 8.69 | 16.39 | 21.41 | 39.85 | 18.53 |
| $\ddot{h}_a$, Ft./sec.$^2$ | .031 | .13 | 1.91 | 3.0 | 3.16 | 2.58 | 5.59 | 12.57 | 27.10 | 37.37 | 30.87 |
| $\ddot{h}_2$, Ft./sec.$^2$ | .030 | .12 | 1.56 | 2.03 | .92 | 1.52 | 5.14 | 13.66 | 23.14 | 5.47 | 16.77 |
| $A_f = .77$: | | | | | | | | | | | |
| $d_f$, Feet | .220 | .388 | 1.099 | 1.588 | 2.268 | 2.414 | 2.332 | 2.110 | 1.724 | 1.520 | .756 |
| $d_a$, Feet | .538 | .802 | 1.410 | 1.732 | 2.226 | 2.20 | 2.126 | 2.020 | 1.926 | 1.540 | .838 |
| $A_a = .99$: | | | | | | | | | | | |
| $\ddot{h}_f$, Ft./sec.$^2$ | .032 | .136 | 2.24 | 3.75 | 3.84 | 2.97 | 7.79 | 14.75 | 19.50 | 37.15 | 16.78 |
| $\ddot{h}_a$, Ft./sec.$^2$ | .032 | .131 | 2.01 | 3.29 | 4.14 | 4.29 | 7.17 | 14.35 | 28.5 | 38.46 | 30.87 |
| $\ddot{h}_2$, Ft./sec.$^2$ | .031 | .126 | 1.71 | 2.44 | 1.70 | 2.32 | 5.93 | 13.88 | 22.82 | 4.45 | 17.33 |

R=30; b=22 Feet; l=11 Feet; v=22 Knots; $\Delta$=6,000 Lbs.; $\lambda$=Wave Length Feet; 2 $y_0$=Wave Trough to Crest Height.

TABLE II.—HEAD SEA

| $\lambda$, Feet | 10 | 15 | 20 | 25 | 30 | 35 | 50 | 75 | 100 | 200 | 300 |
|---|---|---|---|---|---|---|---|---|---|---|---|
| $2 y_0$, Feet | .67 | 1.0 | 1.33 | 1.67 | 2.0 | 2.33 | 3.33 | 5.0 | 6.67 | 13.33 | 20 |
| $A_f = .77$: | | | | | | | | | | | |
| $d_f$, Feet | .632 | .828 | 1.052 | 1.048 | .974 | .936 | 1.030 | 1.234 | 1.350 | 1.320 | 1.172 |
| $d_a$, Feet | .638 | .846 | 1.140 | 1.576 | 1.846 | 1.954 | 1.840 | 1.382 | 1.014 | .636 | .928 |
| $A_a = 0$: | | | | | | | | | | | |
| $\ddot{h}_f$, Ft./sec.² | 15.78 | 31.26 | 30.46 | 47.18 | 57.11 | 59.15 | 54.87 | 49.75 | 45.65 | 32.81 | 26.47 |
| $\ddot{h}_a$, Ft./sec.² | 27.31 | 29.69 | 33.84 | 15.02 | 9.04 | 20.99 | 38.08 | 39.41 | 41.36 | 30.86 | 25.89 |
| $\ddot{h}_2$, Ft./sec.² | 16.06 | 3.27 | 23.67 | 31.09 | 25.64 | 19.11 | 23.03 | 33.83 | 35.74 | 30.11 | 25.47 |
| $A_f = .55$: | | | | | | | | | | | |
| $d_f$, Feet | .626 | .832 | 1.096 | 1.170 | 1.194 | 1.256 | 1.606 | 2.12 | 2.458 | 2.762 | 2.432 |
| $d_a$, Feet | .638 | .844 | 1.152 | 1.540 | 1.772 | 1.868 | 1.802 | 1.54 | 1.420 | 1.676 | 1.912 |
| $A_a = 0$: | | | | | | | | | | | |
| $\ddot{h}_f$, Ft./sec.² | 16.25 | 30.34 | 25.79 | 39.63 | 46.52 | 47.3 | 44.42 | 43.30 | 41.95 | 33.63 | 27.47 |
| $\ddot{h}_a$, Ft./sec.² | 28.11 | 30.78 | 31.55 | 14.94 | 12.32 | 21.68 | 35.9 | 38.40 | 36.80 | 30.60 | 26.30 |
| $\ddot{h}_2$, Ft./sec.² | 15.55 | 1.63 | 22.69 | 27.11 | 20.20 | 12.84 | 19.75 | 31.43 | 33.95 | 30.51 | 26.16 |
| $A_f = .33$: | | | | | | | | | | | |
| $d_f$, Feet | .620 | .838 | 1.140 | 1.280 | 1.382 | 1.528 | 2.082 | 2.842 | 3.410 | 4.872 | 5.288 |
| $d_a$, Feet | .636 | .840 | 1.164 | 1.506 | 1.712 | 1.810 | 1.856 | 1.898 | 2.090 | 3.300 | 4.14 |
| $A_a = 0$: | | | | | | | | | | | |
| $\ddot{h}_f$, Ft./sec.² | 17.02 | 29.94 | 22.16 | 32.99 | 37.0 | 36.55 | 34.07 | 34.65 | 34.46 | 30.96 | 28.00 |
| $\ddot{h}_a$, Ft./sec.² | 28.89 | 31.79 | 29.48 | 15.64 | 15.26 | 22.28 | 33.16 | 34.33 | 32.36 | 27.37 | 25.58 |
| $\ddot{h}_2$, Ft./sec.² | 15.10 | .93 | 21.95 | 23.54 | 15.64 | 7.42 | 16.55 | 27.39 | 29.61 | 28.05 | 26.16 |
| $A_f = .88$: | | | | | | | | | | | |
| $d_f$, Feet | .622 | .856 | 1.070 | .968 | .756 | .594 | .552 | .698 | .788 | .836 | .806 |
| $d_a$, Feet | .662 | .858 | .958 | 1.204 | 1.312 | 1.282 | .900 | .340 | .126 | .442 | .534 |
| $A_a = .88$: | | | | | | | | | | | |
| $\ddot{h}_f$, Ft./sec.² | 19.02 | 27.23 | 28.57 | 56.17 | 70.55 | 72.79 | 61.96 | 51.18 | 45.72 | 32.19 | 26.10 |
| $\ddot{h}_a$, Ft./sec.² | 29.64 | 26.22 | 42.14 | 35.20 | 36.22 | 42.66 | 53.61 | 51.62 | 45.96 | 31.89 | 25.91 |
| $\ddot{h}_2$, Ft./sec.² | 14.17 | 2.12 | 32.85 | 41.98 | 34.18 | 21.84 | 15.12 | 33.42 | 36.75 | 30.32 | 25.36 |
| $A_f = .77$: | | | | | | | | | | | |
| $d_f$, Feet | .620 | .866 | 1.096 | 1.034 | .876 | .774 | .872 | 1.146 | 1.272 | 1.262 | 1.162 |
| $d_a$, Feet | .666 | .856 | .942 | 1.136 | 1.198 | 1.134 | .706 | .194 | .198 | .492 | .542 |
| $A_a = .99$: | | | | | | | | | | | |
| $\ddot{h}_f$, Ft./sec.² | 19.75 | 25.81 | 26.12 | 52.67 | 65.1 | 66.40 | 56.69 | 49.48 | 45.46 | 32.63 | 26.39 |
| $\ddot{h}_a$, Ft./sec.² | 30.44 | 26.73 | 43.00 | 39.43 | 42.26 | 48.41 | 57.5 | 53.67 | 47.08 | 32.04 | 25.93 |
| $\ddot{h}_2$, Ft./sec.² | 13.58 | 3.48 | 33.24 | 40.80 | 31.84 | 18.35 | 15.45 | 35.00 | 38.00 | 30.75 | 25.55 |

R=30; b=22 Feet; l=11 Feet; v=22 Knots; $\Delta$=6000 Lbs.; $\lambda$=Wave Length Feet; $2 y_0$=Wave Trough to Crest Height.

It is true that with Combination I, the maximum vertical accelerations at the hydrofoils, i.e., $$\ddot{h}_f \text{ and } \ddot{h}_a$$

exceed the tolerable limit. These excesses are not considered serious for High Tail because personnel are not present at the bow and the excess acceleration at the stern is small. However, with $A_f$ as well as $A_a$ set according to the wave length, $\lambda$, and the boat heading, substantial reductions in the vertical accelerations at the bow and stern are possible. Consider Combination II in which:

$A_f = .77$ and $A_a = .99$ in following seas for wave lengths 25 feet or longer, $A_f = .33$ and $A_a = 0$ for wave lengths less than 25 feet in following seas and up to 50 feet in head seas, $A_f = .55$ and $A_a = 0$ for wave lengths in head seas longer than 50 feet up to 100 feet, and $A_f = .77$ and $A_a = 0$ in head seas for wave lengths above 100 feet.

Tables I and II show that with Combination II, the computed flying draft variances do not exceed the tolerable limit, and that the vertical accelerations, $$\ddot{h}_f, \ddot{h}_a, \text{ and } \ddot{h}_2$$

exceed the tolerable limit only by small amounts in the range from 75 through 100 feet. The later excess is not considered significant because for such wave lengths, the wave length/amplitude ratio, R, of 30, used in the computation, represents a steeper wave than would ordinarily be encountered, i.e., a higher R would means lower computed flying draft variances and vertical accelerations.

The data shown in Tables I and II can be converted to apply to a larger boat by multiplying the flying draft variances and the wave lengths in Tables I and II by both the ratio of increase in b, and the reciprocal of the ratio of increase in R, provided the dimensionless parameters appearing in (124) and (125) in Appendix D, are adhered to. For instance, Tables III and IV represent the data of Tables I and II converted to apply to a boat velocity of 29 knots, a distance between foils, b, of 39 feet, a sensor lead, l, of 19.5 feet, a wave length/amplitude ratio, R, of 40, and a total weight of boat, $\Delta$, of 34,000 pounds. In Tables III and IV only Combination II settings for $A_f$ and $A_a$ are shown because it is considered that personnel would be present near the bow of a boat of this size.

In quartering or beam seas there is more latitude in selecting $A_f$ and $A_a$ because the wave length/amplitude ratio is higher, so that no additional combination of $A_f$ and $A_a$ is needed for such courses. The data of Tables I and II indicate that for a given Froude number, F, near optimum performance as measured by (60) is attainable with hydrofoil elevation control coupling in accordance with (63) and (64), if $A_f$ and $A_a$ are properly set as functions the ratio c/v as determined by (124) and (125) of Appendix D. Where different dimensionless parameters are required than those on which Tables I and II are based, other solutions of (124) and (125) of Appendix D are used.

Factors $A_f$ and $A_a$ may be set into control computer either by separate manual adjustments as on High Tail, or by means of a wave velocity function unit which requires only a single manual adjustment. Such a function unit is shown schematically in FIGURE 19. Referring to FIGURE 19, cam shaft 1C is rotated manually by means of crank 2C through an angle representing the ratio c/v which depends on the dominant wave length and relative wave propagation direction of the seaway in which the boat is operating. Cam shaft 1C is supported in stationary bearings 3C and 4C and carries cams 5C and 6C. Bearing 4C is rigidly attached to stationary indicating plate 7C. Crank 2C is held in the selected position by a detent, not shown, acting between crank 2C and sockets 8C in plate 7C. Cam followers 9C and 10C are supported by stationary bearings 11C and 12C and held in engagement with their respective cams by springs 13C and 14C. Cams 5C and 6C are shaped in accordance with the functional relationships between $A_f$ and $c/v$ and $A_a$ and $c/v$ respectively so that displacements of cam followers 9C and 10C transmitted by connecting rods 15C and 16C corresponding to the factors $A_f$ and $A_a$ respectively can be used to set the factors $A_f$ and $A_a$ into a control computer. For instance, the displacments of the connecting rods 15C and 16C can be used to locate the carriages 330 and 567, of the forward and bow computer sections of High Tail. As another example, the cam arrangement of FIG. 19 can be used to set the factors $A_f$ and $A_a$ into the electrical computer, shown in FIG. 28, by moving the potentiometers 47F and 48A with the connecting rods 15C and 16C respectively.

To adjust for sea condition, it is best to start with a rough estimate of the factor $c/v$. However, the operator can adjust the control even without an estimate of $c/v$ by rotating crank 2C in the direction which improves the performance as observed until the best observed performance is attained. Since there is only one adjustment with the arrangement of FIG. 19, all possible adjustments can be tried by a single sweep of the crank.

On the basis of the Appendix D analysis it can be shown that the flying draft variance becomes excessive if the sensor lead is not near optimum. It does not appear practical to simulate sensor lead by the use of a wave slope signal or a time rate of change in sensor signal because of the frequently present short wave length water surface roughness. Actual optimum sensor lead is therefore essential for minimum flying draft variance. The optimum sensor lead for a hydrofoil Froude number, $$\frac{gb}{v^2} = .5$$

is about $b/2$. For lower hydrofoil Froude numbers the optimum lead is greater and vice versa. The optimum lead is also increased by increased lag in following of the water surface by the sensor. For a specific boat, boat speed, heading and wave length the optimum sensor lead may be determined from equations such as (124) and (125).

The results of the mathematical analysis shown in Tables I and II indicate that the maximum flying draft variance in a following sea without aft hydrofoil control surface rotation is more than double that attainable with such rotation controlled with a relative water elevation sensor having both lead $l_2$ and coupling factor $A_a$ approximately optimum. On the other hand in a head sea and in short waves in any direction, the optimum coupling factor $A_a$ is approximately zero. Thus, in head seas and in protected waters there is no need for an aft relative water elevation sensor. In this case Equations (63) and (64) become:

$$\alpha_t + E\dot{\alpha}_t = \frac{w_t}{Kq} - \frac{A_t}{l_1}\delta_t \qquad (63w)$$

$$\alpha_a + E\dot{\alpha}_a = \frac{w_t}{Kq} \qquad (64w)$$

Predicted flying draft variances and vertical accelerations in waves

TABLE III.—FOLLOWING SEA

| | Sea Condition, a | | | | | | | | Sea Condition, b | | |
|---|---|---|---|---|---|---|---|---|---|---|---|
| | $A_f$=.77; $A_a$=.99 | | | | | | | | $A_f$=.33; $A_a$=0 | | |
| λ, Feet | 535 | 356 | 178 | 133 | 89 | 62 | 53 | 45 | 36 | 27 | 18 |
| 2 y₀, Feet | 26.75 | 17.8 | 8.9 | 6.65 | 4.45 | 3.1 | 2.65 | 2.25 | 1.80 | 1.35 | .9 |
| d_t, Feet | .29 | .52 | 1.46 | 2.12 | 3.03 | 3.22 | 3.11 | 2.82 | 2.30 | 1.78 | 1.01 |
| d_a, Feet | .72 | 1.07 | 1.88 | 2.31 | 2.84 | 2.94 | 2.84 | 2.70 | 2.39 | 1.83 | 1.04 |
| $\ddot{h}_t$, Ft./Sec.² | .02 | .11 | 1.68 | 2.81 | 2.88 | 2.23 | 5.84 | 11.62 | 12.42 | 18.12 | 12.59 |
| $\ddot{h}_a$, Ft./Sec.² | .02 | .10 | 1.51 | 2.47 | 3.11 | 3.22 | 5.38 | 10.76 | 13.13 | 19.02 | 19.73 |
| $\ddot{h}_2$, Ft./Sec.² | .02 | .13 | 1.28 | 1.83 | 1.28 | 1.74 | 4.48 | 10.41 | 12.47 | 4.52 | 9.98 |

$R_w$=40; b=39 Feet; l=19.5 Feet; v=29 Knots; $\frac{2 y_0}{\lambda}$=20; Δ=34,000 Lbs.; λ=Wave Length (Feet); 2 y₀=Wave Height—Trough to Crest Predicted flying draft variances and vertical accelerations in waves

TABLE IV.—HEAD SEA

| | Sea Condition, b | | | | | | | Sea Condition, c | | Sea Condition, d | |
|---|---|---|---|---|---|---|---|---|---|---|---|
| | $A_f$=.33; $A_a$=0 | | | | | | | $A_f$=.55; $A_a$=0 | | $A_f$=.77; $A_a$=0 | |
| λ, Feet | 18 | 27 | 36 | 45 | 53 | 62 | 89 | 133 | 178 | 356 | 535 |
| 2 y₀, Feet | .9 | 1.35 | 1.80 | 2.25 | 2.65 | 3.1 | 4.45 | 6.65 | 8.9 | 17.8 | 26.75 |
| d_t, Feet | .83 | 1.12 | 1.52 | 1.71 | 1.85 | 2.04 | 2.78 | 2.84 | 3.28 | 1.76 | 1.56 |
| d_a, Feet | .85 | 1.13 | 1.55 | 2.01 | 2.29 | 2.42 | 2.48 | 2.06 | 1.90 | .85 | 1.24 |
| $\ddot{h}_t$, Ft./Sec.² | 12.77 | 22.46 | 16.62 | 24.74 | 27.75 | 27.41 | 25.55 | 32.48 | 31.46 | 24.61 | 19.85 |
| $\ddot{h}_a$, Ft./Sec.² | 21.67 | 23.84 | 22.11 | 11.73 | 11.45 | 16.71 | 24.87 | 28.80 | 27.6 | 23.15 | 19.42 |
| $\ddot{h}_2$, Ft./Sec.² | 11.33 | .70 | 16.46 | 17.66 | 11.73 | 5.57 | 12.41 | 23.57 | 25.46 | 22.58 | 19.10 |

R=40; b=39 Feet; l=19.5 Feet; v=29 Knots; $\frac{2 y_0}{\lambda}$=20; Δ=34,000 Lbs.; λ=Wave Length (Feet); 2 y₀=Wave Height —Trough to Crest.

(D) Roll stabilization

A larger ratio of error is permissible for roll control than for pitch and heave control. The reason is that the difference in elevation of the outer ends of the hydrofoils with respect to the water surface which the roll control regulates is much smaller in linear measure than the change in elevation of the keel due to pitch and heave motions. Unfortunately where roll is controlled, as in High Tail, through the difference in angle settings of two aft hydrofoils, the relation between the sensor movements and the hydrofoil angle settings required for proper roll control is much different than the relation between the sensor movements and the hydrofoil settings required for proper pitch and heave control. In other words, if the sensor forward of each aft hydrofoil were simply coupled directly to that hydrofoil there is no coupling ratio which would be proper for roll control and also proper for pitch and heave control for all wave lengths and wave velocity direction with respect to the boat course.

The angle of roll with respect to the water surface is determined by the difference between right and left sensor movements. Thus in the case of High Tail with two two hydrofoils and sensors aft and one hydrofoil and one sensor forward ,the angle of roll is given by:

$$\gamma = \frac{\delta_{2r} - \delta_{2l}}{b_s} \quad (66)$$

Since a rolling moment or movement is produced by a difference between right and left aft hydrofoil angles, a restoring effect in roll without smoothing can be expressed by:

$$(\alpha_{ar} - \alpha_{al}) = \frac{A_r}{b_s}(\delta_{2l} - \delta_{2r}) \quad (67)$$

First order smoothing of the same type as included in (63) and (64) can be added to (65) by replacing $\alpha_{ar}$ and $\alpha_{al}$ with $$(\alpha_{ar} + E\dot{\alpha}_{ar}) \text{ and } (\alpha_{al} + E\dot{\alpha}_{al})$$

respectively thus:

$$\alpha_{ar} + E\dot{\alpha}_{ar} - (\alpha_{al} + E\dot{\alpha}_{al}) = \frac{A_r}{b_s}(\delta_{2l} - \delta_{2r}) \quad (68)$$

Adding (65) and (68) gives:

$$\alpha_{ar} + E\dot{\alpha}_{ar} = +\frac{w_a}{Kq} - \frac{A_a}{2l}(\delta_{2r} + \delta_{21}) - \frac{A_r}{2b_s}(\delta_{2r} - \delta_{2l}) \quad (69)$$

Subtracting (68) from (65) gives:

$$\alpha_{al} + E\dot{\alpha}_{al} = +\frac{w_a}{Kq} - \frac{A_a}{2l}(\delta_{2r} + \delta_{21}) + \frac{A_r}{2b_s}(\delta_{2r} - \delta_{21}) \quad (70)$$

(63), (69) and (70) express coupling relationships for control of pitch, heave and roll on a straight course with first order smoothing.

(E) Roll and elevation control in turns

In order to reduce the side loads on both the struts and occupants of the boat it is desirable to use some banking of the boat in a turn. Full banking for a boat of High Tail's beamwise dimensions is not compatible with minimum hydrofoil draft increment for sharp turns because the hydrofoil on the outside of the turn would broach the surface. On High Tail about one half full banking is produced automatically by using the steering rotation of the forward hydrofoil as an added signal in the roll control for the rear foils .This scheme can be expressed by introducing the terms $-K_\theta\theta_c$ and $+K_\theta\theta_c$ into (69) and (70) respectively as shown in (72) and (73).

Even with one half full banking, lowering of the boat in a turn is used on High Tail to avoid adding to the hydrofoil draft increment. This lowering can be expressed by introducing the term $-K_f\theta_b^2$ into (63) and the term $-K_a\theta_b^2$ into (69) and (70), as shown in (71), (72) and (73) respectively.

(F) Automatic climb and descent during acceleration and deceleration

As High Tail reaches up speed (down speed) the hull abruptly climbs to (descends from) the flying elevation automatically. This behavior can be expressed by subtracting the term $A_e$ from each of the sensor displacements, $\delta_1$, $\delta_{2r}$, and $\delta_{2l}$ in (63), (69) and (70), as shown in (71), (72) and (73) respectively.

(G) Manual adjustments for pay load and trimming

The term $w_f/Kq$ in (63) may be approximated by the quantity $$\left[\frac{w_{fh}}{Kq} + B_f\right]$$

The term $w_a/Kq$ in (69) may be approximated by the quantity $$\left[\frac{w_{ah}}{Kq} + B_{ar}\right]$$

The term $w_a/Kq$ in (70) may be approximated by the quantity $$\left[\frac{w_{ah}}{Kq} + B_{al}\right]$$

The first term in each of the bracketed quantities above varies only with $q$. The last term represents manual adjustment for pay load. However, the last term can also represent adjustment for trimming the elevation, pitch or roll of the boat. Substituting the approximations $$\frac{w_{fh}}{Kq} + B_f \text{ and } \frac{w_{ah}}{Kq} + B_a$$

for $w_f/Kq$ and $w_a/Kq$ respectively, in (63) and (64) these equations become:

$$\alpha_f + E\dot{\alpha}_f = \frac{w_{fh}}{Kq} + B_f - \frac{A_f}{l_1}\delta_1 \quad (63x)$$

$$\alpha_a + E\dot{\alpha}_a = \frac{w_{ah}}{Kq} + B_a - \frac{A_a}{l_2}\delta_2 \quad (64x)$$

If $w_{fh}/Kq$ and $w_{ah}/Kq$ are absent additional adjustments of $B_f$ and $B_a$ are necessary if the flying elevation and pitch of said boat are to be approximately independent of boat speed. With only $w_{fh}/Kq$ absent the flying pitch is approximately independent of boat speed, but the relative water elevation is not. In this case adjustment of $B_f$ is necessary if the flying elevation is to be approximately independent of boat speed.

Trimming adjustments for such purposes would be more ideal if they were combined with the term $A_e$. But this would complicate the computer in a way that seems unnecessary unless it is important to have the sea condition adjustment independent of the trimming adjustment for any adjustment of elevation.

(H) Specific coupling equations and High Tail's control (63), (69) and (70) modified as described in the preceding sections become the specific coupling equations:

$$\alpha_f + E\dot{\alpha}_f = \frac{w_{fh}}{Kq} + B_f - \frac{A_f}{l}(\delta_1 + A_e + K_f\theta_b^2) \quad (71)$$

$$\alpha_{ar} + E\dot{\alpha}_{ar} = \frac{w_{ah}}{Kq} + B_{ar} - \frac{A_a}{2l}(\delta_{2r} + \delta_{21} + 2A_e + 2K_a\theta_b^2) + \frac{A_r}{2b_w}(\delta_{2r} - \delta_{21} + 2K_\theta\theta_c) \quad (72)$$

$$\alpha_{al} + E\dot{\alpha}_{al} = \frac{w_{ah}}{Kq} + B_{al} - \frac{A_a}{2l}(\delta_{2r} + \delta_{21} + 2A_e + 2K_a\theta_b^2) - \frac{A_r}{2b_w}(\delta_{2r} - \delta_{21} + 2K_\theta\theta_c) \quad (73)$$

The invented hydrofoil system includes at least two fully submerged hydrofoils spaced longitudinally with respect to the hull of said boat. These hydrofoils have at least two hydrofoil control surfaces spaced laterally with respect to said hull. Each of these hydrofoil control surfaces is rotated with respect to the hull about a substantially horizontal lateral extending axis for the control of pitch, elevation and roll of the boat.

A control surface may be a flap, an aileron, or an entire hydrofoil. The hydrofoils may be arranged with one forward and two aft, as in the case of High Tail, one forward and one aft, two forward and one aft, and two forward and two aft.

The invented hydrofoil system requires at least one strut per hydrofoil and at least one strut control rotatable about an upright axis for steering the boat. A strut control surface for steering may be a flap or entire strut.

Irrespective of the hydrofoil arrangement, the coupling relationships expressed in (f), (a) and (γ) following may be used as well as other coupling relationships, for instance those described herein in the section entitled "Hydrofoil Boat with Hydrofoil Sensing."

$$a_f + E_f \dot{\alpha}_f = \frac{w_{fh}}{Kq} + B_f - \frac{A_f}{l}(\delta_1 + A_e + K_f \theta_b^2) \quad (f)$$

$$a_a + E_a \dot{\alpha}_a = \frac{w_{ah}}{Kq} + B_a - \frac{A_a}{l}(\delta_2 + A_e + K_a \theta_b^2) \quad (a)$$

$$D(\alpha_r - \alpha_1) + E_r(\dot{\alpha}_r - \dot{\alpha}_1) = B_r - A_r(\gamma + K_\gamma \theta_c) \quad (\gamma)$$

The specific coupling equations for one hydrofoil forward and two aft as for High Tail have been presented in (71), (72) and (73).

For two hydrofoils forward and one aft we have:

$$\dot{\alpha}_{fr} + E \dot{\alpha}_{fr} = \frac{w_{fh}}{Kq} + B_{fr} - \frac{A_f}{2l}(\delta_{1r} + \delta_{1l}) + 2A_e + 2K_f \theta_b^2) - $$
$$\frac{A_r}{2b_w}(\delta_{1r} - \delta_{1l} + 2K_\theta \theta_c) \quad (fr)$$

$$a_{fl} + E \dot{\alpha}_f = \frac{w_{fh}}{Kq} + B_{fl} - \frac{A_f}{2l}(\delta_{1r} + \delta_{1l} + 2A_e + 2K_f \theta_b^2) + $$
$$\frac{A_r}{2b_w}(\delta_{1r} - \delta_{1l} + 2K_\theta \theta_c) \quad (fl)$$

$$a_a + E \dot{\alpha}_a = \frac{w_{ah}}{Kq} + B_a - \frac{A_a}{l}(\delta_2 + A_e + K_a \theta_b^2) \quad (a)$$

For two hydrofoils forward and two aft we have:

$$a_{fr} + E \dot{\alpha}_{fr} = \frac{w_{fh}}{Kq} + B_{fr} - \frac{A_f}{2l}(\delta_{1r} + \delta_{1l} + 2A_e + 2K_f \theta_b^2) - $$
$$\frac{A_r}{2b_w}(\delta_{1r} - \delta_{1l} + 2K_\theta \theta_c) \quad (fr)$$

$$a_{fl} + E \dot{\alpha}_{fl} = \frac{w_{fh}}{Kq} + B_{fl} - \frac{A_f}{2l}(\delta_{1r} + \delta_{1l} + 2A_e + 2K_f \theta_b^2) + $$
$$\frac{A_r}{2b_w}(\delta_{1r} - \delta_{1l} + 2K_\theta \theta_c) \quad (fl)$$

$$a_{ar} + E \dot{\alpha}_{ar} = \frac{w_{ah}}{Kq} + B_{ar} - \frac{A_a}{2l}(\delta_{2r} + \delta_{2l} + 2A_e + 2K_a \theta_b^2) - $$
$$\frac{A_r}{2b_w}(\delta_{1r} - \delta_{1l} + 2K_\theta \theta_c) \quad (ar)$$

$$a_{al} + E \dot{\alpha}_{al} = \frac{w_{ah}}{Kq} + B_{al} \frac{A_a}{2l}(\delta_{2r} + \delta_{2l} + 2A_e + 2K_a \theta_b^2) + $$
$$\frac{A_r}{2b_w}(\delta_{1r} - \delta_{1l} + 2K_\theta \theta_c) \quad (al)$$

High Tail's hydrofoil angle control (coupling means) continuously produces the angle settings $\alpha_f$, $\alpha_{ar}$ and $\alpha_{al}$, expressed by (71), (72) and (73). The sensors and the control coupling including computer, servos and their connections are all involved. The signals functionally related to the sensor displacements $\delta_1$, $\delta_{2r}$ and $\delta_{2l}$, the steering angle $\theta$, and the dynamic pressure $q$, are transmitted to the computer. The computer is adjusted manually for the sea condition and for pay load and trim. The sea condition adjustment is functiotnally related to the parameter $A_a$, and the pay load and trim adjustments are proportional to the parameters $B_f$, $B_{ar}$ and $B_{al}$.

The computer produces the signals $\sigma_f$, $\sigma_{ar}$ and $\sigma_{al}$ which are proportional to the right hand members of (71), (72) and (73) respectively. The signals $\sigma_f$, $\sigma_{ar}$ and $\sigma_{al}$ are transmitted as commands to the servos. The servos are designed to produce from these commands the hydrofoil angle settings $\alpha_l$, $\alpha_{ar}$ and $\alpha_{al}$ that satisfy (71), (72) and (73).

(I) Function units

The term function unit as used herein designates a control component which produces a signal that is a prescribed function, other than a simple linear relationship, of the signal received. High Tail has five kinds of function units, sixteen units in all. The three servos are smoothing function units. In the computer there are three more smoothing function units, five sine function units, two steering function units, two reciprocal function units and one sequence function unit. Each of the five signals transmitted to the computer is received by one or more function units.

The three sensor displacements are transmitted to the computer as angular displacements of the three sensor mounting shafts. Each of these angular displacements is approximately the arc sine of $\delta$, $\delta$ being the downward vertical displacement of the sensor contact with the water surface. For each sensor shaft a sine function unit is used to produce a signal proportional to $\delta$ from the angular displacement of the shaft. Each sine function unit consists of a crank on the sensor shaft and a connecting rod transmitting the signal, with the angle between the crank and the connecting rod equal to the angle between the sensor radius and a line perpendicular to the flying bottom plane.

A signal, proportional to the steering angle $\theta$, is received by two steering function units, one in the control for the forward hydrofoil and one in the control for the aft hydrofoils. Both steering function units produce a signal proportional to the function $\theta_b^2$ appearing in (71), (72), and (73). In each unit the square function is produced with a crank and connecting rod on dead center at $\theta=0$, and the discontinuities in the functional relation between $\theta$ and $\theta_b$ are produced with lost motion in the connection rod and with a related stop and spring. In addition, the steering function unit for the aft hydrofoils produces a signal proportional to $\theta_c$ by means of an overload release equipped connecting rod. This connecting rod has a displacement lengthwise at one end proportional to the steering angle $\theta$ and a displacement lengthwise at the other end limited by stops corresponding to the limits on $\theta_c$. The change in length of the connecting rod is accommodated by its overload release.

The characteristics of the servos as smoothing function units is included in Appendix D.

The servo pressure (which has nothing to do with the servos as smoothing function units) is the signal specifically related to the dynamic pressure $q$. It is received by the three other smoothing function units each of which consists of an accumulator connected to the servo pressure with a passage restricted by an orifice. The pressure in the accumulator is the smoothed servo pressure. Because the smoothing effects of the smoothing function units are not identical, there is a smoothed servo pressure for each of the three smoothing function units.

One such smoothed servo pressure is the signal to a sequence function unit which is a battery of four pilot valves (only three are used on High Tail). These valves are closed (opened) in sequence as the smoothed servo pressure is increased (decreased) by the increase (decrease) in forward speed of the boat. The corresponding sequence of abrupt increases (decreases) in the three pilot pressures automatically extends (folds) the sensors at sensor down (up) speed, starts (stops) the hydrofoil angle control at uncage (cage) speed, and introduces the abrupt climb to (descent from) the flying elevation at up (down) speed during acceleration (deceleration).

The climb (descent) operation is specifically related to the term $A_e$ in (71), (72) and (73).

The second such smoothed servo pressure is transmitted to two reciprocal function units, one in the control for the forward hydrofoil and one in the control for the aft hydrofoils. These reciprocal function units produce identical signals functionally related to the terms $w_{fh}/Kq$ and $w_{ah}/Kq$ in (71), (72) and (73), the smoothed servo pressure Q being the signal for the dynamic pressure $q$ as explained in the introduction. These signals substantially eliminate change in bottom clearance with change in boat speed if the boat speed is above up speed.

Each reciprocal function unit is a variable length connecting link in the computer mechanism which includes a nonlinear spring member loaded with a small low friction hydraulic cylinder to which the smoothed servo pressure is connected. The arrangement is such that the smoothed servo pressure determines the deflection of the nonlinear spring member and the latter determines the increase in length of the reciprocal function unit as a connecting link which is the signal $\sigma_h$ for both reciprocal function units.

There is considerable freedom in the choice of the functional relation between load and deflection in the design of a nonlinear spring member. But there is a stability problem if the deflection must decrease with increase in load on the spring member. Such a relationship would be involved if the signal $\sigma_h$ were to equal either the $$C_f \frac{w_{fh}}{K_q} \text{ or } C_a \frac{w_{ah}}{K_q}$$

To avoid the stability problem consider that the signal $\sigma_h$ is given either by:

$$\sigma_h \equiv -C_f \left[\frac{w_{fh}}{K_q}\right] \quad (74)$$

or by:

$$\sigma_h \equiv -C_a \left[\frac{w_{ah}}{K_q}\right] \quad (75)$$

where $C_f$ and $C_a$ are positive constants determined by the dimensions of the control mechanism and the approximately constant ratio $Q/q$. With the relationships (74) and (75) an increase in length of a reciprocal function unit results from an increase in the smoothed servo pressure so that there is no stability problem.

Appendix A.—Approximation for wave train velocity

From Reference 14 the velocity $c$ of a wave train is given by:

$$C^2 = \frac{g\lambda}{2\pi}\left(1 + \frac{4\pi^2 y_0^2}{\lambda^2}\right) \quad (76)$$

Under Assumption $a$, listed herein, $$\frac{4\pi^2 y_0^2}{\lambda^2}$$

may be neglected and (76) becomes the approximation:

$$C = \sqrt{\frac{g\lambda}{2\pi}} = 2.265\sqrt{\lambda} \quad (77)$$

The wave train velocity along the boat course is given by:

$$c = \frac{C}{\cos \beta} \quad (78)$$

Appendix B.—Pitch and heave control requirements for minimum draft and limited acceleration Consider a single hydrofoil flying through a sinusoidal wave train with a sinusoidal flight path of the same wave length and phase as the wave train. The frequency of wave encounter is given by:

$$\omega = \frac{2\pi(v \cos \beta + C)}{\lambda} = \frac{2\pi(v \cos \beta \pm 2.265\sqrt{\lambda})}{\lambda} \quad (79)$$

With the amplitude of vertical hydrofoil displacement and acceleration expressed as $$h_0 \text{ and } (\ddot{h})_0$$

respectively, the simple harmonic vertical motion of the hydrofoil requires that:

$$(\ddot{h})_0 = h_0 \omega^2 \quad (80)$$

The combination of (77), (79) and (80) gives:

$$h_0 = \frac{(\ddot{h})_0 \lambda^2}{4\pi^2 (v \cos \beta \pm 2.265\sqrt{\lambda})^2} \quad (81)$$

The flying draft variance $d$ is of course twice the difference between the wave amplitude $y_0$ and flight path amplitude $h_0$ or:

$$d = 2(y_0 - h_0) \quad (82)$$

Combining (81) and (82) and substituting $\lambda/R$ for $y_0$ gives:

$$d = \frac{2\lambda}{R} - \frac{(\ddot{h})_0 \lambda^2}{2\pi^2 (v \cos \beta \pm 2.265\sqrt{\lambda})^2} \quad (83)$$

Consider further that $$(\ddot{h})_0$$

is taken as the tolerable limit on the amplitude of acceleration which is $$(\ddot{h})_t$$

Then (83) becomes:

$$d_r = \frac{2\lambda}{R} - \frac{(\ddot{h})_t \lambda^2}{2\pi^2 (v \cos \beta \pm 2.265\sqrt{\lambda})^2} \quad (60)$$

which is the equation plotted in FIG. 18.

Appendix C.—Pitch and heave control signals and coupling parameters for zero flying draft variance in long waves Referring to FIG. 17, consider an angle controlled tandem hydrofoil boat flying in a wave train moving to the left. The $xy$ rectagular coordinate system shown moves with the wave train. The boat velocity with respect to the moving coordinates is $v+c$.

For the purposes of this section it is assumed that each hydrofoil is located at the center of percussion of the boat with respect to a center of oscillation at the other hydrofoil. Under this assumption the boat may be considered as two concentrated masses with one mass at each hydrofoil.

Since the velocity with respect to the moving coordinate system of a water particle near the water surface must be parallel to the water surface, the forward hydrofoil angle setting for zero flying draft variance measured with respect to the setting for zero lift in smooth water is:

$$\alpha_f = \frac{h_f - h_a}{b} - \frac{\dot{h}_f}{v+c} - \frac{w_f \ddot{h}_f}{gKq} + \frac{w_f}{Kq} \quad (84)$$

The hydrofoil angle setting of an aft hydrofoil for zero flying draft variance is:

$$\alpha_a = \frac{h_f - h_a}{b} - \frac{\dot{h}_a}{v+c} - \frac{w_a \ddot{h}_a}{gKq} + \frac{w_a}{Kq} \quad (85)$$

In view of the assumption $j$ listed herein, the wave surface depth at the points $x_f$ and $x_a$ can be expressed as a three term Taylor's expansion thus:

$$y_1 = y_f + l\frac{dy_f}{dx_f} + \frac{l^2}{2}\frac{d^2 y_f}{dx_f^2} \quad (86)$$

$$y_a = y_f - b\frac{dy_f}{dx_f} + \frac{b^2}{2}\frac{d^2 y_f}{dx_f^2} \quad (87)$$

$$y_2 = y_f - (b-l)\frac{dy_f}{dx_f} + \frac{(b-l)^2}{2}\frac{d^2 y_f}{dx_f^2} \quad (88)$$

With zero flying draft variance any $h$ equals the $y$ with the same subscript. Converting the derivations with respect to time to derivations with respect to $x$ in (84) by using the boat velocity ($v+c$) with respect to the coordinate system and then combining (84) and (87):

$$\alpha_f = \frac{w_f}{Kq} - \left[\frac{b}{2} + \frac{w_f(v+c)^2}{gKq}\right]\frac{d^2y_f}{dx_f^2} \quad (89)$$

Similarly the combination of (85) and (87) gives:

$$\alpha_a = \frac{w_a}{Kq} + \frac{dy_f}{dx_f} - \frac{b}{2}\frac{d^2y_f}{dx_f^2} - \frac{dy_a}{dx_a} - \frac{w_a(v+c)^2}{gKq}\frac{d^2y_a}{dx_a^2} \quad (90)$$

With $d^2y/dx^2$ constant in accordance with assumption $j$ listed herein:

$$\frac{d^2y_f}{dx_f^2} = \frac{d^2y_a}{dx_a^2} \quad (91)$$

and $$\frac{dy_f}{dx_f} - \frac{dy_a}{dx_a} = b\frac{d^2y_f}{dx_f^2} \quad (92)$$

then (90) becomes:

$$\alpha_a = \frac{w_a}{Kq} + \left[\frac{b}{2} - \frac{w_a(v+c)^2}{gKq}\right]\frac{d^2y_a}{dx_a^2} \quad (93)$$

With the sensors following the water surface in accordance with assumption $f$, listed herein, the signal deflections of the sensors are:

$$\delta_1 = y_1 - h_1 \quad (94)$$

$$\delta_2 = y_2 - h_2 \quad (95)$$

From the geometry of FIG. 17, $$h_1 = h_f\left(1 + \frac{l}{b}\right) - \frac{lh_a}{b} \quad (96)$$

$$h_2 = \frac{l}{b}h_f + \left(1 - \frac{l}{b}\right)h_a \quad (97)$$

Then using the conditions of zero flying draft variance, (86), (87), (94) and (96) combine to form:

$$\delta_1 = \frac{l}{2}(b+l)\frac{d^2y_f}{dx_f^2} \quad (98)$$

Similarly (87), (88), (95) and (97) combine to form:

$$\delta_2 = \frac{l}{2}(1-b)\frac{d^2y_f}{dx_f^2} \quad (99)$$

Combining (89) and (98) to eliminate $d^2y_f/dx_f^2$ gives:

$$\alpha_f = \frac{w_f}{Kq} - \left[\frac{b}{l(b+l)} + \frac{4w_f(v+c)^2}{v^2\rho lKg(b+l)}\right]\delta_1 \quad (100)$$

Combining (93) and (99) to eliminate $d^2y_f/dx_f^2$ gives:

$$\alpha_a = \frac{w_a}{Kq} - \left[\frac{b}{l(b-l)} - \frac{4w_a(v+c)^2}{v^2\rho lKg(b-l)}\right]\delta_2 \quad (101)$$

From the definitions of $A_{fn}$ and $A_{an}$ (100) and (101) become:

$$\alpha_f = \frac{w_f}{Kq} - \frac{A_{fn}}{1}\delta_1 \quad (61)$$

$$\alpha_a = \frac{w_a}{Kq} - \frac{A_{an}}{1}\delta_2 \quad (62)$$

Appendix D.—Analysis of pitch and heave motions in waves

Referring to FIG. 17, the forward sensor is mounted on the sensor shaft 75. In smooth water, the planing point of the sensor ski rides at the water surface and the draft of the sensor ski is $d_p$. In waves, $d_s$ is the instantaneous submergence of the planing point.

The upward hydrodynamic force perpendicular to the sensor radius $r_s$ can be approximately expressed by:

$$N = K_p av^2(d_p + d_s)\left(\alpha_p + \frac{\dot{d}_s}{v}\right) \quad (102)$$

Performing the indicated multiplications, neglecting $$\frac{d_s \dot{d}_s}{v}$$

on the basis of assumption $a$, listed herein, (102) becomes:

$$N = K_p av^2 d_p \alpha_p + K_p avd_p \dot{d}_s + K_p av^2 \alpha_p d_s \quad (103)$$

Dynamic equilibrium in view of assumption $m$, listed herein is expressed by:

$$N - nv^2 = -m_s \ddot{\delta}_1 \quad (104)$$

Eliminating N from (103) and (104) gives:

$$K_p av^2 d_p \alpha_p - nv^2 + K_p avd_p \dot{d}_s + K_p av^2 \alpha_p d_s + m_s \ddot{\delta}_1 = 0 \quad (105)$$

Taking $\alpha_p$ as constant in accordance with assumption $l$, listed herein, the first two terms of (105) represent equal and opposite forces which cancel. Replacing $d_s$ with ($\delta_1 + h_1 - y_1$) on the basis of FIG. 17, $K_p avd_p$ with $C_s$, and $K_p av^2\alpha_p$ with $K_s$, (105) becomes:

$$K_s(\delta_2 + h_2 - y_2) + C_s(\dot{\delta}_2 + \dot{h}_2 - \dot{y}_2) + m_s \ddot{\delta}_2 = 0 \quad (106)$$

A similar development applies to each aft sensor thus:

$$K_s(\delta_1 + h_1 - y_1) + C_s(\dot{\delta}_1 + \dot{h}_1 - \dot{y}_1) + m_s \ddot{\delta}_1 = 0 \quad (107)$$

If the sensors are designed so as to make the error in following the water surface neglectable, then (106) and (107) may be considered filter equations where, in either equation, the sensor signal to the filter is ($y - h$) and the filter output signal is $\delta$.

From the geometry of the boat base line with respect to the mean water level:

$$h_1 = h_a + (h_f - h_a)\left(\frac{b+l}{b}\right) \quad (108)$$

$$h_2 = h_a + (h_f - h_a)\frac{l}{b} \quad (109)$$

(61) and (62) synthesized in Appendix C, with the specific coefficient $A_{fn}$ and $A_{an}$ replaced with as yet undetermined coefficients $A_f$ and $A_a$ and with first order smoothing added, become:

$$\alpha_f + E\dot{\alpha}_f = \frac{w_f}{Kq} - \frac{A_f}{l_1}\delta_1 \quad (63)$$

$$\alpha_a + E\dot{\alpha}_a = \frac{w_a}{Kq} - \frac{A_a}{l_2}\delta_2 \quad (64)$$

Since this analysis is concerned only with variations, (63) and (64) may be written:

$$\bar{\alpha}_f + E\dot{\bar{\alpha}}_f = -\frac{A_f}{l_1}\delta_1 \quad (63v)$$

$$\bar{\alpha}_a + E\dot{\bar{\alpha}}_a = -\frac{A_a}{l_2}\delta_2 \quad (64v)$$

First order smoothing, represented in (63v) and (64v) by the terms with the coefficient E, is introduced in the control by the servo linkage and valve action in accordance with assumption $o$, listed herein.

The upward force on each hydrofoil is determined by multiplying the angle of attack of the hydrofoil by $S q k$, thus:

$$F_f = \left[\frac{(h_a - h_f)}{b} + \bar{\alpha}_f + \frac{\dot{h}_f}{v} - \frac{c}{v}\frac{dy_f}{dx_f}\right]S_f qk \quad (110)$$

$$F_a = \left[\frac{-(h_a - h_f)}{b} + \bar{\alpha}_a + \frac{\dot{h}_a}{v} - \frac{c}{v}\frac{dy_a}{dx_f}\right]S_a qk \quad (111)$$

Dynamic equilibrium of the boat mass in the vertical direction requires that:

$$F_f + F_a = -M\left[\ddot{h}_a + \frac{e}{b}(\ddot{h}_f - \ddot{h}_a)\right] \quad (112)$$

Dynamic equilibrium of the boat in rotation about a horizontal transverse axis through the center of gravity requires:

$$F_f(b-e) - F_a e = \frac{Mr^2}{b}(\ddot{h}_a - \ddot{h}_f) \qquad (113)$$

Solving (112) and (113) for $F_f$ and $F_a$ gives:

$$F_f = -\frac{Me}{b}\left[\ddot{h}_a + \frac{e}{b}(\ddot{h}_f - \ddot{h}_a)\right] + \frac{Mr^2}{b^2}(\ddot{h}_a - \ddot{h}_f) \qquad (114)$$

$$F_a = -\frac{M(b-e)}{b}\left[\ddot{h}_a + \frac{e}{b}(\ddot{h}_f - \ddot{h}_a)\right] - \frac{Mr^2}{b^2}(\ddot{h}_a - \ddot{h}_f) \qquad (115)$$

Eliminating $F_f$ from (110) and (114), $F_a$ from (111) and (115), converting the derivatives with respect to $x$ to derivatives with respect to time by using the boat velocity, $(v+c)$, with respect to the moving coordinant system gives:

$$S_f q k \left[\frac{(h_a - h_f)}{b} + \bar{\alpha}_f + \frac{\dot{h}_f}{v} - \frac{c}{v}\frac{\dot{y}_f}{(v+c)}\right]$$
$$= -\frac{Me}{b}\left[\ddot{h}_a + \frac{e}{b}(\ddot{h}_f - \ddot{h}_a)\right] + \frac{Mr^2}{b^2}(\ddot{h}_a - \ddot{h}_f) \qquad (116)$$

$$S_a q k \left[\frac{(h_a - h_f)}{b} + \bar{\alpha}_a + \frac{\dot{h}_a}{v} - \frac{c}{v}\frac{\dot{y}_a}{(v+c)}\right]$$
$$= -\frac{M(b-e)}{b}\left[\ddot{h}_a + \frac{e}{b}(\ddot{h}_f - \ddot{h}_a)\right] - \frac{Mr^2}{b^2}(\ddot{h}_a - \ddot{h}_f) \qquad (117)$$

Using (108), (109), (63v) and (64v) to eliminate $h_1$, $h_2$, $\delta_1$ and $\delta_2$ from (106) and (107) and taking $l_1 = l = l_2$ gives:

$$K_s\left[-\frac{(\bar{\alpha}_f + E\dot{\alpha}_f)1}{A_f} + h_a + (h_f - h_a)\frac{(b+1)}{b} - y_1\right]$$
$$+ C_s\left[-\frac{(\dot{\alpha}_f + E\ddot{\alpha}_f)1}{A_f} + \dot{h}_a + (\dot{h}_f - \dot{h}_a)\frac{(b+1)}{b} - \dot{y}_1\right]$$
$$- \frac{m_s(\ddot{\alpha}_f + E\dddot{\alpha}_f)1}{A_f} = 0 \qquad (118)$$

$$K_s\left[\frac{(\bar{\alpha}_a + E\dot{\alpha}_a)l}{A_a} + h_a + (h_f - h_a)\frac{1}{b} - y_2\right] +$$
$$C_s\left[\frac{(\dot{\alpha}_a + E\ddot{\alpha}_a)l}{A_a} + \dot{h}_a + (\dot{h}_f - \dot{h}_a)\frac{1}{b} - \dot{y}_2\right] - m_s(\ddot{\alpha}_a + E\dddot{\alpha}_a)l = 0 \qquad (119)$$

Eliminating $\alpha_f$ from (116) and (118) and $\alpha_a$ from (117) and (119), replacing $t$ with the dimensionless $\tau$, using the dimensionless operator $P_d$, and otherwise converting to dimensionless form, gives:

$$\left[\frac{(b+l)(1+C_d p_d)A_f}{l(1+C_d p_d + m_d p_d^2)(1+E_d p_d)} - 1 + p_d + M_f\left(\frac{e}{b} + \frac{r^2}{be}\right)p_d^2\right]\frac{h_f}{b} -$$
$$\left[\frac{(1+C_d p_d)A_f}{(1+C_d p_d + m_d p_d^2)(1+E_d p_d)} - 1 - M_f\left(\frac{b-e}{b} - \frac{r^2}{be}\right)p_d^2\right]\frac{h_a}{b} =$$
$$\left[\frac{\lambda(1+C_d p_d)A_f}{l(1+C_d p_d + m_d p_d^2)(1+E_d p_d)}\right]\frac{y_1}{\lambda} + \left[\frac{\lambda c}{b(v+c)}p_d\right]\frac{y_f}{\lambda} \qquad (120)$$

$$\left[\frac{(1+C_d p_d)A_a}{(1+C_d p_d + m_d p_d^2)(1+E_d p_d)} - 1 + M_a\left(\frac{e}{b} - \frac{r^2}{b(b-e)}\right)p_d^2\right]\frac{h_f}{b} -$$
$$\left[\frac{(-lb)(1+C_d p_d)A_a}{l(1+C_d p_d + m_d p_d^2)(1+E_d p_d)} - 1 - p_d - \right.$$
$$\left. M_a\left(\frac{b-e}{b} + \frac{r^2}{b(b-e)}\right)p_d^2\right]\frac{h_a}{b} =$$
$$\left[\frac{\lambda(1+C_d p_d)A_a}{l(1+C_d p_d + m_d p_d^2)(1+E_d p_d)}\right]\frac{y_2}{\lambda} + \left[\frac{\lambda c}{b(v+c)}p_d\right]\frac{y_a}{\lambda} \qquad (121)$$

Setting $y_1$, $y_2$, $y_f$ and $y_a$ all equal to zero in (120) and (121) and applying the criteria of Routh (Reference 13) indicates that the system represented is stable for the dimensions of High Tail and the ranges of other parameters of interest.

(120) and (121) may be abbreviated as:

$$Z_3\frac{h_f}{b} + Z_4\frac{h_a}{b} = Y_1 \qquad (122)$$

$$Z_5\frac{h_f}{b} + Z_4\frac{h_a}{b} = Y_2 \qquad (123)$$

Solving (122) and (123) for the boat motions gives:

$$\frac{h_f}{b} = \frac{Y_1 Z_6 - Y_2 Z_4}{Z_3 Z_6 - Z_5 Z_4} \qquad (124)$$

$$\frac{h_a}{b} = \frac{Y_2 Z_3 - Y_1 Z_5}{Z_3 Z_6 - Z_5 Z_4} \qquad (125)$$

With the wave length $\lambda$, the functionally related wave velocity $c$, the control parameters $C_d$, $m_d$, $E_d$, $A_f$ and $A_a$, the mass $M$, the radius of gyration of the boat $r$, and the dimensions of the boat all given, the flying draft variances $d_f$ and $d_a$ and the other variables are determined by solving (124) and (125) with the well known method of substituting $\omega_n \sqrt{-1}$ for $p_d$ and dropping the imaginary component of the result.

(124) and (125) thus become the basis of finding optimums, considering all wave lengths $\lambda$ and corresponding wave velocities $c$, for the sensor lead $l$, the control coupling factors $A_f$ and $A_a$, the damping and inertia parameters $C_d$ and $m_d$, and the smoothing parameter E.

To examine the effect of changes in the total weight and changes in the division of weight between forward and aft hydrofoils consider the case in which the mass and mass distribution of the boat are appropriately represented by two masses, one at each hydrofoil. In this case both the coefficients $$\left(\frac{b-e}{b} - \frac{r^2}{be}\right) \text{ and } \left(\frac{e}{b} - \frac{r^2}{b(b-e)}\right)$$

in (120) and (121) become zero and each of the coefficients $$\left(\frac{e}{b} + \frac{r^2}{be}\right)$$

and $$\left(\frac{b-e}{b} + \frac{r^2}{b(b-e)}\right)$$

in the same equations become one. Thus (120) and (121) become independent of the total mass or the division of mass between forward and aft hydrofoils so long as the loadings per square foot on the forward and aft hydrofoils, represented by $M_f$ and $M_a$ respectively, are unchanged.

Study of the effect of introducing a signal filter on the basis of (124) and (125) and the choice of the parameters $C_d$ and $m_d$, indicates that an improvement in control operation is possible for a given wave length. But such improvement does not appear practical because of the poor operation indicated at other wave lengths, which might be simultaneously present. This same mathematical result indicates that large errors in sensor following are a disadvantage. It is, therefore, concluded that $C_s$ and $m_s$ should be small. Setting $C_s$ and $m_s$ equal to zero, and introducing the approximation mentioned above of representing the boat mass as two concentrated masses, one at each hydrofoil, in (120) and (121), gives:

$$\left[\frac{(b+l)A_f}{l(1+E_d p_d)} - 1 + p_d + M_f p_d^2\right]\frac{h_f}{b} - \left[\frac{A_f}{(1+E_d p_d)} - 1\right]\frac{h_b}{b} =$$
$$\frac{\lambda}{l}\frac{A_f}{(1+E_d p_d)}\frac{y_1}{\lambda} + \frac{\lambda}{b}\frac{c}{(v+c)}p_d\frac{y_f}{\lambda} \qquad (126)$$

$$\left[\frac{A_a}{(1+E_d p_d)}-1\right]\frac{h_f}{b}-\left[\frac{(1-b)A_a}{l(1+E_d p_d)}-1-p_d-M_a p_d^2\right]\frac{h_a}{b}=$$
$$\frac{\lambda}{1}\frac{A_a}{(1+E_d p)}\frac{y_2}{\lambda}+\frac{\lambda}{b}\frac{c}{(v+c)}p_d\frac{y_a}{\lambda}$$
(127)

the solutions of which are obtained with the same method as used for (120) and (121).

Flying performance in waves

High Tail was operated in waves visually estimated 60 to 90 feet in wave length with maximum wave heights of 4 to 6 feet respectively. With computer settings of $A_f=.88$ and $A_a=0$ in a head sea and $A_f=.88$ and $A_a=.88$ in a following sea, the performance as judged visually without recording instruments was about as predicted in Table II. With computer settings of $A_f=.88$ and $A_a=0$ in a following sea, increased flying draft variance caused brief racing of the engine due to broaching of the propeller as each wave was traversed. No such difficulty was observed with $A_f=.88$ and $A_a=.88$ in a following sea.

Some conclusions

It has been concluded:

That the dynamic behavior of a hydrofoil boat in waves should be such as to minimize flying draft variance to reduce the hydrofoil draft increment and thereby reduce drag, increase the pay load and enlarge areas of flying operation;

That to fly in waves of any single wave length, with any single wave train velocity direction with respect to the boat course, and with an ideal control, requires a hydrofoil draft increment that increases: (a) with decrease in the limiting tolerable vertical acceleration, (b) with decrease in the wave length-amplitude ratio, and (c) with increase in forward speed of the boat;

That at a critical head sea wave length the maximum flying draft variance occurs which added to the lift draft determines the smallest possible hydrofoil draft increment;

That the flying draft variance required is a minimum if the control places the flight path in phase with the wave profile at the critical wave length even though the flight path is not in phase with wave profile at other wave lengths so long as the tolerable vertical acceleration is not exceeded and the flying draft variance does not exceed that for the critical wave length;

That the maximum flying draft variance without aft hydrofoil pitch and heave control may be more than double that possible with aft hydrofoil surface sensing pitch and heave control and that therefore the omission of aft hydrofoil pitch and heave control may double the hydrofoil draft increment required and correspondingly increase the propeller draft needed (Appendix D);

That to achieve minimum flying draft variance and therefore minimum hydrofoil draft increment the sensor lead must be near optimum (Appendix D);

That optimum sensor lead can apparently be practically obtained for a forward hydrofoil with a forward extending mechanical sensor and obtained for aft hydrofoils with rearward extending mechanical sensors provided the boat is not so large as to preclude adequately high natural frequencies of the sensor arms;

That first order smoothing of the sensor signal is desirable to reduce high frequency accelerations (Appendix D); and That neither second order filtering nor large sensor movement relative to the water surface is desirable (Appendix D).

Hydrofoil boat with hydrofoil sensing

GENERAL DESCRIPTION

The second principal embodiment is a hydrofoil boat with hydrofoil sensing, having three fully submerged hydrofoils, two aft and one forward, with the latter rotated about an upright axis for steering. The fully submerged hydrofoil configuration, steering scheme, and retraction mechanism may be substantially the same as described for Hight Tail in connection with FIGS. 3, 4A and 5A. Because the hydrofoil and sensor configuration as shown in FIGS. 20 through 23 is symmetrical with respect to a vertical longitudinal center plane, the structure described below for the starboard side is also representative of the port side. Therefore, for simplification the port side is not completely described.

Referring to FIGS. 20 through 24, the hull 1001 is supported above the water line 1000 during operation of the boat by fully submerged forward hydrofoil 1002 and by fully submerged aft hydrofoils. The hydrofoil 1002 extends generally beamwise of the boat. The hydrofoil 1002 is provided with an upward extending portion 1005 on the starboard side which is attached to strut 1003 at the pivot 1006. A similar attachment is provided between the hydrofoil 1002 and the strut 1004 at the pivot 1006' on the port side.

Coupling arm 1007 is rigidly attached to the hydrofoil 1002 and extends forward therefrom. Arm 1007 is pivotally attached at 1010 to surface-piercing sensing hydrofoil 1011. Double-crotched link 1008 is pivotally attached to the strut 1003 at 1015 and double-crotched link 1009 is similarly attached to strut 1003 at 1014. The links 1008 and 1009 extend forwardly and are pivotally attached to the sensing hydrofoil 1011 at 1012 and 1013 respectively. The hydrofoil 1011 has high dihedral, i.e., from 35° to 70° to avoid ventilation and to reduce sensitivity to pitch and elevation changes.

A straight line extending aft from pivot attachment 1010 to the axis of pivots 1006 and 1006', straight lines extending aft from pivot attachments 1012 and 1013 to pivot attachments 1015 and 1014 respectively, and corresponding straight lines for the starboard side of the boat are all equal in length and parallel. With this arrangement as the hydrofoil 1002 rotates about a beamwise axis through the pivots 1006 and 1006', the sensing hydrofoil 1011 translates up or down.

Attached to and extending forwardly from hull 1001, there may be provided a suitable mounting member 1016 having a forward extending portion 1017, an upward extending portion 1018, and a rearward extending portion 1019. The latter is attached to the hull 1001, with the connecting member 1020. The steered member 1023 is mounted between the portions 1017 and 1019 for rotation about the upright king pin 1021. Member 1023 supports the tubular cross member 1024. The latter extends substantially beamwise when the boat is on a straight course and rotates with member 1023 for steering. The tubular cross member 1024 rigidly supports the struts 1003 and 1004.

Shaft 1025 may extend from inside the hull through member 1016. Within the hull, means (not shown) are provided to produce rotation of shaft 1025 for steering the boat. Fixedly attached to the portion of shaft 1025 which extends outside the hull there may be provided crank 1026, to which may be pivotally attached link 1028 at the pin 1027. Link 1028 may be pivotally attached to member 1023 at 1029 so that rotational movement of shaft 1025 will cause rotational movement of the struts 1003 and 1004 and the hydrofoils 1002 and 1011 about the king pin 1021 for steering the boat.

On the starboard side, a single-acting hydraulic coupling cylinder 1030 is pivotally connected to a projecting portion of the strut 1002 at 1031. The ram 1029 of the cylinder 1030 extends downwardly to a pin connection 1032 to the link 1009. When the fluid pressure (fluid connection not shown) is applied to cylinder 1030 the ram 1029 exerts a downward force on the pin connection 1032 and therefore a downward force on the sensing hydrofoil 1011. A soft compression spring 1033 (not shown) within the lower portion of the cylinder 1030 acts to counterbalance the weight of the sensing hydrofoil 1011 and to position the hydrofoil 1022 with its chord approximately horizontal when the boat is floating stationary and there is no pressure in the cylinder 1030. On the port side forward, a second hydraulic coupling cylinder 1030', spring 1033', etc., are provided corresponding to cylinder 1030, spring 1033, etc., respectively on the starboard side.

Referring to FIG. 22, the aft starboard hydrofoil 1042 extends generally beamwise of the boat. Hydrofoil 1042 is provided with upward extending portions 1045 and 1045' which are pivotally attached to the struts 1043 and 1044 at 1046 and 1046'. Struts 1043 and 1044 may be attached to transversely extending tube 1064. The latter is rigidly supported by the mounting member 1056 attached to the hull 1001.

Coupling arm 1047 is rigidly attached to the hydrofoil 1042 and extends forward therefrom. Arm 1047 is pivotally attached at 1050 to the surface-piercing sensing hydrofoil 1051. Double-crotched link 1048 is pivotally attached to the strut 1043 at 1055, and double-crotched link 1049 is similarly attached to strut 1043 at 1054. The links 1048 and 1049 extend forwardly and are pivotally attached to the sensing hydrofoil 1051 at 1052 and 1053 respectively. The hydrofoil has high dihedral, i.e., from 35° to 70° to avoid ventilation and to reduce sensitivity to pitch and elevation changes.

A straight line extending aft from the pivot attachment 1050 to the axis of the pivots 1046 and 1046', straight lines extending aft from the pivot attachments 1052 and 1053 to the pivot attachments 1055 and 1054 respectively, are all equal in length and parallel. Thus as the hydrofoil 1042 rotates about a beamwise axis through the pivots 1046 and 1046', the sensing hydrofoil 1051 translates up or down.

On the starboard side a single-acting hydraulic coupling cylinder 1070 is pivotally connected to a projecting portion of the strut 1043 at 1071. The ram 1072 of the cylinder 1070 extends downwardly to a pin connection 1073 to the link 1049. When fluid pressure (fluid connection not shown) is applied to the cylinder 1070, the ram 1072 exerts a downward force on the pin connection 1073 and therefore a downward force on the sensing hydrofoil 1051. A soft compression spring 1074 (not shown) within the lower portion of the cylinder 1070 acts to counterbalance the weight of the sensing hydrofoil 1051 and to position the hydrofoil 1002 with its chord approximately horizontal when the boat is floating stationary and there is no pressure in the cylinder 1070.

At the stern on the port side a second hydrofoil 1042', struts, tube 1064', sensing hydrofoil, hydraulic coupling cylinder 1070', etc., are provided corresponding to the hydrofoil 1042, struts, tube 1064, sensing hydrofoil, hydraulic cylinder 1070, etc., respectively on the starboard side.

Propeller 1081 adapted to propell the boat may be mounted on a shaft extending forwardly within the housing 1080 and may be protected by the skeg 1082. Retraction apparatus (not shown) may be provided for: (a) rotating the forward hydrofoil-strut unit forward and upward about the axis of the tubular cross member 1014, (b) rotating the aft hydrofoil-strut unit aft and upward about the axis of the tubes 1064 and 1064', and (c) raising the propeller up to a position near the bottom of the hull 1001 forward of the rudder 1083, the latter being used for steering when the hydrofoils and propeller are retracted.

INVARIANT HINGED HYDROFOIL

About nine-tenths of the weight of the boat described above is carried on the horizontal fully submerged hydrofoils and the remaining weight is carried by the partially submerged sensing hydrofoils. With an invariant hinged fully submerged hydrofoil the hydrodynamic moment about the hydrofoil hinge or pivot axis is substantially independent of the angle of attack of the hydrofoil and therefore approximately proportional to the square of the boat speed. With the surface-piercing sensing hydrofoil mechanism described above the reaction of the hydrodynamic moment in question is sustained by the lift of the sensing hydrofoil. Since both the lift for a given submergence of a sensing hydrofoil and the hydrodynamic reaction on the sensing hydrofoil from the connected invariant hinged hydrofoil vary with the square of the boat speed, it follows that the submergence of such a sensing hydrofoil not otherwise loaded is independent of the boat speed.

Referring to FIG. 20, for example, it is clear that if the submergence of the sensing hydrofoil 1011 is constant an increase in depth of the pivot 1006 and therefore a decrease in elevation of the boat is necessary in order to increase the angle of the hydrofoil 1002 as is necessary when the flying speed is reduced. However, since the lead, i.e., the distance between pivot 1006 and pivot connection 1010, is relatively small the change in elevation of the boat with change in speed is also small.

At a given speed an increase in the relative water surface elevation increases (decreases) the lift on the sensing hydrofoil 1011 causing it to climb (descend). This increases (decreases) the angle of the fully submerged hydrofoil 1002 either causing it also to climb (descend) as it follows the sensing hydrofoil 1011 upward (downward), or to sustain a higher (lower) dynamic load.

At a given speed and pitch angle of the boat, an increase in load increases the angle of attack of any fully submerged hydrofoil involved but does not increase the load on the sensing hydrofoil. Thus the sensing hydrofoil submergence is unchanged by boat load other things being equal.

On a turn, the nonsymmetry of the aft sensing hydrofoils has the advantage of introducing either an inward roll or an inward rolling moment.

To explain the resistance of the system to pitch, consider that the boat has initially a small positive pitch, i.e., that the flying water plane is above the water surface at the bow and below the water surface at the stern. Under this condition, the aft sensing hydrofoils have higher than their equilibrium submergence so that the stern will climb. The bow sensing hydrofoil will have either more or less than its equilibrium submergence. In the former case, the bow will also ascend. But, being higher than the stern initially, the bow sensing hydrofoil will reach its equilibrium submergence first. As the stern continues to ascend, the pitch is removed. On the other hand, if the bow sensing hydrofoil has less than its equilibrium submergence, the bow will then descend, accelerating the return to zero pitch.

Thus without coupling to the steering system and without making a manual adjustment as a function of speed, the flying draft of the hydrofoils can be regulated within close limits provided the waves are not critical. (For critical wave lengths, near optimum sensor lead is needed as in the High Tail embodiment. Such a lead is awkward with a sensing hydrofoil.) Because the decrease in boat elevation with decrease in flying speed is small, added coupling means is required to lower (raise) the hull to (from) the water surface during deceleration (acceleration) to avoid stalling of the fully submerged hydrofoils. Both of these operations are accomplished automatically with the hydraulic apparatus described next. This coupling apparatus also provides for manual lowering of the hull to the water surface at any flying speed to facilitate a quick stop in an emergency.

HYDRAULIC ELEVATION ADJUSTMENT

FIG. 24 shows schematically the hydraulic circuit for supplying fluid pressure to the cylinders 1030, 1030', 1070 and 1070' and connected accumulator 1086. Pilot pump 1087, having constant displacement, is driven directly from propeller shaft 1088. Fluid delivery of pilot pump 1087 flows through fixed restrictor 1098 to drain 1090. Since at flying speeds the propeller shaft rotational speed is approximately proportional to the forward speed of the boat, the pressure ahead of the restrictor 1089 is approximately proportional to $q$ and will therefore be designated as Q. Q pressure is transmitted to two-position three-way spring returned manually operated valve 1091. Valve 1091 is also connected to drain 1090 and to single-acting pilot cylinder 1092. In its spring held position $f$ valve 1091 conducts Q pressure to cylinder 1092. In its manual held position $g$ valve 1091 drains cylinder 1092. Cylinder 1092 with spring 1093 determines the position of two-position three-way pilot valve 1094. Pilot line 1095 transmits the pilot pressure from pilot valve 1094 to double-acting pilot cylinder 1096 which determines the position of three-position three-way valve 1097. Constant displacement pump 1098 also driven from propeller shaft 1088, delivers fluid to valve 1097. Valve 1097 is also connected to: drain 1090, pilot cylinder 1096, accumulator 1086, and cylinders 1030, 1030', 1070 and 1070'. Whenever the pressure in the accumulator 1086 is less than, equal to or greater than the pilot pressure in line 1095, the valve 1097 is positioned at $a$, $b$ or $c$ respectively by the pilot cylinder 1096. Thus the valve 1097 controls the flow to and from the accumulator 1086 causing the accumulator pressure to approach the pilot pressure in line 1095.

In operation valve 1091 is in spring held position $f$ except in an emergency. At flying speeds when Q exceeds $Q_u$, valve 1094 is positioned at $e$ which reduces the pilot pressure to zero by draining pilot line 1095. Cylinder 1096 responds by positioning valve 1097 at $c$ which reduces the pressure in cylinders 1030, 1030', 1070 and 1070' to zero by draining accumulator 1086. At less than flying speeds, Q is less than $Q_u$, valve 1094 is positioned at $d$, the pilot pressure in line 1095 becomes Q and cylinder 1096 actuates valve 1097 to bring the accumulator pressure also to Q. Introduction during flight of Q pressure into cylinders 1030, 1030', 1070 and 1070', increases the load on all sensing hydrofoils which increases their submergence and thereby lowers the hull onto the water at any speed. Ordinarily such lowering only occurs at speed $v_u$ during deceleration. For a quick emergency deceleration from any flying speed, valve 1091 can be placed manually at $g$ draining cylinder 1092. This positions valve 1094 at $d$ and thus conducts Q pressure to cylinder 1096. Cylinder 1096 actuates valve 1097 to bring the pressure in accumulator 1086 and in cylinders 1030, 1030', 1070 and 1070' to Q. The resulting loads on the sensing hydrofoils lower the hull to the water surface where the hull resistance rapidly decelerates the boat.

The use of a pressure proportional to $v^2$ to change the elevation of the boat by changing the submergence of the sensing hydrofoil as described, has the advantage that the change in elevation is approximately independent of the boat speed. Thus the change in elevation is dependent on the size of the restrictor 1089 but not on the boat speed.

The combination of a constant displacement pump directly connected to the propeller shaft and a fixed restrictor for producing Q pressure as described above is a dynamic pressure sensor. Refinement can be introduced in such a dynamic pressure sensor by correcting the signal for propeller slip with a function unit having propeller torque and speed as inputs. But this is ordinarily unnecessary for the purpose of automatic or manual elevation change as described.

The balance of the hydraulic circuit as described is a sequence function unit. All of the hydraulic apparatus is part of the coupling means which operatively associates the fully submerged hydrofoils with the sensing hydrofoils.

FUNCTIONALLY HINGED HYDROFOILS

With a functionally hinged hydrofoil, the hydrofoil hinge or pivot axis is located forward of the location used for invariant hinging and the sensor lead is greater than that used with the invariant hinged hydrofoil. With functional hinging, the bottom clearance changes from zero at the lowest flying speed to design clearance at design speed without any load on the sensing hydrofoils other than the moment reaction from the functionally hinged hydrofoil, i.e., the hydraulic apparatus used with an invariant hinged hydrofoil for automatically adjusting the elevation of the boat is eliminated.

With the functionally hinged hydrofoil system the sensing hydrofoil submergence is no longer independent of load and speed as in the invariant hinged hydrofoil case because each sensing hydrofoil has a load component determined by the load on the connected fully submerged hydrofoil not present with the invariant hinged hydrofoil. The results for the functionally hinged hydrofoil system are: a smoother ride, a more flexible system and a wider configuration requirement.

ELEVATION-SPEED RELATIONSHIPS FOR SENSING HYDROFOIL SYSTEMS AND FOR HIGH TAIL'S SYSTEM COMPARED

FIG. 25 shows the functional relationships between elevation and speed (or $q$ pressure) in wave free water for three systems having about the same displacement, design speed, bottom clearance at design speed, fore and aft spacing of hydrofoils and hydrofoil area. The systems are the High Tail system, which is the first principal embodiment of the invention as described above and shown in FIGS. 1–13 and two sensing hydrofoil systems, which are variations of the second principal embodiment of the invention as described above and shown in FIGS. 20, 21, 22, 23, and 24, one variation with invariant hinged hydrofoils and the other with functionally hinged hydrofoils.

Referring to FIG. 25, the elevation-speed functional relationship for High Tail is shown as a solid horizontal line with a one foot step at speed $v_u$ indicating respectively the constant flying elevation maintained by High Tail's reciprocal function unit and the abrupt change in elevation at $v_u$ during acceleration or deceleration introduced by High Tail's seqence function unit. (The actual difference between High Tail's up and down speed has been disregarded in this connection.) The elevation-speed functional relationship for the sensing hydrofoil system with invariant hinged hydrofoils, defined by Equation 149, is shown as a nearly horizontal dashed line with an .83 foot step at speed $v_u$ indicating respectively the near to constant flying elevation maintained by this system and the abrupt change in elevation at $v_u$ during acceleration or deceleration introduced by the hydraulic sequence function unit of the system shown in FIG. 24. The abrupt change in elevation in question is represented by the term $h_{ef}$ in (149) which is a step function of $v$. The elevation-speed functional relationship for the sensing hydrofoil system with functionally hinged hydrofoils is shown as a dash-dot line as defined in Equation 167. With this system the change in elevation between the speeds $v_u$ and $v_d$ is the same as with the other two systems. But the change is continuous for the interval $v_u$ to $v_d$ rather than abrupt at $v_u$.

Analysis of sensing hydrofoil system with invariant hinged hydrofoils

DRAFT OF SENSING HYDROFOILS

Consider the operation of the second principal embodiment, as shown in FIGS. 20 through 24, in other than critical waves. The upward hydrodynamic forces $N_1$, $N_{2r}$ and $N_{2l}$ on the sensing hydrofoils may be expressed as $$N_1 = K_1 v^2 d_1 \alpha_1 \qquad (128)$$

$$N_{2r} = K_2 v^2 d_{2r} \alpha_{2r} \qquad (129)$$

$$N_{2l} = K_2 v^2 d_{2l} \alpha_{2l} \qquad (130)$$

Under assumption $q$, equilibrium of the sensing hydrofoils requires that $$N_1 = n_{i1}v^2 + n_{d1}v^2 \quad (131)$$

$$N_{2r} = N_{2l} = n_{i2}v^2 + n_{d2}v^2 \quad (132)$$

Under assumptions $p$ and $r$, the angles of attack $$\underline{\alpha}_1, \; \underline{\alpha}_{2r} \text{ and } \underline{\alpha}_{2l}$$

may be expressed as $$\underline{\alpha}_1 = \alpha_1 + \frac{(\dot{h}_1 - \dot{\alpha}_f l_i)}{v} \quad (133)$$

$$\underline{\alpha}_{2r} = \alpha_{2r} + \frac{(\dot{h}_2 - \dot{\alpha}_{ar} l_i)}{v} - K_t \theta \quad (134)$$

$$\underline{\alpha}_{2l} = \alpha_{2l} + \frac{(\dot{h}_2 - \dot{\alpha}_{al} l_i)}{v} + K_t \theta \quad (135)$$

In (134) and (135) the term $K_t\theta$ is the decrease (increase) in $$\alpha_{2r}$$

and the increase (decrease) in $$\alpha_{2l}$$

on a right (left) turn resulting from the motion to the left (right) of the aft sensing hydrofoils with respect to the water. Taking the case of smooth water for which $\dot{h}_1$, $\dot{h}_2$, $\dot{\alpha}_f$, $\dot{\alpha}_{ar}$ and $\dot{\alpha}_{al}$ are negligible under assumption $s$, (128) through (135) can be combined and solved for $d_1$, $d_{2r}$ and $d_{2l}$ giving:

$$d_1 = d_{p1} = \frac{n_{i1} + n_{d1}}{K_1 \alpha_1} \quad (136)$$

$$d_{2r} = d_{p2} = \frac{n_{i2} + n_{d2}}{K_2(\alpha_{2r} - K_t\theta)} \quad (137)$$

$$d_{2l} = d_{p2} = \frac{n_{i2} + n_{d2}}{K_2(\alpha_{2l} + K_t\theta)} \quad (138)$$

Since $n_{i1}$ and $n_{i2}$ are constants, since $n_{d1}$ and $n_{d2}$ are zero at flying speeds and constants for hull borne speeds, (136), (137) and (138) show (1) That the drafts of the forward sensing hydrofoils are constant at flying speeds and larger constants at hull borne speeds, (2) That the same conclusions apply to $d_{2r}$ and $d_{2l}$ on a straight course, and (3) That on a turn to the right (left) with a steering angle $\theta$ ($-\theta$), $d_{2r}$ is greater (less) than $d_{2l}$, i.e., the aft sensing hydrofoils produce an inward rolling moment or motion on a turn.

EQUATION OF VERTICAL MOTION FOR SENSING HYDROFOIL

On a straight course at design speed in a head or following sea of non-critical waves under assumptions ($i$) and ($p$) the equations of motion for the bow and stern are identical in form. For simplification only the equations of motion of the bow will be analyzed as representative of both the bow and stern. (128) and (133) when combined become:

$$n_{i1}v^2 = K_1 v^2 d_1 \left[ \alpha_1 + \frac{(\dot{h}_1 - \dot{\alpha}_f l_i)}{v} \right] \quad (139)$$

Using the equivalent, $d_1 = d_{p1} + h_1 - y_1 + \delta_1$, cancelling the constant terms, dropping terms of higher order on the basis of the small variations assumption $a$, and using the differential operation $p$, (139) becomes:

$$\left[ \frac{d_{p1}}{v} p + \alpha_1 \right] h_1 - l_i \left( \alpha_1 + \frac{d_{p1}}{v} p \right) \bar{\alpha}_f = \alpha_1 y_1 \quad (140)$$

ELEVATION OF HULL AS A FUNCTION OF SPEED

Continuing the analysis of the bow as representative of both bow and stern, the upward hydrodynamic force during flight on the forward hydrofoil is expressed by:

$$F_f + W_f = S_f q K \underline{\alpha}_f \quad (141)$$

It will be noted that the upward force shown in (141) is not all of the upward hydrodynamic force at the bow during flight, the upward force on the forward sensing hydrofoil being omitted. However, since the latter force at a given speed is constant, $F_f$ is the entire *variable* force on the bow during flight at a given speed.

The angle of attack $\alpha_f$ is given by $$\underline{\alpha} = \bar{\alpha}_f + \frac{w_f}{Kq} + \frac{\dot{h}_f}{v} \quad (142)$$

In smooth water $$\bar{\alpha}_f = \frac{\dot{h}_f}{v}$$

can be neglected under assumption $s$, and $\alpha_f$ equals $\underline{\alpha}_f$. Thus (142) becomes $$\alpha_f = \frac{w_f}{Kq} \quad (143)$$

Since a change in speed does not change the submergence of any sensing hydrofoil, as explained in connection with (136), (137) and (138), the change in elevation of the flying water plane when the speed is changed from design speed $v_d$ to another speed $v$ can be expressed by $$h_f = (\alpha_f - \alpha_{fd}) l_i \quad (144)$$

With the constant draft of the sensing hydrofoil, $d_p$, when it is loaded only by the moment reaction from the invariant hinge hydrofoil, $$\frac{h_f}{l_1} = -\frac{\delta_1}{l_1} = \bar{\alpha}_f \quad (145)$$

Under assumptions $b$ and $q$ in wave free water, equilibrium of moments about the forward hydrofoil hinge axis requires that:

$$K_1 v^2 d_1 \alpha_1 l_1 = l_i n_i v^2 \quad (146)$$

and equilibrium of vertical forces requires that:

$$K_1 v^2 d_1 \alpha_1 + W = W_t \quad (147)$$

Eliminating $d_1$ from (146) and (147) and using $$q = \frac{\rho v^2}{2}$$

gives:

$$w = \frac{1}{S_f} \left[ W_t - \frac{2 n_i q}{\rho} \right] \quad (148)$$

Combining (143), (144), (145) and (148) and adding $h_{ef}$ to represent hull borne as well as flying speeds $$h_f = \frac{l_i W_t}{K S_f} \left( \frac{1}{q} - \frac{1}{q_d} \right) + h_{ef} \quad (149)$$

(149) shows the functional relationship between the boat elevation and $q$ pressure (or boat speed).

EQUATION OF HULL MOTION

With the boat flying, combining (141) and (142), canceling the constant terms, and equating the upward variable force $F_f$ to the product of mass and accelerated in accordance with assumption $i$ gives:

$$-m_f \ddot{h}_f = S_f q K \left( \bar{\alpha}_f + \frac{\dot{h}_f}{v} \right) \quad (150)$$

Using the differential operator $p$ (150) may be written $$\left[ \frac{m_f}{S_f q K} p^2 + \frac{p}{v} \right] h_f = -\bar{\alpha}_f \quad (151)$$

Eliminating $\bar{\alpha}_f$ from (140) and (151) and considering $h_1 = h_f$ in view of assumption $p$ gives:

$$\left\{ \left[ \frac{m_f l_i d_{p1}}{S_f q K v} \right] p^3 + \left[ \frac{l_i \alpha_1 m_f}{S_f q K} + \frac{l_i d_{p1}}{v^2} \right] p^2 + \left[ \frac{d_{p1}}{v} + \frac{l_i}{v} \alpha_1 \right] p + \alpha_1 \right\} h_f = \alpha_1 y_1 \quad (152)$$

STABILITY (152) can be written as:

$$a_0 p^3 + a_1 p^2 + a_2 p + a_3 h_f = \alpha_1 y_1 \qquad (153)$$

according to Routh's criterion stability requires that:

$$a_1 a_2 > a_0 a_3 \qquad (154)$$

For example, with the following data for a boat comparable to High Tail in size, displacement and speed:

$m_f = 81.4$ slugs
$l_i = 2.015$ ft.
$S_f = 5.25$ ft.$^2$
$q_d = (36.6)^2 = 1340$
$K = .09/\text{degree} = 5.14/\text{radian}$
$v = 36.6$ ft./sec.
$d_{p1} = 1$ ft.
$p_1 = .0652$ rad. $= 3.72°$ (153) with $y_1 = 0$ becomes:

$$p^3 + 14.5 p^2 + 249 p + 526 = 0 \qquad (155)$$

Routh's criterion (154) applied to (155) indicates that the system in question is stable.

Analysis of sensing hydrofoil system with functionally hinged hydrofoils

DEFINITION OF SYSTEM

The sensing hydrofoil system with functionally hinged hydrofoils analyzed below is the same as the sensing hydrofoil system with invariant hinged hydrofoils analyzed above except that:

(a) The moment reaction of a functionally hinged hydrofoil is the only load on the sensing hydrofoil, i.e., there is no hydraulic cylinder for adjusting the elevation of the boat during acceleration and deceleration as with the invariant hinged hydrofoil;

(b) The hydrofoil hinge axis is located a distance $a_n$ forward of the location used for invariant hinging;

(c) The sensor lead $l_n$ is greater than the sensor lead $l_i$ for the invariant hinged hydrofoil; and (d) $a_n$ and $l_n$ are selected such that the hull is at design elevation only at design speed, and touching the water surface at the lowest flying speed.

FORWARD UNIT TYPICAL

The vertical motion on a straight course at the forward fully submerged hydrofoil of a functionally hinged hydrofoil system analyzed below is considered representative of the vertical motion of the aft fully submerged hydrofoil of the same system also, as explained in the previous section in connection with an invariant hinged hydrofoil system.

ELEVATION OF THE HULL AS A FUNCTION OF SPEED

In wave free water, the hydrodynamic hinge moment $M_n$ on a functionally hinged hydrofoil is related to the hydrodynamic hinge moment $M_i$ on the invariant hinged hydrofoil approximately by:

$$M_n = M_i + W a_n \qquad (160)$$

(160) can be written as $$K_1 v^2 d_1 \alpha_1 l_n = l_i n_i v^2 + w S_f a_n \qquad (161)$$

Equilibrium of vertical forces on a functionally hinged hydrofoil unit requires $$W_t = W + n_n v^2 \qquad (162)$$

(162) may be written $$W_t = w S_f + K_1 v^2 d_1 \alpha_1 \qquad (163)$$

Solving (161) and (163) for $w$ and $d_1$ and using $$v^2 = \frac{2q}{\rho}$$

gives $$w = \frac{l_n \rho W_t - 2 n_i l_i q}{\rho S_f (a_n + l_n)} \qquad (164)$$

$$d_1 = \frac{a_n \rho W_t + 2 n_i l_i q}{2 K_1 q \alpha_1 (a_n + l_n)} \qquad (165)$$

In wave free water, consider that the speed is changed from design speed $v_d$ to any other speed $v$. From the geometry of the hydrofoil unit, the decrease in elevation of the forward hydrofoil $h_f$ is given by $$h_f = (d_1 - d_{1d}) + l_n (\alpha_f - \alpha_{fd}) \qquad (166)$$

Substituting $w$ and $d_1$ from (164) and (165) and the wave free water relation $$\alpha_f = \frac{w_f}{Kq}$$

into (169) gives $$h_f = \frac{W_t (a_n K S_f \rho + 2 l_n^2 K_1 \alpha_1)}{2 K S_f K_1 \alpha_1 (a_n + l_n)} \left[ \frac{1}{q} - \frac{1}{q_d} \right] \qquad (167)$$

(167) shows the functional relationship between the boat elevation and $q$ (or the boat speed since $$v = \sqrt{\frac{2q}{\rho}}$$

For $v = v_u$ (167) may be written $$\frac{h_{fu}}{\dfrac{1}{q_u} - \dfrac{1}{q_d}} = \frac{W_t (a_n K S_f \rho + 2 l_n^2 K_1 \alpha_1)}{2 K S_f K_1 \alpha_1 (a_n + l_n)} \qquad (168)$$

$h_{fu}$ in the left hand member of (168) is determined by the zero bottom clearance condition at speed $v_u$ in the system definition above. The dynamic pressures $q_d$ and $q_u$ are determined when the speeds $v_d$ and $v_u$ are selected in the design. Thus the constant right hand member of (168) and the complete functional relationship between $h_f$ and $q$ as given by (167) are determined by (168) even though the system parameters $a_n$, $l_n$ and $K_1 \alpha_1$ are not determined. The functional relationship (167) with all parameters selected to make the system comparable to High Tail is plotted in FIG. 25.

DETERMINATION OF $a_n$, $l_n$ AND $K_1 \alpha_1$

At design speed $n_n = n_i$ so that (160) may be written $$n_i v_d^2 l_n = n_i v_d^2 l_i + W_d a_n \qquad (169)$$

and (162) may be written $$W_d = W_t - n_i v_d^2 \qquad (170)$$

Combining (169) and (170), using $$v_d^2 = \frac{2 q_d}{\rho}$$

and solving for $a_n$ gives $$a_n = \frac{n_i v_d^2 \rho (l_n - l_i)}{W_t \rho - n_i 2 q_d} \qquad (171)$$

In (168) and (171) every quantity is known except $a_n$, $l_n$ and $K_1 \alpha_1$. With $a_n$, $l_n$ or $K_1 \alpha_1$ selected on the basis of other conditions than (168) and (171) the other two parameters are determined by (168) and (171). Referring to the following data, for a boat comparable to High Tail in size, displacement and speed, $W_t$, $m_f$, $h_{fu}$, $S_f$, $v_d$, $v_u$ and K are taken approximately the same as for High Tail. $n_i$ was chosen by design such that the sensing hydrofoil lift equals $\frac{1}{10} W_t$. $l_i$ is determined by $n_i$ and the moment coefficient of High Tail's forward hydrofoil. $l_n$ was chosen as the tolerable limit from the standpoints of drag and vulnerability. With the other parameters given (171) determines $a_n$ and (168) determines $K_1 \alpha_1$.

$W_t = 2,620$ lbs.
$n_t = .147$ lb. sec.$^2$/ft.$^2$
$m_t = 81.4$ slugs
$S_t = 5.25$ ft.$^2$
$v_d = 42.2$ ft./sec.
$v_u = 28.7$ ft./sec.
$l_i = 2.68$ ft.
$l_n = 4.5$ ft.
$\alpha_1 = .1396$ radian
$K = 5.14$/radian
$K_1 = .725$
$h_{fu} = 1$ ft.
$a_n = .203$
$K_1\alpha_1 = .101$
$d_{p1} = 2$

EQUATION OF VERTICAL MOTION FOR SENSING HYDROFOIL

From (128), (133) and (142) under assumption $q$, the summation of moments about the hinge axis of the forward fully submerged functionally hinged hydrofoil at design speed is given by:

$$n_i v^2 l_i + a_n q K S_f \left[ \bar{\alpha}_f + \frac{w_f}{Kq} + \frac{\dot{h}_f}{v} \right] = l_n K_1 v^2 d_1 \left[ \alpha_1 + \frac{\dot{h}_1 - \dot{\bar{\alpha}}_f l_n}{v} \right]$$
(175)

Under assumptions $a$ and $b$ using the equivalent $$d_1 = d_{p1} + h_1 - y_1 + \delta_1$$

canceling constant terms, and using the operator $p$ (175) reduces to $$\left[ \left\{ \frac{d_{p1}}{v} - \frac{a_n q K S_f}{l_n K_1 v^3} \right\} p + a \right] h_1 - l_n \left[ \alpha_1 + \frac{d_{p1}}{v} p + \frac{q a_n K S_f}{v^2 l_n^2 K_1} \right] \bar{\alpha}_f = \alpha_1 y_1$$
(176)

EQUATION OF HULL MOTION AND STABILITY

Under assumption ($i$), equating the product of forward equivalent mass and the upward acceleration at the forward hydrofoil to the upward forces there gives:

$$-m_t \ddot{h}_f = +L_f + n_n v^2 - W_t$$
(177)

Equilibrium of moments about the hinge axis of the forward hydrofoil under assumption $q$ is expressed by:

$$n_1 v^2 l_1 + L_f a_n = n_n v^2 l_n$$
(178)

Under assumption $r$, $L_f$ may be expressed by:

$$L_f = K S_f q \left[ \bar{\alpha}_f + \frac{w_f}{Kq} + \frac{\dot{h}_f}{v} \right]$$
(179)

Combining (177), (178) and (179) to eliminate $n_n v^2$ and $L_f$ and using the operator $p$ $$\left[ \frac{l_n m_t p^2}{(l_n + a_n) K S_f q} + \frac{p}{v} \right] h_f + \bar{\alpha}_f = 0$$
(180)

Eliminating $\alpha_f$ from (176) and (180), taking $h_1 = h_f$ according to assumption $p$ gives:

$$\frac{l_n^2 m_t d_{p1} p^3}{(l_n + a_n) K S_f q v} + \left[ \frac{m_t a_1 l_n^2}{(l_n + a_n) K S_f q} + \frac{l_n d_{p1}}{v^2} + \frac{a_n m_t}{(l_n + a_n) K_1 v^2} \right] p^2 + \left[ \frac{d_{p1}}{v} + \frac{l_n \alpha_1}{v} \right] p + \alpha_1 \right\} h_f = \alpha_1 y_1$$
(181)

Writing (181) as:

$$\{a_0 p^3 + a_1 p^2 + a_2 p + a_3\} h_f = \alpha_1 y_1$$
(182)

According to Routh's criterion stability requires that $$a_1 a_2 > a_0 a_3$$
(183)

For example, with the above data for the functionally hinged system, with $y = 0$, (181) becomes $$p^3 + 25.39 p^2 + 180.06 p + 403.47 = 0$$

Routh's criterion (183) applied to (184) indicates that the system in question is stable.

Coupling equations of High Tail control and sensor hydrofoil controls compared and discussed Equation (63u) shows $\alpha_f$ for the High Tail system in wave-free water as a function of the hydrofoil loading $w_t$ and the dynamic pressure, $q$.

$$\alpha_f = \frac{w_f}{Kq}$$
(63u)

(63u) is identical to (143) derived for the sensing hydrofoil system with invariant hinged hydrofoils. However there is a small variation in $w_t$ with $q$ due to the sensing hydrofoil in the latter system that is not present in the High Tail system.

The variation in $\alpha_f$ at a given speed, i.e., $\bar{\alpha}_f$ for the High Tail system is given by $$\bar{\alpha}_f + E \dot{\bar{\alpha}}_f = -\frac{A_f}{l_1} \delta_1$$
(63v)

The corresponding equation for the sensing hydrofoil systems is $$\bar{\alpha}_f = -\frac{\delta_1}{l_1}$$
(145a)

(145a) being taken from (145).

(145a) is the same as (63v) with $E = 0$ and $A_f = 1$. E is defined as zero for the sensing hydrofoil systems because the signal $\delta$ in these systems is a smoothed signal whereas in the High Tail system the signal $\delta$ is not smoothed so that added smoothing represented by the term $E\dot{\alpha}$ is needed. Thus except for the lack of adjustment of the control coupling factor $A_f$ and the difference in smoothing, Equations (63u) and (63v) apply to the sensing hydrofoil system with invariant hinged hydorfoils as well as to the High Tail system. A similar conclusion applies to Equations (64u) and (64v) and the following combination of these equations:

$$\alpha_f + E\dot{\alpha}_f = \frac{w_f}{Kq} - \frac{A_f}{l_1} \delta_1$$
(63)

$$\alpha_a + E\dot{\alpha}_a = \frac{w_f}{K_a} - \frac{A_a}{l_2} \delta_2$$
(64)

The coupling equations for the control of pitch and elevation of a hydrofoil boat with a prescribed change in elevation as function of boat speed are formed from (63) and (64) by replacing $\delta_1$ and $\delta_2$ respectively with $(\delta_1 + A_e)$ and $(\delta_2 + A_e)$, thus:

$$\alpha_f + E\dot{\alpha}_f = \frac{w_f}{Kq} - \frac{A_f}{l_1} (\delta_1 + A_e)$$
(fa)

$$\alpha_a + E\dot{\alpha}_a = \frac{w_a}{Kq} - \frac{A_a}{l_1} (\delta_2 + A_e)$$
($\alpha$a)

Equations (fa) and ($\alpha$a) are formed with Equations (f) and (a) by setting $B_f$, $B_a$, $K_f$, and $K_a$ all equal to zero.

fa and $\alpha$a as coupling equations produce the functional relationship between boat elevation and boat speed shown with a solid line in FIG. 25. This is approximately the same functional relationship as expressed by Equation (149) and shown with a dotted line in FIG. 25.

Taking the forward hydrofoil as representative in wave-free water, $$y=0, \delta_f = -h_f, \dot{\alpha}_f = 0$$

From (63u), (fa) for any control coupling factor $A_f$ $$h_f = A_e \tag{fb}$$

From Equation (fb) it is seen that any prescribed flying elevation as a function of boat speed, $h_t$, within practical limits, may be obtained with the control coupling represented by Equation (fa) by providing a signal $A_e = h_f$. The sequence function unit shown in FIGS. 8, 9, and 10 is an example of an apparatus for producing such prescribed $A_e$. It is further seen that the sea condition adjustment provided by the control coupling factor $A_f$ and the signal $A_e$ are independent of each other.

Drag probe sensor

A drag probe sensor 850 to sense water level forward of a hydrofoil, especially the forward hydrofoil, is shown in FIGS. 26 and 27. Referring to FIGS. 26 and 27, the drag probe 851 is pivoted on a gimbal cross 852 about an upright caster axis 853 in order to eliminate side loads on the probe. The gimbal cross 853 is pivoted about a horizontal axis 854 on a tubular sensor arm 855. A connecting tube 856 is pin-connected to the gimbal cross 853 at 873 and extends through an aperture sealed by bellows 857 into the sensor arm 855 where it is guided on rollers 858 to the aft end of the sensor arm 855 and pinned at 865 to a lever 859 as shown in FIG. 26. Lever 859 is pivotally attached to an arm 860 rigidly attached to the body of a hydraulic cylinder 861 located within a tubular mounting arm 862, to which the sensor arm 855 is hingedly connected at 872. The hydraulic cylinder 861 and its ram 863 are pin-connected to the mounting arm 862 and to the sensor arm 855 respectively at 867 and 868. A 3-way hydraulic valve 870 may be mounted on the body of the hydraulic cylinder 861. A connecting rod 871 is pivotally attached to lever 859 near the lower end of the lever 859 and is attached to the stem of the 3-way valve 870.

In operation, system pressure is conducted to the ram end of the hydraulic cylinder 861. The 3-way valve 870 is connected to the system pressure and to drain. The cavity aft of the spool (which, for simplicity, is not shown) of the 3-way valve 870 is connected to the smoothed servo pressure; the spool is spring centered by a spring which, for simplicity, also is not shown. The 3-way valve 870 controls the flow to and from the aft cavity of the hydraulic cylinder 861 causing the cylinder 861 to extend and contract and the sensor arm 855 to raise and lower, respectively, with respect to the mounting arm.

In operation, the lower end of the drag probe 851 is submerged about six inches. The moment on the probe 851 is balanced by the tension in the connecting tube 856 caused by the smoothed servo pressure on the aft end of the valve spool. If the submergence of the drag probe 851 increases, the increase in drag rotates the drag probe rearward causing the 3-way valve spool to move forward until the force in the centering spring balances the increased drag. This movement of the spool causes the sensor arm to be raised until the initial submergence is reached. As the spool is restored to its center position, fluid flow into the cylinder 861 is stopped.

If the forward speed of the boat is increased, the smoothed servo pressure and the drag on the probe 851 for a given submergence increase by about the same ratio. On this account the drag probe submergence is nearly independent of the forward speed of the boat. It also follows that the rate of vertical movement of the sensor arm 855 for a given change in submergence increases roughly with the square of the boat speed.

With this arrangement, as the drag probe 851 moves through waves, the vertical motion of the drag probe 851 follows the wave profile of the longer waves. As the wave motion of the drage probe 851 follows the the wave length is decreased, a point is reached where the probe 851 no longer follows and the water level moves up and down with respect to the drag probe 851 at an increasing frequency.

The sensor 850 may be a suitable low pass filter when the sensing signal is taken as the rotation of the sensor arm 855 as shown in FIG. 26 where the signal transmission tube 877 is pinned directly to the sensor arm 855. If higher frequency response in the sensor signal is desired than is practical to produce with the sensor arm motion, then one may use a combination of the rotation of the sensor arm 855 and the rotation of the drag probe 851 with respect to the sensor arm 855 as a signal.

The sensor 850 is retracted by rotation of the sensor mounting arm 862 through about 180°, to the position shown in dashed lines at 876 in FIG. 26. During retraction, motion is first transmitted through signal transmission tube 877 to the lever 859 to cause probe 851 to rotate until its tip nearly touches the sensor arm 855 so that it has the position shown in dashed lines at 878 when the mounting and sensor arms have been retracted to the position shown in dashed lines at 879. The overload release 880 forming part of the connecting rod 871 permits this lever movement without an overtravel of the spool of 3-way valve 870.

A rotation of the drag probe 851 aft, similar to that described for retraction, occurs when the drag probe 851 strikes an object. The probability of damage to the drag probe 851 is thereby greatly reduced.

Advantages of the drag probe sensor 850 are:

(1) It is not dependent on force from the water surface for its upward motion as is the ski-type sensor and, therefore, the possibility of tripping is largely removed.

(2) The drag is very small.

(3) The spray is relatively low.

(4) The drag probe 851 can ride over many types of objects in the water without damage. However, if damaged, the drag probe 851 and the outer end of the sensor arm 855 can be easily replaced with a spare.

(5) Its simplicity results in comparatively low cost and high reliability.

Electrical analogue of High Tail's computer

FIG. 28 is a schematic diagram of an electrical analogue of High Tail's computer that solves (71), (72) and (73). When used herein in connection with the electrical analogue computer:

The term *forward computer section* designates the computer section solving (71) which is the coupling equation for control of the forward hydrofoil;

The term *modified sequence function unit* designates a sequence function unit as shown in FIGS. 8, 9 and 10 and described for High Tail's computer except that electrical switches are used instead of hydraulic pilot valves to initiate caging, uncaging, climb and descend control operations;

The term *aft computer section* designates the computer section solving simultaneously (72) and (73) which are the coupling equations for the control of the aft hydrofoil. In the electrical analogue computer, the apparatus in the aft computer section is analogous to the apparatus in the bow and stern computer sections of High Tail.

Power for the electrical analogue computer is supplied by a storage battery charged by a generator driven by the propulsion engine. Alternating current for the computer and multiple voltage direct current for the computer output amplifier are generated in a conventional power pack shown generally at PP which is very similar to that used for automotive radios. The primaries of the transformers TF and TA, supplying the forward and aft computer sections respectively, are connected to the power pack PP. Seven secondaries of the transformer TF and seventeen secondaries of the transformer TA provide the independent alternating voltage sources required for the forward and aft computer sections respectively. Six of the alternating voltages provided by the transformer TF and fifteen of the alternating voltages provided by the transformer TA are required for the twenty-one modulators used in the electrical analogue computer. Potentiometer modulators are shown in FIG. 28 to simplify illustration. Variable transformer modulators can also be used and are preferable in most cases to avoid sliding contacts.

For the purpose of describing the solution of (71) by the forward computer section, it is convenient to rearrange (71) as:

$$E\dot{\alpha}_f = \left[ +\frac{w_{fh}}{Kq} + B_f - \frac{A_f}{l}(\delta_1 + A_e + K_f\theta_b^2) \right] - \alpha_f$$

(71A)

The left hand member of (71A) represents the output signal of the forward computer section which appears across the conductors 1F. This voltage after amplification by the amplifier 2F determines the areas of the fluid flow openings in the servo valve 3F. These areas substantially determine:

(1) The rate of fluid flow into the chamber 4F of the hydraulic cylinder 5F, and therefore, (2) The rate of movement of the cylinder plunger 6F, (3) The rate of movement of the connecting rod 7F which connects the cylinder plunger 6F to the pivot 8F on the hydrofoil 21, and (4) The rate of rotation $$\dot{\alpha}_f$$

of the hydrofoil 21 about the pivot axis 9F.

The bracketed [ ] quantity of the right hand member of (71A) represents the command angular displacement of the forward hydrofoil 21. The entire right hand member then represents the difference between the command angular displacement of the hydrofoil and $\alpha_f$.

A displacement corresponding to the term $-\alpha_f$ is transmitted by the connecting rod 7F to the pivot 10F fixed thereto, then transmitted by the connecting rod 11F, the bell crank 12F and the connecting member 13F to the slide of the potentiometer modulator 14F which is connected to the conductor 15F. Thus, the output voltage of the modulator 14F which appears across the the conductors 16F and 15F represents the term $-\alpha_f$.

A displacement corresponding the term $w_{fh}/Kq$ is produced by the modified reciprocal function unit 17F shown schematically in FIG. 28 and in cross section in FIG. 11. A magnification of the dynamic pressure $q$ is communicated to the cylinder cavity 18F, displacing the plunger 19F against the resistance of the nonlinear spring 20F. The characteristics of the spring are such that the displacement of the rod 21F corresponds to the term $w_{fh}/Kq$. The rod 21F transmits this displacement to the side of the modulator 22F. Thus, the output voltage of the modulator 22F which appears across the conductors 23F and 16F represents the term $w_{fh}/Kq$. The same result can be obtained with a linear spring and a cam similar to the scheme of the sequence function unit, or with a linear spring and a nonlinear modulator.

The output voltage of the modulator 24F which appears across the conductors 25F and 23F represents the trim adjustment $B_f$ when the slide of the modulator 24F is given a manual displacement corresponding to $B_f$.

Since the conductors 16F and 23F connect the modulators 14F, 22F and 24F in series, the resultant voltage appearing across the conductors 25F and 15F represents the combination of terms, $$\frac{w_{fh}}{Kq} + B_f - \alpha_f$$

The sensor ski 26F is attached to the sensor arm 27F which is hinged to apparatus at the bow of the boat about the axis 28F. Downward displacement $\delta_1$ of the sensor ski 26F is transmitted by the sensor arm 27F, the crank 29F, attached to the sensor arm, and the connecting rod 30F, to the slide of the modulator 32F which is connected to the conductor 33F. The output voltage of the modulator 32F, which appears across the conductors 34F and 33F, represents the displacement $\delta_1$.

The term $+A_e$ is represented by the output voltage of the stepped modulator 36F, which appears across the conductors 37F and 34F. The stepped modulator 36F includes the single pole double throw switch 38F instead of a slide.

The switch 38F, (1) Is in the dotted line position when the boat is at rest or moving at very low speed, (2) Is switched to the solid line position by the modified sequence function unit at up speed during acceleration of the boat, and (3) Is returned to the dotted line position by the modified sequence function unit at down speed during deceleration of the boat.

The shaft 40 and the related crank pins, connecting rods, etc. illustrate schematically steering function units for both the forward computer section and the aft computer section similar to those described for High Tail's computer except that the mechanisms for limiting $\theta_b$ and $\theta_c$ are not shown and the descriptions of these mechanisms are not repeated. The shaft 40 rotates the forward hydrofoil for steering and carries the crank pin 40F. The rotational displacement of 40F from the position shown, is proportional to the steering angle $\theta$. The crank pin 40F is connected to the pin 41F by the connecting rod 42F. The pin 41F is attached to the crosshead 43F which carries the slide of the modulator 45F. The movement of the crosshead 43F and the slide of the modulator 45F is approximately proportional to $\theta_b^2$ because the crank 40F is on dead center when $\theta$ equals zero. Thus, with the proper choice of scale factors, the output voltage of the modulator 45F, which appears on the conductors 46F and 39F, represents the term $K_f\theta_b^2$.

Since the conductors 34F and 39F connect the modulators 32F, 36F and 45F in series, the resultant voltage representing the quantity $$(\delta_1 + A_e + K_f\theta_b^2)$$

is placed on the potentiometer 47F by the conductors 46F and 33F. The output voltage of the potentiometer 47F which appears on the conductors 46F and 25F represents the term $$\frac{A_f}{l}(\delta_1 + A_e + K_f\theta_b^2)$$

when the slide of the potentiometer 47F is positioned manually away from its zero position adjacent to the conductor 46F a distance corresponding to the coefficient $A_f/l$.

When the boat is at rest or moving at low speed, the single pole, double throw caging switch 48F is in its caged position, as indicated by the dotted line. When the speed of the boat reaches uncage speed during acceleration, the switch 48F is moved to the uncaged position by the modified sequence function unit, as indicated by the solid line. When the boat reaches cage speed during deceleration, the caging switch 48F is returned to the caged position.

Thus, in the caged position of the caging switch 48F, the voltage appearing across the conductors 49F and 15F represents $$\left[\frac{w_{fh}}{Kq} + B_f\right] - \alpha_f$$

The voltage appearing across the same conductors when the caging switch 48F is in the uncaged position represents the entire right hand member of (71A).

The voltage across the conductors 49F and 15F is demodulated by the phase sensitive demodulator 50F which receives its phase signal from the secondary 51F of the transformer TF. The demodulated signal, after smoothing by the filter 52F, is the output signal of the computer, which appears across the conductors 1F.

For the purpose of describing the solution of (72) and (73) by the aft computer section, it is convenient to rearrange (72) and (73) as:

$$E\dot{\alpha}_{ar} = \left[\frac{w_{ah}}{Kq} - \frac{A_a}{2l}(\delta_{2r} + \delta_{2l} + 2A_e + 2K_a\theta_b^2) + B_{ar} - \frac{A_r}{2b_w}(\delta_{2r} - \delta_{2l} + 2K_\theta\theta_c)\right] - \alpha_{ar}$$

(72A)

$$E\dot{\alpha}_{al} = \left[\frac{w_{ah}}{Kq} - \frac{A_a}{2l}(\delta_{2r} + \delta_{2l} + 2A_e + 2K_a\theta_b^2) + B_{al} + \frac{A_r}{2b_w}(\delta_{2r} - \delta_{2l} + 2K_\theta\theta_c)\alpha - _{la}\right]$$

(73A)

The left hand members of (72A) and (73A) represent the output signals of the aft computer section which appear on the conductors 1R and 1L and which, after amplification by the amplifiers 2R and 2L, determine the areas of the fluid flow openings in the servo valves 3R and 3L. These areas substantially determine:

(1) The rate of fluid flow into the chambers 4R and 4L of the hydraulic cylinders 5R and 5L, respectively, and therefore, (2) The rates of movement of the cylinder plungers 6R and 6L, (3) The rates of movement of the connecting rods 7R and 7L which connect the cylinder plungers 6R and 6L to the pivots 8R and 8L on the hydrofoils 1 and 20, and (4) The rates of rotation, $$\dot{\alpha}_{ar} \text{ and } \dot{\alpha}_{al}$$

of the hydrofoils 1 and 20 about the pivot axes 9R and 9L respectively.

The bracketed [ ] quantities of the right hand members of (72A) and (73A) represent the command angular displacements of the aft hydrofoils 1 and 20. The entire right hand members of these equations then represent the differences between the command angular displacements of the hydrofoils 1 and 20 and the angular displacements of these hydrofoils, $\alpha_{ar}$ and $\alpha_{al}$, respectively.

A displacement corresponding to the term $w_{ah}/Kq$ is produced by the modified reciprocal function unit 17A, shown schematically, which is similar to the modified reciprocal function unit 17F described above. The rod 21A transmits this displacement to the slide of the modulator 22A, which is connected to the conductor 23A. Thus, the output voltage of the modulator 22A which appears across the conductors 24A and 23A represents the term $w_{ah}/Kq$.

The downward displacements $\delta_{2r}$ and $\delta_{2l}$ of the sensor skis 25R and 25L are transmitted to the slides of the modulators 32R and 32L by means of the cranks, 28R and 28L, the connecting rods, 29R and 29L, the bell cranks, 30R and 30L and the connecting members 31R and 31L respectively. The output voltages of these modulators which appear on the conductors 34A and 33A and on the conductors 35A and 34A then represent the displacements $-\delta_{2r}$ and $-\delta_{2l}$ respectively.

The term $2A_e$ is represented by the output voltage of the stepped modulator 36A, which appears across the conductors 37A and 35A. The stepped modulator 36A, including the single pole, double throw switch 28A, operates in the same way as the modulator 36F described above.

The crank pin 40A is carried by the shaft 40, which steers the boat. The crank pin 40A is connected to the pin 41A on the bell crank 42A by the connecting rod 43A, producing a motion of the pin 41A approximately proportional to $\theta_b^2$ as described above in connection with the pin 41A. The motion of the pin 41A is transmitted to the slide of the modulator 45A by the bell crank 42A and the connecting member 44A. Thus, with the proper choice of scale factors, the output voltage of the modulator 45A, which appears on the conductors 46A and 39A, represents the term $-2K_a\theta_b^2$.

Since the conductors 34A, 35A and 39A connect the modulators 32R, 32L, 36A and 45A in series, the resultant voltage representing the quantity $$-(\delta_{2r} + \delta_{2l} + 2A_e + 2K_a\theta_b^2)$$

is placed on the potentiometer 47A by the conductors 46A and 33A. The output voltage of the potentiometer 47A, which appears on the conductors 46A and 24A, represents the term $$-\frac{A_a}{2l}(\delta_{2r} + \delta_{2l} + 2A_e + 2K_a\theta_b^2)$$

when the slide of the potentiometer 47A is positioned manually away from its zero position adjacent to the conductor 46A a distance corresponding to the coefficient $A_a/2l$. Since the conductor 24A connects the output voltage of the potentiometer 47A in series with the output voltage of the modulator 22A, the resultant voltage which appears across the conductors 46A and 23A represents the difference $$\frac{w_{ah}}{Kq} - \frac{A_a}{2l}(\delta_{2r} + \delta_{2l} + 2A_e + 2K_a\theta_b^2)$$

The caging switch 48A is operated by the modified sequence function unit in the same way as the caging switch 48F as described above. Thus in the caged position of the switch 48A, as indicated by the dotted line, the voltage appearing across the conductors 49A and 23A represents the term $w_{ah}/Kq$, and the voltage appearing across the same conductors when the caging switch 48A is in the uncaged position as indicated by the solid line, represents the terms $$\frac{w_{ah}}{Kq} - \frac{A_a}{2l}(\delta_{2r} + \delta_{2l} + 2A_e + 2K_a\theta_b^2)$$

The downward displacements $\delta_{2r}$ and $\delta_{2l}$ of the sensor skis 25R and 25L are also transmitted through the connecting members 31R and 31L to the slides of the modulators 32RR and 32RL.

Thus, the output voltage of the modulator 32RR, which appears across the conductors 33R and 34R with reverse polarity, represents the term $$-\frac{A_r}{2b_w}\delta_{2r}$$

and the output voltage of the modulator 32RL, which appears across the conductors 35R and 33R, represents the term $$\frac{A_r}{2b_w}\delta_{2l}$$

Since the conductor 33R connects the modulators 32RR and 32RL in series the resultant voltage, which appears across the conductors 35R and 34R, represents $$-\frac{A_r}{2b_w}(\delta_{2r} - \delta_{2l})$$

The output voltage of the modulator 24R, which appears across the conductors 25R and 35R, represents the trim adjustment $B_{ar}$ when the slide of the modulator 24R is given a manual displacement corresponding to $B_{ar}$.

The crank pin 54A is carried by the shaft 40 which steers the boat. The crank pin 54A is connected to the pin 55A on the bell crank 56A by the connecting rod 57A, producing a motion of the pin 55A approximately proportional to $\theta_c$. The motion of the pin 55A is transmitted to the slide of the modulator 58R by the bell crank 56A and connecting member 57A. Thus, with proper choice of the scale factors and with reverse polarity the output voltage of the modulator 58R, which appears across the conductors 59R and 25R, represents the term $$-\frac{A_r}{b_w} K_\theta \theta_c$$

A displacement corresponding to the term $-\alpha_{ar}$ is transmitted from the pin 8R on the right rear hydrofoil 1 to the slide of the modulator 14R which is connected to the conductor 59R in the same manner as described for the forward hydrofoil 21 and the modulator 14F, corresponding components having the same numbers except the letter R appears in each case instead of the letter F.

Since the conductors 25R and 59R connect the modulators 24R, 58R and 14R in series, the resultant voltage representing the sum, $$B_{ar} - \frac{A_r K_\theta \theta_c}{2b_w} - \alpha_{ar}$$

appears on the conductors 15R and 35R.

The caging switch 48R is operated by the modified sequence function unit in the same way as the caging switch 48A as described above. Thus, in the caged positions of the switches 48R and 48A, as indicated by the dotted lines, the voltage across the conductors 15R and 23A represents the sum, $$\frac{w_{ah}}{Kq} + B_{ar} - \frac{A_r}{b_w} K_\theta \theta_c - \alpha_{ar}$$

The voltage across the same conductors when the caging switches 48R and 48A are in the uncaged positions, as indicated by the solid lines, represents the entire right hand member of (72A).

The voltage across the conductors 15R and 23A is demodulated by the phase sensitive demodulator 50R which receives its phase signal from the secondary 51R of the transformer TA. The demodulated signal, after smoothing in the filter 52R, is an output signal of the aft computer section, which appears across the conductors 1R.

The modulators 32LR, 32LL and 58L are the same and are connected into their network the same as the modulator 32RR, 32RL and 58R respectively except for reverse polarity. The modulators 24L and 14L are the same and are connected into their network the same as the modulator 24R and 14R. The caging switch 48L is the same, operated the same and connected into its network the same as the switch 48R. Thus, in the caged position of the switches 48L and 48A, as indicated by the dotted lines, the voltage across the conductors 15L and 23A represents the sum $$\frac{w_{ah}}{Kq} + B_{al} + \frac{A_r}{b_w} K_\theta \theta_c - \alpha_{ar}$$

The voltage across the same conductors when the caging switches 48L and 48A are in the uncaged positions, as indicated by the solid lines, represents the entire right hand member of (73A).

The voltage across the conductors 15L and 23A is demodulated by the phase sensitive demodulator 50L which receives its phase signal from the secondary 51L of the transformer TA.

The demodulated signal, after smoothing in the filter 52L, is an output signal of the aft computer section, which appears across the conductors 1L.

Alternative forward sensor

Various methods of sensing the relative water level can be used as an alternative to the planning and drag probe sensors described above. The use of a sonic echo for sensing is well known. With this scheme the relative elevation is found by determining the time required for an echo to return after a sound impulse is emitted. The signal from the sensor is in the form of an electrical voltage. FIG. 29 shows a supplementary circuit for using such a sensor as an alternative to the sensing scheme for the forward hydrofoil shown in FIG. 28. Referring to FIG. 29, the signal voltage, across the conductors 60S from the sonic echo sensor 61S modulates the voltage from the secondary 32S (which replaces 32F) of the transformer TF at modulator 62S. This modulated voltage appears across the conductors 34S and 33S. The network otherwise is the same as shown in FIG. 28.

Alternate roll control

The angle of roll (see 66), which in High Tail is sensed as the difference between right and left sensor movements, may instead be sensed by use of a gyroscope. Thus a hydrofoil craft of the type described may be operated in accordance with the claims with means other than a sensor on each side to sense roll. A signal for roll stabilization to provide the desired restoring effect in roll in accordance with (67) can be produced with the control means shown schematically in FIG. 30 wherein electrical signals from gyro vertical 900 and steering control displacement transducer 901 are fed to servo network 904. An accelerometer 902 may be utilized, if desired, and its signal also may be fed to servo network 904. Power supply 905 may supply electrical power to network 904. Roll trim adjusting means 906 may be operated manually to introduce into network 904 an electrical signal corresponding to any needed trim adjustment in roll. The output signal from network 904 is carried by conductors 907 to feed back modulator 914 to electrically operated control valve 908, which receives hydraulic fluid at system pressure through line 910 (which ultimately is returned to a reservoir at its source through drain line 911) and delivers fluid into lines 912 and 913.

Feedback modulator 914 is supplied from source 915 with a current having a stable voltage and its slider is connected to the rod 916 which is attached to piston 917 within cylinder 918. Valve 908 is operated by the signal transmitted through conductors 907 to cause fluid from line 910 to flow through line 912 or 913 to move piston 917 in cylinder 918 as may be needed to provide the proper roll correction. The voltage supplied through conductors 907 is modified by the resistance of modulator 914 in accordance with the position of piston 917 so that valve 908 continues to operate to cause valve 908 to move until the modification provided by 914 corresponds to an indication that the piston occupies the position called for by the command signal. The mechanical action of cylinder 918 may be utilized in place of the actions of the aft water level sensors in "High Tail" to control roll by removing them and removing crank arms 579 and 580 from bar 582 in the bow computer shown in FIG. 4A and installing cylinder 918 so that it acts longitudinally against bar 582. For example, the outer end of piston rod 916 may be hingeably connected to bar 582 and the other end of cylinder 918 may be pinned or otherwise hingeably connected to a fixed mounted member extending from the computer frame.

Clean hydrofoil hinge

Referring now to FIGS. 31 to 36, there is shown in detail the structure wherein a hydrofoil such as hydrofoil 1 is attached to a strut 2. In place of hydrofoil 1 there may be used any fully submerged hydrofoil such as hydrofoil 20, 21, 1002 or 1042 and in place of strut 2 there may be used any strut such as strut 3, strut 61, strut 1003, strut 1043 or the like. Upwardly extending portion or stub strut 920 is fixedly attached to foil 1 by any suitable method, as by welding and extends upwardly into the hollow lower portion of strut 2, and is pivotally mounted to rotate with respect to strut 2 on axis 921. Such pivotal rotation is provided for by providing bushing 922 in stub strut 921. Tubular member 823 is then inserted through suitable apertures provided in strut 2 and is received within bushing 922. Bifurcated pin 925, which has outwardly extending portions 926 at the ends of its two bifurcated portions, is then inserted in tubular member 923 and the spring action of the bifurcated portions causes the outwardly extending portions 926 to be received within suitable recesses provided in tubular member 923 to retain pin 925 in place. By suitable contouring, a hinge or pivotal mounting is thus provided which can be readily assembled and disassembled but which has hydrodynamically clean portions at the surfaces of strut 2. That is, the end portions of tubular member 923 and bifurcated pin 925 may be made flush with the surfaces of strut 2 to provide a minimum of parasitic drag at the surface of strut 2.

Rod or tube 928 is pivotally attached to member 920 by pin 929 and is loaded in compression and extends upwardly within the hollow interior of strut 2. To prevent its failure by column action it may be guided by rollers such as rollers 930.

Member 928 transmits a significant portion of the weight of the boat to the hydrofoil.

To provide for a minimum parasitic drag due to eddy currents forming in the space between members 920 and 2, the outer surface 931 of member 920 is contoured to fit within a few thousandths of an inch of the interior surface 932 of the opening with strut 2 at the bottom of strut 2. To provide further such reduction of parasitic drag the trailing edge 933 of member 920 is an arc around axis 921 and portion 934 of the leading edge of member 920 is also an arc about axis 921. Thus, cross sections taken on different planes through axis 921 and extending through leading edge portion 934 and trailing edge 933 are identical in size and contour as shown by FIGS. 35 and 36.

Pitot sensors for dynamic pressure

Referring now to the embodiments of FIGS. 37–40, it seen that dynamic pressure, i.e., a function of boat speed, may be sensed by means other than those hereinbefore described.

Referring now to FIG. 37, there is shown leading edge 940 of strut 2'. In place of strut 2' there may be utilized any strut previously described herein to transfer a portion of the weight of a boat to a hydrofoil. Received in the leading edge 940 there is provided tubular member 941 extending rearwardly into the strut; its interior communicates with the interior of tube 942 which extends upwardly within the strut. Attached to the front end of tube 941 near the edge 940 by any suitable means such as threaded connection as shown there is provided pitot tube nozzle 943. Portion 944 of nozzle 943 extends rearwardly within the interior of tube 941 and connected to portion 944 there is provided flexible tube 945 which may be of rubber plastic or any other suitable flexible material. Contained within the space defined by the outer wall of tube 945 and the inner wall of tube 941, and extending within the interior of tube 942 there is provided a non-freezing liquid 946 which may be for example a mixture of alcohol and water. As the boat moves forward the pressure within tube 945 corresponds to the dynamic pressure $q$ and is transferred through non-freezing liquid 946 to a transducer, amplifying device or other device with which tube 942 may be connected.

Referring now to FIG. 38, pitot tube nozzle member 953 extends forward from leading edge 950 of strut 2" for which any suitable strut extending upward from the hydrofoil may be substituted as mentioned in connection with strut 2. Within the hollow interior 939' of strut 2" there is provided vertically extending tubular member 951 with which the rearwardly extending passage within nozzle 953 is in communicating relationship. At its upper end tube 951 is provided with closure 954 and with air vent 955 extending from its interior to ambient air. Tube 952 extends downwardly into tube 951 through closure 954, being supported by the closure. Attached to the bottom end of tube 952 there may be provided plug 959 which may be provided with an o-ring 956 which may provide sealing engagement of plug 959 with the interior of tube 951. Portion 957 of plug 959 may extend downwardly and have attached thereto flexible tube 958 (of rubber or the like) which may contain a non-freezing fluid such as a mixture of water and alcohol. The fluid may extend through the interior of tube 952. The space between the outer wall of tube 958 and the inner wall of 951 may contain water which is forced into this space through the passage of pitot nozzle 953 which, if under sufficiently high pressure may travel upward, through the throttle air vent 949 but which normally extends only part of the height of tube 958. The pressure of such fluid, which corresponds to its head within tube 951, may be transmitted by non-freezing fluid within tubes 958 and 952 to a suitable transducer, amplifying device or other device to which tube 952 may be attached.

Referring now to FIG. 39 there is shown another strut 2''' having an opening 963 in its leading edge 960. Opening 963 is preferably a vertically extending slit or slot and it communicates with the interior of chamber 961 which is defined within the hollow interior 939" of strut 2''' by bottom wall 964, rear wall 965 and top wall 966. Extending downwardly into the chamber 961 thus defined there is provided tube 967. This tube also extends upwardly from wall 966. Attached to the bottom of tube 962 which extends from about wall 966 upwardly within tube 967 and extending downwardly below wall 966 within the bottom portion of 967 there is provided flexible tube 968. The interior of tubes 962 and 968 may be filled with a non-freezing fluid. The chamber 961 serves in the manner of a pitot nozzle: as the boat moves forward the pressure of water forced rearwardly through opening 963 due to forward motion of the boat transmits pressure through the water within the chamber 961 into the space between the interior wall of tube 967 and exterior walls of tubes 968 and 962. Thus the head of water in the space defined between tubes 962 and 967 corresponds to the dynamic pressure, $q$, i.e., a function of boat speed $v$ which is proportional to $v^2$. Non-freezing fluid in the interior of tubes 962 and 968 may transmit the pressure corresponding to the head between tubes 962 and 967 to sensing or amplifying or other means to which tube 962 may be attached.

Referring now to FIG. 40, there is shown a hydraulic amplifying device which may have an input tube 972 to which any one of tubes 942, 952 or 962 respectively of FIGS. 37, 38 and 39 may be attached to communicate to non-freezing fluid contained within chamber 971 of this device a pressure corresponding to a function of boat speed. One wall of chamber 971 is provided by diaphragm 973 which is connected to spool 974 of hydraulic valve 975. Hydraulic fluid at suitable system pressure enters the valve through tube 975 and hydraulic fluid may leave the valve at substantially no pressure through drain tubes 976 and 977. Spool 974 is constructed with lands at 978, 979 and 980 and with outlet port 981 connected to port 982 which is connected with chamber 983 at the opposite end of the spool from the end to which diaphragm 973 is connected. Thus, an increase in pressure in chamber 971 causes diaphragm 973 to move spool 974 to the right, the quantity of fluid leaving the valve through port 981 and tube 984 increases. Consequently the pressure in chamber 983 is increased so that the spool tends to be moved back to the position shown in the drawing and the pressure in outlet tube 985 which communicates with other suitable control mechanisms for introducing into the computation of the specific coupling equations the value for $q$ is increased correspondingly. As pressure falls in chamber 971, the pressure of fluid in chamber 983 and the action of accumulator 986 which is connected thereto forces spool 974 to the left whereupon fluid in lines 984, 985, 982 and in chamber 983 is bled through drain tube 977, reducing pressure in chamber 983 and allowing spool 974 to tend to be moved back into the position shown in the drawing by the force of pressure in chamber 971 against diaphragm 973. Accumulator 986 may be utilized to provide a smoother output signal pressure in line 985 and to smooth sudden fluctuations in pressure chamber 983.

Vane type dynamic pressure sensor

Referring now to FIGS. 41, 42, 43, 44 and 45 there is shown another embodiment of means for sensing a function of boat speed or more specifically, dynamic pressure, $q$. As shown in FIG. 41, strut 61, which may have substituted for it strut 3, strut 1003, strut 1043 or the like, has leading edge 1100 and trailing edge 1100'. Tube 1115 may extend rearwardly from trailing edge 1100'. Mounted in trailing relationship to tube 1115, and mounted rotatably with respect thereto as hereinafter more fully described, there may be provided a vane device or propeller-like device comprising blades 1101 and 1101'.

As shown in FIG. 42, blades 1101 and 1101' are slightly offset or skewed with respect to each other; the planes defined by the leading and trailing edges of each vane may lie slightly out of the axis of the device in opposite directions as shown. Referring now to FIGS. 43 and 44, tube 1115 may extend within the hollow interior of strut 61. Tube 1112 may be threadedly engaged with tube 1115 at the rear end of the latter and may extend inwardly within tube 1115. As will be more fully described hereinafter, the entire device may be removed from the strut by threadedly removing tube 1112. Mounted within tube 1112 there may be provided roller bearing 1121 and ball bearing 1111; ball bearing 1111 may be held in place by snap rings 1110 and 1114; snap ring 1114 may engage shaft 1108 to retain in place sleeve member 1113 which contacts the inner race of bearing 1114. Shaft 1108 is mounted to rotate in bearings 1121 and 1111. At the rear end of tube 1115 seal 1109 may be provided to prevent passage of water through tube 1115 alongside shaft 1108 into the interior of strut 61. Pinned to the rearwardly extending portion of shaft 1108 and the forwardly extending portion of a casting or other assembly which comprises blades 1101 and 1101', by pins 1107 and 1103, there may be provided universal joint 1104 comprising rearwardly extending ferrule 1104' through which pin 1103 extends and forwardly extending ferrule 1104'' through which pin 1107 extends. A housing 1105 of flexible plastic tubing may extend over universal joint 1104 and may hold in place pins 1103 and 1107 by extending respectively over them. It may be installed or removed by compressedly forcing its rear end forwardly and inserting or removing pin 1103. Overlying the rear ferrule 1104' of universal joint 1104 and the rear portion of plastic member 1105 there may be provided streamlining collar 1102, which may be provided with hole 1102' for inserting pin 1103 into ferrule 1104'. Streamlining collar 1106 may be provided over the forward ferrule 1104'' and may be provided with hole 1106' through which pin 1107 may be inserted into ferrule 1104''.

Referring now to FIGS. 44 and 45, shaft 1108 at its forward end is slotted or bifurcated to provide two forwardly extending portions 1108' and 1108''. Member 1116 extends between these portions and is hingeably held in place with pin 1118. Member 1116 may either extend laterally with respect to the axis of shaft 1108 or may extend substantially forward or in a generally coaxial manner with respect to shaft 1108. To retain member 1116 in either one of these positions, shaft 1108 is provided with a coaxial hole 1125 extending rearwardly at its forward end into which is received compression spring 1120 and a cylindrical sliding portion 1126 extending from member 1127 which is received between bifurcated portions 1108' and 1108'' and is urged forwardly by compression spring 1120 into engagement with member 1116. Shaft 1108 may be enlarged at its forward end as shown at 1119. Cable 1117 may be attached to member 1116 as shown and may extend upwardly within the interior of strut 61 as indicated by arrow 1128. The cable at its upper end may be attached to one end of a lever to the other end of which spool 974 (FIG. 40) may be attached (if diaphragm 973 and the housing which provides chamber 971 are first removed) by any suitable means, such as a connecting link. The tension force transmitted through cable 1117 may thus be substituted for the force exerted by diaphragm 973.

At the forward end of tube 1115 an upwardly extending sloping portion 1122 is provided and shoulders 1123 and 1124 are provided which act to restrain the rotation of shaft 1108 so that it can only rotate until member 1116 contacts either shoulder 1124 or shoulder 1123.

In order to remove the entire unit from the strut tube 1112 is threadedly disengaged from tube 1115 and is then pulled rearwardly whereupon member 1116 contacts the end of tube 1115 at 1129 and is forced from the position in which it is shown into the position of being generally coaxial or in line with shaft 1108, while the rotation of its lower corner 1130 forces member 1127 back against the action of spring 1120 during the first part of such rotation. During the latter part of such rotation member 1127 snaps forward to hold member 1116 in its new position. In order to reinstall the device in the strut, tube 1112 is threadedly engaged with the rear end of tube 1115 and as this is done, or just prior to beginning such engagement, member 1116 is forced forwardly against upward sloping portion 1122 which forces it to rotate from the position of being generally in line with shaft 1108 to the position shown in FIGS. 44 and 45. During the first portion of such rotation, corner 1130 forces member 1127 rearwardly against biasing spring 1120 and during the latter portion of such rotation, member 1127 snaps forward to occupy the position shown in FIGS. 44 and 45 and retains member 1116 in the position shown in these same figures.

Because the force on a restrained submerged propeller attached to a boat having a velocity, $v$, is proportional to $v^2$, the tension force produced in cable 1117 when shaft 1108 is restricted to rotation through a small angle is proportional to $v^2$ and may be transmitted, as a mechanical force having a value sutable for utilization as corresponding to $q$, to equipment located in the boat for controlling the angle of incidence of the hydrofoils in accordance with the specific coupling equations. Thus the tension force in cable 1117 may be transmitted to a control member such as spool 974 of a valve such as valve 975 as described above or may be transmitted to any other suitable equipment.

By reason of the blades 1101 and 1101' being attached to shaft 1108 through universal joint 1104 they remain in line with the water flowing past them, i.e., remain coaxial with the true slipstream and erroneous sensing due to pressure exerted by flow components which are not parallel to the true direction of travel of the blades through the water is avoided.

Propeller boat speed sensors

FIG. 46 shows a pump restrictor method of generating $q$ pressure similar to that described above in connection with FIG. 24, except that the pump 992 of FIG. 46 is driven by a propeller 990 rotated by the water flow by the boat rather than by the propulsion propeller shaft as shown in FIG. 24.

Propeller 990 may be mounted in the same manner as (and may have the same form as) vanes 1101 and 1101' in FIGS. 41–45 so that it operates in the wake of a strut, underwater, with its shaft extending through the trailing edge of the strut. Propeller 990 rotates a positive displacement low friction pump 992, which may be, for example, a gear pump, located within the hollow interior of the strut. Alternatively, the propeller and pump may be mounted on any other suitable means extending from the boat to cause the propeller to operate substantially below the water surface when the boat is floating or flying. The pump may be located in close association with the propeller or at any location where it may be driven by the propeller with minimum loss of efficiency. Fluid may be supplied to the pump from a reservoir or other suitable source through tube 998. Delivery of the pump may flow through tube 993, restrictor 994 and drain line 996. Pressure before restrictor 998 is conducted for use in the control through line 995. The rate of flow through the restrictor 994 being proportional to $v$ generates a pressure proportional to $v^2$ and therefore proportional to $q$, as explained in connection with FIG. 24.

Alternatively, as shown in FIG. 47, propeller shaft 991 of propeller 992 may have attached thereto an alternating current generator 1161. The output of generator 1161, carried by conductors 1162 and 1163, may be rectified by rectifier 1164 to provide a direct current voltage at terminals 1165 and 1166, which corresponds to a function of boat speed which may, if desired, be made to correspond to $v^2$ by means not shown and may be utilized electrically to introduce a value corresponding to $v^2$ or $q$ into equipment such as described hereinabove to control the angles of incidence of the hydrofoils in accordance with the specific coupling equations.

It may thus be seen that the invention is broad in scope and includes such modifications as will be apparent to those skilled in the art and is to be limited only by the claims.

Having thus described my invention, I claim:

1. A hydrofoil assembly adapted for use with a hydrofoil boat for partially supporting and stabilizing the boat wherein a fully submerged hydrofoil is an invariant hinged hydrofoil which is also a speed sensor to sense dynamic presure as measured by the hydrodynamic hinge moment on said hydrofoil, wherein a relative water elevation sensor is a surface-piercing sensing hydrofoil constrained to substantially translate up and down with respect to the boat, wherein a coupling means comprises a forward extending arm fixed to said fully submerged hydrofoil and pivotally attached to said sensing hydrofoil, the reaction of said hydrodynamic hinge moment on said fully submerged hydrofoil being an upward hydrodynamic force on said sensing hydrofoil, and wherein the functional relationship between $h_f$ and $q$ in wave free water for said hydrofoil boat is approximately expressed by Equation 149.

2. A hydrofoil assembly adapted for use with a hydrofoil boat for partially supporting and stabilizing the boat wherein a fully submerged hydrofoil is a functionally hinged hydrofoil, which is also a speed sensor, wherein a relative water elevation sensor is a surface-piercing sensing hydrofoil constrained to substantially translate up and down with respect to the boat, wherein a coupling means comprises a forward extending arm fixed to said fully submerged hydrofoil and pivotally attached to said sensing hydrofoil, the reaction of the hydrodynamic hinge moment on said fully submerged hydrofoil being an upward hydrodynamic force on said sensing hydrofoil, and wherein said prescribed functional relationship while flying is expressed by Equation 167.

3. A hydrofoil apparatus adapted for use with a hydrofoil boat for partially supporting and stabilizing the boat, for manual control of the relative water elevation of the boat and for providing a prescribed functional relationship between relative water elevation and relative water speed of the boat, said apparatus comprising a fully submerged lifting hydrofoil invariant hinged on strut means attaching said hydrofoil to the hull of the boat, said hydrofoil also being a speed sensor to sense dynamic pressure as measured by the hydrodynamic hinge moment on said hydrofoil, a second dynamic pressure sensing means, a high dihedral surface-piercing relative water elevation sensing hydrofoil constrained to substantially translate up or down with respect to the boat, and coupling means for operatively associating said fully submerged hydrofoil, said second dynamic pressure sensing means and said sensing hydrofoil, said coupling means including loading means adapted to apply a load on said sensing hydrofoil determined at a given boat speed by a manual setting, and thus to determine the relative water elevation at the sensing hydrofoil at the given speed, said coupling means also including a forward extending coupling arm fixed to said fully submerged hydrofoil and pivotally attached to said sensing hydrofoil, said sensing hydrofoil being adapted to co-act with said coupling arm to sustain said hydrodynamic hinge movement, to determine the hydrofoil angle setting of said fully submerged hydrofoil, to thus provide an increase in said angle setting in the event of an increase in relative water elevation and vice versa, and to provide a prescribed functional relationship between the relative water elevation and relative water speed of said boat during flight when no load is applied by said loading means.

4. The hydrofoil apparatus of claim 3 wherein said load on said sensing hydrofoil varies approximately with the square of the speed with said manual setting given.

5. A hydrofoil apparatus adapted for use with a hydrofoil boat for partial support and stabilization of the boat and for providing a prescribed functional relationship between relative water elevation and relative water speed of the boat, said apparatus comprising a fully submerged lifting hydrofoil invariant hinged on strut means attaching said hydrofoil to the hull of the boat, said hydrofoil also being a speed sensor to sense dynamic pressure as measured by the hydrodynamic hinged moment on said hydrofoil, a second dynamic presure sensing means, a high dihedral surface-piercing relative water elevation sensing hydrofoil constrained to substantially translate up or down with respect to the boat, and coupling means for operatively associating said fully submerged hydrofoil, said second dynamic pressure sensing means and said sensing hydrofoil, said coupling means including loading means connected to said strut means and to said sensing hydrofoil and a sequence function unit adapted to receive signals from said second dynamic pressure sensing means and to transmit climb and descend signals during acceleration and deceleration respectively to said loading means approximately at a prescribed boat speed, said loading means responding to said climb and descend signals by releasing and applying respectively a downward load on said sensing hydrofoil in order to abruptly change the level of the boat from hull borne to hydrofoil borne operation and vice versa as represented by the function of dynamic pressure, $h_{ef}$, said coupling means also including a forward extending coupling arm fixed to said fully submerged hydrofoil and pivotally attached to said sensing hydrofoil, said sensing hydrofoil adapted to coacting with said coupling arm to sustain said hydrodynamic hinge moment, to provide an increase in said fully submerged hydrofoil angle setting in the event of an increase in relative water elevation at said sensing hydrofoil, and with said loading means, to provide a prescribed functional relationship between relative water elevation and relative water speed as represented by Equation 149.

6. A hydrofoil apparatus of claim 5 wherein said coupling means is also adapted to provide a manual descend signal at any flying speed for emergency deceleration of the boat.

7. A hydrofoil apparatus adapted for use with a hydrofoil boat for support and stabilization of the boat and for providing a prescribed functional relationship between relative water elevation and relative speed of the boat, said apparatus comprising three fully submerged lifting hydrofoils invariant hinged on strut means for attaching two of said hydrofoils side-by-side at one end of the hull of the boat and one of said hydrofoils at the other end of the boat, each of said hydrofoils also being a speed sensor to sense dynamic pressure as meausred by the hydrodynamic hinge moment on each said hydrofoil, a second dynamic pressure sensing means, a high dihedral surface-piercing relative water elevation sensing hydrofoil located forward of each of said fully submerged hydrofoils and constrained to substantially translate up and down with respect to the boat, and coupling means for operatively associating each of said fully submerged hydrofoils with the preceding sensing hydrofoil and with said second dynamic pressure sensing means, said coupling means including loading means, connected to each of said sensing hydrofoils and to said strut means, and a sequence function unit adapted to receive signals from said dynamic pressure sensing means and to transmit climb and descend signals, during acceleration and deceleration respectively, to said loading means approximately at a prescribed boat speed, said loading means responding to said climb and descend signals by releasing and applying respectively a downward load on each and every said sensing hydrofoil in order to abruptly change the level of the boat from hull borne to hydrofoil borne operation during acceleration and vice versa during deceleration as represented by the function of dynamic pressure, $h_{ef}$, said coupling means also including three forward extending coupling arms each fixed to one of said fully submerged hydrofoils and pivotally attached to said preceding sensing hydrofoils, said preceding sensing hydrofoil being adapted to co-act with the attached coupling arm to sustain said hydrodynamic hinge moment, to provide an increase in said fully submerged hydrofoil angle setting in the event of an increase in relative water elevation at said sensing hydrofoil, and, with said loading means, to provide a prescribed functional relationship between relative elevation and relative water speed of the boat as represented by Equation 149.

8. Hydrofoil apparatus adapted for use with a hydrofoil boat for minimizing flying draft variance of the boat in waves for a given tolerable vertical acceleration and for support and stabilization of the boat, said apparatus comprising forward and aft fully submerged lifting hydrofoils attached to the hull of the boat by strut means and having respectively forward and aft hydrofoil control surfaces rotatable with respect to the hull about substantially beamwise axes by means of forward and aft actuators responsive to forward and aft command signals respectively, forward and aft relative water elevation sensors having approximately optimum lead, forward and aft coupling means adapted respectively to receive forward and aft relative water elevation signals, to form said forward and aft command signals and to transmit said forward and aft command signals to said forward and aft actuators respectively, said forward and aft command signals being formed by multiplying said forward and aft relative water elevation signals by forward and aft control coupling factors respectively and by adding manual boat speed adjustments, said control coupling factors being approximately optimum functions of the opposing wave velocity component divided by boat speed, said forward and aft control coupling factors being manually set into said forward and aft coupling means respectively.

9. Hydrofoil apparatus of claim 8 in which said control coupling factors are simultaneously set into said forward and aft coupling means by the output signals of a function unit, the input signal to the function unit being a manual displacement approximately representing the opposing wave velocity component divided by boat speed.

10. Hydrofoil apparatus adapted for use with a hydrofoil boat for minimizing flying draft variance of the boat in critical waves for a given tolerable vertical acceleration, for providing a prescribed functional relationship between relative water elevation and relative water speed of the boat, and for support and stabilization of the boat, said apparatus comprising forward and aft fully submerged hydrofoils attached to the hull of the boat by strut means and having respectively forward and aft hydrofoil control surfaces rotatable with respect to the hull about substantially beamwise axes by means of forward and aft actuators, said actuators being responsive to forward and aft command signals to produce hydrofoil control surface rotations $\alpha_f$ and $\alpha_a$ respectively, forward and aft relative water elevation sensors with approximately optimum lead to produce signals $\delta_1$ and $\delta_2$ respectively, a speed sensor to produce the signal $q$, forward and aft coupling means adapted to receive signals $\delta_1$, $\delta_2$ and $q$ and forward and aft control coupling factors $A_f$ and $A_a$ respectively, to form and said forward and aft command signals represented by the right hand members of Equations 63 and 64, and to transmit said forward and aft command signals to said forward and aft actuators respectively, to produce forward and aft hydrofoil control surface rotations $\alpha_f$ and $\alpha_a$ in accordance with Equations 63 and 64, said control coupling factors $A_f$ and $A_a$ being set into said coupling means manually.

11. Hydrofoil apparatus of claim 10 wherein said control coupling factors are simultaneously set into said forward and aft coupling means by the output signals of a function unit, the input signal to the function unit being a manual displacement approximately representing the opposing wave velocity component divided by boat speed.

12. The hydrofoil apparatus of claim 10 wherein said forward and aft relative elevation sensors are functionally loaded sensors.

13. Hydrofoil apparatus adapted for use with a hydrofoil boat for minimizing flying draft variance in critical waves for a given tolerable vertical acceleration, for providing a prescribed functional relationship between the mean relative water elevation and relative water speed of the boat, and for support and stabilization of the boat, said apparatus comprising forward and aft fully submerged lifting hydrofoils attached to the hull of the boat by strut means and having at least three hydrofoil control surfaces at least two side-by-side near one end of said hull and at least one near the other end of said hull, said hydrofoil control surfaces being rotatable with respect to said hull about substantially beamwise axes by actuating means responsive to forward, aft and roll command signals to produce hydrofoil control surface rotations $\alpha_f$, $\alpha_a$ and $(\alpha_r - \alpha_l)$ respectively, forward and aft relative water elevation sensors with approximately optimum lead to a produce signals $\delta_1$ and $\delta_2$ respectively, means for sensing roll to produce signal $\gamma$, a speed sensor to produce signal $q$, coupling means adapted to receive signals $\delta_1$, $\delta_2$, $\gamma$ and $q$, manually set in control coupling factors $A_f$ and $A_a$, and manual forward aft elevation and roll trimming signals $B_f$, $B_a$ and $B_r$, to form said forward, aft and roll command signals represented by the right-hand members of Equations $f$, $a$ and $\gamma$ with $K_f$, $K_a$ and $K_o$ equal to zero, and to transmit said forward, aft and roll command signals to said actuating means to produce hydrofoil control surface rotations $\alpha_f$, $\alpha_a$ and $(\alpha_r - \alpha_l)$ in accordance with Equations $f$, $a$ and $\gamma$ with $K_f$, $K_a$ and $K_o$ equal to zero.

14. Hydrofoil apparatus of claim 13 in which said control coupling factors are simultaneously set into said forward and aft coupling means by the output signals of a function unit, the input signal to the function unit being a manual displacement approximately representing the opposing wave velocity component divided by boat speed.

15. The hydrofoil apparatus of claim 13 wherein said forward and aft relative elevation sensors are functionally loaded sensors.

16. Hydrofoil apparatus adapted for use with a hydrofoil boat for minimizing flying draft variance in critical waves for a given tolerable vertical acceleration, for providing a prescribed functional relationship between the mean relative water elevation and relative water speed of the boat, and for support and stabilization of the boat, said apparatus comprising forward and aft fully submerged lifting hydrofoils attached to the hull of the boat by strut means and having at least three hydrofoil control surfaces at least two side-by-side near one end of said hull and at least one near the other end of said hull, said hydrofoil control surfaces being rotatable with respect to said hull about substantially beamwise axes by actuating means responsive to forward, aft and roll command signals to produce hydrofoil control surface rotations $\alpha_f$, $\alpha_a$ and $(\alpha_r - \alpha_l)$ respectively, forward and aft relative water elevation sensors with approximately optimum lead to produce signals $\delta_1$ and $\delta_2$ respectively, means for sensing roll to produce signal $\gamma$, a speed sensor to produce signal $q$, coupling means adapted to receive signals $\delta_1$, $\delta_2$, $\gamma$, $q$, manually set in control coupling factors $A_f$ and $A_a$, and manual forward and aft elevation and roll trimming signals $B_f$, $B_a$ and $B_r$ and angle of steer signal $\theta$ from the steering gear of the boat, to form said forward aft and roll command signals represented by the right hand members of Equations $f$, $a$ and $\gamma$ with $K_f$ and $K_a$ equal to zero and $\theta_c$ equal to $\theta$, and to transmit said forward, aft and roll command signals to said actuating means to produce hydrofoil control surface rotations $\alpha_f$, $\alpha_a$ and $(\alpha_r - \alpha_l)$ in accordance with Equations $f$, $a$ and $\gamma$ with $K_f$ and $K_a$ equal to zero and $\theta_c$ equal to $\theta$.

17. The hydrofoil apparatus of claim 16 wherein at least one of said hydrofoil control surfaces is an invariant hinged hydrofoil and said speed sensor.

18. The hydrofoil apparatus of claim 17 wherein said actuating means includes a hydraulic cylinder actuator for rotating said invariant hinged hydrofoil, and said coupling means is adapted to receive the smoothed hydraulic cylinder pressure of said actuator as a dynamic pressure signal $q$.

19. The hydraulic apparatus of claim 16 wherein at least one of said relative water elevation sensors is a hydrodynamic sensor having a hydraulic loading cylinder to which Q pressure may be applied.

20. The hydrofoil apparatus of claim 16 wherein said coupling means includes a sequence function unit receiving the signal $q$ and forming signals for starting said relative elevation sensors, starting the formation of said command signals in sequence during acceleration and vice versa during deceleration, said sequence function unit being also adapted to produce the function $A_e$.

21. Hydrofoil apparatus adapted for use with a hydrofoil boat for minimizing flying draft variance in critical waves for a given tolerable vertical acceleration, for providing a prescribed functional relationship between the mean relative water elevation and relative water speed of the boat, and for support and stabilization of the boat, said apparatus comprising forward and aft fully submerged lifting hydrofoils attached to the hull of the boat by strut means and having at least three hydrofoil control surfaces at least two side-by-side near one end of said hull and at least one near the other end of said hull, said hydrofoil control surfaces being rotatable with respect to said hull about substantially beamwise axes by actuating means responsive to forward, aft and roll command signals to produce hydrofoil control surface rotations $\alpha_f$, $\alpha_a$ and $(\alpha_r - \alpha_l)$ respectively, forward and aft relative water elevation sensors with approximately optimum lead to produce signals $\delta_1$ and $\delta_2$ respectively, means for sensing roll to produce signal $\gamma$, a speed sensor to produce signal $q$, coupling means adapted to receive signals $\delta_1$, $\delta_2$ $\gamma$ and $q$, manually set in control coupling factors $A_f$ and $A_a$, and manual forward and aft elevation and roll trimming signals $B_f$, $B_a$ and $B_r$ and angle of steer signal $\theta$ from the steering gear of the boat, to form said forward, aft and roll command signals represented by the right hand members of Equations $f$, $a$ and $\gamma$, and to transmit said forward, aft and roll command signals to said actuating means to produce hydrofoil control surfce rotations $\alpha_f$, $\alpha_a$ and $(\alpha_r - \alpha_l)$ in accordance with Equations $f$, $a$ and $\gamma$, said coupling means having a steering function unit to produce the signals $\theta_b$ and $\theta_c$.

22. Hydrofoil apparatus adapted for use with a hydrofoil boat for minimizing flying draft variance in critical waves for a given tolerable vertical acceleration, for providing a prescribed functional relationship between the mean relative water elevation and relative water speed of the boat, for support and stabilization of the boat, said apparatus comprising forward and aft fully submerged hydrofoils attached to the hull of the boat by strut means and having one hydrofoil control surface forward and two side-by-side aft, said hydrofoil control surfaces being rotatable with respect to said hull about substantially beamwise axes with actuating means responsive to forward, right aft and left aft command signals to produce hydrofoil control surface rotations $\alpha_f$, $\alpha_{ar}$ and $\alpha_{al}$ respectively, forward right aft and left aft relative water elevation sensors with approximately optimum lead to produce signals $\delta_1$, $\delta_{2r}$ and $\delta_{2l}$ respectively, a speed sensor to produce signal $q$, coupling means adapted to receive signals $\delta_1$, $\delta_{2r}$ and $\delta_{2l}$ and $q$, manually set in control coupling factors $A_f$ and $A_a$, manual forward, right aft and left aft trimming signals $B_f$, $B_{ar}$ and $B_{al}$, and angle of steer signal $\theta$ from the steering gear of the boat to form said forward, right aft and left aft command signals represented by the right hand members of Equations 71, 72 and 73, and to transmit said forward, right aft and left aft command signals to said actuating means to produce hydrofoil control surface rotations $\alpha_f$, $\alpha_{ar}$ and $\alpha_{al}$ in accordance with Equations 71, 72 and 73 said coupling means having a function unit for producing the signals $\theta_b$ and $\theta_c$ from $\theta$.

23. A hydrofoil apparatus adapted for use with a hydrofoil boat for partially supporting and stabilizing the boat comprising a hydrofoil invariant hinged to strut means for attaching said hydrofoil to the hull of the boat, coupling means including a pivot connection to said hydrofoil for determining the angle setting of said hydrofoil and means for sustaining the reaction of the hydrodynamic moment on said hydrofoil about the hinge axis, and for transmitting a signal proportional to said reaction, said signal being the speed signal.

24. The hydrofoil apparatus of claim 23 wherein a hydraulic actuated cylinder extending from a strut connection to said pivot is the means for sustaining and transmitting said reaction.

25. The hydrofoil apparatus of claim 24 in which the smoothed hydraulic actuator cylinder pressure becomes the speed signal.

26. A hydrofoil-strut assembly for partial support and stabilization of a hydrofoil boat including at least one streamlined hollow, downward extending strut attached to the hull of said boat, at least one hydrofoil, extending laterally with respect to the boat, to which hydrofoil is rigidly attached at least one stub-strut extending upwardly into the interior of said hollow strut and pivoted thereto about a substantially beamwise axis and actuating means within said hollow strut, operatively associated with said stub-strut for rotating said hydrofoil about said axis in response to a signal from the control of said boat, the vertical distance between said axis and the upper surface of said hydrofoil being not more than one chord of the hydrofoil and not less than one-eighth of one chord, at least that portion of the surfaces of said stub-strut that may not be covered by said hollow strut being streamlined, the opening at the bottom of said hollow strut into which said stub-strut extends having a shape similar to and just enough larger than said stub-strut for any operating $\alpha$ of said hydrofoil to permit rotation of said hydrofoil within the operating range of said $\alpha$ to minimize the gap between said stub-strut and said hollow strut for a given shape of said stub-strut, in order to reduce the drag of said assembly.

27. The assembly of claim 26 in which at least the streamlined surface of said stub-strut that may be covered by said hollow strut is a surface of revolution about said beamwise axis to minimize said gap.

28. The assembly of claim 26 in which the lower end of said actuating means is a connecting rod extending upward within said hollow strut.

29. The assembly of claim 26 wherein said hydrofoil is an invarient hinged hydrofoil.

30. The assembly of claim 26 wherein said hydrofoil is a functionally hinged hydrofoil.

31. In a hydrofoil apparatus adapted for use with a hydrofoil boat for partially supporting and stabilizing the boat, a first fully submerged sensing means to sense dynamic pressure as a function of boat speed, a second sensing means (at a selected distance forward of one of said hydrofoils) to sense water level with respect to the boat, means to provide a loading force on said second sensing means, and means to provide said loading force as a prescribed function of boat speed.

32. In the boat of claim 31 said second sensing means being partly submerged, said loading force causing the second sensing means to penetrate the water an amount that is substantially independent of boat speed.

33. In the boat of claim 32, a said second sensing means at a selected distance forward of each hydrofoil.

34. The device of claim 31 wherein said first sensing means comprises a bladed water engaging device.

35. The device of claim 34 wherein said first sensing means comprises a propeller restrained to rotate less than one revolution.

36. The device of claim 34 wherein said first sensing means comprising a rotating propeller.

37. The device of claim 31 wherein said second sensing means is a ski-like planing member mounted on a boom.

38. The device of claim 31 wherein said second sensing means is a surface piercing hydrofoil.

39. The device of claim 38 wherein said second sensing means is connected to said combined first sensing means and hydrofoil is such manner that:

$$M_h = M_L$$

40. The device of claim 31 wherein said second means comprises a forwardly extending boom and a drag probe member hingedly connected to the forward end of said boom and extending downwardly therefrom.

41. In the control of $\alpha$ for a hydrofoil of a hydrofoil boat, the combination of a sensor producing a relative water speed signal $q$ and a reciprocal function unit receiving said signal and approximately producing a second signal, $w/Kq$, as a component of the total signal in said control determining $\alpha$.

42. The combination of claim 41 wherein said relative water speed sensor is an invariant hinged hydrofoil.

43. The combination of claim 42 wherein said function unit is a surface-piercing sensing hydrofoil mounted to translate with respect to said boat and to take the reaction of the hydrodynamic moment on said invariand hinged hydrofoil.

44. The combination of claim 41 wherein said relative water speed signal is a pressure proportional to $q$, said function unit comprising a hydraulic cylinder with plunger subject to said pressure, the reaction of said plunger being taken by spring means having a non-linear relationship between said pressure and the displacement of said spring means such that the displacement of said spring means is the second signal.

45. In the control of $\alpha$ for a hydrofoil of a hydrofoil boat, the combination of a sensor producing a relative water speed signal $q$, a second sensor porducing a relative water elevation signal, $\delta$, a sequence function unit receiving said signal $q$ and producing a prescribed function of $q$ $A_e$, and means for adding $\delta$ to $A_e$ and multiplying the sum by a control coupling factor A to form the signal $$\frac{A}{1}(\delta + A_e)$$

as a component of the total signal in said control determining $\alpha$.

46. Apparatus for automatically regulating the flying elevation and pitch of a hydrofoil boat substantially independent of boat speed, said boat having at least one forward and at least one aft fully submerged hydrofoils each of which including at least one control surface, said apparatus including at least one relative water elevation sensor, at least one relative water speed sensor, and a coupling between said sensors and said control surfaces, said coupling being defined by Equations 63 and 64.

47. The apparatus of claim 46 wherein E is zero and $A_f$ is one.

48. The apparatus of claim 47 wherein said relative water elevation sensor is a surface-piercing hydrofoil.

49. The apparatus of claim 46 wherein one of said fully submerged hydrofoils is invariant hinged and otherwise adapted to be said relative water speed sensor.

50. The apparatus of claim 46 wherein $A_f$ and $A_a$ are selected for optimum performance in waves on the basis of boat speed and the opposing wave velocity component.

51. The apparatus of claim 46 wherein $A_f$ and $A_a$ are selected about as follows:

$A_f = .8$ for head and following seas and all wave lengths
$A_a = 1$ for following seas with $\lambda/b > 1$
$A_a = 0$ for following seas with $\lambda/b < 1$; for head seas with $\lambda b / > 0$ 52. The apparatus of claim 46 wherein $A_f$ and $A_a$ are selected about as follows:

$A_f = .8$ and $A_a = 1$ in following seas with $1 < \lambda/b$
$A_f = .3$ and $A_a = 0$ in following seas $\lambda/b < 1$
$A_f = .3$ and $A_a = 0$ in following seas $\lambda/b < 1$ in head seas $\lambda/b < 2.8$
$A_f = .5$ and $A_a = 0$ in head seas $2.8 < \lambda/b < 6.3$
$A_f = .8$ and $A_a = 0$ in head seas $\lambda/b > 6.3$ 53. Apparatus for automatically controlling the elevation and pitch of a hydrofoil boat, said boat having at least one forward and at least one aft fully submerged hydrofoil, said hydrofoils including at least three control surfaces, two being spaced laterally from each other, said boat having at least one control surface for steering the boat, said apparatus including at least one forward and one aft relative water elevation sensor, one relative water speed sensor, and a coupling between said sensors and said control surfaces, said coupling being defined by Equations $f$ and $a$.

54. The apparatus for automatically controlling the elevation and pitch of a hydrofoil boat, said boat having at least one forward and at least one aft fully submerged hydrofoil, said hydrofoils including at least three control surfaces, two being spaced laterally from each other, said boat having at least one control surface for steering the boat, said apparatus including one forward and one aft relative water elevation sensor, a relative water speed sensor, and a coupling between said sensors and said control surface, said coupling being defined by Equations $fa$ and $aa$.

55. Apparatus for automatically controlling the elevation, pitch, and roll of a hydrofoil boat, said boat having at least one forward and at least one aft fully submerged hydrofoil, said hydrofoils including at least three control surfaces two being spaced laterally from each other, said boat having at least one control surface for steering the boat, said apparatus including one forward and one aft relative water elevation sensor, a relative water speed sensor, a roll sensor and a coupling between said sensors and said control surfaces, said coupling being defined by Equations $f$, $a$, and $\gamma$.

56. Apparatus for automatically controlling the elevation, pitch, and roll of a hydrofoil boat, said boat having at least one forward and one aft fully submerged hydrofoil, said hydrofoils including four control surfaces, two forward spaced laterally from each other and two aft similarly spaced, said boat having at least one additional control surface for steering the boat, said apparatus including four relative water elevation sensors, a relative water speed sensor and a coupling between said sensors and said control surfaces, said coupling being defined by Equations $fr$, $fl$, $ar$, and $al$.

57. Apparatus for automatically controlling the elevation pitch, and roll of a hydrofoil boat, said boat having at least one forward and one aft fully submerged hydrofoil, said hydrofoils including two control surfaces forward spaced laterally from each other, and one control surface aft, said boat having at least one control surface for steering the boat, said apparatus including three relative water elevation sensors, a relative water speed sensor, and a coupling between said sensors and said control surfaces, said coupling being defined by Equations $fr$, $fl$, and $a$.

58. Apparatus for automatically controlling the elevation, pitch, and roll of a hydrofoil boat, said boat having at least one forward and one aft fully submerged hydrofoil, said hydrofoils including one control surface forward and two control surfaces aft, the aft control surfaces being spaced laterally from each other, said boat having at least one control surface for steering the boad, said apparatus including three relative water elevation sensors, a relative water speed sensor and a coupling between said sensors and said control surfaces, said coupling being defined by Equations 71, 72, and 73.

59. In the control of $\alpha$ for a hydrofoil of a hydrofoil boat, the combination of a sensor producing a relative water speed signal, a hydrodynamic sensor producing a relative water elevation signal, and a function unit receiving said relative water speed signal and producing signals as prescribed functions of said relative water speed signal to extend said hydrodynamic sensor from a retracted position to an operating position at sensor down speed, and to uncage said control at uncage speed both during acceleration of the boat and vise versa during deceleration, and when said hydrodynamic sensor is extended, to provide a downward force to hold said hydrodynamic sensor on the water surface.

60. Apparatus for controlling the pitch and elevation of a hydrofoil boat with substantially no variation in pitch due to changes in boat speed during flight, the hull of said boat being normally supported above the water surface by forward and aft fully submerged hydrofoils at forward and aft positions, each said hydrofoil extending transversely of said boat and attached to said hull through strut means, said hydrofoils having at least three control surfaces rotatable about transversely extending axes for varying the angles $\alpha_f$ and $\alpha_a$ and the angle difference $(\alpha_r - \alpha_l)$ of said hydrofoils, two of said control surfaces being spaced transversely of said boat at one of said positions and the third of said control surfaces being at the other of said positions, said apparatus comprising at least one forward relative water elevation sensor producing the signal $\delta_1$, a relative water speed sensor producing the signal $q$, forward coupling means including signal computing, smoothing function and control surface actuation apparatus, said forward coupling means receiving at least the signals $\delta_1$, $\alpha_f$ and $B_f$, $B_f$ being manually set into said forward coupling means to adjust the relative water elevation primarily as needed on account of changes in boat speed, load and load distribution on the boat and to raise the boat to flying elevation during acceleration and to lower the boat to floating elevation during deceleration, aft coupling means including signal computing, smoothing function, reciprocal function and control surface actuation apparatus, said aft coupling means receiving at least the signals $\alpha_a$, $q$, and $B_a$, $B_a$ being manually set into said aft coupling means primarily to adjust the pitch due to changes in load or load distribution on the boat, said forward and aft coupling means producing rotational velocities of said control surfaces corresponding approximately to the rotational velocities $$\dot{\alpha}_f \text{ and } \dot{\alpha}_a$$

respectively of said forward and aft hydrofoils in accordance with:

$$\alpha_f + E\dot{\alpha}_f = B_f - \frac{A\delta_1}{l_1}$$

$$\alpha_a + E\dot{\alpha} = \frac{w_{ah}}{Kq} + B_a$$

A being a coupling factor, $l_1$ being the relative water elevation sensor lead, E being an approximately optimum smoothing function parameter, $w_{ah}$ being the aft hydrofoil load per square foot, and K being the ratio of an increment in hydrofoil lift coefficient to the corresponding increment in hydrofoil angle of attack.

61. In the boat of claim 60, means to respond, as the boat accelerates from floating condition, to a signal which is a function of the forward speed of the boat, to uncage said control means and to respond, as the boat decelerates from flying condition, to a signal which is a function of the forward speed of the boat, to cage said control means.

62. In the boat of claim 60, means to respond, as the boat accelerates from floating condition, to a signal which is a function of the forward speed of the boat, to extend to said second sensing means, and to respond, as the boat decelerates from flying condition, to a signal which is a function of the forward speed of the boat, to retract said second sensing means.

63. The device of claim 60 provided with means to, sequentially, as the boat accelerates from floating condition, respond to a signal which is a function of the forward speed of the boat to first uncage said control means and then change the hydrofoil angle settings to raise the boat to flying position, and to sequentially, as the boat decelerates from flying condition, respond to a signal which is a function of the forward speed of the boat to first change the hydrofoil angle settings to lower the boat to floating position and then cage said control means.

64. The device of claim 61, provided with means to, sequentially, as the boat accelerates from floating condition, respond to a signal which is a function of the forward speed of the boat to first extend said second sensing means, and then uncage said control means and to sequentially, as the boat decelerates from flying condition, respond to a signal which is a function of the forward speed of the boat to first cage said control means and then retract said second sensing means.

65. The device of claim 62, provided with means to, sequentially, as the boat accelerates from floating condition, respond to a signal which is a function of the forward speed of the boat to first extend said second sensing means and then change the hydrofoil angle settings to raise the boat to flying position, and to, sequentially, as the boat decelerates from flying condition, respond to a signal which is a function of the forward speed of the boat to first change the hydrofoil angle settings to lower the boat to floating position and then retract said second sensing means.

66. The device of claim 63, provided with means to, sequentially, as the boat accelerates from floating condition, respond to a signal which is a function of the forward speed of the boat to first extend said second sensing means and then uncage said control means and then change the hydrofoil angle settings to raise the boat to flying position, and to, sequentially, as the boat decelerates from flying condition, respond to a signal which is a function of the forward speed of the boat to first change the hydrofoil angle settings to lower the boat to floating position and then cage said control means and then retract said second sensing means.

67. The apparatus of claim 60 plus roll control apparatus, including provision for automatic banking in turns, comprising, a roll sensor producing the signal $\gamma$, roll coupling means including signal computing, smoothing function, and control surface actuating apparatus, said roll coupling means receiving the signals $\gamma$, $\theta_c$, $(\alpha_r - \alpha_l)$ and $B_r$, $\theta_c$ being a steering angle signal and $B_r$ being manually set into said roll coupling means to trim said boat in roll, said roll coupling means producing roll correction motion corresponding to $$(\dot{\alpha}_r - \dot{\alpha}_l)$$

in accordance with:

$$(\alpha_r - \alpha_l) + E_r(\dot{\alpha}_r - \dot{\alpha}_l) = B_r - A_r(\gamma + K_\gamma \theta_c)$$

$E_r$ being an approximately optimum smoothing function parameter, and $A_r$ being a constant.

68. Apparatus for controlling the pitch and elevation of a hydrofoil boat with substantially no variation in pitch or elevation of said boat due to changes in boat speed during flight, the hull of said boat being normally supported above the water surface by forward and aft fully submerged hydrofoils at forward and aft positions, each said hydrofoil extending transversely of said boat and attached to said hull through strut means, said hydrofoils having at least three control surfaces rotatable about transversely extending axes for varying the angles $\alpha_f$ and $\alpha_a$ and the angle difference $(\alpha_r-\alpha_1)$ of said hydrofoils, two of said control surfaces being spaced transversely of said boat at one of said positions and the third of said control surfaces being at the other of said positions, said apparatus comprising at least one forward relative water elevation sensor producing the signal $\delta_1$, a relative water speed sensor producing the signal $q$, forward coupling means including signal computing, smoothing function, reciprocal function, sequence function and control surface actuation apparatus, said forward coupling means receiving at least the signals $\delta_1$, $\alpha_f$, $q$, $A_e$ and $B_f$, $A_e$ being a control coupling term which changes the elevation of said boat as a prescribed function of boat speed during acceleration and deceleration, $B_f$ being manually set into said forward coupling means to adjust the relative water elevation primarily on account of changes in load and load distribution on said boat, aft coupling means including signal computing, smoothing function, reciprocal function and control surface actuation apparatus, said aft coupling means receiving at least the signals $\alpha_a$, $q$, and $B_a$ being manually set into said aft coupling means primarily to adjust the pitch due to changes in load or load distribution of the boat, said forward and aft coupling means producing rotational velocities of said control surfaces corresponding approximately to the rotational velocities $$\dot{\alpha}_f \text{ and } \dot{\alpha}_a$$

respectively of said forward and aft hydrofoils in accordance with:

$$\alpha_f + E\dot{\alpha}_f = \frac{w_{fh}}{Kq} + B_f - \frac{A(\delta_1 + A_e)}{l_1}$$

$$\alpha_a + E\dot{\alpha}_a = \frac{w_{ah}}{Kq} + B_a$$

A being a coupling factor, $l_1$ being the relative water elevation sensor lead, E being an approximately optimum smoothing function parameter, $w_{fh}$ and $w_{ah}$ being the forward and aft hydrofoil load per square foot respectively, and K being the ratio of an increment in hydrofoil lift coefficient to the corresponding increment in hydrofoil angle of attack.

69. The apparatus of claim 68 plus roll control apparatus, including provision for automatic banking in turns, comprising, a roll sensor producing the signal $\gamma$, roll coupling means including signal computing, smoothing function, and control surface actuating apparatus, said roll coupling means receiving the signals $\gamma$, $\theta_c$, $(\alpha_r-\alpha_1)$ and $B_r$, $\theta_c$ being a steering angle signal and $B_r$ being manually set into said roll coupling means to trim said boat in roll, said roll coupling means producing roll correction motion corresponding to $$(\dot{\alpha}_r - \dot{\alpha}_1)$$

in accordance with:

$$(\alpha_r-\alpha_1) + E_r(\dot{\alpha}_r-\dot{\alpha}_1) = B_r - A_r(\gamma + K_\gamma \theta_c)$$

$E_r$ being an approximately optimum smoothing function parameter, and $A_r$ being a constant.

70. Apparatus for controlling the pitch and elevation of a hydrofoil boat at a given boat speed to minimize the flying draft variance in waves for a given tolerable vertical acceleration, the hull of said boat being normally supported above the water surface by forward and aft fully submerged hydrofoils at forward and aft positions, each of said hydrofoils extending transversely of said boat and attached to said hull through strut means, said hydrofoils having a total of at least three control surfaces rotatable about transversely extending axes for varying the angles $\alpha_f$ and $\alpha_a$ and the angle difference $(\alpha_r-\alpha_f)$ of said hydrofoils, two of said control surfaces being spaced transversely of said boat at one of said positions and the third of said control surfaces being at the other of said positions, said apparatus comprising forward and aft relative water elevation sensors producing signals $\delta_1$ and $\delta_2$ respectively, the sensing points of said forward and aft relative water elevation sensors leading said forward and aft hydrofoils by $l_1$ and $l_2$ respectively, such leads being approximately optimum, forward and aft coupling means including signal computing, smoothing function and control surface actuation apparatus, said forward and aft coupling means receiving signals $\delta_1$ and $\delta_2$ $$\overline{\alpha}_f \text{ and } \overline{\alpha}_a$$

$A_f$ and $A_a$ respectively, the signals $$\overline{\alpha}_f \text{ and } \overline{\alpha}_a$$

being the variations in $\alpha_f$ and $\alpha_a$ respectively at said given forward speed, the signals $A_f$ and $A_a$ being approximately optimum coupling factors manually set into said forward and aft coupling means respectively on the basis of said given forward boat speed and a current estmiate of the opposing wave velocity component, said forward and aft coupling means producing rotational velocities of said control surfaces corresponding approximately to the rotational velocities $$\dot{\alpha}_f \text{ and } \dot{\alpha}_a$$

respectively of said forward and aft hydrofoils in accordance with:

$$\overline{\alpha}_f + E\dot{\alpha}_f = -\frac{A_f\delta_1}{l_1}$$

$$\overline{\alpha}_a + E\dot{\alpha}_a = -\frac{A_a\delta_2}{l_2}$$

E being an approximately optimum smoothing function parameter.

71. Apparatus for controlling the pitch and elevation of a hydrofoil boat to minimize the flying draft variance in waves for a given tolerable vertical acceleration, the hull of said boat being normally supported above the water surface by forward and aft fully submerged hydrofoils at forward and aft positions, each of said hydrofoils extending transversely of said boat and attached to said hull through strut means, said hydrofoils having a total of at least three control surfaces rotatable about transversely extending axes for varying the angles $\alpha_f$ and $\alpha_a$ and the angle difference $(\alpha_r-\alpha_1)$ of said hydrofoils, two of said control surfaces being spaced transversely of said boat at one of said positions and one of said control surfaces being at the other of said positions, said apparatus comprising forward and aft relative water elevation sensors producing signals $\delta_1$ and $\delta_2$, the sensing points leading said forward and aft hydrofoils by $l_1$ and $l_2$ respectively, such leads being approximately optimum, forward and aft coupling means receiving signals $\delta_1$ and $\delta_2$, $\alpha_f$ and $\alpha_a$, $A_f$ and $A_a$, $B_f$ and $B_a$, respectively, the signals $A_f$ and $A_a$ being approximately optimum coupling factors manually set into said forward and aft coupling means respectively on the basis of the boat speed and a current estimate of the opposing wave velocity component being encountered by said boat, the signals $B_f$ and $B_a$ being manually set into said forward and aft coupling means respectively to adjust the pitch and relative water elevation, primarily where needed on account of changes in speed, load and load distribution on said boat, said forward and aft coupling means producing rotational velocities of said forward and aft hydrofoils $$\dot{\alpha}_f \text{ and } \dot{\alpha}_a$$

respectively in accordance with:

$$\alpha_f + E\dot{\alpha}_f = B_f - \frac{A_f\delta_1}{l_1}$$

$$\alpha_a + E\dot{\alpha}_a = B_a - \frac{A_a\delta_2}{l_2}$$

The smoothing parameter E being approximately optimum.

72. The apparatus of claim 71 plus roll control apparatus, including provision for automatic banking in turns, comprising, a roll sensor producing the signal $\gamma$, roll coupling means including signal computing, smoothing function, and control surface actuating apparatus, said roll coupling means receiving the signals $\gamma$, $\theta_c$, $(\alpha_r - \alpha_1)$ and $B_r$, $\theta_c$ being a steering angle signal and $B_r$ being manually set into said roll coupling means to trim said boat in roll, said roll coupling means producing roll correction motion corresponding to $$(\dot{\alpha}_r - \dot{\alpha}_1)$$

in accordance with:

$$(\alpha_r - \alpha_1) + E_r(\dot{\alpha}_r - \dot{\alpha}_1) = B_r - A_r(\gamma + K_\gamma \theta_c)$$

$E_r$ being an approximately optimum smoothing function parameter, and $A_r$ being a constant.

73. Apparatus for controlling the pitch and elevation of a hydrofoil boat to minimize the flying draft variance in waves for a given tolerable vertical acceleration with substantially no variation in pitch or elevation of said boat due to changes in boat speed while foil-borne, the hull of said boat being normally supported above the water surface by forward and aft fully submerged hydrofoils at forward and aft positions, each of said hydrofoils extending transversely of said boat and attached to said hull through strut means, said hydrofoils having a total of at least three control surfaces rotatable about transversely extending axes, two of said control surfaces being spaced transversely of said boat at one of said positions and one of said control surfaces being at the other of said positions, for varying the angles $\alpha_f$ and $\alpha_a$ and the angle difference $(\alpha_r - \alpha_1)$ of said hydrofoils, said apparatus comprising forward and aft relative water elevation sensors producing the signals, $\delta_1$ and $\delta_2$, the sensing points leading said forward and aft hydrofoils by $l_1$ and $l_2$ respectively, such leads being approximately optimum, forward and aft coupling means including signal computing, smoothing function, reciprocal function and control surface actuating apparatus, said forward and aft coupling means, receiving signals $\delta_1$ and $\delta_2$, $\alpha_f$ and $\alpha_a$, $A_f$ and $A_a$, $B_f$ and $B_a$, and $q$, the $A_f$ and $A_a$ being approximately optimum coupling factors manually set into said forward and aft coupling means respectively on the basis of said given boat speed and a current estimate of the opposing wave velocity component, the signals $B_f$ and $B_a$ being manually set into said forward and aft coupling means respectively to adjust the pitch and relative water elevation of the boat, primarily as needed on account of changes in pitch and relative water elevation due to changes in load, and load distribution on said boat and to raise the boat to flying elevation during acceleration and to lower the boat to floating elevation during deceleration, said forward and aft coupling means producing rotational velocities of said control surfaces corresponding approximately to the rotational velocities $$\dot{\alpha}_f \text{ and } \dot{\alpha}_a$$

respectively of said forward and aft hydrofoils in accordance with:

$$\alpha_f + E\dot{\alpha}_f \frac{w_{fh}}{Kq} + B_f - \frac{A_f \delta_1}{l_1}$$

$$\alpha_a + E\dot{\alpha}_a = \frac{w_{ah}}{Kq} + B_a - \frac{A_a \delta_1}{l_1}$$

The smoothing parameter E being approximately optimum.

74. The apparatus of claim 73 plus roll control apparatus, including provision for automatic banking in turns, comprising, a roll sensor producing the signal $\gamma$, roll coupling means including signal computing, smoothing function, and control surface actuating apparatus, said roll coupling means receiving the signals $\gamma$, $\theta_c$, $(\alpha_r - \alpha_1)$ and $B_r$, $\theta_c$ being a steering angle signal and $B_r$ being manually set into said roll coupling means to trim said boat in roll, said roll coupling means producing roll correction motion corresponding to $$(\dot{\alpha}_r - \dot{\alpha}_1)$$

in accordance with:

$$(\alpha_r - \alpha_1) + E_r(\dot{\alpha}_r - \dot{\alpha}_1) = B_r - A_r(\tau + K_\gamma \theta_c)$$

$E_r$ being an approximately optimum smoothing function parameter, and $A_r$ being a constant.

75. The apparatus of claim 70 plus a control coupling component which receives a signal $c$ representing the opposing wave velocity component and produces signals representing approximately optimum coupling factors $A_f$ and $A_a$, $A_f$ and $A_a$ being functions of $c$ for a given boat and boat speed, and $c$ being currently estimated by the boat operator on the basis of the waves being encountered and manually set into said function unit.

76. In the control of $\alpha$ for a hydrofoil of a hydrofoil boat, the combination of a sensor producing a relative water speed signal $q$, a reciprocal function unit receiving $q$ and approximately producing a second signal $w/Kq$, a sequence function unit receiving $q$ and producing a prescribed function of $q$, $A_e$, a second sensor producing a relative water elevation signal $\delta$, and coupling means receiving the signals $w/Kq$, $A_e$, $\delta$ and the control coupling factor A and producing the signal $$\frac{w}{Kq} - \frac{A}{1}(\delta + A_e)$$

as a component of the total signal in the said control determining $\alpha$.

References Cited

UNITED STATES PATENTS

| | | |
|---|---|---|
| 955,343 | 4/1919 | Meacham. |
| 2,387,907 | 10/1945 | Hook. |
| 2,603,179 | 7/1952 | Gardiner. |
| 2,914,014 | 11/1959 | Carl et al. _____ 114—66.5 |
| 3,156,209 | 11/1964 | Ask. |
| 3,209,714 | 10/1965 | Bowles. |

ANDREW H. FARRELL, Primary Examiner

UNITED STATES PATENT OFFICE
CERTIFICATE OF CORRECTION

Patent No. 3,465,704　　　　　　　　Dated September 9, 1969

Inventor(s) John Gordon Baker

It is certified that error appears in the above-identified patent and that said Letters Patent are hereby corrected as shown below:

Column 1, lines 49 and 50 (line 37 in the inserted abstract), replace "planning" with -- planing --.

Column 1, line 54 (line 42 in the inserted abstract), replace "is" with -- in --.

Column 6, line 67 (page 10, line 5), replace "means" with -- mean --.

Column 7, after line 6 (page 10, after line 15), before "Coupling", insert new paragraph -- "Control surface" is part or all of a hydrofoil, strut, rudder or propeller which participates in the control of the boat. --.

Column 7, (page 10, after line 23), cancel lines 16 - 22.

Column 7, line 33, (page 11, line 3), replace "related" with -- relative --.

Column 8, line 7 (page 12, line 15), replace "meansure" with -- measure --.

Column 9, line 47 (page 16, line 2), replace "δ perpendicular" with -- $\frac{\delta}{T}$ --.

Column 9, line 48 (page 16, line 2), place "(dimensionless)" after "a" at right-hand margin.

Column 9, line 70 (page 16, line 16), after "FIGURE 25.", at right-hand margin, insert -- (ft.) --.

Column 11, line 3 (page 19, line 13), replace "flane" with -- plane --.

Column 11, line 13 (page 19, line 21), replace "$h_a$" with -- $h_e$ --.

Column 11, line 30 (page 20, line 11), after "$K_1$" add -- , --.

Column 11, line 36 (page 20, line 15), replace "$K_q$" with -- $K_p$ --.

Column 11, line 42 (page 20, in the insertion at line 20), replace "betwen" with -- between --.

Column 12, line 45 (page 22, line 21), replace "portional" with -- proportional --.

Column 12, line 56 (page 23, line 8), after "forward" insert -- and --.

Column 13, cancel lines 20 - 22.

Column 13, line 30 (page 25, line 6), replace " $\overset{Y_f}{\lambda}$ " with -- $\dfrac{Y_f}{\lambda}$ --.

Column 13, line 38 (page 25, line 12), in equation, replace the numerator "A" with -- $A_f$ --.

Column 13, line 59 (page 26, line 1), after "lift" insert -- for a --.

Column 13, line 69 (page 26, line 8), replace "$a_f$" second occurrence with -- $\underline{a}_f$ --.

Column 13, line 72 (page 26, line 10), before "$\underline{a}_a$" insert -- $a_{a'}$ --.

Column 14, line 1 (page 26, line 12), replace "$a_f$" with -- $a_f$ --.

Column 14, line 42 (page 27, line 14), after "plane.", at right-hand margin, insert -- (ft.) --.

Column 14, line 54 (page 27, line 25), replace "δ" first occurrence with -- $\bar{\delta}$ --.

Column 14, line 69 (page 28, line 15), replace "seat" with -- sea --.

Column 19, line 40 (page 38, line 16), replace "115" with -- 145 --.

Column 21, line 71 (page 43, line 10), replace "20" with -- 280 --.

Column 25, line 3 (page 50, line 1), in equation (8), replace the numerator "$w_{fn}$" with -- $w_{fh}$ --.

Column 25, line 55 (page 51, line 17), in equation (14), replace "$\sigma_1$" with -- $\delta_1$ --.

Column 26, line 4 (page 52, line 9), replace "$a_f$" with -- $\dot{a}_f$ --.

Column 29, line 49 (page 60, line 1), after "$2K_a\theta_b^2$" insert -- ] --.

Column 29, line 58 (page 60, line 8), after "necting" insert -- rod --.

Column 30, line 5 (page 61, line 5), replace "50" with -- 550 --.

Column 30, line 27, equation (30) (page 61, line 18), replace "$\sigma_{595}$" with -- $\sigma_{559}$ --.

Column 31, line 34 (page 64, line 6), replace "586" with -- 596 --.

Column 31, line 72 (page 65, line 8), cancel "$\sigma_{620}$ of the guided connecting tube."

Column 32, line 4 (page 65, after line 12), cancel.

Column 32, line 60 (page 67, line 9), replace "roates" with -- rotates --.

Column 33, line 4 (page 68, line 1) equation (50), replace numerator "$-\sigma_{742}$" with -- $-\sigma_{642}$ -- and after "+" second occurrence insert -- $2A_e +$ --.

Column 39, line 25 (page 83, line 12) equation (60), replace numerator "$\lambda_2$" with -- $\lambda^2_2$ --.

Column 40, line 65 (page 86, in the insertion after line 5) equation (63u), replace "(63u" with -- (63u) --.

Column 41, line 8 (page 86, in the insertion after line 5) equation (64v), replace "$E\bar{a}_a$" with -- $E\dot{a}_a$ --.

Column 42, line 25 (page 87, line 6), replace "$h_2$" with -- $\ddot{h}_2$ --.

Columns 41 and 42, Table I, column "300", line 9 (page 88, line 7), replace "0.29 with -- .029 --.

Columns 41 and 42, Table I, column "300", line 15 (page 88, line 11), replace "0.31" with -- .031 --.

Columns 41 and 42, Table I, column "300", line 16 (page 88, line 12), replace "0.31" with -- .031 --.

Columns 41 and 42, Table I, column "200", line 5 (page 88, line 4), replace "2.092" with -- 2.902 --.

Columns 41 and 42, Table I, column "50", line 33 (page 88, line 24), replace "2.226" with -- 2.126 --.

Columns 43 and 44, Table II, column "75", line 8 (page 89, line 6), replace "39.41" with -- 41.36 --.

Columns 43 and 44, Table II, column "100", line 8 (page 89, line 6), replace

"41.36" with -- 39.41 --.

Column 43, line 67 (page 90, line 18), replace "later" with -- latter --.

Column 43, line 71 (page 90, line 20), replace "means" with -- mean --.

Column 44, line 67 (page 91, line 15), after "either by" insert -- two --.

Column 47, line 8 (page 96, line 17), cancel "two" and before "sensors" insert -- two --.

Column 47, line 35 (page 97, line 8) equation (69), replace "$\delta_1$" with -- $\delta_{21}$ -- and "$-\delta_{2d}$" with -- $\delta_{21}$) --.

Column 48, line 23 (page 98, in the insertion after line 22), replace "$\frac{W_{fh}}{Kq} + B_f$" with -- $\left[\frac{W_{fh}}{Kq} + B_f\right]$ -- and replace "$\frac{W_{ah}}{Kq} + B_a$" with -- $\left[\frac{W_{ah}}{Kq} + B_a\right]$ --.

Column 49, line 5 (page 99, line 18), after "control" insert -- surface --.

Column 49, line 20 (page 100, line 7) equation (γ), cancel "D".

Column 49, line 26 (page 100, line 11) equation (fr), replace "$\dot{a}$" with -- $a_{fr}$ --

Column 49, line 41 (page 101, line 2) equation (fr), after "$E\dot{a}_{fr}$" replace " - " with -- = --.

Column 49, line 59 (page 101, line 8) equation (al), after "$+B_{al}$" insert -- - --.

Column 49, line 73 (page 102, line 6), replace "functiotnally" with -- functionally --.

Column 52, line 41 (page 109, line 5), replace "rectagular" with -- rectangular --

Column 54, line 21 (page 114, line 3), replace "$av_2\alpha_p$" with -- $av^2\alpha_p$ --.

Column 54, line 41 (page 114, line 14), replace "coefficient" with -- coefficients --.

Column 54, line 69 (page 115, line 9) equation (111), replace denominator "$dx_f$" with -- $dx_a$ --.

Column 55, line 9 (page 116, line 1) equation (114), after ")" first occurrence insert -- $\Big]$ --.

Column 55, line 50 (page 117, line 3), replace "$\alpha_f$" with -- $\bar{\alpha}_f$ --.

Column 55, line 51 (page 117, line 4), replace "$\alpha_a$" with -- $\bar{\alpha}_a$ --.

Column 55, line 67 (page 118, line 2) equation (121), replace "(-lb)" with -- (1 - b) --.

Column 56, line 11 (page 118, line 9) equation (123), replace "$Z_4$" with -- $Z_6$ --

Column 56, line 36 (page 119, line 12), replace "appropriately" with -- approximately --.

Column 58, line 5 (page 123, line 6), replace "Hight" with -- High --.

Column 59, line 72 (page 127, line 8), replace "wieght" with -- weight --.

Column 63, line 5 (page 134, line 11), replace "$\alpha_{2r}$" with -- $\underline{\alpha}_{2r}$ --.

Column 63, line 21 (page 134, line 17), replace "$\alpha_{21}$" with -- $\underline{\alpha}_{21}$ --.

Column 63, line 25 (page 134, line 19), replace "$\alpha_f, \alpha_{ar}$ and $\alpha_{al}$" with -- $\dot{\alpha}_f, \dot{\alpha}_{ar}$ and $\dot{\alpha}_{al}$ --.

Column 64, line 5 (page 136, line 11) equation (142), replace "$a_f$" with -- $\underline{a}_f$ --.

Column 64, line 7 (page 136, line 12) equation (142), replace "$a$" with -- $\underline{a}_f$ --.

Column 64, line 12 (page 136, line 13), replace "=" with -- , --.

Column 64, line 13 (page 136, line 14), replace "$a_f$", first occurrence with -- $\underline{a}_f$ --.

Column 64, line 33 (page 137, line 3), replace "b" with -- p --.

Column 64, line 42 (page 137, line 8), replace "$\rho_2 v^2$" with -- $\dfrac{\rho v^2}{2}$ --.

Column 66, line 27 (page 141, line 2), after "$\dfrac{2q}{\rho}$" insert -- ). --.

Column 67, line 60 (page 144, line 2), replace "$a_f$" with -- $\bar{a}_f$ --.

Column 67, line 65 (page 144, line 3) equation (181), insert -- $\left\{\vphantom{\dfrac{a}{b}}\right.$ -- at left margin.

Column 68, line 71 (in the insertion at page 144), replace "fa and aa" with -- (fa) and (aa) --.

Column 70, line 1, (page 146, after line 15), cancel "the wave . . . follows the".

Column 71, line 56 (page 150, line 14), replace "side" with -- slide --.

Column 73, line 17 (page 153, line 8) equation (73A), replace "$a - la\big]$" with -- $\big]^{-a}{}_{al}$ --.

Column 76, line 68 (page 162, line 10), replace "823" with -- 923 --.

Column 77, line 30 (page 164, line 2), after "it" insert -- is --.

Column 77, line 46 (page 164, line 13), after "rubber" insert -- , --.

Column 80, line 38 (page 171, line 1), replace "sutable" with -- suitable --.

In the claims:

Column 81, line 28 (claim 1, line 4), replace "presure" with -- pressure --.

Column 82, line 5 (claim 3, line 18), replace "movement" with -- moment --.

Column 84, line 2 (claim 10, line 14), after "form" cancel "and".

Column 85, line 52 (claim 21, line 14), after "$\delta_2$" insert -- , --.

Column 85, line 60 (claim 21, line 19), replace "surfce" with -- surface --.

Column 87, line 41 (old claim 44, line 3), replace "invariand" with -- invariant --.

Column 87, line 52 (old claim 46, line 3), replace "porducing" with -- producing --.

Column 87, line 55 (old claim 46, line 4), after "q" insert -- , --.

Column 87, line 58 (old claim 46, line 6), replace denominator "1" with -- | --.

Column 88, (old claim 53), cancel line 15.

Column 88, line 65 (old claim 58, line 1), after "tion" insert -- , --.

Column 89, line 6 (old claim 59, line 5), replace "boad" with -- boat --.

Column 90, line 9 (old claim 63, line 3), cancel "to", first occurrence.

Column 91, line 26 (old claim 69, line 20), after "$B_a$" insert -- , $B_a$ --.

Column 92, line 22 (old claim 71, line 20), replace "estmiate" with -- estimate --.

Column 94, line 4 (old claim 74, line 29), after "$\dot{E}a_f$" insert -- = --.

Column 94, line 24 (old claim 75, line 8), replace "$\tau$" with -- $\gamma$ --.

Column 94, line 45 (old claim 77, line 9), replace denominator "l" with -- 1 --.

FO-1050
(5/69)

UNITED STATES PATENT OFFICE
CERTIFICATE OF CORRECTION

Patent No. 3,465,704  Dated September 9, 1969

Inventor(s) John Gordon Baker

It is certified that error appears in the above-identified patent and that said Letters Patent are hereby corrected as shown below:

"Applicant's Mistakes"

Column 32, line 5, equation (43) (page 65, line 13), after "$\delta_{21}$" insert -- + -- and replace "+" third occurrence with -- - --.

Column 34, line 25 or 28 (page 70, line 16) equation (53), replace "-" second occurrence with -- + --.

Column 34, line 32 or 35 (page 71, line 1) equation (54), replace "-" second occurrence with -- + --.

Column 34, line 45 (page 71, line 6) equation (56), replace "-" second occurrence with -- + --.

Column 34, lines 51-55 (page 71, line 8) equation (57), replace "-" second and third occurrences with -- + --.

Column 36, lines 17 and 18 (page 75, line 4), after "believed that" cancel "it has been fully described on that".

Columns 45 and 46, Table III (page 94), replace "$R_w = 40$" with -- $R = 40$ --.

Column 49, line 15 (page 100, line 5) equation (f), replace denominator "I" with $I_1$ --.

- 10 -

Column 49, line 18, (page 100, line 6) equation (a), replace denominator "1" with -- $1_2$ --.

Column 49, line 64 (page 102, line 1), cancel "(coupling means)".

Column 53, line 47 (page 111, line 14) equation (99), replace "1" with -- l --.

Column 53, line 55 (page 112, line 4) equation (101), replace "$\varepsilon^2$" with -- $\varepsilon_2$ --.

Column 53, line 60 (page 112, line 6) equation (61), replace denominator "1" with -- l --.

Column 53, line 63 (page 112, line 7) equation (62), replace denominator "1" with -- l --.

Column 55, lines 35-41, (page 116, lines 11 and 12) equation (118), replace numerator "1" five occurrences with -- l --.

Column 55, lines 45-48, (page 117, lines 1 and 2) equation (119), replace numerator "1" first and second occurrence with -- l -- and replace "$E\ddot{a}_a$" second occurrence with -- $E\dot{\ddot{a}}_a$ -- and insert beneath "$m_s \ldots l$" -- $\dfrac{\phantom{xxxxxxxx}}{A_a}$ --.

Column 56, line 70 (page 120, line 4) equation (126), replace numerator "(b+1)" with -- (b+l) -- and replace "$\dfrac{\lambda}{1}$" with -- $\dfrac{\lambda}{l}$ --.

Column 57, line 1 (page 120, line 6) equation (127), replace numerator "1" with -- l -- and replace "$\dfrac{\lambda}{1}$" with -- $\dfrac{\lambda}{l}$ --.

Column 70, line 3 (page 146, line 17), after "follows" insert -- , --.

Column 75, line 67 (page 159, line 3), replace "planning" with -- planing --.

Signed and sealed this 21st day of July 1970.

(SEAL)
Attest:

Edward M. Fletcher, Jr.
Attesting Officer

WILLIAM E. SCHUYLER, JR.
Commissioner of Patents